(12) United States Patent
Kumakura et al.

(10) Patent No.: US 11,493,244 B2
(45) Date of Patent: Nov. 8, 2022

(54) AIR-CONDITIONING UNIT

(71) Applicant: DAIKIN INDUSTRIES, LTD., Osaka (JP)

(72) Inventors: Eiji Kumakura, Osaka (JP); Takuro Yamada, Osaka (JP); Atsushi Yoshimi, Osaka (JP); Ikuhiro Iwata, Osaka (JP); Mitsushi Itano, Osaka (JP); Daisuke Karube, Osaka (JP); Yuuki Yotsumoto, Osaka (JP); Kazuhiro Takahashi, Osaka (JP); Yuzo Komatsu, Osaka (JP); Shun Ohkubo, Osaka (JP); Tatsuya Takakuwa, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 6 days.

(21) Appl. No.: 16/912,112

(22) Filed: Jun. 25, 2020

(65) Prior Publication Data

US 2020/0363105 A1 Nov. 19, 2020

Related U.S. Application Data

(63) Continuation-in-part of application No. 16/954,669, filed as application No. PCT/JP2018/045288 on Dec. 10, 2018.

(30) Foreign Application Priority Data

Dec. 18, 2017 (JP) .............................. JP2017-242183
Dec. 18, 2017 (JP) .............................. JP2017-242185
(Continued)

(51) Int. Cl.
*F25B 31/02* (2006.01)
*F25B 13/00* (2006.01)
*C09K 5/04* (2006.01)

(52) U.S. Cl.
CPC ............ *F25B 31/026* (2013.01); *C09K 5/045* (2013.01); *F25B 13/00* (2013.01); *C09K 2205/126* (2013.01); *C09K 2205/22* (2013.01)

(58) Field of Classification Search
CPC .......... F24F 1/0059; F24F 1/0063; F24F 1/24; F24F 1/38; F24F 5/001; F24F 1/14;
(Continued)

(56) References Cited

U.S. PATENT DOCUMENTS 5,185,092 A 2/1993 Fukuda et al.
5,344,069 A 9/1994 Narikiyo
(Continued)

FOREIGN PATENT DOCUMENTS

AU 2001284508 3/2002
CN 1288132 3/2001
(Continued)

OTHER PUBLICATIONS

International Search Report dated Mar. 19, 2019 in International Application No. PCT/JP2018/046531.
(Continued)

*Primary Examiner* — Kun Kai Ma
(74) *Attorney, Agent, or Firm* — Wenderoth, Lind & Ponack, L.L.P.

(57) ABSTRACT

An air-conditioning unit that is able to suppress ignition at an electric heater even when leakage of refrigerant occurs while a low-GWP refrigerant is used is provided. In an outdoor unit (20) including a casing (60), a compressor (21) provided inside the casing (60) and configured to compress refrigerant containing 1,2-difluoroethylene, and a drain pan heater (54) provided inside the casing (60), an electric power consumption of the drain pan heater (54) is lower than or equal to 300 W.

10 Claims, 26 Drawing Sheets

(30) Foreign Application Priority Data

| Dec. 18, 2017 | (JP) | JP2017-242186 |
|---|---|---|
| Dec. 18, 2017 | (JP) | JP2017-242187 |
| Oct. 5, 2018 | (WO) | PCT/JP2018/037483 |
| Oct. 17, 2018 | (WO) | PCT/JP2018/038746 |
| Oct. 17, 2018 | (WO) | PCT/JP2018/038747 |
| Oct. 17, 2018 | (WO) | PCT/JP2018/038748 |
| Oct. 17, 2018 | (WO) | PCT/JP2018/038749 |

(58) Field of Classification Search
CPC ........... F24F 11/88; F24F 13/30; C09K 5/045; C09K 2205/128; C09K 2205/106; C09K 2205/43; C09K 2205/122; C09K 2205/24; C09K 2205/126; C09K 2205/22
See application file for complete search history.

(56) References Cited

U.S. PATENT DOCUMENTS

| 5,851,968 | A | 12/1998 | Schnur | | |
|---|---|---|---|---|---|
| 6,591,631 | B1 | 7/2003 | Taira | | |
| 6,667,285 | B1 | 12/2003 | Kawahara et al. | | |
| 8,358,040 | B2 | 1/2013 | Komuro et al. | | |
| 10,131,827 | B2 | 11/2018 | Fukushima et al. | | |
| 10,883,745 | B2 | 1/2021 | Higashiiue et al. | | |
| 2002/0140309 | A1 | 10/2002 | Yanashima et al. | | |
| 2002/0193262 | A1 | 12/2002 | Kaimai et al. | | |
| 2004/0011062 | A1 | 1/2004 | Taira | | |
| 2006/0000224 | A1 | 1/2006 | Matsuoka | | |
| 2007/0209373 | A1 | 9/2007 | Taira et al. | | |
| 2008/0184723 | A1 | 8/2008 | Sato et al. | | |
| 2008/0184731 | A1 | 8/2008 | Sienel et al. | | |
| 2008/0188173 | A1 | 8/2008 | Chen et al. | | |
| 2009/0260382 | A1 | 10/2009 | Takeichi et al. | | |
| 2010/0067264 | A1 | 3/2010 | Ohashi et al. | | |
| 2010/0082162 | A1 | 4/2010 | Mundy et al. | | |
| 2010/0122545 | A1 | 5/2010 | Minor et al. | | |
| 2011/0108756 | A1 | 5/2011 | Tsuchiya et al. | | |
| 2011/0167848 | A1* | 7/2011 | Wakashima | ............... | F24F 1/14 62/151 |
| 2012/0260679 | A1 | 10/2012 | Huerta-Ochoa | | |
| 2014/0070132 | A1 | 3/2014 | Fukushima | | |
| 2014/0077123 | A1 | 3/2014 | Fukushima | | |
| 2014/0291411 | A1 | 10/2014 | Tamaki et al. | | |
| 2014/0314606 | A1 | 10/2014 | Maeyama et al. | | |
| 2014/0373569 | A1 | 12/2014 | Tsuboe et al. | | |
| 2015/0001981 | A1 | 1/2015 | Hattori et al. | | |
| 2015/0075203 | A1* | 3/2015 | Mochizuki | ............... | F24F 1/06 62/324.5 |
| 2015/0096321 | A1 | 4/2015 | Kawano et al. | | |
| 2015/0143841 | A1 | 5/2015 | Kawano et al. | | |
| 2015/0256038 | A1 | 9/2015 | Nigo et al. | | |
| 2015/0362199 | A1 | 12/2015 | Yumoto et al. | | |
| 2015/0376486 | A1 | 12/2015 | Hashimoto et al. | | |
| 2016/0018135 | A1 | 1/2016 | Yuzawa et al. | | |
| 2016/0047579 | A1 | 2/2016 | Yan et al. | | |
| 2016/0075927 | A1 | 3/2016 | Fukushima | | |
| 2016/0131378 | A1 | 5/2016 | Hinokuma et al. | | |
| 2016/0276886 | A1 | 9/2016 | Baba et al. | | |
| 2016/0333241 | A1 | 11/2016 | Fukushima et al. | | |
| 2016/0333243 | A1 | 11/2016 | Fukushima et al. | | |
| 2016/0340565 | A1 | 11/2016 | Tasaka et al. | | |
| 2016/0348933 | A1 | 12/2016 | Takeuchi et al. | | |
| 2016/0355719 | A1 | 12/2016 | Fukushima et al. | | |
| 2017/0002245 | A1 | 1/2017 | Fukushima | | |
| 2017/0058172 | A1 | 3/2017 | Fukushima et al. | | |
| 2017/0058173 | A1 | 3/2017 | Fukushima | | |
| 2017/0058174 | A1 | 3/2017 | Fukushima et al. | | |
| 2017/0121581 | A1 | 5/2017 | Horiike et al. | | |
| 2017/0138642 | A1* | 5/2017 | Ueno | ..................... | F04B 39/00 |
| 2017/0166831 | A1 | 6/2017 | Matsumoto | | |
| 2017/0248328 | A1 | 8/2017 | Eskew et al. | | |
| 2017/0328586 | A1 | 11/2017 | Maeyama | | |
| 2017/0336085 | A1 | 11/2017 | Yasuo et al. | | |
| 2017/0338707 | A1 | 11/2017 | Shono et al. | | |
| 2018/0051198 | A1* | 2/2018 | Okamoto | ............... | C09K 5/044 |
| 2018/0094844 | A1 | 4/2018 | Suzuki | | |
| 2018/0138763 | A1 | 5/2018 | Nakamura et al. | | |
| 2018/0156217 | A1 | 6/2018 | Sakima et al. | | |
| 2018/0156511 | A1 | 6/2018 | Chikami et al. | | |
| 2018/0254676 | A1 | 9/2018 | Nigo et al. | | |
| 2018/0299175 | A1 | 10/2018 | Hayamizu et al. | | |
| 2018/0320942 | A1 | 11/2018 | Hayamizu et al. | | |
| 2018/0331436 | A1 | 11/2018 | Hayamizu et al. | | |
| 2018/0358861 | A1 | 12/2018 | Hayamizu et al. | | |
| 2019/0063773 | A1* | 2/2019 | Nagahashi | ............... | F24F 11/62 |
| 2019/0068015 | A1 | 2/2019 | Yabe et al. | | |
| 2019/0309963 | A1 | 10/2019 | Zaki et al. | | |
| 2020/0079985 | A1 | 3/2020 | Okamoto et al. | | |
| 2020/0321816 | A1 | 10/2020 | Watanabe | | |
| 2020/0325375 | A1 | 10/2020 | Kumakura et al. | | |
| 2020/0325376 | A1 | 10/2020 | Kumakura et al. | | |
| 2020/0325377 | A1 | 10/2020 | Kumakura et al. | | |
| 2020/0326100 | A1 | 10/2020 | Ukibune et al. | | |
| 2020/0326101 | A1 | 10/2020 | Itano et al. | | |
| 2020/0326102 | A1 | 10/2020 | Kumakura et al. | | |
| 2020/0326103 | A1 | 10/2020 | Kumakura et al. | | |
| 2020/0326105 | A1 | 10/2020 | Kumakura et al. | | |
| 2020/0326109 | A1 | 10/2020 | Kumakura et al. | | |
| 2020/0326110 | A1 | 10/2020 | Asano et al. | | |
| 2020/0332164 | A1 | 10/2020 | Itano et al. | | |
| 2020/0332166 | A1 | 10/2020 | Kumakura et al. | | |
| 2020/0333041 | A1 | 10/2020 | Itano et al. | | |
| 2020/0333054 | A1 | 10/2020 | Asano et al. | | |
| 2020/0347283 | A1 | 11/2020 | Itano et al. | | |
| 2020/0363085 | A1 | 11/2020 | Itano et al. | | |
| 2020/0363105 | A1 | 11/2020 | Kumakura et al. | | |
| 2020/0363106 | A1 | 11/2020 | Itano et al. | | |
| 2020/0363112 | A1 | 11/2020 | Ohtsuka et al. | | |
| 2020/0369934 | A1 | 11/2020 | Itano et al. | | |
| 2020/0385620 | A1 | 12/2020 | Itano et al. | | |
| 2020/0385621 | A1 | 12/2020 | Itano et al. | | |
| 2020/0385622 | A1 | 12/2020 | Itano et al. | | |
| 2020/0392387 | A1 | 12/2020 | Ohtsuka et al. | | |
| 2020/0392388 | A1 | 12/2020 | Itano et al. | | |
| 2020/0393178 | A1 | 12/2020 | Kumakura et al. | | |
| 2021/0018191 | A1 | 1/2021 | Itano et al. | | |
| 2021/0135520 | A1 | 5/2021 | Shimokawa et al. | | |
| 2021/0189209 | A1 | 6/2021 | Yotdumoto et al. | | |
| 2021/0222040 | A1 | 7/2021 | Fukushima et al. | | |
| 2021/0355359 | A1 | 11/2021 | Ohkubo et al. | | |

FOREIGN PATENT DOCUMENTS

| CN | 1447491 | 10/2003 |
|---|---|---|
| CN | 1455855 | 11/2003 |
| CN | 1723373 | 1/2006 |
| CN | 1987264 | 6/2007 |
| CN | 101235815 | 8/2008 |
| CN | 101441012 | 5/2009 |
| CN | 102401519 | 4/2012 |
| CN | 103562338 | 2/2014 |
| CN | 203704143 | 7/2014 |
| CN | 103975204 | 8/2014 |
| CN | 104094069 | 10/2014 |
| CN | 104456760 | 3/2015 |
| CN | 104578493 | 4/2015 |
| CN | 204534884 | 8/2015 |
| CN | 104903661 | 9/2015 |
| CN | 104937350 | 9/2015 |
| CN | 204648544 | 9/2015 |
| CN | 105102905 | 11/2015 |
| CN | 204943959 | 1/2016 |
| CN | 205261858 | 5/2016 |
| CN | 106029821 | 10/2016 |
| CN | 106030222 | 10/2016 |
| CN | 106062159 | 10/2016 |
| CN | 106085363 | 11/2016 |
| CN | 106103992 | 11/2016 |
| CN | 106133110 | 11/2016 |
| CN | 106414653 | 2/2017 |
| CN | 106414654 | 2/2017 |
| CN | 106415152 | 2/2017 |
| CN | 106574802 | 4/2017 |

(56) References Cited

FOREIGN PATENT DOCUMENTS

| | | |
|---|---|---|
| CN | 106661477 | 5/2017 |
| CN | 106839496 | 6/2017 |
| CN | 107110570 | 8/2017 |
| CN | 107112830 | 8/2017 |
| CN | 107429957 | 12/2017 |
| CN | 107614980 | 1/2018 |
| CN | 107925285 | 4/2018 |
| CN | 108139112 | 6/2018 |
| CN | 108431414 | 8/2018 |
| CN | 108469126 | 8/2018 |
| EP | 1 231 255 | 8/2002 |
| EP | 1 246 348 | 10/2002 |
| EP | 1 326 057 | 7/2003 |
| EP | 1 632 732 | 3/2006 |
| EP | 1 953 388 | 8/2008 |
| EP | 2 423 609 | 2/2012 |
| EP | 2 620 736 | 7/2013 |
| EP | 2 711 405 | 3/2014 |
| EP | 2 789 933 | 10/2014 |
| EP | 2 840 335 | 2/2015 |
| EP | 2 853 826 | 4/2015 |
| EP | 2 918 953 | 9/2015 |
| EP | 2 952 828 | 12/2015 |
| EP | 2 980 508 | 2/2016 |
| EP | 3 012 555 | 4/2016 |
| EP | 3 012 557 | 4/2016 |
| EP | 3 070 417 | 9/2016 |
| EP | 3 101 082 | 12/2016 |
| EP | 3 109 302 | 12/2016 |
| EP | 3 115 716 | 1/2017 |
| EP | 3 121 242 | 1/2017 |
| EP | 3 128 259 | 2/2017 |
| EP | 3 147 595 | 3/2017 |
| EP | 3 153 559 | 4/2017 |
| EP | 3 153 561 | 4/2017 |
| EP | 3 170 881 | 5/2017 |
| EP | 3 222 934 | 9/2017 |
| EP | 3 249 309 | 11/2017 |
| EP | 3 299 731 | 3/2018 |
| EP | 3 358 272 | 8/2018 |
| EP | 3 358 278 | 8/2018 |
| EP | 3 399 189 | 11/2018 |
| GB | 2530915 | 4/2016 |
| JP | 51-90115 | 7/1976 |
| JP | 52-13025 | 4/1977 |
| JP | 57-198968 | 12/1982 |
| JP | 59-39790 | 3/1984 |
| JP | 62-69066 | 3/1987 |
| JP | 63-69066 | 3/1987 |
| JP | 2-4163 | 1/1990 |
| JP | 5-264070 | 10/1993 |
| JP | 5-272823 | 10/1993 |
| JP | 7-19627 | 1/1995 |
| JP | 7-190571 | 7/1995 |
| JP | 8-200273 | 8/1996 |
| JP | 10-46170 | 2/1998 |
| JP | 10-300292 | 11/1998 |
| JP | 10-309050 | 11/1998 |
| JP | 10-318564 | 12/1998 |
| JP | 11-206001 | 7/1999 |
| JP | 11-256358 | 9/1999 |
| JP | 2000-161805 | 6/2000 |
| JP | 2000-220877 | 8/2000 |
| JP | 2000-234767 | 8/2000 |
| JP | 2000-304302 | 11/2000 |
| JP | 2001-82755 | 3/2001 |
| JP | 2001-139972 | 5/2001 |
| JP | 2002-54888 | 2/2002 |
| JP | 2002-89978 | 3/2002 |
| JP | 2002-257366 | 9/2002 |
| JP | 2002-272043 | 9/2002 |
| JP | 2002-318028 | 10/2002 |
| JP | 2003-18776 | 1/2003 |
| JP | 2003-83614 | 3/2003 |
| JP | 2003-174794 | 6/2003 |
| JP | 2004-28035 | 1/2004 |
| JP | 2004-132647 | 4/2004 |
| JP | 2004-215406 | 7/2004 |
| JP | 2004-251535 | 9/2004 |
| JP | 2004-361036 | 12/2004 |
| JP | 2005-61711 | 3/2005 |
| JP | 2005-241045 | 9/2005 |
| JP | 2005-288502 | 10/2005 |
| JP | 2006-162197 | 6/2006 |
| JP | 2006-211824 | 8/2006 |
| JP | 2006-313027 | 11/2006 |
| JP | 2008-39305 | 2/2008 |
| JP | 2008-54488 | 3/2008 |
| JP | 2008-190377 | 8/2008 |
| JP | 2008-245384 | 10/2008 |
| JP | 2008-286422 | 11/2008 |
| JP | 2009-63216 | 3/2009 |
| JP | 2009-92274 | 4/2009 |
| JP | 2009-121654 | 6/2009 |
| JP | 2009-150620 | 7/2009 |
| JP | 2009-299975 | 12/2009 |
| JP | 2010-28985 | 2/2010 |
| JP | 2010-103346 | 5/2010 |
| JP | 2010-119190 | 5/2010 |
| JP | 2010-164222 | 7/2010 |
| JP | 2010-230242 | 10/2010 |
| JP | 2011-4449 | 1/2011 |
| JP | 2011-43304 | 3/2011 |
| JP | 2011-52884 | 3/2011 |
| JP | 2011-94841 | 5/2011 |
| JP | 2011-135638 | 7/2011 |
| JP | 2011-202738 | 10/2011 |
| JP | 2011-252636 | 12/2011 |
| JP | 2012-42169 | 3/2012 |
| JP | 2012-112617 | 6/2012 |
| JP | 2012-132637 | 7/2012 |
| JP | 2012-151969 | 8/2012 |
| JP | 2013-124848 | 6/2013 |
| JP | 2013-126281 | 6/2013 |
| JP | 2013-139990 | 7/2013 |
| JP | 2013-155892 | 8/2013 |
| JP | 2013-155921 | 8/2013 |
| JP | 2013-172615 | 9/2013 |
| JP | 2013-200090 | 10/2013 |
| JP | 2013-221671 | 10/2013 |
| JP | 2014-70840 | 4/2014 |
| JP | 2014-75971 | 4/2014 |
| JP | 2014-89004 | 5/2014 |
| JP | 2014-129543 | 7/2014 |
| JP | 2014-152999 | 8/2014 |
| JP | 2014-167381 | 9/2014 |
| JP | 2015-23721 | 2/2015 |
| JP | 2015-55455 | 3/2015 |
| JP | 2015-78789 | 4/2015 |
| JP | 2015-82875 | 4/2015 |
| JP | 2015-111012 | 6/2015 |
| JP | 2015-114082 | 6/2015 |
| JP | 2015-145765 | 8/2015 |
| JP | 2015-158282 | 9/2015 |
| JP | 2015-218909 | 12/2015 |
| JP | 2015-218912 | 12/2015 |
| JP | 2015-229767 | 12/2015 |
| JP | 2016-1062 | 1/2016 |
| JP | 2016-11423 | 1/2016 |
| JP | 2016-56340 | 4/2016 |
| JP | 2016-125808 | 7/2016 |
| JP | 2016-133256 | 7/2016 |
| JP | 2016-172869 | 9/2016 |
| JP | 2016-174461 | 9/2016 |
| JP | 2017-36861 | 2/2017 |
| JP | 2017-46430 | 3/2017 |
| JP | 2017-53285 | 3/2017 |
| JP | 2017-67373 | 4/2017 |
| JP | 2017-67428 | 4/2017 |
| JP | 2017-122549 | 7/2017 |
| JP | 2017-145975 | 8/2017 |
| JP | 2017-192190 | 10/2017 |
| JP | 2018-25377 | 2/2018 |
| KR | 2001-0029975 | 4/2001 |

(56) References Cited

FOREIGN PATENT DOCUMENTS

| | | | |
|---|---|---|---|
| KR | 2003-0028838 | 4/2003 | |
| KR | 10-0939609 | 10/2003 | |
| KR | 10-2004-0075737 | 8/2004 | |
| KR | 10-2005-0044931 | 5/2005 | |
| KR | 10-2017-0034887 | 3/2017 | |
| RU | 2013 156 3 80 | 6/2015 | |
| TW | 20030103482 | 2/2003 | |
| WO | 01/36571 | 5/2001 | |
| WO | 02/23100 | 3/2002 | |
| WO | 2009/069679 | 6/2009 | |
| WO | 2009/093345 | 7/2009 | |
| WO | 2012/157764 | 11/2012 | |
| WO | 2012/157765 | 11/2012 | |
| WO | WO-2012157765 A1 * | 11/2012 | ............. F25B 9/002 |
| WO | 2013/084301 | 6/2013 | |
| WO | 2013/146103 | 10/2013 | |
| WO | 2013/146208 | 10/2013 | |
| WO | 2013/151043 | 10/2013 | |
| WO | 2014/045400 | 3/2014 | |
| WO | 2014/118945 | 8/2014 | |
| WO | 2014/119149 | 8/2014 | |
| WO | 2014/156190 | 10/2014 | |
| WO | 2014/203353 | 12/2014 | |
| WO | 2014/203354 | 12/2014 | |
| WO | 2015/071967 | 5/2015 | |
| WO | 2015/115252 | 8/2015 | |
| WO | 2015/125763 | 8/2015 | |
| WO | 2015/125884 | 8/2015 | |
| WO | 2015/136981 | 9/2015 | |
| WO | 2015/140827 | 9/2015 | |
| WO | 2015/141678 | 9/2015 | |
| WO | 2015/186557 | 12/2015 | |
| WO | 2015/186670 | 12/2015 | |
| WO | 2016/009884 | 1/2016 | |
| WO | 2016/017460 | 2/2016 | |
| WO | 2016/103711 | 6/2016 | |
| WO | 2016/104418 | 6/2016 | |
| WO | 2016/117443 | 7/2016 | |
| WO | 2016/157538 | 10/2016 | |
| WO | 2016/182030 | 11/2016 | |
| WO | 2016/190232 | 12/2016 | |
| WO | 2017/038489 | 3/2017 | |
| WO | 2017/056789 | 4/2017 | |
| WO | 2017/057004 | 4/2017 | |
| WO | 2017/115636 | 7/2017 | |
| WO | 2017/122517 | 7/2017 | |
| WO | 2017/195248 | 11/2017 | |
| WO | 2019/123782 | 6/2019 | |
| WO | 2019/123804 | 6/2019 | |
| WO | 2019/123805 | 6/2019 | |
| WO | 2019/123806 | 6/2019 | |
| WO | 2019/123807 | 6/2019 | |
| WO | 2019/124400 | 6/2019 | |
| WO | 2019/124401 | 6/2019 | |
| WO | 2019/124402 | 6/2019 | |
| WO | 2019/124403 | 6/2019 | |
| WO | 2019/124404 | 6/2019 | |

OTHER PUBLICATIONS

International Preliminary Report on Patentability dated Jun. 23, 2020 in International Application No. PCT/JP2018/046531.
International Preliminary Report on Patentability dated Jun. 23, 2020 in International Application No. PCT/JP2018/045978.
International Search Report dated Mar. 19, 2019 in International Application No. PCT/JP2018/045978.
International Preliminary Report on Patentability dated Jun. 23, 2020 in International Application No. PCT/JP2018/046532.
International Search Report dated Feb. 12, 2019 in International Application No. PCT/JP2018/046532.
International Preliminary Report on Patentability dated Jun. 23, 2020 in International Application No. PCT/JP2018/042027.
International Search Report dated Feb. 12, 2019 in International Application No. PCT/JP2018/042027.
International Preliminary Report on Patentability dated Jun. 23, 2020 in International Application No. PCT/JP2018/042032.
International Search Report dated Feb. 19, 2019 in International Application No. PCT/JP2018/042032.
International Preliminary Report on Patentability dated Jun. 23, 2020 in International Application No. PCT/JP2018/046666.
International Search Report dated Apr. 2, 2019 in International Application No. PCT/JP2018/046666.
International Preliminary Report on Patentability dated Jun. 23, 2020 in International Application No. PCT/JP2018/045336.
International Search Report dated Feb. 19, 2019 in International Application No. PCT/JP2018/045336.
International Preliminary Report on Patentability dated Jun. 23, 2020 in International Application No. PCT/JP2018/045557.
International Search Report dated Mar. 12, 2019 in International Application No. PCT/JP2018/045557.
International Preliminary Report on Patentability dated Jun. 23, 2020 in International Application No. PCT/JP2018/046426.
International Search Report dated Feb. 19, 2019 in International Application No. PCT/JP2018/046426.
International Preliminary Report on Patentability dated Jun. 23, 2020 in International Application No. PCT/JP2018/046427.
International Search Report dated Feb. 19, 2019 in International Application No. PCT/JP2018/046427.
International Preliminary Report on Patentability dated Jun. 23, 2020 in International Application No. PCT/JP2018/046428.
International Search Report dated Mar. 19, 2019 in International Application No. PCT/JP2018/046428.
International Preliminary Report on Patentability dated Jun. 23, 2020 in International Application No. PCT/JP2018/046581.
International Search Report dated Mar. 5, 2019 in International Application No. PCT/JP2018/046581.
International Preliminary Report on Patentability dated Jun. 23, 2020 in International Application No. PCT/JP2018/046630.
International Search Report dated Mar. 5, 2019 in International Application No. PCT/JP2018/046630.
International Preliminary Report on Patentability dated Jun. 23, 2020 in International Application No. PCT/JP2018/046582.
International Search Report dated Mar. 5, 2019 in International Application No. PCT/JP2018/046582.
International Preliminary Report on Patentability dated Jun. 23, 2020 in International Application No. PCT/JP2018/046631.
International Search Report dated Mar. 5, 2019 in International Application No. PCT/JP2018/046631.
International Preliminary Report on Patentability dated Jun. 23, 2020 in International Application No. PCT/JP2018/046627.
International Search Report dated Mar. 19, 2019 in International Application No. PCT/JP2018/046627.
International Preliminary Report on Patentability dated Jun. 23, 2020 in International Application No. PCT/JP2018/046628.
International Search Report dated Mar. 19, 2019 in International Application No. PCT/JP2018/046628.
International Preliminary Report on Patentability dated Jun. 23, 2020 in International Application No. PCT/JP2018/045979.
International Search Report dated Mar. 12, 2019 in International Application No. PCT/JP2018/045979.
International Preliminary Report on Patentability dated Jun. 23, 2020 in International Application No. PCT/JP2018/046434.
International Search Report dated Feb. 19, 2019 in International Application No. PCT/JP2018/046434.
International Preliminary Report on Patentability dated Jun. 23, 2020 in International Application No. PCT/JP2018/045290.
International Search Report dated Jan. 22, 2019 in International Application No. PCT/JP2018/045290.
International Preliminary Report on Patentability dated Jun. 23, 2020 in International Application No. PCT/JP2018/045288.
International Search Report dated Jan. 22, 2019 in International Application No. PCT/JP2018/045288.
International Preliminary Report on Patentability dated Jun. 23, 2020 in International Application No. PCT/JP2018/045289.
International Search Report dated Jan. 22, 2019 in International Application No. PCT/JP2018/045289.

(56) References Cited

OTHER PUBLICATIONS

International Preliminary Report on Patentability dated Jun. 23, 2020 in International Application No. PCT/JP2018/046639.
International Preliminary Report on Patentability dated Jun. 23, 2020 in International Application No. PCT/JP2018/046642.
International Preliminary Report on Patentability dated Jun. 23, 2020 in International Application No. PCT/JP2018/038746.
International Preliminary Report on Patentability dated Jun. 23, 2020 in International Application No. PCT/JP2018/046643.
International Preliminary Report on Patentability dated Jun. 23, 2020 in International Application No. PCT/JP2018/038748.
International Preliminary Report on Patentability dated Jun. 23, 2020 in International Application No. PCT/JP2018/046640.
International Preliminary Report on Patentability dated Jun. 23, 2020 in International Application No. PCT/JP2018/046644.
International Preliminary Report on Patentability dated Jun. 23, 2020 in International Application No. PCT/JP2018/038749.
International Preliminary Report on Patentability dated Jun. 23, 2020 in International Application No. PCT/JP2018/037483.
International Search Report dated Feb. 19, 2019 in International Application No. PCT/JP2018/045335.
International Preliminary Report on Patentability dated Jun. 23, 2020 in International Application No. PCT/JP2018/045335.
International Search Report dated Feb. 19, 2019 in International Application No. PCT/JP2018/046435.
International Preliminary Report on Patentability dated Jun. 23, 2020 in International Application No. PCT/JP2018/046435.
International Search Report dated Mar. 19, 2019 in International (PCT) Application No. PCT/JP2018/046530.
International Preliminary Report on Patentability dated Jun. 23, 2020 in International Application No. PCT/JP2018/046530.
International Search Report dated Feb. 12, 2019 in International (PCT) Application No. PCT/JP2018/046533.
International Preliminary Report on Patentability dated Jun. 23, 2020 in International Application No. PCT/JP2018/046533.
Hirahara et al., "Latest trend of alternative refrigerant: LCCP-analogy for HFO-1234yf Air Conditioners using a Simulation with R134a Properties", Refrigeration, Jan. 15, 2010, vol. 85, No. 987, pp. 15-20, with partial translation.
International Preliminary Report on Patentability dated Jun. 23, 2020 in International Application No. PCT/JP2018/038747.
International Search Report dated Mar. 12, 2019 in International (PCT) Application No. PCT/JP2018/046639.
International Search Report dated Mar. 12, 2019 in International (PCT) Application No. PCT/JP2018/046642.
International Search Report dated Dec. 18, 2018 in International (PCT) Application No. PCT/JP2018/038746.
International Search Report dated Mar. 19, 2019 in International (PCT) Application No. PCT/JP2018/046643.
International Search Report dated Dec. 18, 2018 in International (PCT) Application No. PCT/JP2018/038748.
International Search Report dated Mar. 12, 2019 in International (PCT) Application No. PCT/JP2018/046640.
International Search Report dated Mar. 19, 2019 in International (PCT) Application No. PCT/JP2018/046644.
International Search Report dated Dec. 18, 2018 in International (PCT) Application No. PCT/JP2018/038749.
International Search Report dated Dec. 18, 2018 in International (PCT) Application No. PCT/JP2018/037483.
International Search Report dated Dec. 18, 2018 in International (PCT) Application No. PCT/JP2018/038747.
Summary, Collection of Papers of the 2nd Symposium on New Technologies of Refrigeration and Air Conditioning, 2nd Edition, Ding Guoliang, Ed., published by Shanghai Jiatong University Press, 2003, with Concise Explanation.

* cited by examiner

AIR-CONDITIONING UNIT

TECHNICAL FIELD

The present disclosure relates to an air-conditioning unit.

BACKGROUND ART

Hitherto, in heat cycle systems, such as air conditioners, R410A is often used as a refrigerant. R410A is a two-component mixed refrigerant of difluoromethane ($CH_2F_2$; HFC-32, or R32) and pentafluoroethane ($C_2HF_5$; HFC-125, or R125) and is a pseudo-azeotropic composition.

However, the global warming potential (GWP) of R410A is 2088, and, in recent years, because of growing concern about global warming, R32 that has a further lower GWP of 675 is used more often.

For this reason, for example, PTL 1 (International Publication No. 2015/141678) suggests various types of low-GWP refrigerant mixtures as alternatives to R410A.

SUMMARY OF THE INVENTION

Technical Problem

However, such low-GWP refrigerants include flammable refrigerants. In air-conditioning units, an electric heatier having a high electric power consumption can be used for various purposes. In this way, in air-conditioning units in which an electric heater having a high electric power consumption is used, it is desired to suppress ignition at the electric heater even when leakage of flammable refrigerant occurs.

The contents of the present disclosure are described in view of the above-described points, and it is an object to provide an air-conditioning unit that is able to suppress ignition at an electric heater even when leakage of refrigerant occurs while a low-GWP refrigerant is used.

Solution to Problem

An air-conditioning unit according to a first aspect includes a casing, a device, and an electric heater. The device is provided inside the casing. The electric heater is provided inside the casing. The device is a compressor configured to compress refrigerant containing 1,2-difluoroethylene and/or a heat exchanger configured to exchange heat between outside air and refrigerant containing 1,2-difluoroethylene. An electric power consumption of the electric heater is lower than or equal to 300 W.

The air-conditioning unit is not limited and may be, for example, a heat source unit or a service unit in a refrigeration cycle apparatus, such as an air conditioner in which the heat source unit, such as an outdoor unit, and the service unit, such as an indoor unit, are connected via a connection pipe. The heat source unit may include only the heat exchanger, and the compressor may be provided in a different unit.

In this air-conditioning unit, the compressor configured to compress refrigerant containing 1,2-difluoroethylene and/or the heat exchanger configured to exchange heat between outside air and refrigerant containing 1,2-difluoroethylene is accommodated together with the electric heater in the casing; however, the electric power consumption of the electric heater is lower than or equal to 300 W. Therefore, if the above-described refrigerant leaks, ignition at the electric heater is suppressed.

An air-conditioning unit according to a second aspect is the air-conditioning unit of the first aspect, and the casing has an air outlet for discharging air having passed through the heat exchanger at a side in an installation state. The electric power consumption of the electric heater is higher than or equal to 75 W.

Since the electric power consumption of the electric heater is higher than or equal to 75 W in this air-conditioning unit, the function of the electric heater is easily exercised.

An air-conditioning unit according to a third aspect is the air-conditioning unit of the second aspect and has a single fan configured to form air flow passing through the heat exchanger. The electric power consumption of the electric heater is higher than or equal to 75 W and lower than or equal to 100 W.

Preferably, an internal volume (the volume of fluid that can be filled inside) of the heat exchanger of the air-conditioning unit including only a single fan is greater than or equal to 0.4 L and less than 3.5 L. Specifically, for the one in which no refrigerant container (which is a low-pressure receiver, a high-pressure receiver, or the like, except an accumulator attached to the compressor) in a refrigerant circuit in which the air-conditioning unit is used, the internal volume is preferably greater than or equal to 0.4 L and less than or equal to 2.5 L; for the one in which a refrigerant container is provided in a refrigerant circuit (preferably, the number of service units, such as indoor units, is one), the internal volume is preferably greater than or equal to 1.4 L and less than 3.5 L.

Since this air-conditioning unit has a capacity to such a degree that only a single fan is provided, even when the electric power consumption of the electric heater is lower than or equal to 100 W, the function of the electric heater is sufficiently exercised.

An air-conditioning unit according to a fourth aspect is the air-conditioning unit of the second aspect and has two fans configured to form air flow passing through the heat exchanger. The electric power consumption of the electric heater is higher than or equal to 100 W.

Preferably, an internal volume (the volume of fluid that can be filled inside) of the heat exchanger of the air-conditioning unit including two fans is greater than or equal to 3.5 L and less than or equal to 7.0 L. Specifically, for the one in which one or multiple service units, such as indoor units including no expansion valve are provided in a refrigerant circuit in which an air-conditioning unit is used, the internal volume is preferably greater than or equal to 3.5 L and less than 5.0 L; for the one in which multiple service units, such as indoor units including an expansion valve are provided in a refrigerant circuit, the internal volume is preferably greater than or equal to 5.0 L and less than or equal to 7.0 L.

Since this air-conditioning unit includes two fans, the capacity of the air-conditioning unit is large, and a large-capacity electric heater tends to be required. Here, the electric power consumption of the electric heater is higher than or equal to 100 W, so the function of the electric heater can be sufficiently exercised appropriately for the capacity of the air-conditioning unit.

An air-conditioning unit according to a fifth aspect is the air-conditioning unit of the first aspect, and the casing has an air outlet for upwardly discharging air having passed through the heat exchanger. The electric power consumption of the electric heater is higher than or equal to 200 W.

Preferably, an internal volume (the volume of fluid that can be filled inside) of the heat exchanger of the air-conditioning unit that upwardly discharges air having passed through the heat exchanger is greater than or equal to 5.5 L and less than or equal to 38 L. Preferably, the one in which the internal volume of the heat exchanger is greater than or equal to 5.5 L and less than or equal to 38 L in this way is employed in the one in which multiple service units, such as indoor units including an expansion valve, are provided in a refrigerant circuit.

Since this air-conditioning unit upwardly sends air having passed through the heat exchanger, the capacity of the air-conditioning unit is large, and a large-capacity electric heater tends to be required. Here, the electric power consumption of the electric heater is higher than or equal to 200 W, so the function of the electric heater can be sufficiently exercised appropriately for the capacity of the air-conditioning unit.

An air-conditioning unit according to a sixth aspect is the air-conditioning unit of any one of the first aspect to the fifth aspect, and the electric heater is at least any one of a drain pan heater, a crankcase heater, and a refrigerant heater.

When this air-conditioning unit includes a drain pan heater, freezing of dew condensation water on a drain pan can be suppressed in the air-conditioning unit including the drain pan. When the air-conditioning unit includes a crankcase heater, generation of bubbles of refrigerating machine oil (oil foaming) at the startup of the compressor can be suppressed in the air-conditioning unit including the compressor. When the air-conditioning unit includes a refrigerant heater, refrigerant in the refrigerant circuit can be heated.

An air-conditioning unit according to a seventh aspect is the air-conditioning unit according to any of the first through sixth aspects, wherein the refrigerant comprises trans-1,2-difluoroethylene (HFO-1132(E)), trifluoroethylene (HFO-1123), and 2,3,3,3-tetrafluoro-1-propene (R1234yf).

With this air-conditioning unit, a refrigerant having such performance that the refrigerant has a sufficiently low GWP and a refrigeration capacity (which may be referred to as cooling capacity or capacity) and a coefficient of performance (COP) equivalent to those of R410A is used, and ignition at the electric heater can be suppressed even when leakage of the refrigerant occurs.

An air-conditioning unit according to an eighth aspect is the air-conditioning unit according to the seventh aspect, wherein when the mass % of HFO-1132(E), HFO-1123, and R1234yf based on their sum in the refrigerant is respectively represented by x, y, and z, coordinates (x,y,z) in a ternary composition diagram in which the sum of FO-1132(E), HFO-1123, and R1234yf is 100 mass % are within the range of a figure surrounded by line segments AA', A'B, BD, DC', C'C, CO, and OA that connect the following 7 points:
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0),
point C (32.9, 67.1, 0.0), and
point O (100.0, 0.0, 0.0),
or on the above line segments (excluding the points on the line segments BD, CO, and OA);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments BD, CO, and OA are straight lines.

An air-conditioning unit according to a ninth aspect is the air-conditioning unit according to the seventh aspect, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments GI, IA, AA', A'B, BD, DC', C'C, and CG that connect the following 8 points:
point G (72.0, 28.0, 0.0),
point I (72.0, 0.0, 28.0),
point A (68.6, 0.0, 31.4),
point A' (30.6, 30.0, 39.4),
point B (0.0, 58.7, 41.3),
point D (0.0, 80.4, 19.6),
point C'(19.5, 70.5, 10.0), and
point C (32.9, 67.1, 0.0),
or on the above line segments (excluding the points on the line segments IA, BD, and CG);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments GI, IA, BD, and CG are straight lines.

An air-conditioning unit according to a tenth aspect is the air-conditioning unit according to the seventh aspect, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments JP, PN, NK, KA', A'B, BD, DC', C'C, and CJ that connect the following 9 points:
point J (47.1, 52.9, 0.0),
point P (55.8, 42.0, 2.2),
point N (68.6, 16.3, 15.1),
point K (61.3, 5.4, 33.3),
point A' (30.6, 30.0, 39.4),
point B (0.0, 58.7, 41.3),
point D (0.0, 80.4, 19.6),
point C'(19.5, 70.5, 10.0), and
point C (32.9, 67.1, 0.0),
or on the above line segments (excluding the points on the line segments BD and CJ);
the line segment PN is represented by coordinates (x, $-0.1135x^2+12.112x-280.43$, $0.1135x^2-13.112x+380.43$),
the line segment NK is represented by coordinates (x, $0.2421x^2-29.955x+931.91$, $-0.2421x^2+28.955x-831.91$),
the line segment KA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments JP, BD, and CG are straight lines.

An air-conditioning unit according to an eleventh aspect is the air-conditioning unit according to the seventh aspect, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments JP, PL, LM, MA', A'B, BD, DC', C'C, and CJ that connect the following 9 points:

point J (47.1, 52.9, 0.0),
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segments BD and CJ);

the line segment PL is represented by coordinates (x, $-0.1135x^2+12.112x-280.43$, $0.1135x^2-13.112x+380.43$)

the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments JP, LM, BD, and CG are straight lines.

An air-conditioning unit according to a twelfth aspect is the air-conditioning unit according to the seventh aspect, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments PL, LM, MA', A'B, BF, FT, and TP that connect the following 7 points:

point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point F (0.0, 61.8, 38.2), and
point T (35.8, 44.9, 19.3),
or on the above line segments (excluding the points on the line segment BF);

the line segment PL is represented by coordinates (x, $-0.1135x^2+12.112x-280.43$, $0.1135x^2-13.112x+380.43$), the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment FT is represented by coordinates (x, $0.0078x^2-0.7501x+61.8$, $-0.0078x^2-0.2499x+38.2$), the line segment TP is represented by coordinates (x, $0.00672x^2-0.7607x+63.525$, $-0.00672x^2-0.2393x+36.475$), and the line segments LM and BF are straight lines.

An air-conditioning unit according to a thirteenth aspect is the air-conditioning unit according to the seventh aspect, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments PL, LQ, QR, and RP that connect the following 4 points:

point P (55.8, 42.0, 2.2),
point L (63.1, 31.9, 5.0),
point Q (62.8, 29.6, 7.6), and
point R (49.8, 42.3, 7.9),
or on the above line segments;

the line segment PL is represented by coordinates (x, $-0.1135x^2+12.112x-280.43$, $0.1135x^2-13.112x+380.43$), the line segment RP is represented by coordinates (x, $0.00672x^2-0.7607x+63.525$, $-0.00672x^2-0.2393x+36.475$), and the line segments LQ and QR are straight lines.

An air-conditioning unit according to a fourteenth aspect is the air-conditioning unit according to the seventh aspect, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments SM, MA', A'B, BF, FT, and TS that connect the following 6 points:

point S (62.6, 28.3, 9.1),
point M (60.3, 6.2, 33.5),
point A' (30.6, 30.0, 39.4),
point B (0.0, 58.7, 41.3),
point F (0.0, 61.8, 38.2), and
point T (35.8, 44.9, 19.3),
or on the above line segments, the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment FT is represented by coordinates (x, $0.0078x^2-0.7501x+61.8$, $-0.0078x^2-0.2499x+38.2$), the line segment TS is represented by coordinates (x, $-0.0017x^2-0.7869x+70.888$, $-0.0017x^2-0.2131x+29.112$), and the line segments SM and BF are straight lines.

An air-conditioning unit according to a fifteenth aspect is the air-conditioning unit according to any of the first through sixth aspects, wherein the refrigerant comprises trans-1,2-difluoroethylene (HFO-1132(E)) and trifluoroethylene (HFO-1123) in a total amount of 99.5 mass % or more based on the entire refrigerant, and the refrigerant comprises 62.0 mass % to 72.0 mass % of HFO-1132(E) based on the entire refrigerant.

With this air-conditioning unit, a refrigerant having such performance that the refrigerant has a sufficiently low GWP and a coefficient of performance (COP) and a refrigeration capacity (which may be referred to as cooling capacity or capacity) equivalent to those of R410A and is classified with lower flammability (class 2L) under the standard of American Society of Heating Refrigeration and Air Conditioning Engineers (ASHRAE) is used, and ignition at the electric heater can be suppressed even when leakage of the refrigerant occurs.

An air-conditioning unit according to a sixteenth aspect is the air-conditioning unit according to any of the first through sixth aspects, wherein the refrigerant comprises HFO-1132(E) and HFO-1123 in a total amount of 99.5 mass % or more based on the entire refrigerant, and the refrigerant comprises 45.1 mass % to 47.1 mass % of HFO-1132(E) based on the entire refrigerant.

With this air-conditioning unit, a refrigerant having such performance that the refrigerant has a sufficiently low GWP and a coefficient of performance (COP) and a refrigeration capacity (which may be referred to as cooling capacity or capacity) equivalent to those of R410A and is classified with lower flammability (class 2L) under the standard of American Society of Heating Refrigeration and Air Conditioning Engineers (ASHRAE) is used, and ignition at the electric heater can be suppressed even when leakage of the refrigerant occurs.

An air-conditioning unit according to a seventeenth aspect is the air-conditioning unit according to any of the first through sixth aspects, wherein the refrigerant comprises trans-1,2-difluoroethylene (HFO-1132(E)), trifluoroethylene (HFO-1123), 2,3,3,3-tetrafluoro-1-propene (R1234yf), and difluoromethane (R32), wherein when the mass % of HFO-1132(E), HFO-1123, R1234yf, and R32 based on their sum in the refrigerant is respectively represented by x, y, z, and a, if $0 < a \leq 11.1$, coordinates (x,y,z) in a ternary composition diagram in which the sum of HFO-1132(E), HFO-1123, and R1234yf is (100−a) mass % are within the range of a figure surrounded by straight lines GI, IA, AB, BD', D'C, and CG that connect the following 6 points:
point G ($0.026a^2-1.7478a+72.0$, $-0.026a^2+0.7478a+28.0$, 0.0),
point I ($0.026a^2-1.7478a+72.0$, 0.0, $-0.026a^2+0.7478a+28.0$),
point A ($0.0134a^2-1.9681a+68.6$, 0.0, $-0.0134a^2+0.9681a+31.4$),
point B (0.0, $0.0144a^2-1.6377a+58.7$, $-0.0144a^2+0.6377a+41.3$),
point D' (0.0, $0.0224a^2+0.968a+75.4$, $-0.0224a^2-1.968a+24.6$), and
point C ($-0.2304a^2-0.4062a+32.9$, $0.2304a^2-0.5938a+67.1$, 0.0),
or on the straight lines GI, AB, and D'C (excluding point G, point I, point A, point B, point D', and point C);

if $11.1 < a \leq 18.2$, coordinates (x,y,z) in the ternary composition diagram are within the range of a figure surrounded by straight lines GI, IA, AB, BW, and WG that connect the following 5 points:
point G ($0.02a^2-1.6013a+71.105$, $-0.02a^2+0.6013a+28.895$, 0.0),
point I ($0.02a^2-1.6013a+71.105$, 0.0, $-0.02a^2+0.6013a+28.895$),
point A ($0.0112a^2-1.9337a+68.484$, 0.0, $-0.0112a^2+0.9337a+31.516$),
point B (0.0, $0.0075a^2-1.5156a+58.199$, $-0.0075a^2+0.5156a+41.801$), and
point W (0.0, 100.0−a, 0.0),
or on the straight lines GI and AB (excluding point G, point I, point A, point B, and point W);

if $18.2 < a \leq 26.7$, coordinates (x,y,z) in the ternary composition diagram are within the range of a figure surrounded by straight lines GI, IA, AB, BW, and WG that connect the following 5 points:
point G ($0.0135a^2-1.4068a+69.727$, $-0.0135a^2+0.4068a+30.273$, 0.0),
point I ($0.0135a^2-1.4068a+69.727$, 0.0, $-0.0135a^2+0.4068a+30.273$),
point A ($0.0107a^2-1.9142a+68.305$, 0.0, $-0.0107a^2+0.9142a+31.695$),
point B (0.0, $0.009a^2-1.6045a+59.318$, $-0.009a^2+0.6045a+40.682$), and
point W (0.0, 100.0−a, 0.0),
or on the straight lines GI and AB (excluding point G, point I, point A, point B, and point W);

if $26.7 < a \leq 36.7$, coordinates (x,y,z) in the ternary composition diagram are within the range of a figure surrounded by straight lines GI, IA, AB, BW, and WG that connect the following 5 points:
point G ($0.0111a^2-1.3152a+68.986$, $-0.0111a^2+0.3152a+31.014$, 0.0),
point I ($0.0111a^2-1.3152a+68.986$, 0.0, $-0.0111a^2+0.3152a+31.014$),
point A ($0.0103a^2-1.9225a+68.793$, 0.0, $-0.0103a^2+0.9225a+31.207$),
point B (0.0, $0.0046a^2-1.41a+57.286$, $-0.0046a^2+0.41a+42.714$), and
point W (0.0, 100.0−a, 0.0),
or on the straight lines GI and AB (excluding point G, point I, point A, point B, and point W); and if $36.7 < a \leq 46.7$, coordinates (x,y,z) in the ternary composition diagram are within the range of a figure surrounded by straight lines GI, IA, AB, BW, and WG that connect the following 5 points:
point G ($0.0061a^2-0.9918a+63.902$, $-0.0061a^2-0.0082a+36.098$, 0.0),
point I ($0.0061a^2-0.9918a+63.902$, 0.0, $-0.0061a^2-0.0082a+36.098$),
point A ($0.0085a^2-1.8102a+67.1$, 0.0, $-0.0085a^2+0.8102a+32.9$),
point B (0.0, $0.0012a^2-1.1659a+52.95$, $-0.0012a^2+0.1659a+47.05$), and
point W (0.0, 100.0−a, 0.0),
or on the straight lines GI and AB (excluding point G, point I, point A, point B, and point W).

With this air-conditioning unit, a refrigerant having such performance that the refrigerant has a sufficiently low GWP and a refrigeration capacity (which may be referred to as cooling capacity or capacity) and a coefficient of performance (COP) equivalent to those of R410A is used, and ignition at the electric heater can be suppressed even when leakage of the refrigerant occurs.

An air-conditioning unit according to an eighteenth aspect is the air-conditioning unit according to any of the first through sixth aspects, wherein the refrigerant comprises trans-1,2-difluoroethylene (HFO-1132(E)), trifluoroethylene (HFO-1123), 2,3,3,3-tetrafluoro-1-propene (R1234yf), and difluoromethane (R32), wherein when the mass % of HFO-1132(E), HFO-1123, R1234yf, and R32 based on their sum in the refrigerant is respectively represented by x, y, z, and a, if $0 < a \leq 11.1$, coordinates (x,y,z) in a ternary composition diagram in which the sum of HFO-1132(E), HFO-1123, and R1234yf is (100−a) mass % are within the range of a figure surrounded by straight lines JK', K'B, BD', D'C, and CJ that connect the following 5 points:

point J ($0.0049a^2-0.9645a+47.1$, $-0.0049a^2-0.0355a+52.9$, 0.0),
point K' ($0.0514a^2-2.4353a+61.7$, $-0.0323a^2+0.4122a+5.9$, $-0.0191a^2+1.0231a+32.4$),
point B (0.0, $0.0144a^2-1.6377a+58.7$, $-0.0144a^2+0.6377a+41.3$),
point D' (0.0, $0.0224a^2+0.968a+75.4$, $-0.0224a^2-1.968a+24.6$), and
point C ($-0.2304a^2-0.4062a+32.9$, $0.2304a^2-0.5938a+67.1$, 0.0),
or on the straight lines JK', K'B, and D'C (excluding point J, point B, point D', and point C);
if $11.1<a \leq 18.2$, coordinates (x,y,z) in the ternary composition diagram are within the range of a figure surrounded by straight lines JK', K'B, BW, and WJ that connect the following 4 points:
point J ($0.0243a^2-1.4161a+49.725$, $-0.0243a^2+0.4161a+50.275$, 0.0),
point K' ($0.0341a^2-2.1977a+61.187$, $-0.0236a^2+0.34a+5.636$, $-0.0105a^2+0.8577a+33.177$),
point B (0.0, $0.0075a^2-1.5156a+58.199$, $-0.0075a^2+0.5156a+41.801$), and
point W (0.0, 100.0−a, 0.0),
or on the straight lines JK' and K'B (excluding point J, point B, and point W);
if $18.2<a \leq 26.7$, coordinates (x,y,z) in the ternary composition diagram are within the range of a figure surrounded by straight lines JK', K'B, BW, and WJ that connect the following 4 points:
point J ($0.0246a^2-1.4476a+50.184$, $-0.0246a^2+0.4476a+49.816$, 0.0),
point K' ($0.0196a^2-1.7863a+58.515$, $-0.0079a^2-0.1136a+8.702$, $-0.0117a^2+0.8999a+32.783$),
point B (0.0, $0.009a^2-1.6045a+59.318$, $-0.009a^2+0.6045a+40.682$), and
point W (0.0, 100.0−a, 0.0),
or on the straight lines JK' and K'B (excluding point J, point B, and point W);
if $26.7<a \leq 36.7$, coordinates (x,y,z) in the ternary composition diagram are within the range of a figure surrounded by straight lines JK', K'A, AB, BW, and WJ that connect the following 5 points:
point J ($0.0183a^2-1.1399a+46.493$, $-0.0183a^2+0.1399a+53.507$, 0.0),
point K' ($-0.0051a^2+0.0929a+25.95$, 0.0, $0.0051a^2-1.0929a+74.05$),
point A ($0.0103a^2-1.9225a+68.793$, 0.0, $-0.0103a^2+0.9225a+31.207$),
point B (0.0, $0.0046a^2-1.41a+57.286$, $-0.0046a^2+0.41a+42.714$), and
point W (0.0, 100.0−a, 0.0),
or on the straight lines JK', K'A, and AB (excluding point J, point B, and point W); and
if $36.7<a \leq 46.7$, coordinates (x,y,z) in the ternary composition diagram are within the range of a figure surrounded by straight lines JK', K'A, AB, BW, and WJ that connect the following 5 points:
point J ($-0.0134a^2+1.0956a+7.13$, $0.0134a^2-2.0956a+92.87$, 0.0),
point K'($-1.892a+29.443$, 0.0, $0.892a+70.557$),
point A ($0.0085a^2-1.8102a+67.1$, 0.0, $-0.0085a^2+0.8102a+32.9$),
point B (0.0, $0.0012a^2-1.1659a+52.95$, $-0.0012a^2+0.1659a+47.05$), and
point W (0.0, 100.0−a, 0.0),
or on the straight lines JK', K'A, and AB (excluding point J, point B, and point W).

With this air-conditioning unit, a refrigerant having such performance that the refrigerant has a sufficiently low GWP and a refrigeration capacity (which may be referred to as cooling capacity or capacity) and a coefficient of performance (COP) equivalent to those of R410A is used, and ignition at the electric heater can be suppressed even when leakage of the refrigerant occurs.

An air-conditioning unit according to a nineteenth aspect is the air-conditioning unit according to any of the first through sixth aspects, wherein the refrigerant comprises trans-1,2-difluoroethylene (HFO-1132(E)), difluoromethane (R32), and 2,3,3,3-tetrafluoro-1-propene (R1234yf), wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:
point I (72.0, 0.0, 28.0),
point J (48.5, 18.3, 33.2),
point N (27.7, 18.2, 54.1), and
point E (58.3, 0.0, 41.7),
or on these line segments (excluding the points on the line segment EI;
the line segment IJ is represented by coordinates ($0.0236y^2-1.7616y+72.0$, y, $-0.0236y^2+0.7616y+28.0$);
the line segment NE is represented by coordinates ($0.012y^2-1.9003y+58.3$, y, $-0.012y^2+0.9003y+41.7$); and
the line segments JN and E are straight lines.

With this air-conditioning unit, a refrigerant having such performance that the refrigerant has a sufficiently low GWP and a refrigeration capacity (which may be referred to as cooling capacity or capacity) equivalent to that of R410A and is classified with lower flammability (class 2L) under the standard of American Society of Heating Refrigeration and Air Conditioning Engineers (ASHRAE) is used, and ignition at the electric heater can be suppressed even when leakage of the refrigerant occurs.

An air-conditioning unit according to a twentieth aspect is the air-conditioning unit according to any of the first through sixth aspects, wherein the refrigerant comprises HFO-1132(E), R32, and R1234yf, wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments MM', M'N, NV, VG, and GM that connect the following 5 points:
point M (52.6, 0.0, 47.4),
point M'(39.2, 5.0, 55.8),
point N (27.7, 18.2, 54.1),
point V (11.0, 18.1, 70.9), and
point G (39.6, 0.0, 60.4),
or on these line segments (excluding the points on the line segment GM);
the line segment MM' is represented by coordinates ($0.132y^2-3.34y+52.6$, y, $-0.132y^2+2.34y+47.4$);
the line segment M'N is represented by coordinates ($0.0596y^2-2.2541y+48.98$, y, $-0.0596y^2+1.2541y+51.02$);
the line segment VG is represented by coordinates ($0.0123y^2-1.8033y+39.6$, y, $-0.0123y^2+0.8033y+60.4$); and
the line segments NV and GM are straight lines.

With this air-conditioning unit, a refrigerant having such performance that the refrigerant has a sufficiently low GWP and a refrigeration capacity (which may be referred to as cooling capacity or capacity) equivalent to that of R410A and is classified with lower flammability (class 2L) under the standard of American Society of Heating Refrigeration and Air Conditioning Engineers (ASHRAE) is used, and ignition at the electric heater can be suppressed even when leakage of the refrigerant occurs.

An air-conditioning unit according to a twenty first aspect is the air-conditioning unit according to any of the first through sixth aspects, wherein the refrigerant comprises HFO-1132(E), R32, and R1234yf, wherein when the mass % of HFO-1132(E), R32, and R1234yf based on their sum in the refrigerant is respectively represented by x, y and z, coordinates (x,y,z) in a ternary composition diagram in which the sum of HFO-1132(E), R32, and R1234yf is 100 mass % are within the range of a figure surrounded by line segments ON, NU, and UO that connect the following 3 points:

point O (22.6, 36.8, 40.6),
point N (27.7, 18.2, 54.1), and
point U (3.9, 36.7, 59.4),
or on these line segments;

the line segment ON is represented by coordinates $(0.0072y^2-0.6701y+37.512, y, -0.0072y^2-0.3299y+62.488)$;

the line segment NU is represented by coordinates $(0.0083y^2-1.7403y+56.635, y, -0.0083y^2+0.7403y+43.365)$; and the line segment UO is a straight line.

With this air-conditioning unit, a refrigerant having such performance that the refrigerant has a sufficiently low GWP and a refrigeration capacity (which may be referred to as cooling capacity or capacity) equivalent to that of R410A and is classified with lower flammability (class 2L) under the standard of American Society of Heating Refrigeration and Air Conditioning Engineers (ASHRAE) is used, and ignition at the electric heater can be suppressed even when leakage of the refrigerant occurs.

An air-conditioning unit according to a twenty second aspect is the air-conditioning unit according to any of the first through sixth aspects, wherein the refrigerant comprises HFO-1132(E), R32, and R1234yf,
wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:

point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments;

the line segment QR is represented by coordinates $(0.0099y^2-1.975y+84.765, y, -0.0099y^2+0.975y+15.235)$;

the line segment RT is represented by coordinates $(0.0082y^2-1.8683y+83.126, y, -0.0082y^2+0.8683y+16.874)$;

the line segment LK is represented by coordinates $(0.0049y^2-0.8842y+61.488, y, -0.0049y^2-0.1158y+38.512)$;

the line segment KQ is represented by coordinates $(0.0095y^2-1.2222y+67.676, y, -0.0095y^2+0.2222y+32.324)$; and the line segment TL is a straight line.

With this air-conditioning unit, a refrigerant having such performance that the refrigerant has a sufficiently low GWP and a refrigeration capacity (which may be referred to as cooling capacity or capacity) equivalent to that of R410A and is classified with lower flammability (class 2L) under the standard of American Society of Heating Refrigeration and Air Conditioning Engineers (ASHRAE) is used, and ignition at the electric heater can be suppressed even when leakage of the refrigerant occurs.

An air-conditioning unit according to a twenty third aspect is the air-conditioning unit according to any of the first through sixth aspects, wherein the refrigerant comprises HFO-1132(E), R32, and R1234yf,
wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments PS, ST, and TP that connect the following 3 points:

point P (20.5, 51.7, 27.8),
point S (21.9, 39.7, 38.4), and
point T (8.6, 51.6, 39.8),
or on these line segments;

the line segment PS is represented by coordinates $(0.0064y^2-0.7103y+40.1, y, -0.0064y^2-0.2897y+59.9)$;

the line segment ST is represented by coordinates $(0.0082y^2-1.8683y+83.126, y, -0.0082y^2+0.8683y+16.874)$; and the line segment TP is a straight line.

With this air-conditioning unit, a refrigerant having such performance that the refrigerant has a sufficiently low GWP and a refrigeration capacity (which may be referred to as cooling capacity or capacity) equivalent to that of R410A and is classified with lower flammability (class 2L) under the standard of American Society of Heating Refrigeration and Air Conditioning Engineers (ASHRAE) is used, and ignition at the electric heater can be suppressed even when leakage of the refrigerant occurs.

An air-conditioning unit according to a twenty fourth aspect is the air-conditioning unit according to any of the first through sixth aspects, wherein the refrigerant comprises trans-1,2-difluoroethylene (HFO-1132(E)), trifluoroethylene (HFO-1123), and difluoromethane (R32),
wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments IK, KB', B'H, HR, RG, and GI that connect the following 6 points:

point I (72.0, 28.0, 0.0),
point K (48.4, 33.2, 18.4),
point B' (0.0, 81.6, 18.4),
point H (0.0, 84.2, 15.8),
point R (23.1, 67.4, 9.5), and
point G (38.5, 61.5, 0.0), or on these line segments (excluding the points on the line segments B'H and GI);

the line segment IK is represented by coordinates $(0.025z^2-1.7429z+72.00, -0.025z^2+0.7429z+28.0, z)$, the line segment HR is represented by coordinates $(-0.3123z^2+4.234z+11.06, 0.3123z^2-5.234z+88.94, z)$, the line segment RG is represented by coordinates $(-0.0491z^2-1.1544z+38.5, 0.0491z^2+0.1544z+61.5, z)$, and the line segments KB' and GI are straight lines.

With this air-conditioning unit, a refrigerant having such performance that the refrigerant has a sufficiently low GWP and a coefficient of performance (COP) equivalent to that of R410A is used, and ignition at the electric heater can be suppressed even when leakage of the refrigerant occurs.

An air-conditioning unit according to a twenty fifth aspect is the air-conditioning unit according to any of the first through sixth aspects, wherein the refrigerant comprises HFO-1132(E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments IJ, JR, RG, and GI that connect the following 4 points:

point I (72.0, 28.0, 0.0),
point J (57.7, 32.8, 9.5),
point R (23.1, 67.4, 9.5), and
point G (38.5, 61.5, 0.0),
or on these line segments (excluding the points on the line segment GI);

the line segment IJ is represented by coordinates $(0.025z^2-1.7429z+72.0, -0.025z^2+0.7429z+28.0, z)$, the line segment RG is represented by coordinates $(-0.0491z^2-1.1544z+38.5, 0.0491z^2+0.1544z+61.5, z)$, and the line segments JR and GI are straight lines.

With this air-conditioning unit, a refrigerant having such performance that the refrigerant has a sufficiently low GWP and a coefficient of performance (COP) equivalent to that of R410A is used, and ignition at the electric heater can be suppressed even when leakage of the refrigerant occurs.

An air-conditioning unit according to a twenty sixth aspect is the air-conditioning unit according to any of the first through sixth aspects, wherein the refrigerant comprises HFO-1132(E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments MP, PB', B'H, HR, RG, and GM that connect the following 6 points:

point M (47.1, 52.9, 0.0),
point P (31.8, 49.8, 18.4),
point B' (0.0, 81.6, 18.4),
point H (0.0, 84.2, 15.8),
point R (23.1, 67.4, 9.5), and
point G (38.5, 61.5, 0.0),
or on these line segments (excluding the points on the line segments B'H and GM);

the line segment MP is represented by coordinates $(0.0083z^2-0.984z+47.1, -0.0083z^2-0.016z+52.9, z)$, the line segment HR is represented by coordinates $(-0.3123z^2+4.234z+11.06, 0.3123z^2-5.234z+88.94, z)$, the line segment RG is represented by coordinates $(-0.0491z^2-1.1544z+38.5, 0.0491zz+0.1544z+61.5, z)$, and the line segments PB' and GM are straight lines.

With this air-conditioning unit, a refrigerant having such performance that the refrigerant has a sufficiently low GWP and a coefficient of performance (COP) equivalent to that of R410A is used, and ignition at the electric heater can be suppressed even when leakage of the refrigerant occurs.

An air-conditioning unit according to a twenty seventh aspect is the air-conditioning unit according to any of the first through sixth aspects, wherein the refrigerant comprises HFO-1132(E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments MN, NR, RG, and GM that connect the following 4 points:

point M (47.1, 52.9, 0.0),
point N (38.5, 52.1, 9.5),
point R (23.1, 67.4, 9.5), and
point G (38.5, 61.5, 0.0),
or on these line segments (excluding the points on the line segment GM);

the line segment MN is represented by coordinates $(0.0083z^2-0.984z+47.1, -0.0083z^2-0.016z+52.9, z)$, the line segment RG is represented by coordinates $(-0.0491z^2-1.1544z+38.5, 0.0491z^2+0.1544z+61.5, z)$, and the line segments JR and GI are straight lines.

With this air-conditioning unit, a refrigerant having such performance that the refrigerant has a sufficiently low GWP and a coefficient of performance (COP) equivalent to that of R410A is used, and ignition at the electric heater can be suppressed even when leakage of the refrigerant occurs.

An air-conditioning unit according to a twenty eighth aspect is the air-conditioning unit according to any of the first through sixth aspects, wherein the refrigerant comprises HFO-1132(E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments PS, ST, and TP that connect the following 3 points:

point P (31.8, 49.8, 18.4),
point S (25.4, 56.2, 18.4), and
point T (34.8, 51.0, 14.2),
or on these line segments;

the line segment ST is represented by coordinates $(-0.0982z^2+0.9622z+40.931, 0.0982z^2-1.9622z+59.069, z)$, the line segment TP is represented by coordinates $(0.0083z^2-0.984z+47.1, -0.0083z^2-0.016z+52.9, z)$, and the line segment PS is a straight line.

With this air-conditioning unit, a refrigerant having such performance that the refrigerant has a sufficiently low GWP and a coefficient of performance (COP) equivalent to that of R410A is used, and ignition at the electric heater can be suppressed even when leakage of the refrigerant occurs.

An air-conditioning unit according to a twenty ninth aspect is the air-conditioning unit according to any of the first through sixth aspects, wherein the refrigerant comprises HFO-1132(E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments QB", B"D, DU, and UQ that connect the following 4 points:

point Q (28.6, 34.4, 37.0),
point B" (0.0, 63.0, 37.0),
point D (0.0, 67.0, 33.0), and
point U (28.7, 41.2, 30.1),
or on these line segments (excluding the points on the line segment B"D);

the line segment DU is represented by coordinates $(-3.4962z^2+210.71z-3146.1, 3.4962z^2-211.71z+3246.1, z)$, the line segment UQ is represented by coordinates $(0.0135z^2-0.9181z+44.133, -0.0135z^2-0.0819z+55.867, z)$, and the line segments QB" and B"D are straight lines.

With this air-conditioning unit, a refrigerant having such performance that the refrigerant has a sufficiently low GWP and a coefficient of performance (COP) equivalent to that of R410A is used, and ignition at the electric heater can be suppressed even when leakage of the refrigerant occurs.

DESCRIPTION OF EMBODIMENTS

(1) Definition of Terms

Figure 1:
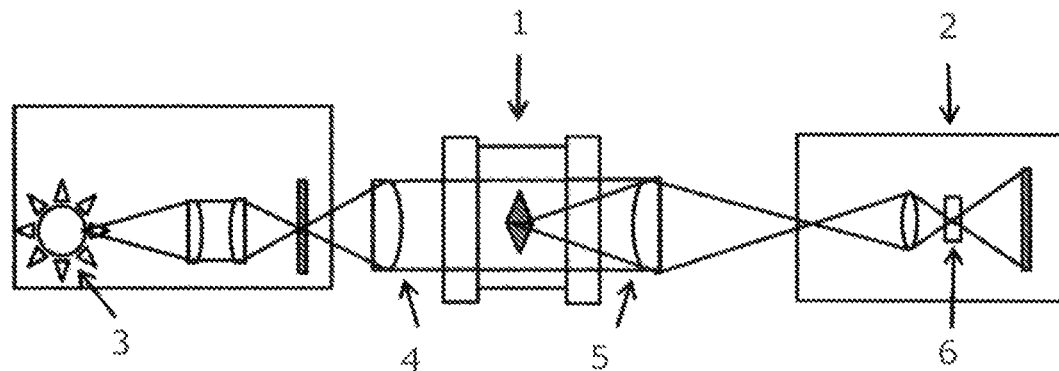
FIG. 1 is a schematic view of an instrument used for a flammability test.
Figure 2:
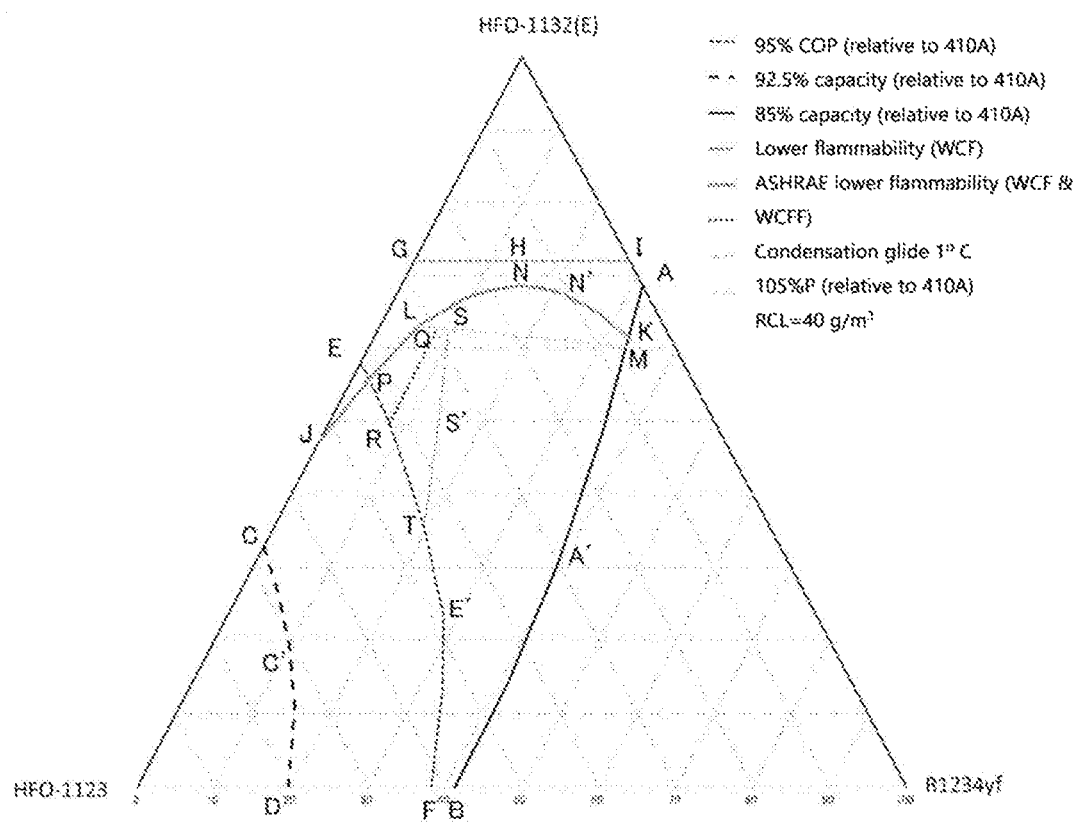
FIG. 2 is a diagram showing points A to T and line segments that connect these points in a ternary composition diagram in which the sum of FO-1132(E), HFO-1123, and R1234yf is 100 mass %.

In the present specification, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given. Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC). Non-fluorocarbon compounds include propane (R290), propylene (R1270), butane (R600), isobutane (R600a), carbon dioxide (R744), ammonia (R717), and the like.

In the present specification, the phrase "composition comprising a refrigerant" at least includes (1) a refrigerant itself (including a mixture of refrigerants), (2) a composition that further comprises other components and that can be mixed with at least a refrigeration oil to obtain a working fluid for a refrigerating machine, and (3) a working fluid for a refrigerating machine containing a refrigeration oil. In the present specification, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."

In the present specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant by using the second refrigerant. This type of alternative means that the same use is achieved with an alternative refrigerant.

In the present specification, the term "refrigerating machine" refers to machines in general that draw heat from an object or space to make its temperature lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

In the present specification, a refrigerant having a "WCF lower flammability" means that the most flammable composition (worst case of formulation for flammability: WCF) has a burning velocity of 10 cm/s or less according to the US ANSI/ASHRAE Standard 34-2013. Further, in the present specification, a refrigerant having "ASHRAE lower flammability" means that the burning velocity of WCF is 10 cm/s or less, that the most flammable fraction composition (worst case of fractionation for flammability: WCFF), which is specified by performing a leakage test during storage, shipping, or use based on ANSI/ASHRAE 34-2013 using WCF, has a burning velocity of 10 cm/s or less, and that flammability classification according to the US ANSI/ASHRAE Standard 34-2013 is determined to classified as be "Class 2L."

In the present specification, a refrigerant having an "RCL of x % or more" means that the refrigerant has a refrigerant concentration limit (RCL), calculated in accordance with the US ANSI/ASHRAE Standard 34-2013, of x % or more. RCL refers to a concentration limit in the air in consideration of safety factors. RCL is an index for reducing the risk of acute toxicity, suffocation, and flammability in a closed space where humans are present. RCL is determined in accordance with the ASHRAE Standard. More specifically, RCL is the lowest concentration among the acute toxicity exposure limit (ATEL), the oxygen deprivation limit (ODL), and the flammable concentration limit (FCL), which are respectively calculated in accordance with sections 7.1.1, 7.1.2, and 7.1.3 of the ASHRAE Standard.

In the present specification, temperature glide refers to an absolute value of the difference between the initial temperature and the end temperature in the phase change process of a composition containing the refrigerant of the present disclosure in the heat exchanger of a refrigerant system.

(2) Refrigerant (2-1) Refrigerant Component

Any one of various refrigerants such as refrigerant A, refrigerant B, refrigerant C, refrigerant D, and refrigerant E, details of these refrigerant are to be mentioned later, can be used as the refrigerant.

(2-2) Use of Refrigerant

The refrigerant according to the present disclosure can be preferably used as a working fluid in a refrigerating machine.

The composition according to the present disclosure is suitable for use as an alternative refrigerant for HFC refrigerant such as R410A, R407C and R404 etc, or HCFC refrigerant such as R22 etc.

(3) Refrigerant Composition

The refrigerant composition according to the present disclosure comprises at least the refrigerant according to the present disclosure, and can be used for the same use as the refrigerant according to the present disclosure. Moreover, the refrigerant composition according to the present disclosure can be further mixed with at least a refrigeration oil to thereby obtain a working fluid for a refrigerating machine.

The refrigerant composition according to the present disclosure further comprises at least one other component in addition to the refrigerant according to the present disclosure. The refrigerant composition according to the present disclosure may comprise at least one of the following other components, if necessary. As described above, when the refrigerant composition according to the present disclosure is used as a working fluid in a refrigerating machine, it is generally used as a mixture with at least a refrigeration oil. Therefore, it is preferable that the refrigerant composition according to the present disclosure does not substantially comprise a refrigeration oil. Specifically, in the refrigerant composition according to the present disclosure, the content of the refrigeration oil based on the entire refrigerant composition is preferably 0 to 1 mass %, and more preferably 0 to 0.1 mass %.

(3-1) Water

The refrigerant composition according to the present disclosure may contain a small amount of water. The water content of the refrigerant composition is preferably 0.1 mass % or less based on the entire refrigerant. A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition.

(3-2) Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers. Preferably, a compound that cannot be an impurity inevitably mixed in the refrigerant of the present disclosure is selected as the tracer.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). The tracer is particularly preferably a hydrofluorocarbon, a hydrochlorofluorocarbon, a chlorofluorocarbon, a fluorocarbon, a hydrochlorocarbon, a fluorocarbon, or a fluoroether.

The following compounds are preferable as the tracer.

FC-14 (tetrafluoromethane, $CF_4$)
HCC-40 (chloromethane, $CH_3Cl$)
HFC-23 (trifluoromethane, $CHF_3$)
HFC-41 (fluoromethane, $CH_3Cl$)
HFC-125 (pentafluoroethane, $CF_3CHF_2$)
HFC-134a (1,1,1,2-tetrafluoroethane, $CF_3CH_2F$)
HFVC-134 (1,1,2,2-tetrafluoroethane, $CHF_2CHF_2$)
HFC-143a (1,1,1-trifluoroethane, $CF_3CH_3$)
HFC-143 (1,1,2-trifluoroethane, $CHF_2CH_2F$)
HFC-152a (1,1-difluoroethane, $CHF_2CH_3$)
HFVC-152 (1,2-difluoroethane, $CH_2FCH_2F$)
HFC-161 (fluoroethane, $CH_3CH_2F$)
HFC-245fa (1,1,1,3,3-pentafluoropropane, $CF_3CH_2CHF_2$)
HFC-236fa (1,1,1,3,3,3-hexafluoropropane, $CF_3CH_2CF_3$)
HFC-236ea (1,1,1,2,3,3-hexafluoropropane, $CF_3CHFCHF_2$)
HFC-227ea (1,1,1,2,3,3,3-heptafluoropropane, $CF_3CHFCF_3$)
HCFC-22 (chlorodifluoromethane, $CHCF_2$)
HCFC-31 (chlorofluoromethane, $CH_2ClF$)
CFC-1113 (chlorotrifluoroethylene, $CF_2=CCF$)
HFE-125 (trifluoromethyl-difluoromethyl ether, $CF_3OCHF_2$)
HFE-134a (trifluoromethyl-fluoromethyl ether, $CF_3OCH_2F$)
HFE-143a (trifluoromethyl-methyl ether, $CF_3OCH_3$)
HFE-227ea (trifluoromethyl-tetrafluoroethyl ether, $CF_3OCHFCF_3$)
HFE-236fa (trifluoromethyl-trifluoroethyl ether, $CF_3OCH_2CF_3$)

The tracer compound may be present in the refrigerant composition at a total concentration of about 10 parts per million (ppm) to about 1000 ppm. Preferably, the tracer compound is present in the refrigerant composition at a total concentration of about 30 ppm to about 500 ppm, and most preferably, the tracer compound is present at a total concentration of about 50 ppm to about 300 ppm.

(3-3) Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably either naphthalimide or coumarin, or both.

(3-4) Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane.

Examples of amines include 2,2,3,3,3-pentafluoropropylamine and diphenylamine.

Examples of stabilizers also include butylhydroxyxylene and benzotriazole.

The content of the stabilizer is not limited. Generally, the content of the stabilizer is preferably 0.01 to 5 mass %, and more preferably 0.05 to 2 mass %, based on the entire refrigerant.

(3-5) Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is not limited. Generally, the content of the polymerization inhibitor is preferably 0.01 to 5 mass %, and more preferably 0.05 to 2 mass %, based on the entire refrigerant.

(4) Refrigeration Oil-Containing Working Fluid

The refrigeration oil-containing working fluid according to the present disclosure comprises at least the refrigerant or refrigerant composition according to the present disclosure and a refrigeration oil, for use as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition. The refrigeration oil-containing working fluid generally comprises 10 to 50 mass % of refrigeration oil.

(4-1) Refrigeration Oil

The refrigeration oil is not limited, and can be suitably selected from commonly used refrigeration oils. In this case, refrigeration oils that are superior in the action of increasing the miscibility with the mixture and the stability of the mixture, for example, are suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil. The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication.

The refrigeration oil-containing working fluid according to the present disclosure may further optionally contain at least one additive. Examples of additives include compatibilizing agents described below.

(4-2) Compatibilizing Agent

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

(5) Various Refrigerants

Hereinafter, the refrigerants A to E, which are the refrigerants used in the present embodiment, will be described in detail.

In addition, each description of the following refrigerant A, refrigerant B, refrigerant C, refrigerant D, and refrigerant E is each independent. The alphabet which shows a point or a line segment, the number of an Examples, and the number of a comparative examples are all independent of each other among the refrigerant A, the refrigerant B, the refrigerant C, the refrigerant D, and the refrigerant E. For example, the first embodiment of the refrigerant A and the first embodiment of the refrigerant B are different embodiment from each other.

(5-1) Refrigerant A

The refrigerant A according to the present disclosure is a mixed refrigerant comprising trans-1,2-difluoroethylene (HFO-1132(E)), trifluoroethylene (HFO-1123), and 2,3,3,3-tetrafluoro-1-propene (R1234yf).

The refrigerant A according to the present disclosure has various properties that are desirable as an R410A-alternative refrigerant, i.e., a refrigerating capacity and a coefficient of performance that are equivalent to those of R410A, and a sufficiently low GWP.

The refrigerant A according to the present disclosure is a composition comprising HFO-1132(E) and R1234yf, and optionally further comprising HFO-1123, and may further satisfy the following requirements. This refrigerant also has various properties desirable as an alternative refrigerant for R410A; i.e., it has a refrigerating capacity and a coefficient of performance that are equivalent to those of R410A, and a sufficiently low GWP.

Requirements

Preferable refrigerant A is as follows:

When the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments AA', A'B, BD, DC', C'C, CO, and OA that connect the following 7 points:

point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0),
point C (32.9, 67.1, 0.0), and
point O (100.0, 0.0, 0.0), or on the above line segments (excluding the points on the line CO);

the line segment AA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments BD, CO, and OA are straight lines.

When the requirements above are satisfied, the refrigerant according to the present disclosure has a refrigerating capacity ratio of 85% or more relative to that of R410A, and a COP of 92.5% or more relative to that of R410A.

When the mass % of HFO-1132(E), HFO-1123, and R1234yf, based on their sum in the refrigerant A according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within a figure surrounded by line segments GI, IA, AA', A'B, BD, DC', C'C, and CG that connect the following 8 points:

point G (72.0, 28.0, 0.0),
point I (72.0, 0.0, 28.0),
point A (68.6, 0.0, 31.4),
point A' (30.6, 30.0, 39.4),
point B (0.0, 58.7, 41.3),
point D (0.0, 80.4, 19.6),
point C'(19.5, 70.5, 10.0), and
point C (32.9, 67.1, 0.0), or on the above line segments (excluding the points on the line segment CG);

the line segment AA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments GI, IA, BD, and CG are straight lines.

When the requirements above are satisfied, the refrigerant A according to the present disclosure has a refrigerating capacity ratio of 85% or more relative to that of R410A, and a COP of 92.5% or more relative to that of R410A; furthermore, the refrigerant A has a WCF lower flammability according to the ASHRAE Standard (the WCF composition has a burning velocity of 10 cm/s or less).

When the mass % of HFO-1132(E), HFO-1123, and R1234yf based on their sum in the refrigerant according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within the range of a figure surrounded by line segments JP, PN, NK, KA', A'B, BD, DC', C'C, and CJ that connect the following 9 points:
point J (47.1, 52.9, 0.0),
point P (55.8, 42.0, 2.2),
point N (68.6, 16.3, 15.1),
point K (61.3, 5.4, 33.3),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segment CJ);

the line segment PN is represented by coordinates (x, $-0.1135x^2+12.112x-280.43$, $0.1135x^2-13.112x+380.43$),
the line segment NK is represented by coordinates (x, $0.2421x^2-29.955x+931.91$, $-0.2421x^2+28.955x-831.91$),
the line segment KA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments JP, BD, and CG are straight lines.

When the requirements above are satisfied, the refrigerant A according to the present disclosure has a refrigerating capacity ratio of 85% or more relative to that of R410A, and a COP of 92.5% or more relative to that of R410A; furthermore, the refrigerant exhibits a lower flammability (Class 2L) according to the ASHRAE Standard (the WCF composition and the WCFF composition have a burning velocity of 10 cm/s or less).

When the mass % of HFO-1132(E), HFO-1123, and R1234yf based on their sum in the refrigerant according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within the range of a figure surrounded by line segments JP, PL, LM, MA', A'B, BD, DC', C'C, and CJ that connect the following 9 points:
point J (47.1, 52.9, 0.0),
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point D (0.0, 80.4, 19.6),
point C'(19.5, 70.5, 10.0), and
point (32.9, 67.1, 0.0),
or on the above line segments (excluding the points on the line segment CJ);

the line segment PL is represented by coordinates (x, $-0.1135x^2+12.112x-280.43$, $0.1135x^2-13.112x+380.43$),
the line segment MA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments JP, LM, BD, and CG are straight lines.

When the requirements above are satisfied, the refrigerant according to the present disclosure has a refrigerating capacity ratio of 85% or more relative to that of R410A, and a COP of 92.5% or more relative to that of R410A; furthermore, the refrigerant has an RCL of 40 g/m³ or more.

When the mass % of HFO-1132(E), HFO-1123, and R1234yf based on their sum in the refrigerant A according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within the range of a figure surrounded by line segments PL, LM, MA', A'B, BF, FT, and TP that connect the following 7 points:
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point F (0.0, 61.8, 38.2), and
point T (35.8, 44.9, 19.3),
or on the above line segments (excluding the points on the line segment BF);

the line segment PL is represented by coordinates (x, $-0.1135x^2+12.112x-280.43$, $0.1135x^2-13.112x+380.43$),
the line segment MA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment FT is represented by coordinates (x, $0.0078x^2-0.7501x+61.8$, $-0.0078x^2-0.2499x+38.2$),
the line segment TP is represented by coordinates (x, $0.00672x^2-0.7607x+63.525$, $-0.00672x^2-0.2393x+36.475$), and
the line segments LM and BF are straight lines.

When the requirements above are satisfied, the refrigerant according to the present disclosure has a refrigerating capacity ratio of 85% or more relative to that of R410A, and a COP of 95% or more relative to that of R410A; furthermore, the refrigerant has an RCL of 40 g/m³ or more.

The refrigerant A according to the present disclosure is preferably a refrigerant wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments PL, LQ, QR, and RP that connect the following 4 points:
point P (55.8, 42.0, 2.2),
point L (63.1, 31.9, 5.0),
point Q (62.8, 29.6, 7.6), and
point R (49.8, 42.3, 7.9),
or on the above line segments;

the line segment PL is represented by coordinates (x, $-0.1135x^2+12.112x-280.43$, $0.1135x^2-13.112x+380.43$), the line segment RP is represented by coordinates (x, $0.00672x^2-0.7607x+63.525$, $-0.00672x^2-0.2393x+36.475$), and the line segments LQ and QR are straight lines.

When the requirements above are satisfied, the refrigerant according to the present disclosure has a COP of 95% or more relative to that of R410A, and an RCL of 40 g/m³ or more, furthermore, the refrigerant has a condensation temperature glide of 1° C. or less.

The refrigerant A according to the present disclosure is preferably a refrigerant wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments SM, MA', A'B, BF, FT, and TS that connect the following 6 points:

point S (62.6, 28.3, 9.1),
point M (60.3, 6.2, 33.5),
point A'(30.6, 30.0, 39.4),
point B (0.0, 58.7, 41.3),
point F (0.0, 61.8, 38.2), and
point T (35.8, 44.9, 19.3),
or on the above line segments, the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment FT is represented by coordinates (x, $0.0078x^2-0.7501x+61.8$, $-0.0078x^2-0.2499x+38.2$), the line segment TS is represented by coordinates (x, $-0.0017x^2-0.7869x+70.888$, $-0.0017x^2-0.2131x+29.112$), and the line segments SM and BF are straight lines.

When the requirements above are satisfied, the refrigerant according to the present disclosure has a refrigerating capacity ratio of 85% or more relative to that of R410A, a COP of 95% or more relative to that of R410A, and an RCL of 40 g/m³ or more furthermore, the refrigerant has a discharge pressure of 105% or more relative to that of R410A.

The refrigerant A according to the present disclosure is preferably a refrigerant wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments Od, dg, gh, and hO that connect the following 4 points:

point d (87.6, 0.0, 12.4),
point g (18.2, 55.1, 26.7),
point h (56.7, 43.3, 0.0), and
point o (100.0, 0.0, 0.0),
or on the line segments Od, dg, gh, and hO (excluding the points O and h);

the line segment dg is represented by coordinates $(0.0047y^2-1.5177y+87.598$, y, $-0.0047y^2+0.5177y+12.402)$, the line segment gh is represented by coordinates $(-0.0134z^2-1.0825z+56.692$, $0.0134z^2+0.0825z+43.308$, z), and the line segments hO and Od are straight lines.

When the requirements above are satisfied, the refrigerant according to the present disclosure has a refrigerating capacity ratio of 92.5% or more relative to that of R410A, and a COP ratio of 92.5% or more relative to that of R410A.

The refrigerant A according to the present disclosure is preferably a refrigerant wherein when the mass % of HFO-1132(E), HFO-1123, and R1234yf, based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments lg, gh, hi, and il that connect the following 4 points:

point l (72.5, 10.2, 17.3),
point g (18.2, 55.1, 26.7),
point h (56.7, 43.3, 0.0), and
point i (72.5, 27.5, 0.0) or on the line segments lg, gh, and il (excluding the points h and i);

the line segment lg is represented by coordinates $(0.0047y^2-1.5177y+87.598$, y, $-0.0047y^2+0.5177y+12.402)$, the line gh is represented by coordinates $(-0.0134z^2-1.0825z+56.692$, $0.0134z^2+0.0825z+43.308$, z), and the line segments hi and il are straight lines.

When the requirements above are satisfied, the refrigerant according to the present disclosure has a refrigerating capacity ratio of 92.5% or more relative to that of R410A, and a COP ratio of 92.5% or more relative to that of R410A; furthermore, the refrigerant has a lower flammability (Class 2L) according to the ASHRAE Standard.

The refrigerant A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments Od, de, ef, and fO that connect the following 4 points:

point d (87.6, 0.0, 12.4),
point e (31.1, 42.9, 26.0),
point f (65.5, 34.5, 0.0), and
point O (100.0, 0.0, 0.0),
or on the line segments Od, de, and ef (excluding the points O and f);

the line segment de is represented by coordinates $(0.0047y^2-1.5177y+87.598$, y, $-0.0047y^2+0.5177y+12.402)$, the line segment ef is represented by coordinates $(-0.0064z^2-1.1565z+65.501$, $0.0064z^2+0.1565z+34.499$, z), and the line segments fO and Od are straight lines.

When the requirements above are satisfied, the refrigerant according to the present disclosure has a refrigerating capacity ratio of 93.5% or more relative to that of R410A, and a COP ratio of 93.5% or more relative to that of R410A.

The refrigerant A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments le, ef, fi, and il that connect the following 4 points:
point l (72.5, 10.2, 17.3),
point e (31.1, 42.9, 26.0),
point f (65.5, 34.5, 0.0), and
point i (72.5, 27.5, 0.0),
or on the line segments le, ef, and il (excluding the points f and i);

the line segment le is represented by coordinates $(0.0047y^2-1.5177y+87.598, y, -0.0047y^2+0.5177y+12.402)$, the line segment ef is represented by coordinates $(-0.0134z^2-1.0825z+56.692, 0.0134z^2+0.0825z+43.308, z)$, and the line segments fi and il are straight lines.

When the requirements above are satisfied, the refrigerant according to the present disclosure has a refrigerating capacity ratio of 93.5% or more relative to that of R410A, and a COP ratio of 93.5% or more relative to that of R410A; furthermore, the refrigerant has a lower flammability (Class 2L) according to the ASHRAE Standard.

The refrigerant A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments Oa, ab, bc, and cO that connect the following 4 points:
point a (93.4, 0.0, 6.6),
point b (55.6, 26.6, 17.8),
point c (77.6, 22.4, 0.0), and
point O (100.0, 0.0, 0.0),
or on the line segments Oa, ab, and bc (excluding the points O and c);

the line segment ab is represented by coordinates $(0.0052y^2-1.5588y+93.385, y, -0.0052y^2+0.5588y+6.615)$, the line segment bc is represented by coordinates $(-0.0032z^2-1.1791z+77.593, 0.0032z^2+0.1791z+22.407, z)$, and the line segments cO and Oa are straight lines.

When the requirements above are satisfied, the refrigerant according to the present disclosure has a refrigerating capacity ratio of 95% or more relative to that of R410A, and a COP ratio of 95% or more relative to that of R410A.

The refrigerant A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments kb, bj, and jk that connect the following 3 points:
point k (72.5, 14.1, 13.4),
point b (55.6, 26.6, 17.8), and
point j (72.5, 23.2, 4.3), or on the line segments kb, bj, and jk;

the line segment kb is represented by coordinates $(0.0052y^2-1.5588y+93.385, y, -0.0052y^2+0.5588y+6.615)$, the line segment bj is represented by coordinates $(-0.0032z^2-1.1791z+77.593, 0.0032z^2+0.1791z+22.407, z)$, and the line segment jk is a straight line.

When the requirements above are satisfied, the refrigerant according to the present disclosure has a refrigerating capacity ratio of 95% or more relative to that of R410A, and a COP ratio of 95% or more relative to that of R410A; furthermore, the refrigerant has a lower flammability (Class 2L) according to the ASHRAE Standard.

The refrigerant according to the present disclosure may further comprise other additional refrigerants in addition to HFO-1132(E), HFO-1123, and R1234yf, as long as the above properties and effects are not impaired. In this respect, the refrigerant according to the present disclosure preferably comprises HFO-1132(E), HFO-1123, and R1234yf in a total amount of 99.5 mass % or more, more preferably 99.75 mass % or more, and still more preferably 99.9 mass % or more, based on the entire refrigerant.

The refrigerant according to the present disclosure may comprise HFO-1132(E), HFO-1123, and R1234yf in a total amount of 99.5 mass % or more, 99.75 mass % or more, or 99.9 mass % or more, based on the entire refrigerant.

Additional refrigerants are not particularly limited and can be widely selected. The mixed refrigerant may contain one additional refrigerant, or two or more additional refrigerants.

(Examples of Refrigerant A)

The present disclosure is described in more detail below with reference to Examples of refrigerant A. However, refrigerant A is not limited to the Examples.

The GWP of R1234yf and a composition consisting of a mixed refrigerant R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in Patent Literature 1). The refrigerating capacity of R410A and compositions each comprising a mixture of HFO-1132(E), HFO-1123, and R1234yf was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

Further, the RCL of the mixture was calculated with the LFL of HFO-1132(E) being 4.7 vol., the LFL of HFO-1123 being 10 vol. % and the LFL of R1234yf being 6.2 vol., in accordance with the ASHRAE Standard 34-2013.

Evaporating temperature: 5° C.
Condensation temperature: 45° C.
Degree of superheating: 5K
Degree of subcooling: 5K
Compressor efficiency: 70

Tables 1 to 34 show these values together with the GWP of each mixed refrigerant.

TABLE 1

| Item | Unit | Comp. Ex. 1 | Comp. Ex. 2 O | Comp. Ex. 3 A | Example 1 | Example 2 A' | Example 3 | Comp. Ex. 4 B |
|---|---|---|---|---|---|---|---|---|
| HFO-1132(E) | mass % | R410A | 100.0 | 68.6 | 49.0 | 30.6 | 14.1 | 0.0 |
| HFO-1123 | mass % | | 0.0 | 0.0 | 14.9 | 30.0 | 44.8 | 58.7 |
| R1234yf | mass % | | 0.0 | 31.4 | 36.1 | 39.4 | 41.1 | 41.3 |
| GWP | — | 2088 | 1 | 2 | 2 | 2 | 2 | 2 |
| COP ratio | % (relative to 410A) | 100 | 99.7 | 100.0 | 98.6 | 97.3 | 96.3 | 95.5 |
| Refrigerating capacity ratio | % (relative to 410A) | 100 | 98.3 | 85.0 | 85.0 | 85.0 | 85.0 | 85.0 |
| Condensation glide | ° C. | | 0.1 | 0.00 | 1.98 | 3.36 | 4.46 | 5.15 | 5.35 |
| Discharge pressure | % (relative to 410A) | 100.0 | 99.3 | 87.1 | 88.9 | 90.6 | 92.1 | 93.2 |
| RCL | g/m³ | — | 30.7 | 37.5 | 44.0 | 52.7 | 64.0 | 78.6 |

TABLE 2

| Item | Unit | Comp. Ex. 5 C | Example 4 | Example 5 C' | Example 6 | Comp. Ex. 6 D | Comp. Ex. 7 E | Example 7 E' | Comp. Ex. 8 F |
|---|---|---|---|---|---|---|---|---|---|
| HFO-1132(E) | mass % | 32.9 | 26.6 | 19.5 | 10.9 | 0.0 | 58.0 | 23.4 | 0.0 |
| HFO-1123 | mass % | 67.1 | 68.4 | 70.5 | 74.1 | 80.4 | 42.0 | 48.5 | 61.8 |
| R1234yf | mass % | 0.0 | 5.0 | 10.0 | 15.0 | 19.6 | 0.0 | 28.1 | 38.2 |
| GWP | — | 1 | 1 | 1 | 1 | 2 | 1 | 2 | 2 |
| COP ratio | % (relative to 410A) | 92.5 | 92.5 | 92.5 | 92.5 | 92.5 | 95.0 | 95.0 | 95.0 |
| Refrigerating capacity ratio | % (relative to 410A) | 107.4 | 105.2 | 102.9 | 100.5 | 97.9 | 105.0 | 92.5 | 86.9 |
| Condensation glide | ° C. | 0.16 | 0.52 | 0.94 | 1.42 | 1.90 | 0.42 | 3.16 | 4.80 |
| Discharge pressure | % (relative to 410A) | 119.5 | 117.4 | 115.3 | 113.0 | 115.9 | 112.7 | 101.0 | 95.8 |
| RCL | g/m³ | 53.5 | 57.1 | 62.0 | 69.1 | 81.3 | 41.9 | 46.3 | 79.0 |

TABLE 3

| Item | Unit | Comp. Ex. 9 J | Example 8 P | Example 9 L | Example 10 N | Example 11 N' | Example 12 K |
|---|---|---|---|---|---|---|---|
| HFO-1132(E) | mass % | 47.1 | 55.8 | 63.1 | 68.6 | 65.0 | 61.3 |
| HFO-1123 | mass % | 52.9 | 42.0 | 31.9 | 16.3 | 7.7 | 5.4 |
| R1234yf | mass % | 0.0 | 2.2 | 5.0 | 15.1 | 27.3 | 33.3 |
| GWP | — | 1 | 1 | 1 | 1 | 2 | 2 |
| COP ratio | % (relative to 410A) | 93.8 | 95.0 | 96.1 | 97.9 | 99.1 | 99.5 |
| Refrigerating capacity ratio | % (relative to 410A) | 106.2 | 104.1 | 101.6 | 95.0 | 88.2 | 85.0 |
| Condensation glide | ° C. | 0.31 | 0.57 | 0.81 | 1.41 | 2.11 | 2.51 |
| Discharge pressure | % (relative to 410A) | 115.8 | 111.9 | 107.8 | 99.0 | 91.2 | 87.7 |
| RCL | g/m³ | 46.2 | 42.6 | 40.0 | 38.0 | 38.7 | 39.7 |

TABLE 4

| Item | Unit | Example 13 L | Example 14 M | Example 15 Q | Example 16 R | Example 17 S | Example 18 S' | Example 19 T |
|---|---|---|---|---|---|---|---|---|
| HFO-1132(E) | mass % | 63.1 | 60.3 | 62.8 | 49.8 | 62.6 | 50.0 | 35.8 |
| HFO-1123 | mass % | 31.9 | 6.2 | 29.6 | 42.3 | 28.3 | 35.8 | 44.9 |
| R1234yf | mass % | 5.0 | 33.5 | 7.6 | 7.9 | 9.1 | 14.2 | 19.3 |
| GWP | — | 1 | 2 | 1 | 1 | 1 | 1 | 2 |
| COP ratio | % (relative to 410A) | 96.1 | 99.4 | 96.4 | 95.0 | 96.6 | 95.8 | 95.0 |
| Refrigerating capacity ratio | % (relative to 410A) | 101.6 | 85.0 | 100.2 | 101.7 | 99.4 | 98.1 | 96.7 |
| Condensation glide | ° C. | 0.81 | 2.58 | 1.00 | 1.00 | 1.10 | 1.55 | 2.07 |
| Discharge pressure | % (relative to 410A) | 107.8 | 87.9 | 106.0 | 109.6 | 105.0 | 105.0 | 105.0 |
| RCL | g/m$^3$ | 40.0 | 40.0 | 40.0 | 44.8 | 40.0 | 44.4 | 50.8 |

TABLE 5

| Item | Unit | Comp. Ex. 10 G | Example 20 H | Example 21 I |
|---|---|---|---|---|
| HFO-1132(E) | mass % | 72.0 | 72.0 | 72.0 |
| HFO-1123 | mass % | 28.0 | 14.0 | 0.0 |
| R1234yf | mass % | 0.0 | 14.0 | 28.0 |
| GWP | — | 1 | 1 | 2 |
| COP ratio | % (relative to 410A) | 96.6 | 98.2 | 99.9 |
| Refrigerating capacity ratio | % (relative to 410A) | 103.1 | 95.1 | 86.6 |
| Condensation glide | ° C. | 0.46 | 1.27 | 1.71 |
| Discharge pressure | % (relative to 410A) | 108.4 | 98.7 | 88.6 |
| RCL | g/m$^3$ | 37.4 | 37.0 | 36.6 |

TABLE 6

| Item | Unit | Comp. Ex. 11 | Comp. Ex. 12 | Example 22 | Example 23 | Example 24 | Example 25 | Example 26 | Comp. Ex. 13 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 85.0 | 75.0 | 65.0 | 55.0 | 45.0 | 35.0 | 25.0 | 15.0 |
| R1234yf | mass % | 5.0 | 5.0 | 5.0 | 5.0 | 5.0 | 5.0 | 5.0 | 5.0 |
| GWP | — | 1 | 1 | 1 | 1 | 1 | 1 | 1 | 1 |
| COP ratio | % (relative to 410A) | 91.4 | 92.0 | 92.8 | 93.7 | 94.7 | 95.8 | 96.9 | 98.0 |
| Refrigerating capacity ratio | % (relative to 410A) | 105.7 | 105.5 | 105.0 | 104.3 | 103.3 | 102.0 | 100.6 | 99.1 |
| Condensation glide | ° C. | 0.40 | 0.46 | 0.55 | 0.66 | 0.75 | 0.80 | 0.79 | 0.67 |
| Discharge pressure | % (relative to 410A) | 120.1 | 118.7 | 116.7 | 114.3 | 111.6 | 108.7 | 105.6 | 102.5 |
| RCL | g/m$^3$ | 71.0 | 61.9 | 54.9 | 49.3 | 44.8 | 41.0 | 37.8 | 35.1 |

TABLE 7

| Item | Unit | Comp. Ex. 14 | Example 27 | Example 28 | Example 29 | Example 30 | Example 31 | Example 32 | Comp. Ex. 15 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 80.0 | 70.0 | 60.0 | 50.0 | 40.0 | 30.0 | 20.0 | 10.0 |
| R1234yf | mass % | 10.0 | 10.0 | 10.0 | 10.0 | 10.0 | 10.0 | 10.0 | 10.0 |
| GWP | — | 1 | 1 | 1 | 1 | 1 | 1 | 1 | 1 |
| COP ratio | % (relative to 410A) | 91.9 | 92.5 | 93.3 | 94.3 | 95.3 | 96.4 | 97.5 | 98.6 |
| Refrigerating capacity ratio | % (relative to 410A) | 103.2 | 102.9 | 102.4 | 101.5 | 100.5 | 99.2 | 97.8 | 96.2 |
| Condensation glide | ° C. | 0.87 | 0.94 | 1.03 | 1.12 | 1.18 | 1.18 | 1.09 | 0.88 |
| Discharge pressure | % (relative to 410A) | 116.7 | 115.2 | 113.2 | 110.8 | 108.1 | 105.2 | 102.1 | 99.0 |
| RCL | g/m$^3$ | 70.5 | 61.6 | 54.6 | 49.1 | 44.6 | 40.8 | 37.7 | 35.0 |

TABLE 8

| Item | Unit | Comp. Ex. 16 | Example 33 | Example 34 | Example 35 | Example 36 | Example 37 | Example 38 | Comp. Ex. 17 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 75.0 | 65.0 | 55.0 | 45.0 | 35.0 | 25.0 | 15.0 | 5.0 |
| R1234yf | mass % | 15.0 | 15.0 | 15.0 | 15.0 | 15.0 | 15.0 | 15.0 | 15.0 |
| GWP | — | 1 | 1 | 1 | 1 | 1 | 1 | 1 | 1 |
| COP ratio | % (relative to 410A) | 92.4 | 93.1 | 93.9 | 94.8 | 95.9 | 97.0 | 98.1 | 99.2 |
| Refrigerating capacity ratio | % (relative to 410A) | 100.5 | 100.2 | 99.6 | 98.7 | 97.7 | 96.4 | 94.9 | 93.2 |
| Condensation glide | °C. | 1.41 | 1.49 | 1.56 | 1.62 | 1.63 | 1.55 | 1.37 | 1.05 |
| Discharge pressure | % (relative to 410A) | 113.1 | 111.6 | 109.6 | 107.2 | 104.5 | 101.6 | 98.6 | 95.5 |
| RCL | g/m³ | 70.0 | 61.2 | 54.4 | 48.9 | 44.4 | 40.7 | 37.5 | 34.8 |

TABLE 9

| Item | Unit | Example 39 | Example 40 | Example 41 | Example 42 | Example 43 | Example 44 | Example 45 |
|---|---|---|---|---|---|---|---|---|
| HFO-1132(E) | mass % | 10.0 | 20.0 | 30.0 | 40.0 | 50.0 | 60.0 | 70.0 |
| HFO-1123 | mass % | 70.0 | 60.0 | 50.0 | 40.0 | 30.0 | 20.0 | 10.0 |
| R1234yf | mass % | 20.0 | 20.0 | 20.0 | 20.0 | 20.0 | 20.0 | 20.0 |
| GWP | — | 2 | 2 | 2 | 2 | 2 | 2 | 2 |
| COP ratio | % (relative to 410A) | 93.0 | 93.7 | 94.5 | 95.5 | 96.5 | 97.6 | 98.7 |
| Refrigerating capacity ratio | % (relative to 410A) | 97.7 | 97.4 | 96.8 | 95.9 | 94.7 | 93.4 | 91.9 |
| Condensation glide | °C. | 2.03 | 2.09 | 2.13 | 2.14 | 2.07 | 1.91 | 1.61 |
| Discharge pressure | % (relative to 410A) | 109.4 | 107.9 | 105.9 | 103.5 | 100.8 | 98.0 | 95.0 |
| RCL | g/m³ | 69.6 | 60.9 | 54.1 | 48.7 | 44.2 | 40.5 | 37.4 |

TABLE 10

| Item | Unit | Example 46 | Example 47 | Example 48 | Example 49 | Example 50 | Example 51 | Example 52 |
|---|---|---|---|---|---|---|---|---|
| HFO-1132(E) | mass % | 10.0 | 20.0 | 30.0 | 40.0 | 50.0 | 60.0 | 70.0 |
| HFO-1123 | mass % | 65.0 | 55.0 | 45.0 | 35.0 | 25.0 | 15.0 | 5.0 |
| R1234yf | mass % | 25.0 | 25.0 | 25.0 | 25.0 | 25.0 | 25.0 | 25.0 |
| GWP | — | 2 | 2 | 2 | 2 | 2 | 2 | 2 |
| COP ratio | % (relative to 410A) | 93.6 | 94.3 | 95.2 | 96.1 | 97.2 | 98.2 | 99.3 |
| Refrigerating capacity ratio | % (relative to 410A) | 94.8 | 94.5 | 93.8 | 92.9 | 91.8 | 90.4 | 88.8 |
| Condensation glide | °C. | 2.71 | 2.74 | 2.73 | 2.66 | 2.50 | 2.22 | 1.78 |
| Discharge pressure | % (relative to 410A) | 105.5 | 104.0 | 102.1 | 99.7 | 97.1 | 94.3 | 91.4 |
| RCL | g/m³ | 69.1 | 60.5 | 53.8 | 48.4 | 44.0 | 40.4 | 37.3 |

TABLE 11

| Item | Unit | Example 53 | Example 54 | Example 55 | Example 56 | Example 57 | Example 58 |
|---|---|---|---|---|---|---|---|
| HFO-1132(E) | mass % | 10.0 | 20.0 | 30.0 | 40.0 | 50.0 | 60.0 |
| HFO-1123 | mass % | 60.0 | 50.0 | 40.0 | 30.0 | 20.0 | 10.0 |
| R1234yf | mass % | 30.0 | 30.0 | 30.0 | 30.0 | 30.0 | 30.0 |
| GWP | — | 2 | 2 | 2 | 2 | 2 | 2 |
| COP ratio | % (relative to 410A) | 94.3 | 95.0 | 95.9 | 96.8 | 97.8 | 98.9 |

TABLE 11-continued

| Item | Unit | Example 53 | Example 54 | Example 55 | Example 56 | Example 57 | Example 58 |
|---|---|---|---|---|---|---|---|
| Refrigerating capacity ratio | % (relative to 410A) | 91.9 | 91.5 | 90.8 | 89.9 | 88.7 | 87.3 |
| Condensation glide | ° C. | 3.46 | 3.43 | 3.35 | 3.18 | 2.90 | 2.47 |
| Discharge pressure | % (relative to 410A) | 101.6 | 100.1 | 98.2 | 95.9 | 93.3 | 90.6 |
| RCL | g/m$^3$ | 68.7 | 60.2 | 53.5 | 48.2 | 43.9 | 40.2 |

TABLE 12

| Item | Unit | Example 59 | Example 60 | Example 61 | Example 62 | Example 63 | Comp. Ex. 18 |
|---|---|---|---|---|---|---|---|
| HFO-1132(E) | mass % | 10.0 | 20.0 | 30.0 | 40.0 | 50.0 | 60.0 |
| HFO-1123 | mass % | 55.0 | 45.0 | 35.0 | 25.0 | 15.0 | 5.0 |
| R1234yf | mass % | 35.0 | 35.0 | 35.0 | 35.0 | 35.0 | 35.0 |
| GWP | — | 2 | 2 | 2 | 2 | 2 | 2 |
| COP ratio | % (relative to 410A) | 95.0 | 95.8 | 96.6 | 97.5 | 98.5 | 99.6 |
| Refrigerating capacity ratio | % (relative to 410A) | 88.9 | 88.5 | 87.8 | 86.8 | 85.6 | 84.1 |
| Condensation glide | ° C. | 4.24 | 4.15 | 3.96 | 3.67 | 3.24 | 2.64 |
| Discharge pressure | % (relative to 410A) | 97.6 | 96.1 | 94.2 | 92.0 | 89.5 | 86.8 |
| RCL | g/m$^3$ | 68.2 | 59.8 | 53.2 | 48.0 | 43.7 | 40.1 |

TABLE 13

| Item | Unit | Example 64 | Example 65 | Comp. Ex. 19 | Comp. Ex. 20 | Comp. Ex. 21 |
|---|---|---|---|---|---|---|
| HFO-1132(E) | mass % | 10.0 | 20.0 | 30.0 | 40.0 | 50.0 |
| HFO-1123 | mass % | 50.0 | 40.0 | 30.0 | 20.0 | 10.0 |
| R1234yf | mass % | 40.0 | 40.0 | 40.0 | 40.0 | 40.0 |
| GWP | — | 2 | 2 | 2 | 2 | 2 |
| COP ratio | % (relative to 410A) | 95.9 | 96.6 | 97.4 | 98.3 | 99.2 |
| Refrigerating capacity ratio | % (relative to 410A) | 85.8 | 85.4 | 84.7 | 83.6 | 82.4 |
| Condensation glide | ° C. | 5.05 | 4.85 | 4.55 | 4.10 | 3.50 |
| Discharge pressure | % (relative to 410A) | 93.5 | 92.1 | 90.3 | 88.1 | 85.6 |
| RCL | g/m$^3$ | 67.8 | 59.5 | 53.0 | 47.8 | 43.5 |

TABLE 14

| Item | Unit | Example 66 | Example 67 | Example 68 | Example 69 | Example 70 | Example 71 | Example 72 | Example 73 |
|---|---|---|---|---|---|---|---|---|---|
| HFO-1132(E) | mass % | 54.0 | 56.0 | 58.0 | 62.0 | 52.0 | 54.0 | 56.0 | 58.0 |
| HFO-1123 | mass % | 41.0 | 39.0 | 37.0 | 33.0 | 41.0 | 39.0 | 37.0 | 35.0 |
| R1234yf | mass % | 5.0 | 5.0 | 5.0 | 5.0 | 7.0 | 7.0 | 7.0 | 7.0 |
| GWP | — | 1 | 1 | 1 | 1 | 1 | 1 | 1 | 1 |
| COP ratio | % (relative to 410A) | 95.1 | 95.3 | 95.6 | 96.0 | 95.1 | 95.4 | 95.6 | 95.8 |
| Refrigerating capacity ratio | % (relative to 410A) | 102.8 | 102.6 | 102.3 | 101.8 | 101.9 | 101.7 | 101.5 | 101.2 |
| Condensation glide | ° C. | 0.78 | 0.79 | 0.80 | 0.81 | 0.93 | 0.94 | 0.95 | 0.95 |

TABLE 14-continued

| Item | Unit | Example 66 | Example 67 | Example 68 | Example 69 | Example 70 | Example 71 | Example 72 | Example 73 |
|---|---|---|---|---|---|---|---|---|---|
| Discharge pressure | % (relative to 410A) | 110.5 | 109.9 | 109.3 | 108.1 | 109.7 | 109.1 | 108.5 | 107.9 |
| RCL | g/m$^3$ | 43.2 | 42.4 | 41.7 | 40.3 | 43.9 | 43.1 | 42.4 | 41.6 |

TABLE 15

| Item | Unit | Example 74 | Example 75 | Example 76 | Example 77 | Example 78 | Example 79 | Example 80 | Example 81 |
|---|---|---|---|---|---|---|---|---|---|
| HFO-1132(E) | mass % | 60.0 | 62.0 | 61.0 | 58.0 | 60.0 | 62.0 | 52.0 | 54.0 |
| HFO-1123 | mass % | 33.0 | 31.0 | 29.0 | 30.0 | 28.0 | 26.0 | 34.0 | 32.0 |
| R1234yf | mass % | 7.0 | 7.0 | 10.0 | 12.0 | 12.0 | 12.0 | 14.0 | 14.0 |
| GWP | — | 1 | 1 | 1 | 1 | 1 | 1 | 1 | 1 |
| COP ratio | % (relative to 410A) | 96.0 | 96.2 | 96.5 | 96.4 | 96.6 | 96.8 | 96.0 | 96.2 |
| Refrigerating capacity ratio | % (relative to 410A) | 100.9 | 100.7 | 99.1 | 98.4 | 98.1 | 97.8 | 98.0 | 97.7 |
| Condensation glide | °C. | 0.95 | 0.95 | 1.18 | 1.34 | 1.33 | 1.32 | 1.53 | 1.53 |
| Discharge pressure | % (relative to 410A) | 107.3 | 106.7 | 104.9 | 104.4 | 103.8 | 103.2 | 104.7 | 104.1 |
| RCL | g/m$^3$ | 40.9 | 40.3 | 40.5 | 41.5 | 40.8 | 40.1 | 43.6 | 42.9 |

TABLE 16

| Item | Unit | Example 82 | Example 83 | Example 84 | Example 85 | Example 86 | Example 87 | Example 88 | Example 89 |
|---|---|---|---|---|---|---|---|---|---|
| HFO-1132(E) | mass % | 56.0 | 58.0 | 60.0 | 48.0 | 50.0 | 52.0 | 54.0 | 56.0 |
| HFO-1123 | mass % | 30.0 | 28.0 | 26.0 | 36.0 | 34.0 | 32.0 | 30.0 | 28.0 |
| R1234yf | mass % | 14.0 | 14.0 | 14.0 | 16.0 | 16.0 | 16.0 | 16.0 | 16.0 |
| GWP | — | 1 | 1 | 1 | 1 | 1 | 1 | 1 | 1 |
| COP ratio | % (relative to 410A) | 96.4 | 96.6 | 96.9 | 95.8 | 96.0 | 96.2 | 96.4 | 96.7 |
| Refrigerating capacity ratio | % (relative to 410A) | 97.5 | 97.2 | 96.9 | 97.3 | 97.1 | 96.8 | 96.6 | 96.3 |
| Condensation glide | °C. | 1.51 | 1.50 | 1.48 | 1.72 | 1.72 | 1.71 | 1.69 | 1.67 |
| Discharge pressure | % (relative to 410A) | 103.5 | 102.9 | 102.3 | 104.3 | 103.8 | 103.2 | 102.7 | 102.1 |
| RCL | g/m$^3$ | 42.1 | 41.4 | 40.7 | 45.2 | 44.4 | 43.6 | 42.8 | 42.1 |

TABLE 17

| Item | Unit | Example 90 | Example 91 | Example 92 | Example 93 | Example 94 | Example 95 | Example 96 | Example 97 |
|---|---|---|---|---|---|---|---|---|---|
| HFO-1132(E) | mass % | 58.0 | 60.0 | 42.0 | 44.0 | 46.0 | 48.0 | 50.0 | 52.0 |
| HFO-1123 | mass % | 26.0 | 24.0 | 40.0 | 38.0 | 36.0 | 34.0 | 32.0 | 30.0 |
| R1234yf | mass % | 16.0 | 16.0 | 18.0 | 18.0 | 18.0 | 18.0 | 18.0 | 18.0 |
| GWP | — | 1 | 1 | 2 | 2 | 2 | 2 | 2 | 2 |
| COP ratio | % (relative to 410A) | 96.9 | 97.1 | 95.4 | 95.6 | 95.8 | 96.0 | 96.3 | 96.5 |
| Refrigerating capacity ratio | % (relative to 410A) | 96.1 | 95.8 | 96.8 | 96.6 | 96.4 | 96.2 | 95.9 | 95.7 |
| Condensation glide | °C. | 1.65 | 1.63 | 1.93 | 1.92 | 1.92 | 1.91 | 1.89 | 1.88 |
| Discharge pressure | % (relative to 410A) | 101.5 | 100.9 | 104.5 | 103.9 | 103.4 | 102.9 | 102.3 | 101.8 |
| RCL | g/m$^3$ | 41.4 | 40.7 | 47.8 | 46.9 | 46.0 | 45.1 | 44.3 | 43.5 |

TABLE 18

| Item | Unit | Example 98 | Example 99 | Example 100 | Example 101 | Example 102 | Example 103 | Example 104 | Example 105 |
|---|---|---|---|---|---|---|---|---|---|
| HFO-1132(E) | mass % | 54.0 | 56.0 | 58.0 | 60.0 | 36.0 | 38.0 | 42.0 | 44.0 |
| HFO-1123 | mass % | 28.0 | 26.0 | 24.0 | 22.0 | 44.0 | 42.0 | 38.0 | 36.0 |
| R1234yf | mass % | 18.0 | 18.0 | 18.0 | 18.0 | 20.0 | 20.0 | 20.0 | 20.0 |
| GWP | — | 2 | 2 | 2 | 2 | 2 | 2 | 2 | 2 |
| COP ratio | % (relative to 410A) | 96.7 | 96.9 | 97.1 | 97.3 | 95.1 | 95.3 | 95.7 | 95.9 |
| Refrigerating capacity ratio | % (relative to 410A) | 95.4 | 95.2 | 94.9 | 94.6 | 96.3 | 96.1 | 95.7 | 95.4 |
| Condensation glide | °C. | 1.86 | 1.83 | 1.80 | 1.77 | 2.14 | 2.14 | 2.13 | 2.12 |
| Discharge pressure | % (relative to 410A) | 101.2 | 100.6 | 100.0 | 99.5 | 104.5 | 104.0 | 103.0 | 102.5 |
| RCL | g/m$^3$ | 42.7 | 42.0 | 41.3 | 40.6 | 50.7 | 49.7 | 47.7 | 46.8 |

TABLE 19

| Item | Unit | Example 106 | Example 107 | Example 108 | Example 109 | Example 110 | Example 111 | Example 112 | Example 113 |
|---|---|---|---|---|---|---|---|---|---|
| HFO-1132(E) | mass % | 46.0 | 48.0 | 52.0 | 54.0 | 56.0 | 58.0 | 34.0 | 36.0 |
| HFO-1123 | mass % | 34.0 | 32.0 | 28.0 | 26.0 | 24.0 | 22.0 | 44.0 | 42.0 |
| R1234yf | mass % | 20.0 | 20.0 | 20.0 | 20.0 | 20.0 | 20.0 | 22.0 | 22.0 |
| GWP | — | 2 | 2 | 2 | 2 | 2 | 2 | 2 | 2 |
| COP ratio | % (relative to 410A) | 96.1 | 96.3 | 96.7 | 96.9 | 97.2 | 97.4 | 95.1 | 95.3 |
| Refrigerating capacity ratio | % (relative to 410A) | 95.2 | 95.0 | 94.5 | 94.2 | 94.0 | 93.7 | 95.3 | 95.1 |
| Condensation glide | °C. | 2.11 | 2.09 | 2.05 | 2.02 | 1.99 | 1.95 | 2.37 | 2.36 |
| Discharge pressure | % (relative to 410A) | 101.9 | 101.4 | 100.3 | 99.7 | 99.2 | 98.6 | 103.4 | 103.0 |
| RCL | g/m$^3$ | 45.9 | 45.0 | 43.4 | 42.7 | 41.9 | 41.2 | 51.7 | 50.6 |

TABLE 20

| Item | Unit | Example 114 | Example 115 | Example 116 | Example 117 | Example 118 | Example 119 | Example 120 | Example 121 |
|---|---|---|---|---|---|---|---|---|---|
| HFO-1132(E) | mass % | 38.0 | 40.0 | 42.0 | 44.0 | 46.0 | 48.0 | 50.0 | 52.0 |
| HFO-1123 | mass % | 40.0 | 38.0 | 36.0 | 34.0 | 32.0 | 30.0 | 28.0 | 26.0 |
| R1234yf | mass % | 22.0 | 22.0 | 22.0 | 22.0 | 22.0 | 22.0 | 22.0 | 22.0 |
| GWP | — | 2 | 2 | 2 | 2 | 2 | 2 | 2 | 2 |
| COP ratio | % (relative to 410A) | 95.5 | 95.7 | 95.9 | 96.1 | 96.4 | 96.6 | 96.8 | 97.0 |
| Refrigerating capacity ratio | % (relative to 410A) | 94.9 | 94.7 | 94.5 | 94.3 | 94.0 | 93.8 | 93.6 | 93.3 |
| Condensation glide | °C. | 2.36 | 2.35 | 2.33 | 2.32 | 2.30 | 2.27 | 2.25 | 2.21 |
| Discharge pressure | % (relative to 410A) | 102.5 | 102.0 | 101.5 | 101.0 | 100.4 | 99.9 | 99.4 | 98.8 |
| RCL | g/m$^3$ | 49.6 | 48.6 | 47.6 | 46.7 | 45.8 | 45.0 | 44.1 | 43.4 |

TABLE 21

| Item | Unit | Example 122 | Example 123 | Example 124 | Example 125 | Example 126 | Example 127 | Example 128 | Example 129 |
|---|---|---|---|---|---|---|---|---|---|
| HFO-1132(E) | mass % | 54.0 | 56.0 | 58.0 | 60.0 | 32.0 | 34.0 | 36.0 | 38.0 |
| HFO-1123 | mass % | 24.0 | 22.0 | 20.0 | 18.0 | 44.0 | 42.0 | 40.0 | 38.0 |
| R1234yf | mass % | 22.0 | 22.0 | 22.0 | 22.0 | 24.0 | 24.0 | 24.0 | 24.0 |
| GWP | — | 2 | 2 | 2 | 2 | 2 | 2 | 2 | 2 |
| COP ratio | % (relative to 410A) | 97.2 | 97.4 | 97.6 | 97.9 | 95.2 | 95.4 | 95.6 | 95.8 |

TABLE 21-continued

| Item | Unit | Example 122 | Example 123 | Example 124 | Example 125 | Example 126 | Example 127 | Example 128 | Example 129 |
|---|---|---|---|---|---|---|---|---|---|
| Refrigerating capacity ratio | % (relative to 410A) | 93.0 | 92.8 | 92.5 | 92.2 | 94.3 | 94.1 | 93.9 | 93.7 |
| Condensation glide | ° C. | 2.18 | 2.14 | 2.09 | 2.04 | 2.61 | 2.60 | 2.59 | 2.58 |
| Discharge pressure | % (relative to 410A) | 98.2 | 97.7 | 97.1 | 96.5 | 102.4 | 101.9 | 101.5 | 101.0 |
| RCL | g/m$^3$ | 42.6 | 41.9 | 41.2 | 40.5 | 52.7 | 51.6 | 50.5 | 49.5 |

TABLE 22

| Item | Unit | Example 130 | Example 131 | Example 132 | Example 133 | Example 134 | Example 135 | Example 136 | Example 137 |
|---|---|---|---|---|---|---|---|---|---|
| HFO-1132(E) | mass % | 40.0 | 42.0 | 44.0 | 46.0 | 48.0 | 50.0 | 52.0 | 54.0 |
| HFO-1123 | mass % | 36.0 | 34.0 | 32.0 | 30.0 | 28.0 | 26.0 | 24.0 | 22.0 |
| R1234yf | mass % | 24.0 | 24.0 | 24.0 | 24.0 | 24.0 | 24.0 | 24.0 | 24.0 |
| GWP | — | 2 | 2 | 2 | 2 | 2 | 2 | 2 | 2 |
| COP ratio | % (relative to 410A) | 96.0 | 96.2 | 96.4 | 96.6 | 96.8 | 97.0 | 97.2 | 97.5 |
| Refrigerating capacity ratio | % (relative to 410A) | 93.5 | 93.3 | 93.1 | 92.8 | 92.6 | 92.4 | 92.1 | 91.8 |
| Condensation glide | ° C. | 2.56 | 2.54 | 2.51 | 2.49 | 2.45 | 2.42 | 2.38 | 2.33 |
| Discharge pressure | % (relative to 410A) | 100.5 | 100.0 | 99.5 | 98.9 | 98.4 | 97.9 | 97.3 | 96.8 |
| RCL | g/m$^3$ | 48.5 | 47.5 | 46.6 | 45.7 | 44.9 | 44.1 | 43.3 | 42.5 |

TABLE 23

| Item | Unit | Example 138 | Example 139 | Example 140 | Example 141 | Example 142 | Example 143 | Example 144 | Example 145 |
|---|---|---|---|---|---|---|---|---|---|
| HFO-1132(E) | mass % | 56.0 | 58.0 | 60.0 | 30.0 | 32.0 | 34.0 | 36.0 | 38.0 |
| HFO-1123 | mass % | 20.0 | 18.0 | 16.0 | 44.0 | 42.0 | 40.0 | 38.0 | 36.0 |
| R1234yf | mass % | 24.0 | 24.0 | 24.0 | 26.0 | 26.0 | 26.0 | 26.0 | 26.0 |
| GWP | — | 2 | 2 | 2 | 2 | 2 | 2 | 2 | 2 |
| COP ratio | % (relative to 410A) | 97.7 | 97.9 | 98.1 | 95.3 | 95.5 | 95.7 | 95.9 | 96.1 |
| Refrigerating capacity ratio | % (relative to 410A) | 91.6 | 91.3 | 91.0 | 93.2 | 93.1 | 92.9 | 92.7 | 92.5 |
| Condensation glide | ° C. | 2.28 | 2.22 | 2.16 | 2.86 | 2.85 | 2.83 | 2.81 | 2.79 |
| Discharge pressure | % (relative to 410A) | 96.2 | 95.6 | 95.1 | 101.3 | 100.8 | 100.4 | 99.9 | 99.4 |
| RCL | g/m$^3$ | 41.8 | 41.1 | 40.4 | 53.7 | 52.6 | 51.5 | 50.4 | 49.4 |

TABLE 24

| Item | Unit | Example 146 | Example 147 | Example 148 | Example 149 | Example 150 | Example 151 | Example 152 | Example 153 |
|---|---|---|---|---|---|---|---|---|---|
| HFO-1132(E) | mass % | 40.0 | 42.0 | 44.0 | 46.0 | 48.0 | 50.0 | 52.0 | 54.0 |
| HFO-1123 | mass % | 34.0 | 32.0 | 30.0 | 28.0 | 26.0 | 24.0 | 22.0 | 20.0 |
| R1234yf | mass % | 26.0 | 26.0 | 26.0 | 26.0 | 26.0 | 26.0 | 26.0 | 26.0 |
| GWP | — | 2 | 2 | 2 | 2 | 2 | 2 | 2 | 2 |
| COP ratio | % (relative to 410A) | 96.3 | 96.5 | 96.7 | 96.9 | 97.1 | 97.3 | 97.5 | 97.7 |
| Refrigerating capacity ratio | % (relative to 410A) | 92.3 | 92.1 | 91.9 | 91.6 | 91.4 | 91.2 | 90.9 | 90.6 |
| Condensation glide | ° C. | 2.77 | 2.74 | 2.71 | 2.67 | 2.63 | 2.59 | 2.53 | 2.48 |

TABLE 24-continued

| Item | Unit | Example 146 | Example 147 | Example 148 | Example 149 | Example 150 | Example 151 | Example 152 | Example 153 |
|---|---|---|---|---|---|---|---|---|---|
| Discharge pressure | % (relative to 410A) | 99.0 | 98.5 | 97.9 | 97.4 | 96.9 | 96.4 | 95.8 | 95.3 |
| RCL | g/m$^3$ | 48.4 | 47.4 | 46.5 | 45.7 | 44.8 | 44.0 | 43.2 | 42.5 |

TABLE 25

| Item | Unit | Example 154 | Example 155 | Example 156 | Example 157 | Example 158 | Example 159 | Example 160 | Example 161 |
|---|---|---|---|---|---|---|---|---|---|
| HFO-1132(E) | mass % | 56.0 | 58.0 | 60.0 | 30.0 | 32.0 | 34.0 | 36.0 | 38.0 |
| HFO-1123 | mass % | 18.0 | 16.0 | 14.0 | 42.0 | 40.0 | 38.0 | 36.0 | 34.0 |
| R1234yf | mass % | 26.0 | 26.0 | 26.0 | 28.0 | 28.0 | 28.0 | 28.0 | 28.0 |
| GWP | — | 2 | 2 | 2 | 2 | 2 | 2 | 2 | 2 |
| COP ratio | % (relative to 410A) | 97.9 | 98.2 | 98.4 | 95.6 | 95.8 | 96.0 | 96.2 | 96.3 |
| Refrigerating capacity ratio | % (relative to 410A) | 90.3 | 90.1 | 89.8 | 92.1 | 91.9 | 91.7 | 91.5 | 91.3 |
| Condensation glide | ° C. | 2.42 | 2.35 | 2.27 | 3.10 | 3.09 | 3.06 | 3.04 | 3.01 |
| Discharge pressure | % (relative to 410A) | 94.7 | 94.1 | 93.6 | 99.7 | 99.3 | 98.8 | 98.4 | 97.9 |
| RCL | g/m$^3$ | 41.7 | 41.0 | 40.3 | 53.6 | 52.5 | 51.4 | 50.3 | 49.3 |

TABLE 26

| Item | Unit | Example 162 | Example 163 | Example 164 | Example 165 | Example 166 | Example 167 | Example 168 | Example 169 |
|---|---|---|---|---|---|---|---|---|---|
| HFO-1132(E) | mass % | 40.0 | 42.0 | 44.0 | 46.0 | 48.0 | 50.0 | 52.0 | 54.0 |
| HFO-1123 | mass % | 32.0 | 30.0 | 28.0 | 26.0 | 24.0 | 22.0 | 20.0 | 18.0 |
| R1234yf | mass % | 28.0 | 28.0 | 28.0 | 28.0 | 28.0 | 28.0 | 28.0 | 28.0 |
| GWP | — | 2 | 2 | 2 | 2 | 2 | 2 | 2 | 2 |
| COP ratio | % (relative to 410A) | 96.5 | 96.7 | 96.9 | 97.2 | 97.4 | 97.6 | 97.8 | 98.0 |
| Refrigerating capacity ratio | % (relative to 410A) | 91.1 | 90.9 | 90.7 | 90.4 | 90.2 | 89.9 | 89.7 | 89.4 |
| Condensation glide | ° C. | 2.98 | 2.94 | 2.90 | 2.85 | 2.80 | 2.75 | 2.68 | 2.62 |
| Discharge pressure | % (relative to 410A) | 97.4 | 96.9 | 96.4 | 95.9 | 95.4 | 94.9 | 94.3 | 93.8 |
| RCL | g/m$^3$ | 48.3 | 47.4 | 46.4 | 45.6 | 44.7 | 43.9 | 43.1 | 42.4 |

TABLE 27

| Item | Unit | Example 170 | Example 171 | Example 172 | Example 173 | Example 174 | Example 175 | Example 176 | Example 177 |
|---|---|---|---|---|---|---|---|---|---|
| HFO-1132(E) | mass % | 56.0 | 58.0 | 60.0 | 32.0 | 34.0 | 36.0 | 38.0 | 42.0 |
| HFO-1123 | mass % | 16.0 | 14.0 | 12.0 | 38.0 | 36.0 | 34.0 | 32.0 | 28.0 |
| R1234yf | mass % | 28.0 | 28.0 | 28.0 | 30.0 | 30.0 | 30.0 | 30.0 | 30.0 |
| GWP | — | 2 | 2 | 2 | 2 | 2 | 2 | 2 | 2 |
| COP ratio | % (relative to 410A) | 98.2 | 98.4 | 98.6 | 96.1 | 96.2 | 96.4 | 96.6 | 97.0 |
| Refrigerating capacity ratio | % (relative to 410A) | 89.1 | 88.8 | 88.5 | 90.7 | 90.5 | 90.3 | 90.1 | 89.7 |
| Condensation glide | ° C. | 2.54 | 2.46 | 2.38 | 3.32 | 3.30 | 3.26 | 3.22 | 3.14 |
| Discharge pressure | % (relative to 410A) | 93.2 | 92.6 | 92.1 | 97.7 | 97.3 | 96.8 | 96.4 | 95.4 |
| RCL | g/m$^3$ | 41.7 | 41.0 | 40.3 | 52.4 | 51.3 | 50.2 | 49.2 | 47.3 |

TABLE 28

| Item | Unit | Example 178 | Example 179 | Example 180 | Example 181 | Example 182 | Example 183 | Example 184 | Example 185 |
|---|---|---|---|---|---|---|---|---|---|
| HFO-1132(E) | mass % | 44.0 | 46.0 | 48.0 | 50.0 | 52.0 | 54.0 | 56.0 | 58.0 |
| HFO-1123 | mass % | 26.0 | 24.0 | 22.0 | 20.0 | 18.0 | 16.0 | 14.0 | 12.0 |
| R1234yf | mass % | 30.0 | 30.0 | 30.0 | 30.0 | 30.0 | 30.0 | 30.0 | 30.0 |
| GWP | — | 2 | 2 | 2 | 2 | 2 | 2 | 2 | 2 |
| COP ratio | % (relative to 410A) | 97.2 | 97.4 | 97.6 | 97.8 | 98.0 | 98.3 | 98.5 | 98.7 |
| Refrigerating capacity ratio | % (relative to 410A) | 89.4 | 89.2 | 89.0 | 88.7 | 88.4 | 88.2 | 87.9 | 87.6 |
| Condensation glide | ° C. | 3.08 | 3.03 | 2.97 | 2.90 | 2.83 | 2.75 | 2.66 | 2.57 |
| Discharge pressure | % (relative to 410A) | 94.9 | 94.4 | 93.9 | 93.3 | 92.8 | 92.3 | 91.7 | 91.1 |
| RCL | g/m$^3$ | 46.4 | 45.5 | 44.7 | 43.9 | 43.1 | 42.3 | 41.6 | 40.9 |

TABLE 29

| Item | Unit | Example 186 | Example 187 | Example 188 | Example 189 | Example 190 | Example 191 | Example 192 | Example 193 |
|---|---|---|---|---|---|---|---|---|---|
| HFO-1132(E) | mass % | 30.0 | 32.0 | 34.0 | 36.0 | 38.0 | 40.0 | 42.0 | 44.0 |
| HFO-1123 | mass % | 38.0 | 36.0 | 34.0 | 32.0 | 30.0 | 28.0 | 26.0 | 24.0 |
| R1234yf | mass % | 32.0 | 32.0 | 32.0 | 32.0 | 32.0 | 32.0 | 32.0 | 32.0 |
| GWP | — | 2 | 2 | 2 | 2 | 2 | 2 | 2 | 2 |
| COP ratio | % (relative to 410A) | 96.2 | 96.3 | 96.5 | 96.7 | 96.9 | 97.1 | 97.3 | 97.5 |
| Refrigerating capacity ratio | % (relative to 410A) | 89.6 | 89.5 | 89.3 | 89.1 | 88.9 | 88.7 | 88.4 | 88.2 |
| Condensation glide | ° C. | 3.60 | 3.56 | 3.52 | 3.48 | 3.43 | 3.38 | 3.33 | 3.26 |
| Discharge pressure | % (relative to 410A) | 96.6 | 96.2 | 95.7 | 95.3 | 94.8 | 94.3 | 93.9 | 93.4 |
| RCL | g/m$^3$ | 53.4 | 52.3 | 51.2 | 50.1 | 49.1 | 48.1 | 47.2 | 46.3 |

TABLE 30

| Item | Unit | Example 194 | Example 195 | Example 196 | Example 197 | Example 198 | Example 199 | Example 200 | Example 201 |
|---|---|---|---|---|---|---|---|---|---|
| HFO-1132(E) | mass % | 46.0 | 48.0 | 50.0 | 52.0 | 54.0 | 56.0 | 58.0 | 60.0 |
| HFO-1123 | mass % | 22.0 | 20.0 | 18.0 | 16.0 | 14.0 | 12.0 | 10.0 | 8.0 |
| R1234yf | mass % | 32.0 | 32.0 | 32.0 | 32.0 | 32.0 | 32.0 | 32.0 | 32.0 |
| GWP | — | 2 | 2 | 2 | 2 | 2 | 2 | 2 | 2 |
| COP ratio | % (relative to 410A) | 97.7 | 97.9 | 98.1 | 98.3 | 98.5 | 98.7 | 98.9 | 99.2 |
| Refrigerating capacity ratio | % (relative to 410A) | 88.0 | 87.7 | 87.5 | 87.2 | 86.9 | 86.6 | 86.3 | 86.0 |
| Condensation glide | ° C. | 3.20 | 3.12 | 3.04 | 2.96 | 2.87 | 2.77 | 2.66 | 2.55 |
| Discharge pressure | % (relative to 410A) | 92.8 | 92.3 | 91.8 | 91.3 | 90.7 | 90.2 | 89.6 | 89.1 |
| RCL | g/m$^3$ | 45.4 | 44.6 | 43.8 | 43.0 | 42.3 | 41.5 | 40.8 | 40.2 |

TABLE 31

| Item | Unit | Example 202 | Example 203 | Example 204 | Example 205 | Example 206 | Example 207 | Example 208 | Example 209 |
|---|---|---|---|---|---|---|---|---|---|
| HFO-1132(E) | mass % | 30.0 | 32.0 | 34.0 | 36.0 | 38.0 | 40.0 | 42.0 | 44.0 |
| HFO-1123 | mass % | 36.0 | 34.0 | 32.0 | 30.0 | 28.0 | 26.0 | 24.0 | 22.0 |
| R1234yf | mass % | 34.0 | 34.0 | 34.0 | 34.0 | 34.0 | 34.0 | 34.0 | 34.0 |
| GWP | — | 2 | 2 | 2 | 2 | 2 | 2 | 2 | 2 |
| COP ratio | % (relative to 410A) | 96.5 | 96.6 | 96.8 | 97.0 | 97.2 | 97.4 | 97.6 | 97.8 |

TABLE 31-continued

| Item | Unit | Example 202 | Example 203 | Example 204 | Example 205 | Example 206 | Example 207 | Example 208 | Example 209 |
|---|---|---|---|---|---|---|---|---|---|
| Refrigerating capacity ratio | % (relative to 410A) | 88.4 | 88.2 | 88.0 | 87.8 | 87.6 | 87.4 | 87.2 | 87.0 |
| Condensation glide | ° C. | 3.84 | 3.80 | 3.75 | 3.70 | 3.64 | 3.58 | 3.51 | 3.43 |
| Discharge pressure | % (relative to 410A) | 95.0 | 94.6 | 94.2 | 93.7 | 93.3 | 92.8 | 92.3 | 91.8 |
| RCL | g/m$^3$ | 53.3 | 52.2 | 51.1 | 50.0 | 49.0 | 48.0 | 47.1 | 46.2 |

TABLE 32

| Item | Unit | Example 210 | Example 211 | Example 212 | Example 213 | Example 214 | Example 215 | Example 216 | Example 217 |
|---|---|---|---|---|---|---|---|---|---|
| HFO-1132(E) | mass % | 46.0 | 48.0 | 50.0 | 52.0 | 54.0 | 30.0 | 32.0 | 34.0 |
| HFO-1123 | mass % | 20.0 | 18.0 | 16.0 | 14.0 | 12.0 | 34.0 | 32.0 | 30.0 |
| R1234yf | mass % | 34.0 | 34.0 | 34.0 | 34.0 | 34.0 | 36.0 | 36.0 | 36.0 |
| GWP | — | 2 | 2 | 2 | 2 | 2 | 2 | 2 | 2 |
| COP ratio | % (relative to 410A) | 98.0 | 98.2 | 98.4 | 98.6 | 98.8 | 96.8 | 96.9 | 97.1 |
| Refrigerating capacity ratio | % (relative to 410A) | 86.7 | 86.5 | 86.2 | 85.9 | 85.6 | 87.2 | 87.0 | 86.8 |
| Condensation glide | ° C. | 3.36 | 3.27 | 3.18 | 3.08 | 2.97 | 4.08 | 4.03 | 3.97 |
| Discharge pressure | % (relative to 410A) | 91.3 | 90.8 | 90.3 | 89.7 | 89.2 | 93.4 | 93.0 | 92.6 |
| RCL | g/m$^3$ | 45.3 | 44.5 | 43.7 | 42.9 | 42.2 | 53.2 | 52.1 | 51.0 |

TABLE 33

| Item | Unit | Example 218 | Example 219 | Example 220 | Example 221 | Example 222 | Example 223 | Example 224 | Example 225 |
|---|---|---|---|---|---|---|---|---|---|
| HFO-1132(E) | mass % | 36.0 | 38.0 | 40.0 | 42.0 | 44.0 | 46.0 | 30.0 | 32.0 |
| HFO-1123 | mass % | 28.0 | 26.0 | 24.0 | 22.0 | 20.0 | 18.0 | 32.0 | 30.0 |
| R1234yf | mass % | 36.0 | 36.0 | 36.0 | 36.0 | 36.0 | 36.0 | 38.0 | 38.0 |
| GWP | — | 2 | 2 | 2 | 2 | 2 | 2 | 2 | 2 |
| COP ratio | % (relative to 410A) | 97.3 | 97.5 | 97.7 | 97.9 | 98.1 | 98.3 | 97.1 | 97.2 |
| Refrigerating capacity ratio | % (relative to 410A) | 86.6 | 86.4 | 86.2 | 85.9 | 85.7 | 85.5 | 85.9 | 85.7 |
| Condensation glide | ° C. | 3.91 | 3.84 | 3.76 | 3.68 | 3.60 | 3.50 | 4.32 | 4.25 |
| Discharge pressure | % (relative to 410A) | 92.1 | 91.7 | 91.2 | 90.7 | 90.3 | 89.8 | 91.9 | 91.4 |
| RCL | g/m$^3$ | 49.9 | 48.9 | 47.9 | 47.0 | 46.1 | 45.3 | 53.1 | 52.0 |

TABLE 34

| Item | Unit | Example 226 | Example 227 |
|---|---|---|---|
| HFO-1132(E) | mass % | 34.0 | 36.0 |
| HFO-1123 | mass % | 28.0 | 26.0 |
| R1234yf | mass % | 38.0 | 38.0 |
| GWP | — | 2 | 2 |
| COP ratio | % (relative to 410A) | 97.4 | 97.6 |
| Refrigerating capacity ratio | % (relative to 410A) | 85.6 | 85.3 |
| Condensation glide | ° C. | 4.18 | 4.11 |
| Discharge pressure | % (relative to 410A) | 91.0 | 90.6 |
| RCL | g/m$^3$ | 50.9 | 49.8 |

These results indicate that under the condition that the mass % of HFO-1132(E), HFO-1123, and R1234yf based on their sum is respectively represented by x, y, and z, when coordinates (x,y,z) in a ternary composition diagram in which the sum of HFO-1132(E), HFO-1123, and R1234yf is 100 mass % are within the range of a figure surrounded by line segments AA', A'B, BD, DC', C'C, CO, and OA that connect the following 7 points:
point A (68.6, 0.0, 31.4),
point A'(30.6, 30.0, 39.4),
point B (0.0, 58.7, 41.3),
point D (0.0, 80.4, 19.6),
point C'(19.5, 70.5, 10.0),
point C (32.9, 67.1, 0.0), and
point O (100.0, 0.0, 0.0),
or on the above line segments (excluding the points on the line segment CO);
the line segment AA' is represented by coordinates (x, 0.0016x$^2$−0.9473x+57.497, −0.0016x$^2$−0.0527x+42.503), the line segment A'B is represented by coordinates (x, $0.0029x^2-1.0268x+58.7$, $-0.0029x^2+0.0268x+41.3$,
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments BD, CO, and OA are straight lines,
the refrigerant has a refrigerating capacity ratio of 85% or more relative to that of R410A, and a COP of 92.5% or more relative to that of R410A.

The point on the line segment AA' was determined by obtaining an approximate curve connecting point A, Example 1, and point A' by the least square method.

The point on the line segment A'B was determined by obtaining an approximate curve connecting point A', Example 3, and point B by the least square method.

The point on the line segment DC' was determined by obtaining an approximate curve connecting point D, Example 6, and point C' by the least square method.

The point on the line segment C'C was determined by obtaining an approximate curve connecting point C', Example 4, and point C by the least square method.

Likewise, the results indicate that when coordinates (x,y,z) are within the range of a figure surrounded by line segments AA', A'B, BF, FT, TE, EO, and OA that connect the following 7 points:
point A (68.6, 0.0, 31.4),
point A' (30.6, 30.0, 39.4),
point B (0.0, 58.7, 41.3),
point F (0.0, 61.8, 38.2),
point T (35.8, 44.9, 19.3),
point E (58.0, 42.0, 0.0) and
point O (100.0, 0.0, 0.0),
or on the above line segments (excluding the points on the line EO);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment FT is represented by coordinates (x, $0.0078x^2-0.7501x+61.8$, $-0.0078x^2\ 0.2499x+38.2$), and
the line segment TE is represented by coordinates (x, $0.0067x^2-0.7607x+63.525$, $-0.0067x^2\ 0.2393x+36.475$), and
the line segments BF, FO, and OA are straight lines,
the refrigerant has a refrigerating capacity ratio of 85% or more relative to that of R410A, and a COP of 95% or more relative to that of R410A.

The point on the line segment FT was determined by obtaining an approximate curve connecting three points, i.e., points T, E', and F, by the least square method.

The point on the line segment TE was determined by obtaining an approximate curve connecting three points, i.e., points E, R, and T, by the least square method.

The results in Tables 1 to 34 clearly indicate that in a ternary composition diagram of the mixed refrigerant of HFO-1132(E), HFO-1123, and R1234yf in which the sum of these components is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on or below the line segment LM connecting point L (63.1, 31.9, 5.0) and point M (60.3, 6.2, 33.5), the refrigerant has an RCL of 40 g/m³ or more.

The results in Tables 1 to 34 clearly indicate that in a ternary composition diagram of the mixed refrigerant of HFO-1132(E), HFO-1123 and R1234yf in which their sum is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on the line segment QR connecting point Q (62.8, 29.6, 7.6) and point R (49.8, 42.3, 7.9) or on the left side of the line segment, the refrigerant has a temperature glide of 1° C. or less.

The results in Tables 1 to 34 clearly indicate that in a ternary composition diagram of the mixed refrigerant of HFO-1132(E), HFO-1123, and R1234yf in which their sum is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on the line segment ST connecting point S (62.6, 28.3, 9.1) and point T (35.8, 44.9, 19.3) or on the right side of the line segment, the refrigerant has a discharge pressure of 105% or less relative to that of 410A.

In these compositions, R1234yf contributes to reducing flammability, and suppressing deterioration of polymerization etc. Therefore, the composition preferably contains R1234yf.

Further, the burning velocity of these mixed refrigerants whose mixed formulations were adjusted to WCF concentrations was measured according to the ANSI/ASHRAE Standard 34-2013. Compositions having a burning velocity of 10 cm/s or less were determined to be classified as "Class 2L (lower flammability)."

A burning velocity test was performed using the apparatus shown in FIG. 1 in the following manner. In FIG. 1, reference numeral 901 refers to a sample cell, 902 refers to a high-speed camera, 903 refers to a xenon lamp, 904 refers to a collimating lens, 905 refers to a collimating lens, and 906 refers to a ring filter. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

Each WCFF concentration was obtained by using the WCF concentration as the initial concentration and performing a leak simulation using NIST Standard Reference Database REFLEAK Version 4.0.

Tables 35 and 36 show the results.

TABLE 35

| Item | | Unit | G | H | I |
|---|---|---|---|---|---|
| WCF | HFO-1132(E) | mass % | 72.0 | 72.0 | 72.0 |
| | HFO-1123 | mass % | 28.0 | 9.6 | 0.0 |
| | R1234yf | mass % | 0.0 | 18.4 | 28.0 |
| Burning velocity (WCF) | | cm/s | 10 | 10 | 10 |

TABLE 36

| Item | | Unit | J | P | L | N | N' | K |
|---|---|---|---|---|---|---|---|---|
| WCF | HFO-1132(E) | mass % | 47.1 | 55.8 | 63.1 | 68.6 | 65.0 | 61.3 |
| | HFO-1123 | mass % | 52.9 | 42.0 | 31.9 | 16.3 | 7.7 | 5.4 |
| | R1234yf | mass % | 0.0 | 2.2 | 5.0 | 15.1 | 27.3 | 33.3 |
| Leak condition that results in WCFF | | | Storage/Shipping −40° C., 92% release, liquid phase side | Storage/Shipping −40° C., 90% release, liquid phase side | Storage/Shipping −40° C., 90% release, gas phase side | Storage/Shipping −40° C., 66% release, gas phase side | Storage/Shipping −40° C., 12% release, gas phase side | Storage/Shipping, −40° C., 0% release, gas phase side |
| WCFF | HFO-1132(E) | mass % | 72.0 | 72.0 | 72.0 | 72.0 | 72.0 | 72.0 |
| | HFO-1123 | mass % | 28.0 | 17.8 | 17.4 | 13.6 | 12.3 | 9.8 |
| | R1234yf | mass % | 0.0 | 10.2 | 10.6 | 14.4 | 15.7 | 18.2 |
| Burning velocity (WCF) | | cm/s | 8 or less | 8 or less | 8 or less | 9 | 9 | 8 or less |
| Burning velocity (WCFF) | | cm/s | 10 | 10 | 10 | 10 | 10 | 10 |

The results in Table 35 clearly indicate that when a mixed refrigerant of HFO-1132(E), HFO-1123, and R1234yf contains HFO-1132(E) in a proportion of 72.0 mass % or less based on their sum, the refrigerant can be determined to have a WCF lower flammability.

The results in Tables 36 clearly indicate that in a ternary composition diagram of a mixed refrigerant of HFO-1132 (E), HFO-1123, and R1234yf in which their sum is 100 mass %, and a line segment connecting a point (0.0, 100.0, 0.0) and a point (0.0, 0.0, 100.0) is the base, when coordinates (x,y,z) are on or below the line segments JP, PN, and NK connecting the following 6 points:
point J (47.1, 52.9, 0.0),
point P (55.8, 42.0, 2.2),
point L (63.1, 31.9, 5.0)
point N (68.6, 16.3, 15.1)
point N' (65.0, 7.7, 27.3) and
point K (61.3, 5.4, 33.3),
the refrigerant can be determined to have a WCF lower flammability, and a WCFF lower flammability.
In the diagram, the line segment PN is represented by coordinates (x, $-0.1135x^2+12.112x-280.43$, $0.1135x^2-13.112x+380.43$),
and the line segment NK is represented by coordinates (x, $0.2421x^2-29.955x+931.91$, $-0.2421x^2+28.955x-831.91$).

The point on the line segment PN was determined by obtaining an approximate curve connecting three points, i.e., points P, L, and N, by the least square method.

The point on the line segment NK was determined by obtaining an approximate curve connecting three points, i.e., points N, N', and K, by the least square method.

(5-2) Refrigerant B

The refrigerant B according to the present disclosure is
a mixed refrigerant comprising trans-1,2-difluoroethylene (HFO-1132(E)) and trifluoroethylene (HFO-1123) in a total amount of 99.5 mass % or more based on the entire refrigerant, and the refrigerant comprising 62.0 mass % to 72.0 mass % or 45.1 mass % to 47.1 mass % of HFO-1132 (E) based on the entire refrigerant, or
a mixed refrigerant comprising HFO-1132(E) and HFO-1123 in a total amount of 99.5 mass % or more based on the entire refrigerant, and the refrigerant comprising 45.1 mass % to 47.1 mass % of HFO-1132(E) based on the entire refrigerant.

The refrigerant B according to the present disclosure has various properties that are desirable as an R410A-alternative refrigerant, i.e., (1) a coefficient of performance equivalent to that of R410A, (2) a refrigerating capacity equivalent to that of R410A, (3) a sufficiently low GWP, and (4) a lower flammability (Class 2L) according to the ASHRAE standard.

When the refrigerant B according to the present disclosure is a mixed refrigerant comprising 72.0 mass % or less of HFO-1132(E), it has WCF lower flammability. When the refrigerant B according to the present disclosure is a composition comprising 47.1% or less of HFO-1132(E), it has WCF lower flammability and WCFF lower flammability, and is determined to be "Class 2L," which is a lower flammable refrigerant according to the ASHRAE standard, and which is further easier to handle.

When the refrigerant B according to the present disclosure comprises 62.0 mass % or more of HFO-1132(E), it becomes superior with a coefficient of performance of 95% or more relative to that of R410A, the polymerization reaction of HFO-1132(E) and/or HFO-1123 is further suppressed, and the stability is further improved. When the refrigerant B according to the present disclosure comprises 45.1 mass % or more of FO-1132(E), it becomes superior with a coefficient of performance of 93% or more relative to that of R410A, the polymerization reaction of HFO-1132(E) and/or HFO-1123 is further suppressed, and the stability is further improved.

The refrigerant B according to the present disclosure may further comprise other additional refrigerants in addition to HFO-1132(E) and HFO-1123, as long as the above properties and effects are not impaired. In this respect, the refrigerant according to the present disclosure preferably comprises HFO-1132(E) and HFO-1123 in a total amount of 99.75 mass % or more, and more preferably 99.9 mass % or more, based on the entire refrigerant.

Such additional refrigerants are not limited, and can be selected from a wide range of refrigerants. The mixed refrigerant may comprise a single additional refrigerant, or two or more additional refrigerants.

(Examples of Refrigerant B)

The present disclosure is described in more detail below with reference to Examples of refrigerant B. However, the refrigerant B is not limited to the Examples.

Mixed refrigerants were prepared by mixing HFO-1132 (E) and HFO-1123 at mass % based on their sum shown in Tables 37 and 38.

The GWP of compositions each comprising a mixture of R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in Patent Literature 1). The refrigerating capacity of compositions each comprising R410A and a mixture of HFO-1132(E) and HFO-1123 was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

Evaporating temperature: 5° C.
Condensation temperature: 45° C.
Superheating temperature: 5 K
Subcooling temperature: 5 K
Compressor efficiency: 70%

The composition of each mixture was defined as WCF. A leak simulation was performed using NIST Standard Reference Data Base Refleak Version 4.0 under the conditions of Equipment, Storage, Shipping, Leak, and Recharge according to the ASHRAE Standard 34-2013. The most flammable fraction was defined as WCFF.

Tables 1 and 2 show GWP, COP, and refrigerating capacity, which were calculated based on these results. The COP and refrigerating capacity are ratios relative to R410A.

The coefficient of performance (COP) was determined by the following formula.

$$COP = (\text{refrigerating capacity or heating capacity}) / \text{power consumption}$$

For the flammability, the burning velocity was measured according to the ANSI/ASHRAE Standard 34-2013. Both WCF and WCFF having a burning velocity of 10 cm/s or less were determined to be "Class 2L (lower flammability)."

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

TABLE 37

| Item | Unit | Comparative Example 1 R410A | Comparative Example 2 HFO-1132E | Comparative Example 3 | Example 1 | Example 2 | Example 3 | Example 4 | Example 5 | Comparative Example 4 |
|---|---|---|---|---|---|---|---|---|---|---|
| HFO-1132E (WCF) | mass % | — | 100 | 80 | 72 | 70 | 68 | 65 | 62 | 60 |
| HFO-1123 (WCF) | mass % | | 0 | 20 | 28 | 30 | 32 | 35 | 38 | 40 |
| GWP | — | 2088 | 1 | 1 | 1 | 1 | 1 | 1 | 1 | 1 |
| COP ratio | % (relative to R410A) | 100 | 99.7 | 97.5 | 96.6 | 96.3 | 96.1 | 95.8 | 95.4 | 95.2 |
| Refrigerating capacity ratio | % (relative to R410A) | 100 | 98.3 | 101.9 | 103.1 | 103.4 | 103.8 | 104.1 | 104.5 | 104.8 |
| Discharge pressure | Mpa | 2.73 | 2.71 | 2.89 | 2.96 | 2.98 | 3.00 | 3.02 | 3.04 | 3.06 |
| Burning velocity (WCF) | cm/sec | Non-flammable | 20 | 13 | 10 | 9 | 9 | 8 | 8 or less | 8 or less |

TABLE 38

| Item | Unit | Comparative Example 5 | Comparative Example 6 | Example 7 | Example 8 | Example 9 | Comparative Example 7 | Comparative Example 8 | Comparative Example 9 | Comparative Example 10 HFO-1123 |
|---|---|---|---|---|---|---|---|---|---|---|
| HFO-1132E (WCF) | mass % | 50 | 48 | 47.1 | 46.1 | 45.1 | 43 | 40 | 25 | 0 |
| HFO-1123 (WCF) | mass % | 50 | 52 | 52.9 | 53.9 | 54.9 | 57 | 60 | 75 | 100 |
| GWP | — | 1 | 1 | 1 | 1 | 1 | 1 | 1 | 1 | 1 |
| COP ratio | % (relative to R410A) | 94.1 | 93.9 | 93.8 | 93.7 | 93.6 | 93.4 | 93.1 | 91.9 | 90.6 |
| Refrigerating capacity ratio | % (relative to R410A) | 105.9 | 106.1 | 106.2 | 106.3 | 106.4 | 106.6 | 106.9 | 107.9 | 108.0 |
| Discharge pressure | Mpa | 3.14 | 3.16 | 3.16 | 3.17 | 3.18 | 3.20 | 3.21 | 3.31 | 3.39 |

TABLE 38-continued

| Item | Unit | Comparative Example 5 | Comparative Example 6 | Example 7 | Example 8 | Example 9 | Comparative Example 7 | Comparative Example 8 | Comparative Example 9 | Comparative Example 10 HFO-1123 |
|---|---|---|---|---|---|---|---|---|---|---|
| Leakage test conditions (WCFF) | | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 90% release, liquid phase side | — |
| HFO-1132E (WCFF) | mass % | 74 | 73 | 72 | 71 | 70 | 67 | 63 | 38 | — |
| HFO-1123 (WCFF) | mass % | 26 | 27 | 28 | 29 | 30 | 33 | 37 | 62 | |
| Burning velocity (WCF) | cm/sec | 8 or less | 8 or less | 8 or less | 8 or less | 8 or less | 8 or less | 8 or less | 8 or less | 5 |
| Burning velocity (WCFF) | cm/sec | 11 | 10.5 | 10.0 | 9.5 | 9.5 | 8.5 | 8 or less | 8 or less | |
| ASHRAE flammability classification | | 2 | 2 | 2L | 2L | 2L | 2L | 2L | 2L | 2L |

The compositions each comprising 62.0 mass % to 72.0 mass % of THFO-1132(E) based on the entire composition are stable while having a low GWP (GWP=1), and they ensure WCF lower flammability. Further, surprisingly, they can ensure performance equivalent to that of R410A. Moreover, compositions each comprising 45.1 mass % to 47.1 mass % of HFO-1132(E) based on the entire composition are stable while having a low GWP (GWP=1), and they ensure WCFF lower flammability. Further, surprisingly, they can ensure performance equivalent to that of R410A.

(5-3) Refrigerant C

The refrigerant C according to the present disclosure is a composition comprising trans-1,2-difluoroethylene (HFO-1132(E)), trifluoroethylene (HFO-1123), 2,3,3,3-tetrafluoro-1-propene (R1234yf), and difluoromethane (R32), and satisfies the following requirements. The refrigerant C according to the present disclosure has various properties that are desirable as an alternative refrigerant for R410A; i.e. it has a coefficient of performance and a refrigerating capacity that are equivalent to those of R410A, and a sufficiently low GWP.

Requirements

Preferable refrigerant C is as follows:

When the mass % of HFO-1132(E), HFO-1123, R1234yf, and R32 based on their sum is respectively represented by x, y, z, and a, if $0 < a \leq 11.1$, coordinates (x,y,z) in a ternary composition diagram in which the sum of HFO-1132(E), HFO-1123, and R1234yf is (100−a) mass % are within the range of a figure surrounded by straight lines GI, IA, AB, BD', D'C, and CG that connect the following 6 points:

point G $(0.026a^2 - 1.7478a + 72.0, -0.026a^2 + 0.7478a + 28.0, 0.0)$, point I $(0.026a^2 - 1.7478a + 72.0, 0.0, -0.026a^2 + 0.7478a + 28.0)$, point A $(0.0134a^2 - 1.9681a + 68.6, 0.0, -0.0134a^2 + 0.9681a + 31.4)$, point B $(0.0, 0.0144a^2 - 1.6377a + 58.7, -0.0144a^2 + 0.6377a + 41.3)$, point D' $(0.0, 0.0224a^2 + 0.968a + 75.4, -0.0224a^2 - 1.968a + 24.6)$, and point C $(-0.2304a^2 - 0.4062a + 32.9, 0.2304a^2 - 0.5938a + 67.1, 0.0)$, or on the straight lines GI, AB, and D'C (excluding point G, point I, point A, point B, point D', and point C);

if $11.1 < a \leq 18.2$, coordinates (x,y,z) in the ternary composition diagram are within the range of a figure surrounded by straight lines GI, IA, AB, BW, and WG that connect the following 5 points:

point G $(0.02a^2 - 1.6013a + 71.105, -0.02a^2 + 0.6013a + 28.895, 0.0)$, point I $(0.02a^2 - 1.6013a + 71.105, 0.0, -0.02a^2 + 0.6013a + 28.895)$, point A $(0.0112a^2 - 1.9337a + 68.484, 0.0, -0.0112a^2 + 0.9337a + 31.516)$, point B $(0.0, 0.0075a^2 - 1.5156a + 58.199, -0.0075a^2 + 0.5156a + 41.801)$ and point W $(0.0, 100.0 - a, 0.0)$, or on the straight lines GI and AB (excluding point G, point I, point A, point B, and point W);

if $18.2 < a \leq 26.7$, coordinates (x,y,z) in the ternary composition diagram are within the range of a figure surrounded by straight lines GI, IA, AB, BW, and WG that connect the following 5 points:

point G $(0.0135a^2 - 1.4068a + 69.727, -0.0135a^2 + 0.4068a + 30.273, 0.0)$, point I $(0.0135a^2 - 1.4068a + 69.727, 0.0, -0.0135a^2 + 0.4068a + 30.273)$, point A $(0.0107a^2 - 1.9142a + 68.305, 0.0, -0.0107a^2 + 0.9142a + 31.695)$, point B $(0.0, 0.009a^2 - 1.6045a + 59.318, -0.009a^2 + 0.6045a + 40.682)$ and point W $(0.0, 100.0 - a, 0.0)$, or on the straight lines GI and AB (excluding point G, point I, point A, point B, and point W);

if $26.7 < a \leq 36.7$, coordinates (x,y,z) in the ternary composition diagram are within the range of a figure surrounded by straight lines GI, IA, AB, BW, and WG that connect the following 5 points:

point G $(0.0111a^2 - 1.3152a + 68.986, -0.0111a^2 + 0.3152a + 31.014, 0.0)$, point I $(0.0111a^2 - 1.3152a + 68.986, 0.0, -0.0111a^2 + 0.3152a + 31.014)$, point A $(0.0103a^2 - 1.9225a + 68.793, 0.0, -0.0103a^2 + 0.9225a + 31.207)$, point B (0.0, $0.0046a^2-1.41a+57.286$, $-0.0046a^2+0.41a+42.714$) and
point W (0.0, $100.0-a$, 0.0),
or on the straight lines GI and AB (excluding point G, point I, point A, point B, and point W); and if $36.7<a\leq46.7$, coordinates (x,y,z) in the ternary composition diagram are within the range of a figure surrounded by straight lines GI, IA, AB, BW, and WG that connect the following 5 points:
point G ($0.0061a^2-0.9918a+63.902$, $-0.0061a^2-0.0082a+36.098$, 0.0),
point I ($0.0061a^2-0.9918a+63.902$, 0.0, $-0.0061a^2-0.0082a+36.098$),
point A ($0.0085a^2-1.8102a+67.1$, 0.0, $-0.0085a^2+0.8102a+32.9$),
point B (0.0, $0.0012a^2-1.1659a+52.95$, $-0.0012a^2+0.1659a+47.05$) and
point W (0.0, $100.0-a$, 0.0),
or on the straight lines GI and AB (excluding point G, point I, point A, point B, and point W). When the refrigerant according to the present disclosure satisfies the above requirements, it has a refrigerating capacity ratio of 85% or more relative to that of R410A, and a COP ratio of 92.5% or more relative to that of R410A, and further ensures a WCF lower flammability.

The refrigerant C according to the present disclosure is preferably a refrigerant wherein
when the mass % of HFO-1132(E), HFO-1123, and R1234yf based on their sum is respectively represented by x, y, and z,
if $0<a\leq11.1$, coordinates (x,y,z) in a ternary composition diagram in which the sum of HFO-1132(E), HFO-1123, and R1234yf is $(100-a)$ mass % are within the range of a figure surrounded by straight lines JK', K'B, BD', D'C, and CJ that connect the following 5 points:
point J ($0.0049a^2-0.9645a+47.1$, $-0.0049a^2-0.0355a+52.9$, 0.0),
point K' ($0.0514a^2-2.4353a+61.7$, $-0.0323a^2+0.4122a+5.9$, $-0.0191a^2+1.0231a+32.4$),
point B (0.0, $0.0144a^2-1.6377a+58.7$, $-0.0144a^2+0.6377a+41.3$),
point D' (0.0, $0.0224a^2+0.968a+75.4$, $-0.0224a^2-1.968a+24.6$), and
point C ($-0.2304a^2-0.4062a+32.9$, $0.2304a^2-0.5938a+67.1$, 0.0),
or on the straight lines JK', K'B, and D'C (excluding point J, point B, point D', and point C);

if $11.1<a\leq18.2$, coordinates (x,y,z) in the ternary composition diagram are within the range of a figure surrounded by straight lines JK', K'B, BW, and WJ that connect the following 4 points:
point J ($0.0243a^2-1.4161a+49.725$, $-0.0243a^2+0.4161a+50.275$, 0.0),
point K' ($0.0341a^2-2.1977a+61.187$, $-0.0236a^2+0.34a+5.636$, $-0.0105a^2+0.8577a+33.177$),
point B (0.0, $0.0075a^2-1.5156a+58.199$, $-0.0075a^2+0.5156a+41.801$) and
point W (0.0, $100.0-a$, 0.0),
or on the straight lines JK' and K'B (excluding point J, point B, and point W);

if $18.2<a\leq26.7$, coordinates (x,y,z) in the ternary composition diagram are within the range of a figure surrounded by straight lines JK', K'B, BW, and WJ that connect the following 4 points:
point J ($0.0246a^2-1.4476a+50.184$, $-0.0246a^2+0.4476a+49.816$, 0.0),
point K' ($0.0196a^2-1.7863a+58.515$, $-0.0079a^2-0.1136a+8.702$, $-0.0117a^2+0.8999a+32.783$),
point B (0.0, $0.009a^2-1.6045a+59.318$, $-0.009a^2+0.6045a+40.682$) and
point W (0.0, $100.0-a$, 0.0),
or on the straight lines JK' and K'B (excluding point J, point B, and point W);

if $26.7<a\leq36.7$, coordinates (x,y,z) in the ternary composition diagram are within the range of a figure surrounded by straight lines JK', K'A, AB, BW, and WJ that connect the following 5 points:
point J ($0.0183a^2-1.1399a+46.493$, $-0.0183a^2+0.1399a+53.507$, 0.0),
point K' ($-0.0051a^2+0.0929a+25.95$, 0.0, $0.0051a^2-1.0929a+74.05$),
point A ($0.0103a^2-1.9225a+68.793$, 0.0, $-0.0103a^2+0.9225a+31.207$),
point B (0.0, $0.0046a^2-1.41a+57.286$, $-0.0046a^2+0.41a+42.714$) and
point W (0.0, $100.0-a$, 0.0),
or on the straight lines JK', K'A, and AB (excluding point J, point B, and point W); and if $36.7<a\leq46.7$, coordinates (x,y,z) in the ternary composition diagram are within the range of a figure surrounded by straight lines JK', K'A, AB, BW, and WJ that connect the following 5 points:
point J ($-0.0134a^2+1.0956a+7.13$, $0.0134a^2-2.0956a+92.87$, 0.0),
point K'($-1.892a+29.443$, 0.0, $0.892a+70.557$),
point A ($0.0085a^2-1.8102a+67.1$, 0.0, $-0.0085a^2+0.8102a+32.9$),
point B (0.0, $0.0012a^2-1.1659a+52.95$, $-0.0012a^2+0.1659a+47.05$) and
point W (0.0, $100.0-a$, 0.0),
or on the straight lines JK', K'A, and AB (excluding point J, point B, and point W). When the refrigerant according to the present disclosure satisfies the above requirements, it has a refrigerating capacity ratio of 85% or more relative to that of R410A, and a COP ratio of 92.5% or more relative to that of R410A. Additionally, the refrigerant has a WCF lower flammability and a WCFF lower flammability, and is classified as "Class 2L," which is a lower flammable refrigerant according to the ASHRAE standard.

When the refrigerant C according to the present disclosure further contains R32 in addition to HFO-1132 (E), HFO-1123, and R1234yf, the refrigerant may be a refrigerant wherein when the mass % of HFO-1132(E), HFO-1123, R1234yf, and R32 based on their sum is respectively represented by x, y, z, and a,
if $0<a\leq10.0$, coordinates (x,y,z) in a ternary composition diagram in which the sum of HFO-1132(E), HFO-1123, and R1234yf is $(100-a)$ mass % are within the range of a figure surrounded by straight lines that connect the following 4 points:
point a ($0.02a^2-2.46a+93.4$, 0, $-0.02a^2+2.46a+6.6$),
point b'($-0.008a^2-1.38a+56$, $0.018a^2-0.53a+26.3$, $-0.01a^2+1.91a+17.7$),
point c ($-0.016a^2+1.02a+77.6$, $0.016a^2-1.02a+22.4$, 0), and
point o ($100.0-a$, 0.0, 0.0)
or on the straight lines oa, ab', and b'c (excluding point o and point c);

if $10.0<a\leq16.5$, coordinates (x,y,z) in the ternary composition diagram are within the range of a figure surrounded by straight lines that connect the following 4 points:
point a ($0.0244a^2-2.5695a+94.056$, 0, $-0.0244a^2+2.5695a+5.944$), point b'$(0.1161a^2-1.9959a+59.749, 0.014a^2-0.3399a+24.8, -0.1301a^2+2.3358a+15.451)$,
point c $(-0.0161a^2+1.02a+77.6, 0.0161a^2-1.02a+22.4, 0)$, and
point o $(100.0-a, 0.0, 0.0)$,
or on the straight lines oa, ab', and b'c (excluding point o and point c); or if $16.5<a\leq21.8$, coordinates (x,y,z) in the ternary composition diagram are within the range of a figure surrounded by straight lines that connect the following 4 points:
point a $(0.0161a^2-2.3535a+92.742, 0, -0.0161a^2+2.3535a+7.258)$,
point b'$(-0.0435a^2-0.0435a+50.406, 0.0304a^2+1.8991a-0.0661, 0.0739a^2-1.8556a+49.6601)$,
point c $(-0.0161a^2+0.9959a+77.851, 0.0161a^2-0.9959a+22.149, 0)$, and
point o $(100.0-a, 0.0, 0.0)$,
or on the straight lines oa, ab', and b'c (excluding point o and point c). Note that when point b in the ternary composition diagram is defined as a point where a refrigerating capacity ratio of 95% relative to that of R410A and a COP ratio of 95% relative to that of R410A are both achieved, point b' is the intersection of straight line ab and an approximate line formed by connecting the points where the COP ratio relative to that of R410A is 95%. When the refrigerant according to the present disclosure meets the above requirements, the refrigerant has a refrigerating capacity ratio of 95% or more relative to that of R410A, and a COP ratio of 95% or more relative to that of R410A.

The refrigerant C according to the present disclosure may further comprise other additional refrigerants in addition to HFO-1132(E), HFO-1123, R1234yf, and R32 as long as the above properties and effects are not impaired. In this respect, the refrigerant according to the present disclosure preferably comprises HFO-1132(E), HFO-1123, R1234yf, and R32 in a total amount of 99.5 mass % or more, more preferably 99.75 mass % or more, and still more preferably 99.9 mass % or more, based on the entire refrigerant.

The refrigerant C according to the present disclosure may comprise HFO-1132(E), HFO-1123, R1234yf, and R32 in a total amount of 99.5 mass % or more, 99.75 mass % or more, or 99.9 mass % or more, based on the entire refrigerant.

Additional refrigerants are not particularly limited and can be widely selected. The mixed refrigerant may contain one additional refrigerant, or two or more additional refrigerants.

(Examples of Refrigerant C)

The present disclosure is described in more detail below with reference to Examples of refrigerant C. However, the refrigerant C is not limited to the Examples.

Mixed refrigerants were prepared by mixing HFO-1132 (E), HFO-1123, R1234yf, and R32 at mass % based on their sum shown in Tables 39 to 96.

The GWP of compositions each comprising a mixture of R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in Patent Literature 1). The refrigerating capacity of compositions each comprising R410A and a mixture of HFO-1132(E) and HFO-1123 was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

For each of these mixed refrigerants, the COP ratio and the refrigerating capacity ratio relative to those of R410 were obtained. Calculation was conducted under the following conditions.

Evaporating temperature: 5° C.
Condensation temperature: 45° C.
Superheating temperature: 5 K
Subcooling temperature: 5 K
Compressor efficiency: 70%

Tables 39 to 96 show the resulting values together with the GWP of each mixed refrigerant. The COP and refrigerating capacity are ratios relative to R410A.

The coefficient of performance (COP) was determined by the following formula.

$$COP = \text{(refrigerating capacity or heating capacity)} / \text{power consumption}$$

TABLE 39

| Item | Unit | Comp. Ex. 1 | Comp. Ex. 2 A | Comp. Ex. 3 B | Comp. Ex. 4 C | Comp. Ex. 5 D' | Comp. Ex. 6 G | Comp. Ex. 7 I | Comp. Ex. 8 J | Ex. 1 K' |
|---|---|---|---|---|---|---|---|---|---|---|
| HFO-1132(E) | Mass % | R410A | 68.6 | 0.0 | 32.9 | 0.0 | 72.0 | 72.0 | 47.1 | 61.7 |
| HFO-1123 | Mass % | | 0.0 | 58.7 | 67.1 | 75.4 | 28.0 | 0.0 | 52.9 | 5.9 |
| R1234yf | Mass % | | 31.4 | 41.3 | 0.0 | 24.6 | 0.0 | 28.0 | 0.0 | 32.4 |
| R32 | Mass % | | 0.0 | 0.0 | 0.0 | 0.0 | 0.0 | 0.0 | 0.0 | 0.0 |
| GWP | — | 2088 | 2 | 2 | 1 | 2 | 1 | 2 | 1 | 2 |
| COP ratio | % (relative to R410A) | 100 | 100.0 | 95.5 | 92.5 | 93.1 | 96.6 | 99.9 | 93.8 | 99.4 |
| Refrigerating capacity ratio | % (relative to R410A) | 100 | 85.0 | 85.0 | 107.4 | 95.0 | 103.1 | 86.6 | 106.2 | 85.5 |

TABLE 40

| Item | Unit | Comp. Ex. 9 A | Comp. Ex. 10 B | Comp. Ex. 11 C | Comp. Ex. 12 D' | Comp. Ex. 13 G | Comp. Ex. 14 I | Comp. Ex. 15 J | Ex. 2 K' |
|---|---|---|---|---|---|---|---|---|---|
| HFO-1132(E) | Mass % | 55.3 | 0.0 | 18.4 | 0.0 | 60.9 | 60.9 | 40.5 | 47.0 |
| HFO-1123 | Mass % | 0.0 | 47.8 | 74.5 | 83.4 | 32.0 | 0.0 | 52.4 | 7.2 |

TABLE 40-continued

| Item | Unit | Comp. Ex. 9 A | Comp. Ex. 10 B | Comp. Ex. 11 C | Comp. Ex. 12 D' | Comp. Ex. 13 G | Comp. Ex. 14 I | Comp. Ex. 15 J | Ex. 2 K' |
|---|---|---|---|---|---|---|---|---|---|
| R1234yf | Mass % | 37.6 | 45.1 | 0.0 | 9.5 | 0.0 | 32.0 | 0.0 | 38.7 |
| R32 | Mass % | 7.1 | 7.1 | 7.1 | 7.1 | 7.1 | 7.1 | 7.1 | 7.1 |
| GWP | — | 50 | 50 | 49 | 49 | 49 | 50 | 49 | 50 |
| COP ratio | % (relative to R410A) | 99.8 | 96.9 | 92.5 | 92.5 | 95.9 | 99.6 | 94.0 | 99.2 |
| Refrigerating capacity ratio | % (relative to R410A) | 85.0 | 85.0 | 110.5 | 106.0 | 106.5 | 87.7 | 108.9 | 85.5 |

TABLE 41

| Item | Unit | Comp. Ex. 16 A | Comp. Ex. 17 B | Comp. Ex. 18 C = D' | Comp. Ex. 19 G | Comp. Ex. 20 I | Comp. Ex. 21 J | Ex. 3 K' |
|---|---|---|---|---|---|---|---|---|
| HFO-1132(E) | Mass % | 48.4 | 0.0 | 0.0 | 55.8 | 55.8 | 37.0 | 41.0 |
| HFO-1123 | Mass % | 0.0 | 42.3 | 88.9 | 33.1 | 0.0 | 51.9 | 6.5 |
| R1234yf | Mass % | 40.5 | 46.6 | 0.0 | 0.0 | 33.1 | 0.0 | 41.4 |
| R32 | Mass % | 11.1 | 11.1 | 11.1 | 11.1 | 11.1 | 11.1 | 11.1 |
| GWP | — | 77 | 77 | 76 | 76 | 77 | 76 | 77 |
| COP ratio | % (relative to R410A) | 99.8 | 97.6 | 92.5 | 95.8 | 99.5 | 94.2 | 99.3 |
| Refrigerating capacity ratio | % (relative to R410A) | 85.0 | 85.0 | 112.0 | 108.0 | 88.6 | 110.2 | 85.4 |

TABLE 42

| Item | Unit | Comp. Ex. 22 A | Comp. Ex. 23 B | Comp. Ex. 24 G | Comp. Ex. 25 I | Comp. Ex. 26 J | Ex. 4 K' |
|---|---|---|---|---|---|---|---|
| HFO-1132(E) | Mass % | 42.8 | 0.0 | 52.1 | 52.1 | 34.3 | 36.5 |
| HFO-1123 | Mass % | 0.0 | 37.8 | 33.4 | 0.0 | 51.2 | 5.6 |
| R1234yf | Mass % | 42.7 | 47.7 | 0.0 | 33.4 | 0.0 | 43.4 |
| R32 | Mass % | 14.5 | 14.5 | 14.5 | 14.5 | 14.5 | 14.5 |
| GWP | — | 100 | 100 | 99 | 100 | 99 | 100 |
| COP ratio | % (relative to R410A) | 99.9 | 98.1 | 95.8 | 99.5 | 94.4 | 99.5 |
| Refrigerating capacity ratio | % (relative to R410A) | 85.0 | 85.0 | 109.1 | 89.6 | 111.1 | 85.3 |

TABLE 43

| Item | Unit | Comp. Ex. 27 A | Comp. Ex. 28 B | Comp. Ex. 29 G | Comp. Ex. 30 I | Comp. Ex. 31 J | Ex. 5 K' |
|---|---|---|---|---|---|---|---|
| HFO-1132(E) | Mass % | 37.0 | 0.0 | 48.6 | 48.6 | 32.0 | 32.5 |
| HFO-1123 | Mass % | 0.0 | 33.1 | 33.2 | 0.0 | 49.8 | 4.0 |
| R1234yf | Mass % | 44.8 | 48.7 | 0.0 | 33.2 | 0.0 | 45.3 |
| R32 | Mass % | 18.2 | 18.2 | 18.2 | 18.2 | 18.2 | 18.2 |
| GWP | — | 125 | 125 | 124 | 125 | 124 | 125 |
| COP ratio | % (relative to R410A) | 100.0 | 98.6 | 95.9 | 99.4 | 94.7 | 99.8 |
| Refrigerating capacity ratio | % (relative to R410A) | 85.0 | 85.0 | 110.1 | 90.8 | 111.9 | 85.2 |

TABLE 44

| Item | Unit | Comp. Ex. 32 A | Comp. Ex. 33 B | Comp. Ex. 34 G | Comp. Ex. 35 I | Comp. Ex. 36 J | Ex. 6 K' |
|---|---|---|---|---|---|---|---|
| HFO-1132(E) | Mass % | 31.5 | 0.0 | 45.4 | 45.4 | 30.3 | 28.8 |
| HFO-1123 | Mass % | 0.0 | 28.5 | 32.7 | 0.0 | 47.8 | 2.4 |
| R1234yf | Mass % | 46.6 | 49.6 | 0.0 | 32.7 | 0.0 | 46.9 |
| R32 | Mass % | 21.9 | 21.9 | 21.9 | 21.9 | 21.9 | 21.9 |
| GWP | — | 150 | 150 | 149 | 150 | 149 | 150 |
| COP ratio | % (relative to R410A) | 100.2 | 99.1 | 96.0 | 99.4 | 95.1 | 100.0 |
| Refrigerating capacity ratio | % (relative to R410A) | 85.0 | 85.0 | 111.0 | 92.1 | 112.6 | 85.1 |

TABLE 45

| Item | Unit | Comp. Ex. 37 A | Comp. Ex. 38 B | Comp. Ex. 39 G | Comp. Ex. 40 I | Comp. Ex. 41 J | Comp. Ex. 42 K' |
|---|---|---|---|---|---|---|---|
| HFO-1132(E) | Mass % | 24.8 | 0.0 | 41.8 | 41.8 | 29.1 | 24.8 |
| HFO-1123 | Mass % | 0.0 | 22.9 | 31.5 | 0.0 | 44.2 | 0.0 |
| R1234yf | Mass % | 48.5 | 50.4 | 0.0 | 31.5 | 0.0 | 48.5 |
| R32 | Mass % | 26.7 | 26.7 | 26.7 | 26.7 | 26.7 | 26.7 |
| GWP | — | 182 | 182 | 181 | 182 | 181 | 182 |
| COP ratio | % (relative to R410A) | 100.4 | 99.8 | 96.3 | 99.4 | 95.6 | 100.4 |
| Refrigerating capacity ratio | % (relative to R410A) | 85.0 | 85.0 | 111.9 | 93.8 | 113.2 | 85.0 |

TABLE 46

| Item | Unit | Comp. Ex. 43 A | Comp. Ex. 44 B | Comp. Ex. 45 G | Comp. Ex. 46 I | Comp. Ex. 47 J | Comp. Ex. 48 K' |
|---|---|---|---|---|---|---|---|
| HFO-1132(E) | Mass % | 21.3 | 0.0 | 40.0 | 40.0 | 28.8 | 24.3 |
| HFO-1123 | Mass % | 0.0 | 19.9 | 30.7 | 0.0 | 41.9 | 0.0 |
| R1234yf | Mass % | 49.4 | 50.8 | 0.0 | 30.7 | 0.0 | 46.4 |
| R32 | Mass % | 29.3 | 29.3 | 29.3 | 29.3 | 29.3 | 29.3 |
| GWP | — | 200 | 200 | 198 | 199 | 198 | 200 |
| COP ratio | % (relative to R410A) | 100.6 | 100.1 | 96.6 | 99.5 | 96.1 | 100.4 |
| Refrigerating capacity ratio | % (relative to R410A) | 85.0 | 85.0 | 112.4 | 94.8 | 113.6 | 86.7 |

TABLE 47

| Item | Unit | Comp. Ex. 49 A | Comp. Ex. 50 B | Comp. Ex. 51 G | Comp. Ex. 52 I | Comp. Ex. 53 J | Comp. Ex. 54 K' |
|---|---|---|---|---|---|---|---|
| HFO-1132(E) | Mass % | 12.1 | 0.0 | 35.7 | 35.7 | 29.3 | 22.5 |
| HFO-1123 | Mass % | 0.0 | 11.7 | 27.6 | 0.0 | 34.0 | 0.0 |
| R1234yf | Mass % | 51.2 | 51.6 | 0.0 | 27.6 | 0.0 | 40.8 |
| R32 | Mass % | 36.7 | 36.7 | 36.7 | 36.7 | 36.7 | 36.7 |
| GWP | — | 250 | 250 | 248 | 249 | 248 | 250 |
| COP ratio | % (relative to R410A) | 101.2 | 101.0 | 96.4 | 99.6 | 97.0 | 100.4 |
| Refrigerating capacity ratio | % (relative to R410A) | 85.0 | 85.0 | 113.2 | 97.6 | 113.9 | 90.9 |

TABLE 48

| Item | Unit | Comp. Ex. 55 A | Comp. Ex. 56 B | Comp. Ex. 57 G | Comp. Ex. 58 I | Comp. Ex. 59 J | Comp. Ex. 60 K' |
|---|---|---|---|---|---|---|---|
| HFO-1132(E) | Mass % | 3.8 | 0.0 | 32.0 | 32.0 | 29.4 | 21.1 |
| HFO-1123 | Mass % | 0.0 | 3.9 | 23.9 | 0.0 | 26.5 | 0.0 |
| R1234yf | Mass % | 52.1 | 52.0 | 0.0 | 23.9 | 0.0 | 34.8 |
| R32 | Mass % | 44.1 | 44.1 | 44.1 | 44.1 | 44.1 | 44.1 |
| GWP | — | 300 | 300 | 298 | 299 | 298 | 299 |
| COP ratio | % (relative to R410A) | 101.8 | 101.8 | 97.9 | 99.8 | 97.8 | 100.5 |
| Refrigerating capacity ratio | % (relative to R410A) | 85.0 | 85.0 | 113.7 | 100.4 | 113.9 | 94.9 |

TABLE 49

| Item | Unit | Comp. Ex. 61 A = B | Comp. Ex. 62 G | Comp. Ex. 63 I | Comp. Ex. 64 J | Comp. Ex. 65 K' |
|---|---|---|---|---|---|---|
| HFO-1132(E) | Mass % | 0.0 | 30.4 | 30.4 | 28.9 | 20.4 |
| HFO-1123 | Mass % | 0.0 | 21.8 | 0.0 | 23.3 | 0.0 |
| R1234yf | Mass % | 52.2 | 0.0 | 21.8 | 0.0 | 31.8 |
| R32 | Mass % | 47.8 | 47.8 | 47.8 | 47.8 | 47.8 |
| GWP | — | 325 | 323 | 324 | 323 | 324 |
| COP ratio | % (relative to R410A) | 102.1 | 98.2 | 100.0 | 98.2 | 100.6 |
| Refrigerating capacity ratio | % (relative to R410A) | 85.0 | 113.8 | 101.8 | 113.9 | 96.8 |

TABLE 50

| Item | Unit | Comp. Ex. 66 | Ex. 7 | Ex. 8 | Ex. 9 | Ex. 10 | Ex. 11 | Ex. 12 | Ex. 13 |
|---|---|---|---|---|---|---|---|---|---|
| HFO-1132(E) | Mass % | 5.0 | 10.0 | 15.0 | 20.0 | 25.0 | 30.0 | 35.0 | 40.0 |
| HFO-1123 | Mass % | 82.9 | 77.9 | 72.9 | 67.9 | 62.9 | 57.9 | 52.9 | 47.9 |
| R1234yf | Mass % | 5.0 | 5.0 | 5.0 | 5.0 | 5.0 | 5.0 | 5.0 | 5.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 92.4 | 92.6 | 92.8 | 93.1 | 93.4 | 93.7 | 94.1 | 94.5 |
| Refrigerating capacity ratio | % (relative to R410A) | 108.4 | 108.3 | 108.2 | 107.9 | 107.6 | 107.2 | 106.8 | 106.3 |

TABLE 51

| Item | Unit | Ex. 14 | Ex. 15 | Ex. 16 | Ex. 17 | Comp. Ex. 67 | Ex. 18 | Ex. 19 | Ex. 20 |
|---|---|---|---|---|---|---|---|---|---|
| HFO-1132(E) | Mass % | 45.0 | 50.0 | 55.0 | 60.0 | 65.0 | 10.0 | 15.0 | 20.0 |
| HFO-1123 | Mass % | 42.9 | 37.9 | 32.9 | 27.9 | 22.9 | 72.9 | 67.9 | 62.9 |
| R1234yf | Mass % | 5.0 | 5.0 | 5.0 | 5.0 | 5.0 | 10.0 | 10.0 | 10.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 95.0 | 95.4 | 95.9 | 96.4 | 96.9 | 93.0 | 93.3 | 93.6 |
| Refrigerating capacity ratio | % (relative to R410A) | 105.8 | 105.2 | 104.5 | 103.9 | 103.1 | 105.7 | 105.5 | 105.2 |

TABLE 52

| Item | Unit | Ex. 21 | Ex. 22 | Ex. 23 | Ex. 24 | Ex. 25 | Ex. 26 | Ex. 27 | Ex. 28 |
|---|---|---|---|---|---|---|---|---|---|
| HFO-1132(E) | Mass % | 25.0 | 30.0 | 35.0 | 40.0 | 45.0 | 50.0 | 55.0 | 60.0 |
| HFO-1123 | Mass % | 57.9 | 52.9 | 47.9 | 42.9 | 37.9 | 32.9 | 27.9 | 22.9 |
| R1234yf | Mass % | 10.0 | 10.0 | 10.0 | 10.0 | 10.0 | 10.0 | 10.0 | 10.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |

TABLE 52-continued

| Item | Unit | Ex. 21 | Ex. 22 | Ex. 23 | Ex. 24 | Ex. 25 | Ex. 26 | Ex. 27 | Ex. 28 |
|---|---|---|---|---|---|---|---|---|---|
| COP ratio | % (relative to R410A) | 93.9 | 94.2 | 94.6 | 95.0 | 95.5 | 96.0 | 96.4 | 96.9 |
| Refrigerating capacity ratio | % (relative to R410A) | 104.9 | 104.5 | 104.1 | 103.6 | 103.0 | 102.4 | 101.7 | 101.0 |

TABLE 53

| Item | Unit | Comp. Ex. 68 | Ex. 29 | Ex. 30 | Ex. 31 | Ex. 32 | Ex. 33 | Ex. 34 | Ex. 35 |
|---|---|---|---|---|---|---|---|---|---|
| HFO-1132(E) | Mass % | 65.0 | 10.0 | 15.0 | 20.0 | 25.0 | 30.0 | 35.0 | 40.0 |
| HFO-1123 | Mass % | 17.9 | 67.9 | 62.9 | 57.9 | 52.9 | 47.9 | 42.9 | 37.9 |
| R1234yf | Mass % | 10.0 | 15.0 | 15.0 | 15.0 | 15.0 | 15.0 | 15.0 | 15.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 97.4 | 93.5 | 93.8 | 94.1 | 94.4 | 94.8 | 95.2 | 95.6 |
| Refrigerating capacity ratio | % (relative to R410A) | 100.3 | 102.9 | 102.7 | 102.5 | 102.1 | 101.7 | 101.2 | 100.7 |

TABLE 54

| Item | Unit | Ex. 36 | Ex. 37 | Ex. 38 | Ex. 39 | Comp. Ex. 69 | Ex. 40 | Ex. 41 | Ex. 42 |
|---|---|---|---|---|---|---|---|---|---|
| HFO-1132(E) | Mass % | 45.0 | 50.0 | 55.0 | 60.0 | 65.0 | 10.0 | 15.0 | 20.0 |
| HFO-1123 | Mass % | 32.9 | 27.9 | 22.9 | 17.9 | 12.9 | 62.9 | 57.9 | 52.9 |
| R1234yf | Mass % | 15.0 | 15.0 | 15.0 | 15.0 | 15.0 | 20.0 | 20.0 | 20.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 96.0 | 96.5 | 97.0 | 97.5 | 98.0 | 94.0 | 94.3 | 94.6 |
| Refrigerating capacity ratio | % (relative to R410A) | 100.1 | 99.5 | 98.9 | 98.1 | 97.4 | 100.1 | 99.9 | 99.6 |

TABLE 55

| Item | Unit | Ex. 43 | Ex. 44 | Ex. 45 | Ex. 46 | Ex. 47 | Ex. 48 | Ex. 49 | Ex. 50 |
|---|---|---|---|---|---|---|---|---|---|
| HFO-1132(E) | Mass % | 25.0 | 30.0 | 35.0 | 40.0 | 45.0 | 50.0 | 55.0 | 60.0 |
| HFO-1123 | Mass % | 47.9 | 42.9 | 37.9 | 32.9 | 27.9 | 22.9 | 17.9 | 12.9 |
| R1234yf | Mass % | 20.0 | 20.0 | 20.0 | 20.0 | 20.0 | 20.0 | 20.0 | 20.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 95.0 | 95.3 | 95.7 | 96.2 | 96.6 | 97.1 | 97.6 | 98.1 |
| Refrigerating capacity ratio | % (relative to R410A) | 99.2 | 98.8 | 98.3 | 97.8 | 97.2 | 96.6 | 95.9 | 95.2 |

TABLE 56

| Item | Unit | Comp. Ex. 70 | Ex. 51 | Ex. 52 | Ex. 53 | Ex. 54 | Ex. 55 | Ex. 56 | Ex. 57 |
|---|---|---|---|---|---|---|---|---|---|
| HFO-1132(E) | Mass % | 65.0 | 10.0 | 15.0 | 20.0 | 25.0 | 30.0 | 35.0 | 40.0 |
| HFO-1123 | Mass % | 7.9 | 57.9 | 52.9 | 47.9 | 42.9 | 37.9 | 32.9 | 27.9 |
| R1234yf | Mass % | 20.0 | 25.0 | 25.0 | 25.0 | 25.0 | 25.0 | 25.0 | 25.0 |
| R32 | Mass % | 7.1 | 7.1 | 7.1 | 7.1 | 7.1 | 7.1 | 7.1 | 7.1 |
| GWP | — | 49 | 50 | 50 | 50 | 50 | 50 | 50 | 50 |

TABLE 56-continued

| Item | Unit | Comp. Ex. 70 | Ex. 51 | Ex. 52 | Ex. 53 | Ex. 54 | Ex. 55 | Ex. 56 | Ex. 57 |
|---|---|---|---|---|---|---|---|---|---|
| COP ratio | % (relative to R410A) | 98.6 | 94.6 | 94.9 | 95.2 | 95.5 | 95.9 | 96.3 | 96.8 |
| Refrigerating capacity ratio | % (relative to R410A) | 94.4 | 97.1 | 96.9 | 96.7 | 96.3 | 95.9 | 95.4 | 94.8 |

TABLE 57

| Item | Unit | Ex. 58 | Ex. 59 | Ex. 60 | Ex. 61 | Comp. Ex. 71 | Ex. 62 | Ex. 63 | Ex. 64 |
|---|---|---|---|---|---|---|---|---|---|
| HFO-1132(E) | Mass % | 45.0 | 50.0 | 55.0 | 60.0 | 65.0 | 10.0 | 15.0 | 20.0 |
| HFO-1123 | Mass % | 7.1 | 7.1 | 7.1 | 7.1 | 7.1 | 7.1 | 7.1 | 7.1 |
| R1234yf | Mass % | 25.0 | 25.0 | 25.0 | 25.0 | 25.0 | 30.0 | 30.0 | 30.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 97.2 | 97.7 | 98.2 | 98.7 | 99.2 | 95.2 | 95.5 | 95.8 |
| Refrigerating capacity ratio | % (relative to R410A) | 94.2 | 93.6 | 92.9 | 92.2 | 91.4 | 94.2 | 93.9 | 93.7 |

TABLE 58

| Item | Unit | Ex. 65 | Ex. 66 | Ex. 67 | Ex. 68 | Ex. 69 | Ex. 70 | Ex. 71 | Ex. 72 |
|---|---|---|---|---|---|---|---|---|---|
| HFO-1132(E) | Mass % | 25.0 | 30.0 | 35.0 | 40.0 | 45.0 | 50.0 | 55.0 | 60.0 |
| HFO-1123 | Mass % | 37.9 | 32.9 | 27.9 | 22.9 | 17.9 | 12.9 | 7.9 | 2.9 |
| R1234yf | Mass % | 30.0 | 30.0 | 30.0 | 30.0 | 30.0 | 30.0 | 30.0 | 30.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 96.2 | 96.6 | 97.0 | 97.4 | 97.9 | 98.3 | 98.8 | 99.3 |
| Refrigerating capacity ratio | % (relative to R410A) | 93.3 | 92.9 | 92.4 | 91.8 | 91.2 | 90.5 | 89.8 | 89.1 |

TABLE 59

| Item | Unit | Ex. 73 | Ex. 74 | Ex. 75 | Ex. 76 | Ex. 77 | Ex. 78 | Ex. 79 | Ex. 80 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 47.9 | 42.9 | 37.9 | 32.9 | 27.9 | 22.9 | 17.9 | 12.9 |
| R1234yf | Mass % | 35.0 | 35.0 | 35.0 | 35.0 | 35.0 | 35.0 | 35.0 | 35.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 95.9 | 96.2 | 96.5 | 96.9 | 97.2 | 97.7 | 98.1 | 98.5 |
| Refrigerating capacity ratio | % (relative to R410A) | 91.1 | 90.9 | 90.6 | 90.2 | 89.8 | 89.3 | 88.7 | 88.1 |

TABLE 60

| Item | Unit | Ex. 81 | Ex. 82 | Ex. 83 | Ex. 84 | Ex. 85 | Ex. 86 | Ex. 87 | Ex. 88 |
|---|---|---|---|---|---|---|---|---|---|
| HFO-1132(E) | Mass % | 50.0 | 55.0 | 10.0 | 15.0 | 20.0 | 25.0 | 30.0 | 35.0 |
| HFO-1123 | Mass % | 7.9 | 2.9 | 42.9 | 37.9 | 32.9 | 27.9 | 22.9 | 17.9 |
| R1234yf | Mass % | 35.0 | 35.0 | 40.0 | 40.0 | 40.0 | 40.0 | 40.0 | 40.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |

TABLE 60-continued

| Item | Unit | Ex. 81 | Ex. 82 | Ex. 83 | Ex. 84 | Ex. 85 | Ex. 86 | Ex. 87 | Ex. 88 |
|---|---|---|---|---|---|---|---|---|---|
| COP ratio | % (relative to R410A) | 99.0 | 99.4 | 96.6 | 96.9 | 97.2 | 97.6 | 98.0 | 98.4 |
| Refrigerating capacity ratio | % (relative to R410A) | 87.4 | 86.7 | 88.0 | 87.8 | 87.5 | 87.1 | 86.6 | 86.1 |

TABLE 61

| Item | Unit | Comp. Ex. 72 | Comp. Ex. 73 | Comp. Ex. 74 | Comp. Ex. 75 | Comp. Ex. 76 | Comp. Ex. 77 | Comp. Ex. 78 | Comp. Ex. 79 |
|---|---|---|---|---|---|---|---|---|---|
| HFO-1132(E) | Mass % | 40.0 | 45.0 | 50.0 | 10.0 | 15.0 | 20.0 | 25.0 | 30.0 |
| HFO-1123 | Mass % | 12.9 | 7.9 | 2.9 | 37.9 | 32.9 | 27.9 | 22.9 | 17.9 |
| R1234yf | Mass % | 40.0 | 40.0 | 40.0 | 45.0 | 45.0 | 45.0 | 45.0 | 45.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 98.8 | 99.2 | 99.6 | 97.4 | 97.7 | 98.0 | 98.3 | 98.7 |
| Refrigerating capacity ratio | % (relative to R410A) | 85.5 | 84.9 | 84.2 | 84.9 | 84.6 | 84.3 | 83.9 | 83.5 |

TABLE 62

| Item | Unit | Comp. Ex. 80 | Comp. Ex. 81 | Comp. Ex. 82 |
|---|---|---|---|---|
| HFO-1132(E) | Mass % | 35.0 | 40.0 | 45.0 |
| HFO-1123 | Mass % | 12.9 | 7.9 | 2.9 |
| R1234yf | Mass % | 45.0 | 45.0 | 45.0 |
| R32 | Mass % | 7.1 | 7.1 | 7.1 |
| GWP | — | 50 | 50 | 50 |
| COP ratio | % (relative to R410A) | 99.1 | 99.5 | 99.9 |
| Refrigerating capacity ratio | % (relative to R410A) | 82.9 | 82.3 | 81.7 |

TABLE 63

| Item | Unit | Ex. 89 | Ex. 90 | Ex. 91 | Ex. 92 | Ex. 93 | Ex. 94 | Ex. 95 | Ex. 96 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 70.5 | 65.5 | 60.5 | 55.5 | 50.5 | 45.5 | 40.5 | 35.5 |
| R1234yf | Mass % | 5.0 | 5.0 | 5.0 | 5.0 | 5.0 | 5.0 | 5.0 | 5.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 93.7 | 93.9 | 94.1 | 94.4 | 94.7 | 95.0 | 95.4 | 95.8 |
| Refrigerating capacity ratio | % (relative to R410A) | 110.2 | 110.0 | 109.7 | 109.3 | 108.9 | 108.4 | 107.9 | 107.3 |

TABLE 64

| Item | Unit | Ex. 97 | Comp. Ex. 83 | Ex. 98 | Ex. 99 | Ex. 100 | Ex. 101 | Ex. 102 | Ex. 103 |
|---|---|---|---|---|---|---|---|---|---|
| HFO-1132(E) | Mass % | 50.0 | 55.0 | 10.0 | 15.0 | 20.0 | 25.0 | 30.0 | 35.0 |
| HFO-1123 | Mass % | 30.5 | 25.5 | 65.5 | 60.5 | 55.5 | 50.5 | 45.5 | 40.5 |
| R1234yf | Mass % | 5.0 | 5.0 | 10.0 | 10.0 | 10.0 | 10.0 | 10.0 | 10.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 96.2 | 96.6 | 94.2 | 94.4 | 94.6 | 94.9 | 95.2 | 95.5 |
| Refrigerating capacity ratio | % (relative to R410A) | 106.6 | 106.0 | 107.5 | 107.3 | 107.0 | 106.6 | 106.1 | 105.6 |

TABLE 65

| Item | Unit | Ex. 104 | Ex. 105 | Ex. 106 | Comp. Ex. 84 | Ex. 107 | Ex. 108 | Ex. 109 | Ex. 110 |
|---|---|---|---|---|---|---|---|---|---|
| HFO-1132(E) | Mass % | 40.0 | 45.0 | 50.0 | 55.0 | 10.0 | 15.0 | 20.0 | 25.0 |
| HFO-1123 | Mass % | 35.5 | 30.5 | 25.5 | 20.5 | 60.5 | 55.5 | 50.5 | 45.5 |
| R1234yf | Mass % | 10.0 | 10.0 | 10.0 | 10.0 | 15.0 | 15.0 | 15.0 | 15.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 95.9 | 96.3 | 96.7 | 97.1 | 94.6 | 94.8 | 95.1 | 95.4 |
| Refrigerating capacity ratio | % (relative to R410A) | 105.1 | 104.5 | 103.8 | 103.1 | 104.7 | 104.5 | 104.1 | 103.7 |

TABLE 66

| Item | Unit | Ex. 111 | Ex. 112 | Ex. 113 | Ex. 114 | Ex. 115 | Comp. Ex. 85 | Ex. 116 | Ex. 117 |
|---|---|---|---|---|---|---|---|---|---|
| HFO-1132(E) | Mass % | 30.0 | 35.0 | 40.0 | 45.0 | 50.0 | 55.0 | 10.0 | 15.0 |
| HFO-1123 | Mass % | 40.5 | 35.5 | 30.5 | 25.5 | 20.5 | 15.5 | 55.5 | 50.5 |
| R1234yf | Mass % | 15.0 | 15.0 | 15.0 | 15.0 | 15.0 | 15.0 | 20.0 | 20.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 95.7 | 96.0 | 96.4 | 96.8 | 97.2 | 97.6 | 95.1 | 95.3 |
| Refrigerating capacity ratio | % (relative to R410A) | 103.3 | 102.8 | 102.2 | 101.6 | 101.0 | 100.3 | 101.8 | 101.6 |

TABLE 67

| Item | Unit | Ex. 118 | Ex. 119 | Ex. 120 | Ex. 121 | Ex. 122 | Ex. 123 | Ex. 124 | Comp. Ex. 86 |
|---|---|---|---|---|---|---|---|---|---|
| HFO-1132(E) | Mass % | 20.0 | 25.0 | 30.0 | 35.0 | 40.0 | 45.0 | 50.0 | 55.0 |
| HFO-1123 | Mass % | 45.5 | 40.5 | 35.5 | 30.5 | 25.5 | 20.5 | 15.5 | 10.5 |
| R1234yf | Mass % | 20.0 | 20.0 | 20.0 | 20.0 | 20.0 | 20.0 | 20.0 | 20.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 95.6 | 95.9 | 96.2 | 96.5 | 96.9 | 97.3 | 97.7 | 98.2 |
| Refrigerating capacity ratio | % (relative to R410A) | 101.2 | 100.8 | 100.4 | 99.9 | 99.3 | 98.7 | 98.0 | 97.3 |

TABLE 68

| Item | Unit | Ex. 125 | Ex. 126 | Ex. 127 | Ex. 128 | Ex. 129 | Ex. 130 | Ex. 131 | Ex. 132 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 50.5 | 45.5 | 40.5 | 35.5 | 30.5 | 25.5 | 20.5 | 15.5 |
| R1234yf | Mass % | 25.0 | 25.0 | 25.0 | 25.0 | 25.0 | 25.0 | 25.0 | 25.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 95.6 | 95.9 | 96.1 | 96.4 | 96.7 | 97.1 | 97.5 | 97.9 |
| Refrigerating capacity ratio | % (relative to R410A) | 98.9 | 98.6 | 98.3 | 97.9 | 97.4 | 96.9 | 96.3 | 95.7 |

TABLE 69

| Item | Unit | Ex. 133 | Comp. Ex. 87 | Ex. 134 | Ex. 135 | Ex. 136 | Ex. 137 | Ex. 138 | Ex. 139 |
|---|---|---|---|---|---|---|---|---|---|
| HFO-1132(E) | Mass % | 50.0 | 55.0 | 10.0 | 15.0 | 20.0 | 25.0 | 30.0 | 35.0 |
| HFO-1123 | Mass % | 10.5 | 5.5 | 45.5 | 40.5 | 35.5 | 30.5 | 25.5 | 20.5 |
| R1234yf | Mass % | 25.0 | 25.0 | 30.0 | 30.0 | 30.0 | 30.0 | 30.0 | 30.0 |
| R32 | Mass % | 14.5 | 14.5 | 14.5 | 14.5 | 14.5 | 14.5 | 14.5 | 14.5 |
| GWP | — | 99 | 99 | 100 | 100 | 100 | 100 | 100 | 100 |
| COP ratio | % (relative to R410A) | 98.3 | 98.7 | 96.2 | 96.4 | 96.7 | 97.0 | 97.3 | 97.7 |
| Refrigerating capacity ratio | % (relative to R410A) | 95.0 | 94.3 | 95.8 | 95.6 | 95.2 | 94.8 | 94.4 | 93.8 |

TABLE 70

| Item | Unit | Ex. 140 | Ex. 141 | Ex. 142 | Ex. 143 | Ex. 144 | Ex. 145 | Ex. 146 | Ex. 147 |
|---|---|---|---|---|---|---|---|---|---|
| HFO-1132(E) | Mass % | 40.0 | 45.0 | 50.0 | 10.0 | 15.0 | 20.0 | 25.0 | 30.0 |
| HFO-1123 | Mass % | 15.5 | 10.5 | 5.5 | 40.5 | 35.5 | 30.5 | 25.5 | 20.5 |
| R1234yf | Mass % | 30.0 | 30.0 | 30.0 | 35.0 | 35.0 | 35.0 | 35.0 | 35.0 |
| R32 | Mass % | 14.5 | 14.5 | 14.5 | 14.5 | 14.5 | 14.5 | 14.5 | 14.5 |
| GWP | — | 100 | 100 | 100 | 100 | 100 | 100 | 100 | 100 |
| COP ratio | % (relative to R410A) | 98.1 | 98.5 | 98.9 | 96.8 | 97.0 | 97.3 | 97.6 | 97.9 |
| Refrigerating capacity ratio | % (relative to R410A) | 93.3 | 92.6 | 92.0 | 92.8 | 92.5 | 92.2 | 91.8 | 91.3 |

TABLE 71

| Item | Unit | Ex. 148 | Ex. 149 | Ex. 150 | Ex. 151 | Ex. 152 | Ex. 153 | Ex. 154 | Ex. 155 |
|---|---|---|---|---|---|---|---|---|---|
| HFO-1132(E) | Mass % | 35.0 | 40.0 | 45.0 | 10.0 | 15.0 | 20.0 | 25.0 | 30.0 |
| HFO-1123 | Mass % | 15.5 | 10.5 | 5.5 | 35.5 | 30.5 | 25.5 | 20.5 | 15.5 |
| R1234yf | Mass % | 35.0 | 35.0 | 35.0 | 40.0 | 40.0 | 40.0 | 40.0 | 40.0 |
| R32 | Mass % | 14.5 | 14.5 | 14.5 | 14.5 | 14.5 | 14.5 | 14.5 | 14.5 |
| GWP | — | 100 | 100 | 100 | 100 | 100 | 100 | 100 | 100 |
| COP ratio | % (relative to R410A) | 98.3 | 98.7 | 99.1 | 97.4 | 97.7 | 98.0 | 98.3 | 98.6 |
| Refrigerating capacity ratio | % (relative to R410A) | 90.8 | 90.2 | 89.6 | 89.6 | 89.4 | 89.0 | 88.6 | 88.2 |

TABLE 72

| Item | Unit | Ex. 156 | Ex. 157 | Ex. 158 | Ex. 159 | Ex. 160 | Comp. Ex. 88 | Comp. Ex. 89 | Comp. Ex. 90 |
|---|---|---|---|---|---|---|---|---|---|
| HFO-1132(E) | Mass % | 35.0 | 40.0 | 10.0 | 15.0 | 20.0 | 25.0 | 30.0 | 35.0 |
| HFO-1123 | Mass % | 10.5 | 5.5 | 30.5 | 25.5 | 20.5 | 15.5 | 10.5 | 5.5 |
| R1234yf | Mass % | 40.0 | 40.0 | 45.0 | 45.0 | 45.0 | 45.0 | 45.0 | 45.0 |
| R32 | Mass % | 14.5 | 14.5 | 14.5 | 14.5 | 14.5 | 14.5 | 14.5 | 14.5 |
| GWP | — | 100 | 100 | 100 | 100 | 100 | 100 | 100 | 100 |
| COP ratio | % (relative to R410A) | 98.9 | 99.3 | 98.1 | 98.4 | 98.7 | 98.9 | 99.3 | 99.6 |
| Refrigerating capacity ratio | % (relative to R410A) | 87.6 | 87.1 | 86.5 | 86.2 | 85.9 | 85.5 | 85.0 | 84.5 |

TABLE 73

| Item | Unit | Comp. Ex. 91 | Comp. Ex. 92 | Comp. Ex. 93 | Comp. Ex. 94 | Comp. Ex. 95 |
|---|---|---|---|---|---|---|
| HFO-1132(E) | Mass % | 10.0 | 15.0 | 20.0 | 25.0 | 30.0 |
| HFO-1123 | Mass % | 25.5 | 20.5 | 15.5 | 10.5 | 5.5 |
| R1234yf | Mass % | 50.0 | 50.0 | 50.0 | 50.0 | 50.0 |

TABLE 73-continued

| Item | Unit | Comp. Ex. 91 | Comp. Ex. 92 | Comp. Ex. 93 | Comp. Ex. 94 | Comp. Ex. 95 |
|---|---|---|---|---|---|---|
| R32 | Mass % | 14.5 | 14.5 | 14.5 | 14.5 | 14.5 |
| GWP | — | 100 | 100 | 100 | 100 | 100 |
| COP ratio | % (relative to R410A) | 98.9 | 99.1 | 99.4 | 99.7 | 100.0 |
| Refrigerating capacity ratio | % (relative to R410A) | 83.3 | 83.0 | 82.7 | 82.2 | 81.8 |

TABLE 74

| Item | Unit | Ex. 161 | Ex. 162 | Ex. 163 | Ex. 164 | Ex. 165 | Ex. 166 | Ex. 167 | Ex. 168 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 63.1 | 58.1 | 53.1 | 48.1 | 43.1 | 38.1 | 33.1 | 28.1 |
| R1234yf | Mass % | 5.0 | 5.0 | 5.0 | 5.0 | 5.0 | 5.0 | 5.0 | 5.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 94.8 | 95.0 | 95.2 | 95.4 | 95.7 | 95.9 | 96.2 | 96.6 |
| Refrigerating capacity ratio | % (relative to R410A) | 111.5 | 111.2 | 110.9 | 110.5 | 110.0 | 109.5 | 108.9 | 108.3 |

TABLE 75

| Item | Unit | Comp. Ex. 96 | Ex. 169 | Ex. 170 | Ex. 171 | Ex. 172 | Ex. 173 | Ex. 174 | Ex. 175 |
|---|---|---|---|---|---|---|---|---|---|
| HFO-1132(E) | Mass % | 50.0 | 10.0 | 15.0 | 20.0 | 25.0 | 30.0 | 35.0 | 40.0 |
| HFO-1123 | Mass % | 23.1 | 58.1 | 53.1 | 48.1 | 43.1 | 38.1 | 33.1 | 28.1 |
| R1234yf | Mass % | 5.0 | 10.0 | 10.0 | 10.0 | 10.0 | 10.0 | 10.0 | 10.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 96.9 | 95.3 | 95.4 | 95.6 | 95.8 | 96.1 | 96.4 | 96.7 |
| Refrigerating capacity ratio | % (relative to R410A) | 107.7 | 108.7 | 108.5 | 108.1 | 107.7 | 107.2 | 106.7 | 106.1 |

TABLE 76

| Item | Unit | Ex. 176 | Comp. Ex. 97 | Ex. 177 | Ex. 178 | Ex. 179 | Ex. 180 | Ex. 181 | Ex. 182 |
|---|---|---|---|---|---|---|---|---|---|
| HFO-1132(E) | Mass % | 45.0 | 50.0 | 10.0 | 15.0 | 20.0 | 25.0 | 30.0 | 35.0 |
| HFO-1123 | Mass % | 23.1 | 18.1 | 53.1 | 48.1 | 43.1 | 38.1 | 33.1 | 28.1 |
| R1234yf | Mass % | 10.0 | 10.0 | 15.0 | 15.0 | 15.0 | 15.0 | 15.0 | 15.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 97.0 | 97.4 | 95.7 | 95.9 | 96.1 | 96.3 | 96.6 | 96.9 |
| Refrigerating capacity ratio | % (relative to R410A) | 105.5 | 104.9 | 105.9 | 105.6 | 105.3 | 104.8 | 104.4 | 103.8 |

TABLE 77

| Item | Unit | Ex. 183 | Ex. 184 | Comp. Ex. 98 | Ex. 185 | Ex. 186 | Ex. 187 | Ex. 188 | Ex. 189 |
|---|---|---|---|---|---|---|---|---|---|
| HFO-1132(E) | Mass % | 40.0 | 45.0 | 50.0 | 10.0 | 15.0 | 20.0 | 25.0 | 30.0 |
| HFO-1123 | Mass % | 23.1 | 18.1 | 13.1 | 48.1 | 43.1 | 38.1 | 33.1 | 28.1 |
| R1234yf | Mass % | 15.0 | 15.0 | 15.0 | 20.0 | 20.0 | 20.0 | 20.0 | 20.0 |
| R32 | Mass % | 21.9 | 21.9 | 21.9 | 21.9 | 21.9 | 21.9 | 21.9 | 21.9 |

TABLE 77-continued

| Item | Unit | Ex. 183 | Ex. 184 | Comp. Ex. 98 | Ex. 185 | Ex. 186 | Ex. 187 | Ex. 188 | Ex. 189 |
|---|---|---|---|---|---|---|---|---|---|
| GWP | — | 149 | 149 | 149 | 149 | 149 | 149 | 149 | 149 |
| COP ratio | % (relative to R410A) | 97.2 | 97.5 | 97.9 | 96.1 | 96.3 | 96.5 | 96.8 | 97.1 |
| Refrigerating capacity ratio | % (relative to R410A) | 103.3 | 102.6 | 102.0 | 103.0 | 102.7 | 102.3 | 101.9 | 101.4 |

TABLE 78

| Item | Unit | Ex. 190 | Ex. 191 | Ex. 192 | Comp. Ex. 99 | Ex. 193 | Ex. 194 | Ex. 195 | Ex. 196 |
|---|---|---|---|---|---|---|---|---|---|
| HFO-1132(E) | Mass % | 35.0 | 40.0 | 45.0 | 50.0 | 10.0 | 15.0 | 20.0 | 25.0 |
| HFO-1123 | Mass % | 23.1 | 18.1 | 13.1 | 8.1 | 43.1 | 38.1 | 33.1 | 28.1 |
| R1234yf | Mass % | 20.0 | 20.0 | 20.0 | 20.0 | 25.0 | 25.0 | 25.0 | 25.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 97.4 | 97.7 | 98.0 | 98.4 | 96.6 | 96.8 | 97.0 | 97.3 |
| Refrigerating capacity ratio | % (relative to R410A) | 100.9 | 100.3 | 99.7 | 99.1 | 100.0 | 99.7 | 99.4 | 98.9 |

TABLE 79

| Item | Unit | Ex. 197 | Ex. 198 | Ex. 199 | Ex. 200 | Comp. Ex. 100 | Ex. 201 | Ex. 202 | Ex. 203 |
|---|---|---|---|---|---|---|---|---|---|
| HFO-1132(E) | Mass % | 30.0 | 35.0 | 40.0 | 45.0 | 50.0 | 10.0 | 15.0 | 20.0 |
| HFO-1123 | Mass % | 23.1 | 18.1 | 13.1 | 8.1 | 3.1 | 38.1 | 33.1 | 28.1 |
| R1234yf | Mass % | 25.0 | 25.0 | 25.0 | 25.0 | 25.0 | 30.0 | 30.0 | 30.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 150 | 150 | 150 |
| COP ratio | % (relative to R410A) | 97.6 | 97.9 | 98.2 | 98.5 | 98.9 | 97.1 | 97.3 | 97.6 |
| Refrigerating capacity ratio | % (relative to R410A) | 98.5 | 97.9 | 97.4 | 96.8 | 96.1 | 97.0 | 96.7 | 96.3 |

TABLE 80

| Item | Unit | Ex. 204 | Ex. 205 | Ex. 206 | Ex. 207 | Ex. 208 | Ex. 209 | Ex. 210 | Ex. 211 |
|---|---|---|---|---|---|---|---|---|---|
| HFO-1132(E) | Mass % | 25.0 | 30.0 | 35.0 | 40.0 | 45.0 | 10.0 | 15.0 | 20.0 |
| HFO-1123 | Mass % | 23.1 | 18.1 | 13.1 | 8.1 | 3.1 | 33.1 | 28.1 | 23.1 |
| R1234yf | Mass % | 30.0 | 30.0 | 30.0 | 30.0 | 30.0 | 35.0 | 35.0 | 35.0 |
| R32 | Mass % | 21.9 | 21.9 | 21.9 | 21.9 | 21.9 | 21.9 | 21.9 | 21.9 |
| GWP | — | 150 | 150 | 150 | 150 | 150 | 150 | 150 | 150 |
| COP ratio | % (relative to R410A) | 97.8 | 98.1 | 98.4 | 98.7 | 99.1 | 97.7 | 97.9 | 98.1 |
| Refrigerating capacity ratio | % (relative to R410A) | 95.9 | 95.4 | 94.9 | 94.4 | 93.8 | 93.9 | 93.6 | 93.3 |

TABLE 81

| Item | Unit | Ex. 212 | Ex. 213 | Ex. 214 | Ex. 215 | Ex. 216 | Ex. 217 | Ex. 218 | Ex. 219 |
|---|---|---|---|---|---|---|---|---|---|
| HFO-1132(E) | Mass % | 25.0 | 30.0 | 35.0 | 40.0 | 10.0 | 15.0 | 20.0 | 25.0 |
| HFO-1123 | Mass % | 18.1 | 13.1 | 8.1 | 3.1 | 28.1 | 23.1 | 18.1 | 13.1 |

TABLE 81-continued

| Item | Unit | Ex. 212 | Ex. 213 | Ex. 214 | Ex. 215 | Ex. 216 | Ex. 217 | Ex. 218 | Ex. 219 |
|---|---|---|---|---|---|---|---|---|---|
| R1234yf | Mass % | 35.0 | 35.0 | 35.0 | 35.0 | 40.0 | 40.0 | 40.0 | 40.0 |
| R32 | Mass % | 21.9 | 21.9 | 21.9 | 21.9 | 21.9 | 21.9 | 21.9 | 21.9 |
| GWP | — | 150 | 150 | 150 | 150 | 150 | 150 | 150 | 150 |
| COP ratio | % (relative to R410A) | 98.4 | 98.7 | 99.0 | 99.3 | 98.3 | 98.5 | 98.7 | 99.0 |
| Refrigerating capacity ratio | % (relative to R410A) | 92.9 | 92.4 | 91.9 | 91.3 | 90.8 | 90.5 | 90.2 | 89.7 |

TABLE 82

| Item | Unit | Ex. 220 | Ex. 221 | Ex. 222 | Ex. 223 | Ex. 224 | Ex. 225 | Ex. 226 | Comp. Ex. 101 |
|---|---|---|---|---|---|---|---|---|---|
| HFO-1132(E) | Mass % | 30.0 | 35.0 | 10.0 | 15.0 | 20.0 | 25.0 | 30.0 | 10.0 |
| HFO-1123 | Mass % | 8.1 | 3.1 | 23.1 | 18.1 | 13.1 | 8.1 | 3.1 | 18.1 |
| R1234yf | Mass % | 40.0 | 40.0 | 45.0 | 45.0 | 45.0 | 45.0 | 45.0 | 50.0 |
| R32 | Mass % | 21.9 | 21.9 | 21.9 | 21.9 | 21.9 | 21.9 | 21.9 | 21.9 |
| GWP | — | 150 | 150 | 150 | 150 | 150 | 150 | 150 | 150 |
| COP ratio | % (relative to R410A) | 99.3 | 99.6 | 98.9 | 99.1 | 99.3 | 99.6 | 99.9 | 99.6 |
| Refrigerating capacity ratio | % (relative to R410A) | 89.3 | 88.8 | 87.6 | 87.3 | 87.0 | 86.6 | 86.2 | 84.4 |

TABLE 84

| Item | Unit | Ex. 227 | Ex. 228 | Ex. 229 | Ex. 230 | Ex. 231 | Ex. 232 | Ex. 233 | Comp. Ex. 105 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 55.7 | 50.7 | 45.7 | 40.7 | 35.7 | 30.7 | 25.7 | 20.7 |
| R1234yf | Mass % | 5.0 | 5.0 | 5.0 | 5.0 | 5.0 | 5.0 | 5.0 | 5.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 95.9 | 96.0 | 96.2 | 96.3 | 96.6 | 96.8 | 97.1 | 97.3 |
| Refrigerating capacity ratio | % (relative to R410A) | 112.2 | 111.9 | 111.6 | 111.2 | 110.7 | 110.2 | 109.6 | 109.0 |

TABLE 83

| Item | Unit | Comp. Ex. 102 | Comp. Ex. 103 | Comp. Ex. 104 |
|---|---|---|---|---|
| HFO-1132(E) | Mass % | 15.0 | 20.0 | 25.0 |
| HFO-1123 | Mass % | 13.1 | 8.1 | 3.1 |
| R1234yf | Mass % | 50.0 | 50.0 | 50.0 |
| R32 | Mass % | 21.9 | 21.9 | 21.9 |
| GWP | — | 150 | 150 | 150 |
| COP ratio | % (relative to R410A) | 99.8 | 100.0 | 100.2 |
| Refrigerating capacity ratio | % (relative to R410A) | 84.1 | 83.8 | 83.4 |

TABLE 85

| Item | Unit | Ex. 234 | Ex. 235 | Ex. 236 | Ex. 237 | Ex. 238 | Ex. 239 | Ex. 240 | Comp. Ex. 106 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 50.7 | 45.7 | 40.7 | 35.7 | 30.7 | 25.7 | 20.7 | 15.7 |
| R1234yf | Mass % | 10.0 | 10.0 | 10.0 | 10.0 | 10.0 | 10.0 | 10.0 | 10.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 96.3 | 96.4 | 96.6 | 96.8 | 97.0 | 97.2 | 97.5 | 97.8 |
| Refrigerating capacity ratio | % (relative to R410A) | 109.4 | 109.2 | 108.8 | 108.4 | 107.9 | 107.4 | 106.8 | 106.2 |

TABLE 86

| Item | Unit | Ex. 241 | Ex. 242 | Ex. 243 | Ex. 244 | Ex. 245 | Ex. 246 | Ex. 247 | Comp. Ex. 107 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 45.7 | 40.7 | 35.7 | 30.7 | 25.7 | 20.7 | 15.7 | 10.7 |
| R1234yf | Mass % | 15.0 | 15.0 | 15.0 | 15.0 | 15.0 | 15.0 | 15.0 | 15.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 96.7 | 96.8 | 97.0 | 97.2 | 97.4 | 97.7 | 97.9 | 98.2 |
| Refrigerating capacity ratio | % (relative to R410A) | 106.6 | 106.3 | 106.0 | 105.5 | 105.1 | 104.5 | 104.0 | 103.4 |

TABLE 87

| Item | Unit | Ex. 248 | Ex. 249 | Ex. 250 | Ex. 251 | Ex. 252 | Ex. 253 | Ex. 254 | Comp. Ex. 108 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 40.7 | 35.7 | 30.7 | 25.7 | 20.7 | 15.7 | 10.7 | 5.7 |
| R1234yf | Mass % | 20.0 | 20.0 | 20.0 | 20.0 | 20.0 | 20.0 | 20.0 | 20.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 97.1 | 97.3 | 97.5 | 97.7 | 97.9 | 98.1 | 98.4 | 98.7 |
| Refrigerating capacity ratio | % (relative to R410A) | 103.7 | 103.4 | 103.0 | 102.6 | 102.2 | 101.6 | 101.1 | 100.5 |

TABLE 88

| Item | Unit | Ex. 255 | Ex. 256 | Ex. 257 | Ex. 258 | Ex. 259 | Ex. 260 | Ex. 261 | Ex. 262 |
|---|---|---|---|---|---|---|---|---|---|
| HFO-1132(E) | Mass % | 10.0 | 15.0 | 20.0 | 25.0 | 30.0 | 35.0 | 40.0 | 10.0 |
| HFO-1123 | Mass % | 35.7 | 30.7 | 25.7 | 20.7 | 15.7 | 10.7 | 5.7 | 30.7 |
| R1234yf | Mass % | 25.0 | 25.0 | 25.0 | 25.0 | 25.0 | 25.0 | 25.0 | 30.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 97.6 | 97.7 | 97.9 | 98.1 | 98.4 | 98.6 | 98.9 | 98.1 |
| Refrigerating capacity ratio | % (relative to R410A) | 100.7 | 100.4 | 100.1 | 99.7 | 99.2 | 98.7 | 98.2 | 97.7 |

TABLE 89

| Item | Unit | Ex. 263 | Ex. 264 | Ex. 265 | Ex. 266 | Ex. 267 | Ex. 268 | Ex. 269 | Ex. 270 |
|---|---|---|---|---|---|---|---|---|---|
| HFO-1132(E) | Mass % | 15.0 | 20.0 | 25.0 | 30.0 | 35.0 | 10.0 | 15.0 | 20.0 |
| HFO-1123 | Mass % | 25.7 | 20.7 | 15.7 | 10.7 | 5.7 | 25.7 | 20.7 | 15.7 |
| R1234yf | Mass % | 30.0 | 30.0 | 30.0 | 30.0 | 30.0 | 35.0 | 35.0 | 35.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 200 | 200 | 200 |
| COP ratio | % (relative to R410A) | 98.2 | 98.4 | 98.6 | 98.9 | 99.1 | 98.6 | 98.7 | 98.9 |
| Refrigerating capacity ratio | % (relative to R410A) | 97.4 | 97.1 | 96.7 | 96.2 | 95.7 | 94.7 | 94.4 | 94.0 |

TABLE 90

| Item | Unit | Ex. 271 | Ex. 272 | Ex. 273 | Ex. 274 | Ex. 275 | Ex. 276 | Ex. 277 | Ex. 278 |
|---|---|---|---|---|---|---|---|---|---|
| HFO-1132(E) | Mass % | 25.0 | 30.0 | 10.0 | 15.0 | 20.0 | 25.0 | 10.0 | 15.0 |
| HFO-1123 | Mass % | 10.7 | 5.7 | 20.7 | 15.7 | 10.7 | 5.7 | 15.7 | 10.7 |
| R1234yf | Mass % | 35.0 | 35.0 | 40.0 | 40.0 | 40.0 | 40.0 | 45.0 | 45.0 |
| R32 | Mass % | 29.3 | 29.3 | 29.3 | 29.3 | 29.3 | 29.3 | 29.3 | 29.3 |
| GWP | — | 200 | 200 | 200 | 200 | 200 | 200 | 200 | 200 |
| COP ratio | % (relative to R410A) | 99.2 | 99.4 | 99.1 | 99.3 | 99.5 | 99.7 | 99.7 | 99.8 |
| Refrigerating capacity ratio | % (relative to R410A) | 93.6 | 93.2 | 91.5 | 91.3 | 90.9 | 90.6 | 88.4 | 88.1 |

TABLE 91

| Item | Unit | Ex. 279 | Ex. 280 | Comp. Ex. 109 | Comp. Ex. 110 |
|---|---|---|---|---|---|
| HFO-1132(E) | Mass % | 20.0 | 10.0 | 15.0 | 10.0 |
| HFO-1123 | Mass % | 5.7 | 10.7 | 5.7 | 5.7 |
| R1234yf | Mass % | 45.0 | 50.0 | 50.0 | 55.0 |
| R32 | Mass % | 29.3 | 29.3 | 29.3 | 29.3 |
| GWP | — | 200 | 200 | 200 | 200 |
| COP ratio | % (relative to R410A) | 100.0 | 100.3 | 100.4 | 100.9 |
| Refrigerating capacity ratio | % (relative to R410A) | 87.8 | 85.2 | 85.0 | 82.0 |

TABLE 92

| Item | Unit | Ex. 281 | Ex. 282 | Ex. 283 | Ex. 284 | Ex. 285 | Comp. Ex. 111 | Ex. 286 | Ex. 287 |
|---|---|---|---|---|---|---|---|---|---|
| HFO-1132(E) | Mass % | 10.0 | 15.0 | 20.0 | 25.0 | 30.0 | 35.0 | 10.0 | 15.0 |
| HFO-1123 | Mass % | 40.9 | 35.9 | 30.9 | 25.9 | 20.9 | 15.9 | 35.9 | 30.9 |
| R1234yf | Mass % | 5.0 | 5.0 | 5.0 | 5.0 | 5.0 | 5.0 | 10.0 | 10.0 |
| R32 | Mass % | 44.1 | 44.1 | 44.1 | 44.1 | 44.1 | 44.1 | 44.1 | 44.1 |
| GWP | — | 298 | 298 | 298 | 298 | 298 | 298 | 299 | 299 |
| COP ratio | % (relative to R410A) | 97.8 | 97.9 | 97.9 | 98.1 | 98.2 | 98.4 | 98.2 | 98.2 |
| Refrigerating capacity ratio | % (relative to R410A) | 112.5 | 112.3 | 111.9 | 111.6 | 111.2 | 110.7 | 109.8 | 109.5 |

TABLE 93

| Item | Unit | Ex. 288 | Ex. 289 | Ex. 290 | Comp. Ex. 112 | Ex. 291 | Ex. 292 | Ex. 293 | Ex. 294 |
|---|---|---|---|---|---|---|---|---|---|
| HFO-1132(E) | Mass % | 20.0 | 25.0 | 30.0 | 35.0 | 10.0 | 15.0 | 20.0 | 25.0 |
| HFO-1123 | Mass % | 25.9 | 20.9 | 15.9 | 10.9 | 30.9 | 25.9 | 20.9 | 15.9 |
| R1234yf | Mass % | 10.0 | 10.0 | 10.0 | 10.0 | 15.0 | 15.0 | 15.0 | 15.0 |
| R32 | Mass % | 44.1 | 44.1 | 44.1 | 44.1 | 44.1 | 44.1 | 44.1 | 44.1 |
| GWP | — | 299 | 299 | 299 | 299 | 299 | 299 | 299 | 299 |
| COP ratio | % (relative to R410A) | 98.3 | 98.5 | 98.6 | 98.8 | 98.6 | 98.6 | 98.7 | 98.9 |
| Refrigerating capacity ratio | % (relative to R410A) | 109.2 | 108.8 | 108.4 | 108.0 | 107.0 | 106.7 | 106.4 | 106.0 |

TABLE 94

| Item | Unit | Ex. 295 | Comp. Ex. 113 | Ex. 296 | Ex. 297 | Ex. 298 | Ex. 299 | Ex. 300 | Ex. 301 |
|---|---|---|---|---|---|---|---|---|---|
| HFO-1132(E) | Mass % | 30.0 | 35.0 | 10.0 | 15.0 | 20.0 | 25.0 | 30.0 | 10.0 |

TABLE 94-continued

| Item | Unit | Ex. 295 | Comp. Ex. 113 | Ex. 296 | Ex. 297 | Ex. 298 | Ex. 299 | Ex. 300 | Ex. 301 |
|---|---|---|---|---|---|---|---|---|---|
| HFO-1123 | Mass % | 10.9 | 5.9 | 25.9 | 20.9 | 15.9 | 10.9 | 5.9 | 20.9 |
| R1234yf | Mass % | 15.0 | 15.0 | 20.0 | 20.0 | 20.0 | 20.0 | 20.0 | 25.0 |
| R32 | Mass % | 44.1 | 44.1 | 44.1 | 44.1 | 44.1 | 44.1 | 44.1 | 44.1 |
| GWP | — | 299 | 299 | 299 | 299 | 299 | 299 | 299 | 299 |
| COP ratio | % (relative to R410A) | 99.0 | 99.2 | 99.0 | 99.0 | 99.2 | 99.3 | 99.4 | 99.4 |
| Refrigerating capacity ratio | % (relative to R410A) | 105.6 | 105.2 | 104.1 | 103.9 | 103.6 | 103.2 | 102.8 | 101.2 |

TABLE 95

| Item | Unit | Ex. 302 | Ex. 303 | Ex. 304 | Ex. 305 | Ex. 306 | Ex. 307 | Ex. 308 | Ex. 309 |
|---|---|---|---|---|---|---|---|---|---|
| HFO-1132(E) | Mass % | 15.0 | 20.0 | 25.0 | 10.0 | 15.0 | 20.0 | 10.0 | 15.0 |
| HFO-1123 | Mass % | 15.9 | 10.9 | 5.9 | 15.9 | 10.9 | 5.9 | 10.9 | 5.9 |
| R1234yf | Mass % | 25.0 | 25.0 | 25.0 | 30.0 | 30.0 | 30.0 | 35.0 | 35.0 |
| R32 | Mass % | 44.1 | 44.1 | 44.1 | 44.1 | 44.1 | 44.1 | 44.1 | 44.1 |
| GWP | — | 299 | 299 | 299 | 299 | 299 | 299 | 299 | 299 |
| COP ratio | % (relative to R410A) | 99.5 | 99.6 | 99.7 | 99.8 | 99.9 | 100.0 | 100.3 | 100.4 |
| Refrigerating capacity ratio | % (relative to R410A) | 101.0 | 100.7 | 100.3 | 98.3 | 98.0 | 97.8 | 95.3 | 95.1 |

TABLE 96

| Item | Unit | Ex. 400 |
|---|---|---|
| HFO-1132(E) | Mass % | 10.0 |
| HFO-1123 | Mass % | 5.9 |
| R1234yf | Mass % | 40.0 |
| R32 | Mass % | 44.1 |
| GWP | — | 299 |
| COP ratio | % (relative to R410A) | 100.7 |
| Refrigerating capacity ratio | % (relative to R410A) | 92.3 |

The above results indicate that the refrigerating capacity ratio relative to R410A is 85% or more in the following cases:

When the mass % of THFO-1132(E), HFO-1123, R1234yf, and R32 based on their sum is respectively represented by x, y, z, and a, in a ternary composition diagram in which the sum of THFO-1132(E), HFO-1123, and R1234yf is (100-a) mass %, a straight line connecting a point (0.0, 100.0-a, 0.0) and a point (0.0, 0.0, 100.0-a) is the base, and the point (0.0, 100.0-a, 0.0) is on the left side, if $0 < a \le 11.1$, coordinates (x,y,z) in the ternary composition diagram are on, or on the left side of, a straight line AB that connects point A $(0.0134a^2-1.9681a+68.6, 0.0, -0.0134a^2+0.9681a+31.4)$ and point B $(0.0, 0.0144a^2-1.6377a+58.7, -0.0144a^2+0.6377a+41.3)$;

if $11.1 < a \le 18.2$, coordinates (x,y,z) in the ternary composition diagram are on, or on the left side of, a straight line AB that connects point A $(0.0112a^2-1.9337a+68.484, 0.0, -0.0112a^2+0.9337a+31.516)$ and point B $(0.0, 0.0075a^2-1.5156a+58.199, -0.0075a^2+0.5156a+41.801)$;

if $18.2 < a \le 26.7$, coordinates (x,y,z) in the ternary composition diagram are on, or on the left side of, a straight line AB that connects point A $(0.0107a^2-1.9142a+68.305, 0.0, -0.0107a^2+0.9142a+31.695)$ and point B $(0.0, 0.009a^2-1.6045a+59.318, -0.009a^2+0.6045a+40.682)$;

if $26.7 < a \le 36.7$, coordinates (x,y,z) in the ternary composition diagram are on, or on the left side of, a straight line AB that connects point A $(0.0103a^2-1.9225a+68.793, 0.0, -0.0103a^2+0.9225a+31.207)$ and point B $(0.0, 0.0046a^2-1.41a+57.286, -0.0046a^2+0.41a+42.714)$; and if $36.7 < a \le 46.7$, coordinates (x,y,z) in the ternary composition diagram are on, or on the left side of, a straight line AB that connects point A $(0.0085a^2-1.8102a+67.1, 0.0, -0.0085a^2+0.8102a+32.9)$ and point B $(0.0, 0.0012a^2-1.1659a+52.95, -0.0012a^2+0.1659a+47.05)$.

Figure 3:
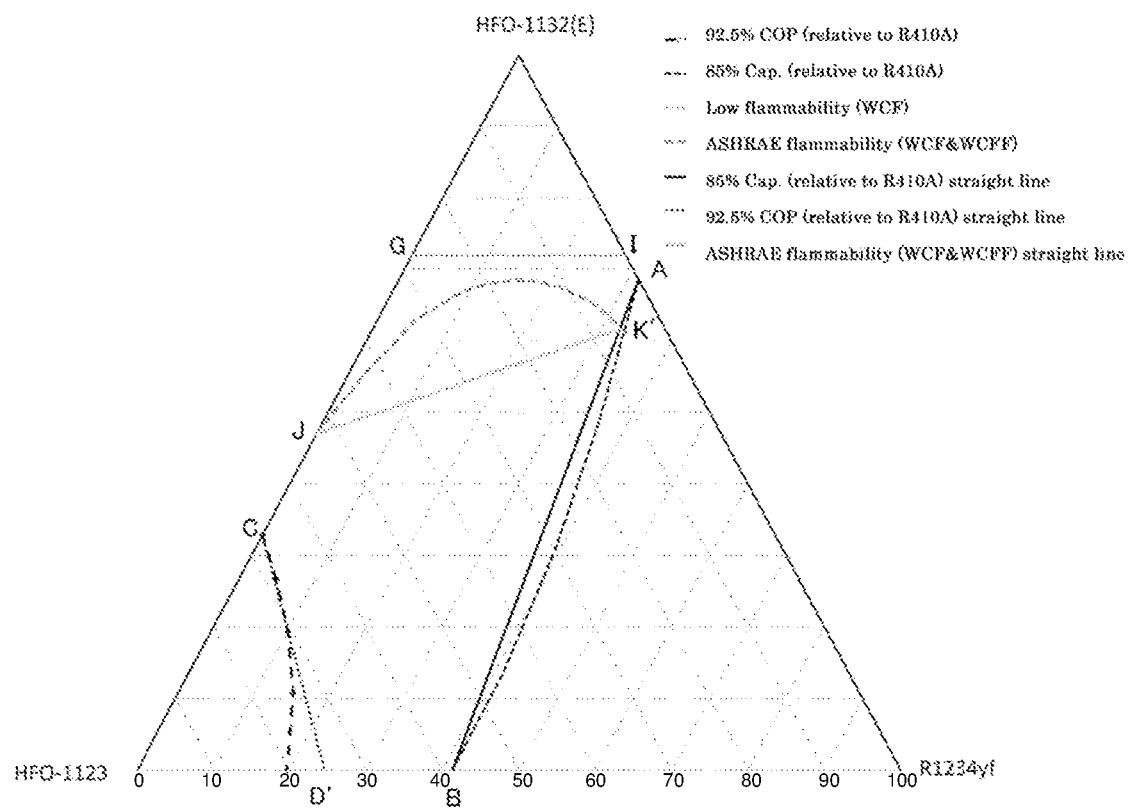
FIG. 3 is a diagram showing points A to C, D', G, I, J, and K', and line segments that connect these points to each other in a ternary composition diagram in which the sum of HFO-1132(E), HFO-1123, and R1234yf is (100–a) mass %.

Actual points having a refrigerating capacity ratio of 85% or more form a curved line that connects point A and point B in FIG. 3, and that extends toward the 1234yf side. Accordingly, when coordinates are on, or on the left side of, the straight line AB, the refrigerating capacity ratio relative to R410A is 85% or more.

Similarly, it was also found that in the ternary composition diagram, if $0 < a \le 11.1$, when coordinates (x,y,z) are on, or on the left side of, a straight line D'C that connects point D' $(0.0, 0.0224a^2+0.968a+75.4, -0.0224a^2-1.968a+24.6)$ and point C $(-0.2304a^2-0.4062a+32.9, 0.2304a^2-0.5938a+67.1, 0.0)$; or if $11.1 < a \le 46.7$, when coordinates are in the entire region, the COP ratio relative to that of R410A is 92.5% or more.

Figure 4:
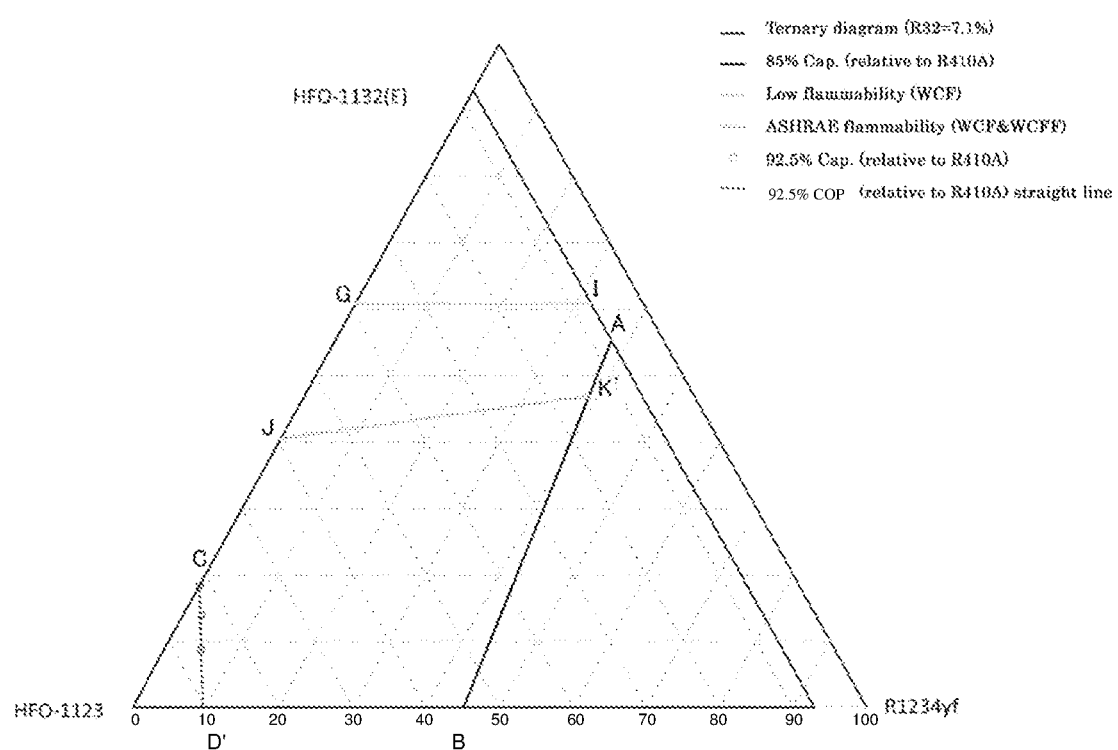
FIG. 4 is a diagram showing points A to C, D', G, I, J, and K', and line segments that connect these points to each other in a ternary composition diagram in which the sum of HFO-1132(E), HFO-1123, and R1234yf is 92.9 mass % (the content of R32 is 7.1 mass %).
Figure 5:
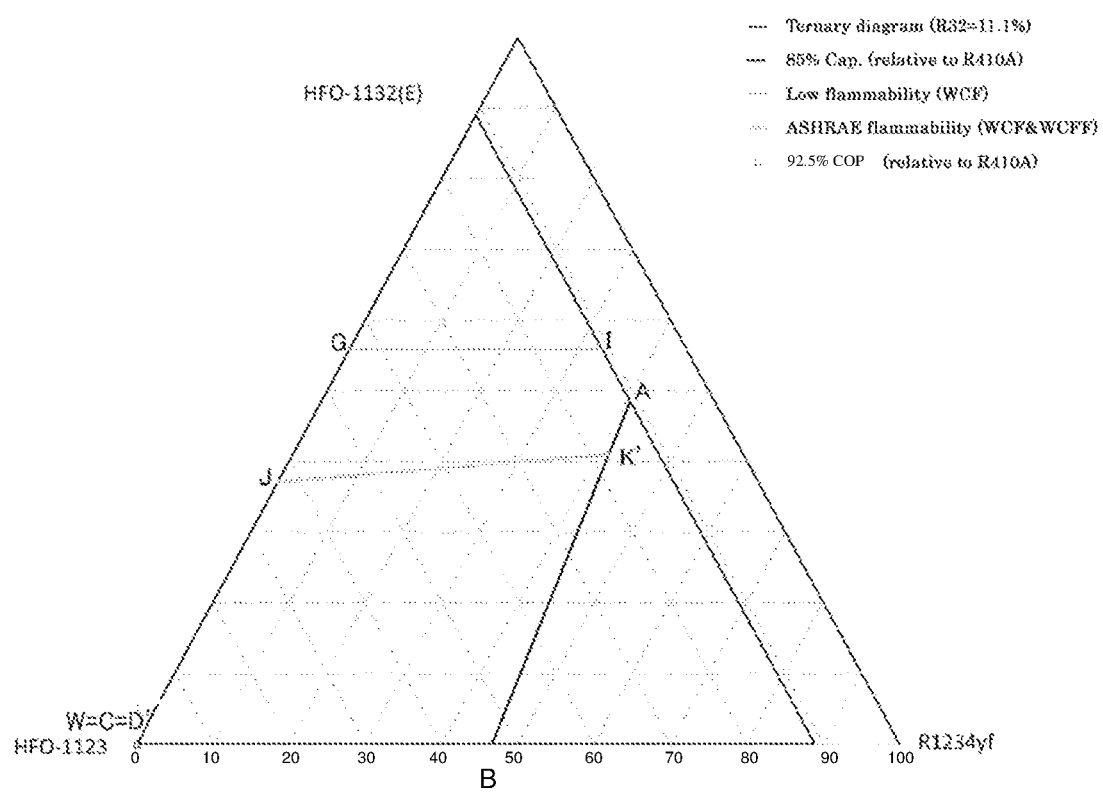
FIG. 5 is a diagram showing points A to C, D', G, I, J, K', and W, and line segments that connect these points to each other in a ternary composition diagram in which the sum of HFO-1132(E), HFO-1123, and R1234yf is 88.9 mass % (the content of R32 is 11.1 mass %).
Figure 6:
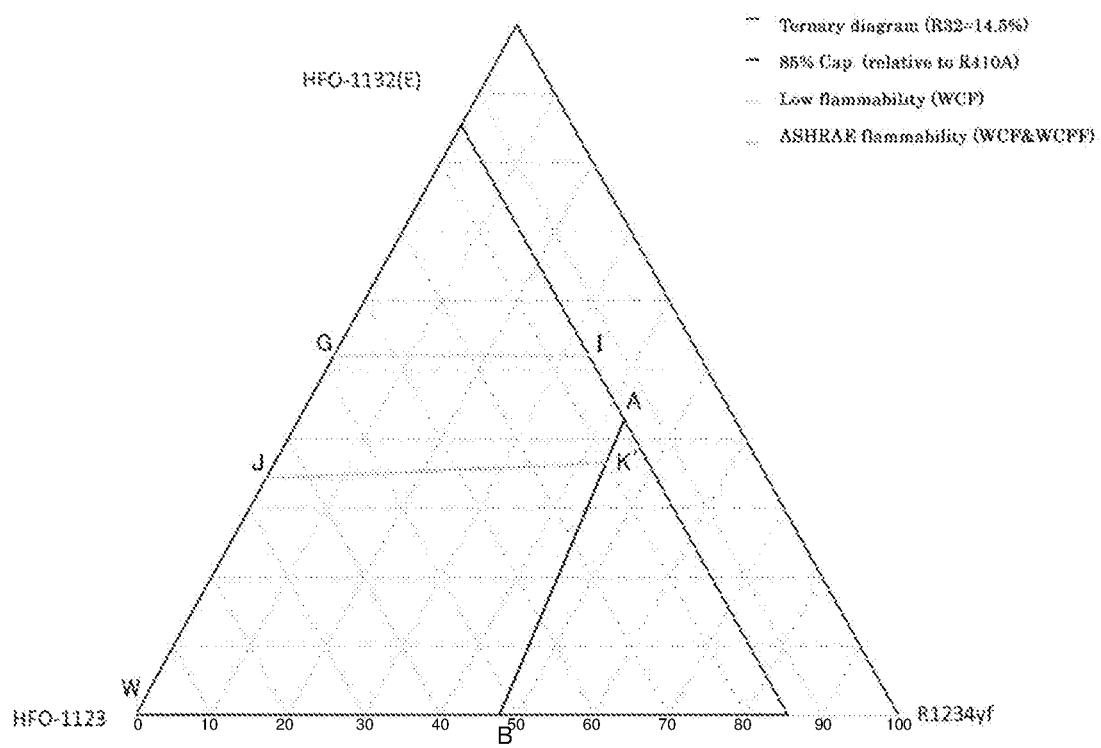
FIG. 6 is a diagram showing points A, B, G, I, J, K', and W, and line segments that connect these points to each other in a ternary composition diagram in which the sum of HFO-1132(E), HFO-1123, and R1234yf is 85.5 mass % (the content of R32 is 14.5 mass %).
Figure 7:
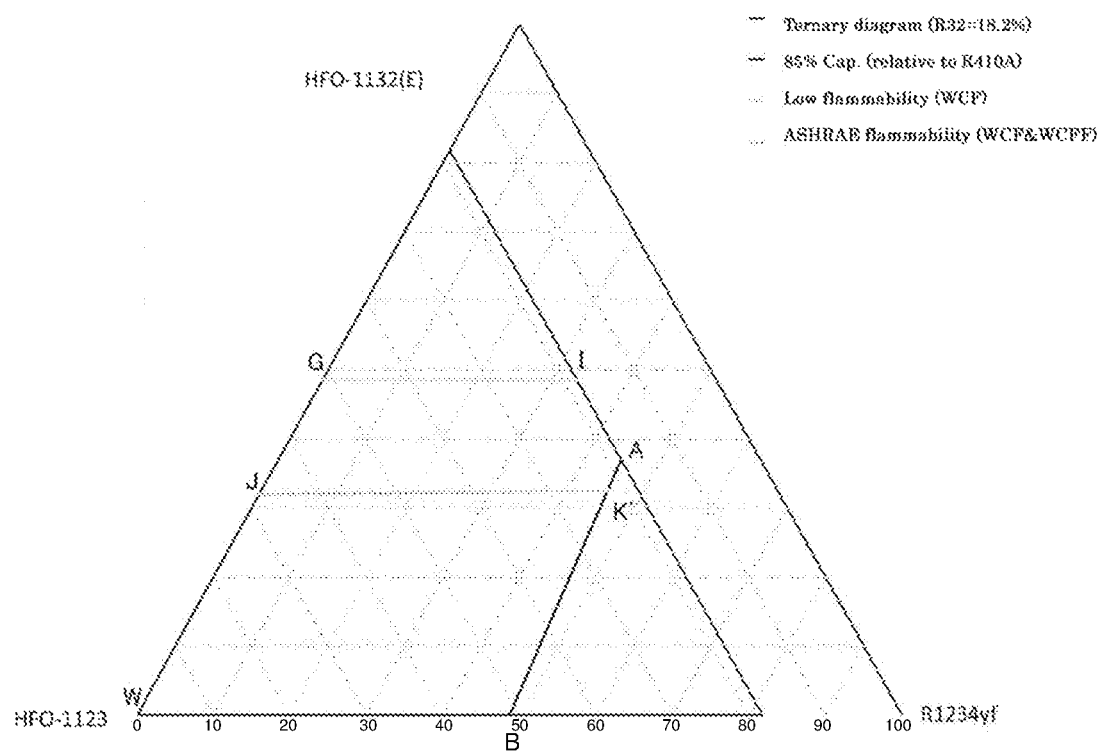
FIG. 7 is a diagram showing points A, B, G, I, J, K', and W, and line segments that connect these points to each other in a ternary composition diagram in which the sum of HFO-1132(E), HFO-1123, and R1234yf is 81.8 mass % (the content of R32 is 18.2 mass %).
Figure 8:
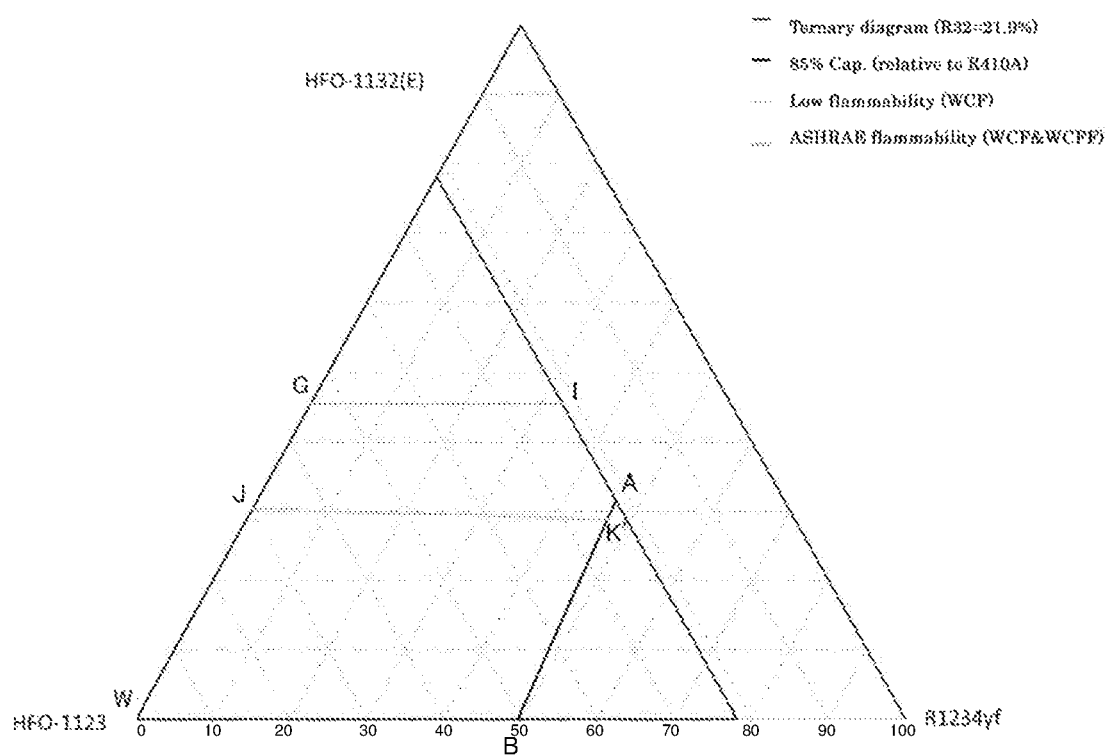
FIG. 8 is a diagram showing points A, B, G, I, J, K', and W, and line segments that connect these points to each other in a ternary composition diagram in which the sum of HFO-1132(E), HFO-1123, and R1234yf is 78.1 mass % (the content of R32 is 21.9 mass %).
Figure 9:
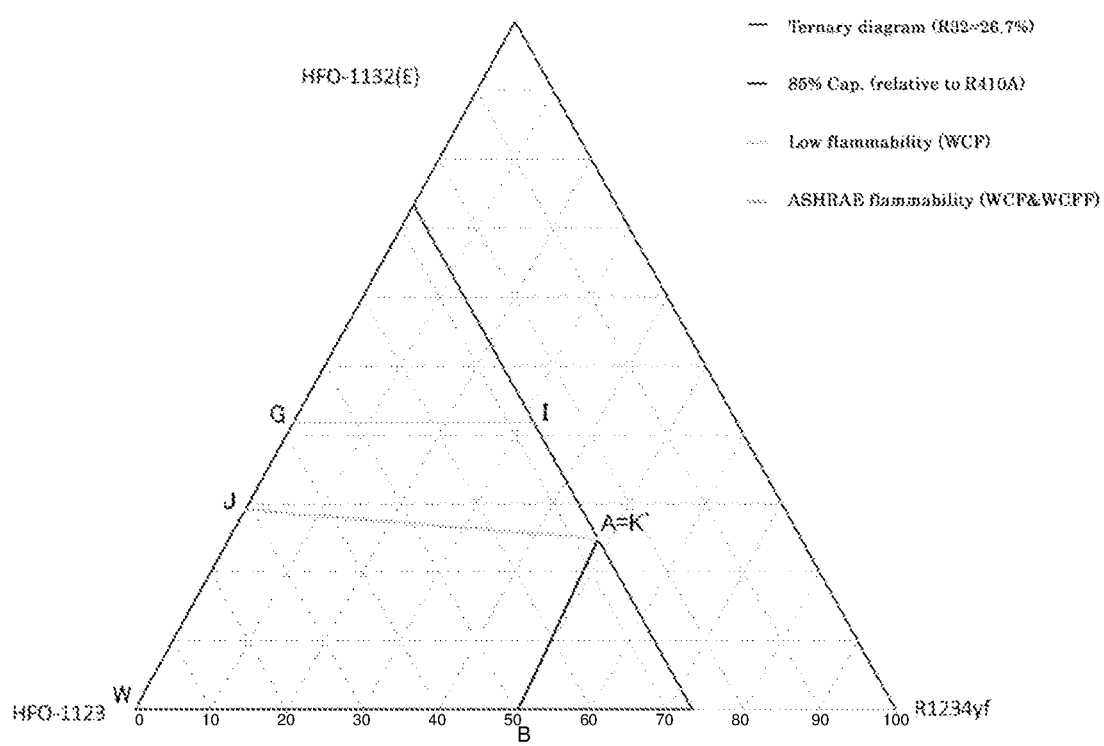
FIG. 9 is a diagram showing points A, B, G, I, J, K', and W, and line segments that connect these points to each other in a ternary composition diagram in which the sum of HFO-1132(E), HFO-1123, and R1234yf is 73.3 mass % (the content of R32 is 26.7 mass %).
Figure 10:
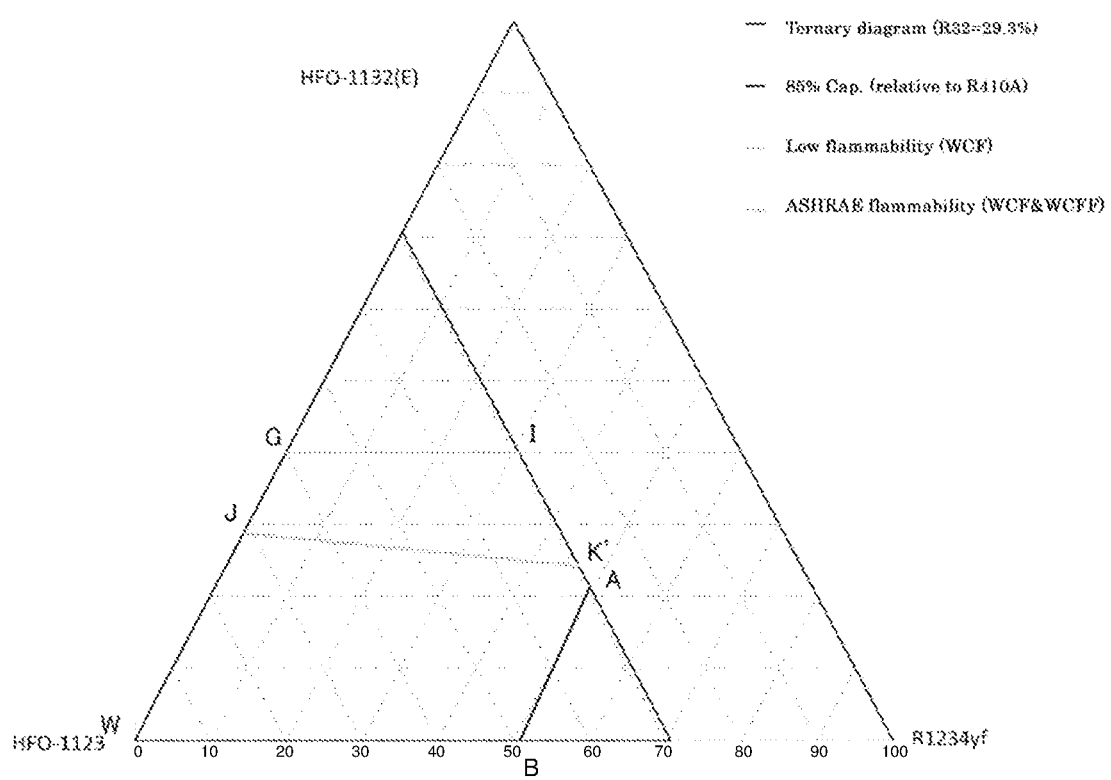
FIG. 10 is a diagram showing points A, B, G, I, J, K', and W, and line segments that connect these points to each other in a ternary composition diagram in which the sum of HFO-1132(E), HFO-1123, and R1234yf is 70.7 mass % (the content of R32 is 29.3 mass %).
Figure 11:
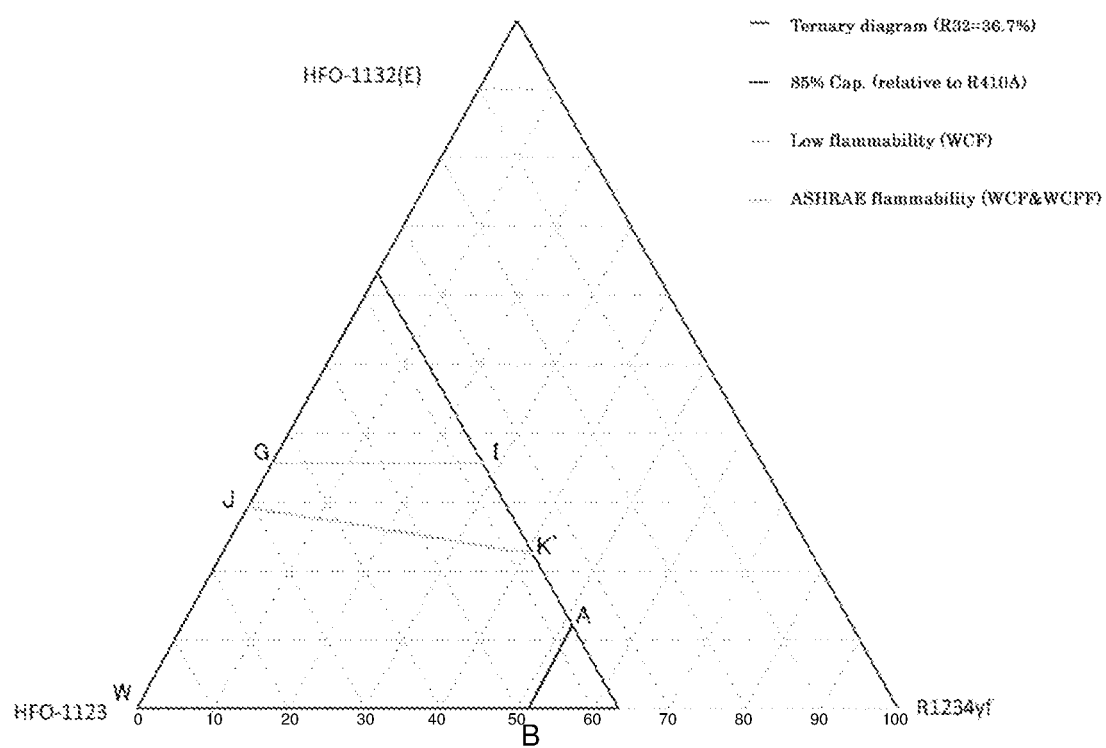
FIG. 11 is a diagram showing points A, B, G, I, J, K', and W, and line segments that connect these points to each other in a ternary composition diagram in which the sum of HFO-1132(E), HFO-1123, and R1234yf is 63.3 mass % (the content of R32 is 36.7 mass %).
Figure 12:
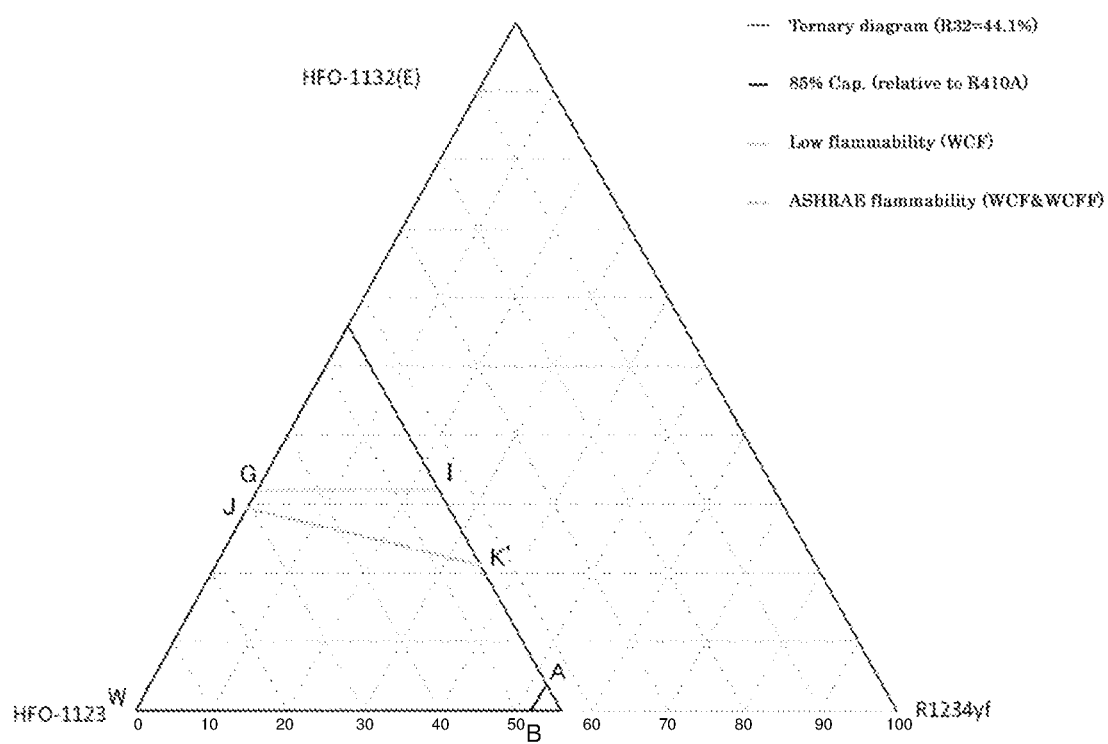
FIG. 12 is a diagram showing points A, B, G, I, J, K', and W, and line segments that connect these points to each other in a ternary composition diagram in which the sum of HFO-1132(E), HFO-1123, and R1234yf is 55.9 mass % (the content of R32 is 44.1 mass %).
Figure 13:
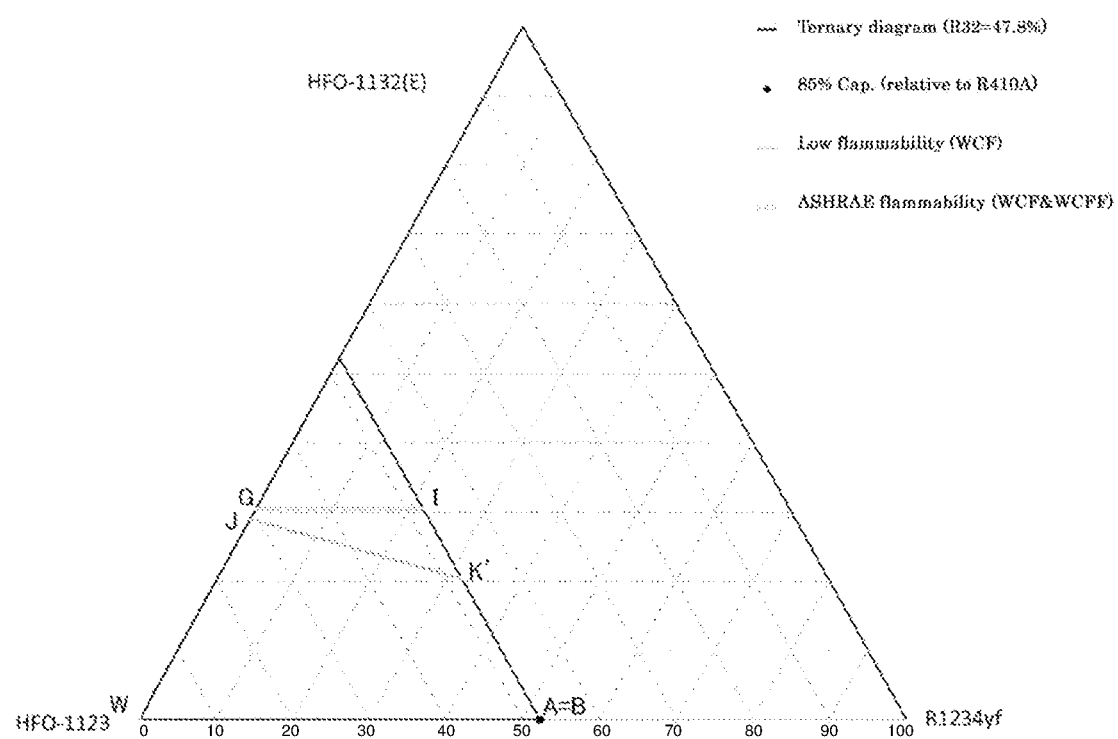
FIG. 13 is a diagram showing points A, B, G, I, J, K', and W, and line segments that connect these points to each other in a ternary composition diagram in which the sum of HFO-1132(E), HFO-1123, and R1234yf is 52.2 mass % (the content of R32 is 47.8 mass %).

In FIG. 3, the COP ratio of 92.5% or more forms a curved line CD. In FIG. 3, an approximate line formed by connecting three points: point C (32.9, 67.1, 0.0) and points (26.6, 68.4, 5) (19.5, 70.5, 10) where the COP ratio is 92.5% when the concentration of R1234yf is 5 mass % and 10 mass was obtained, and a straight line that connects point C and point D' (0, 75.4, 24.6), which is the intersection of the approximate line and a point where the concentration of HFO-1132 (E) is 0.0 mass % was defined as a line segment D'C. In FIG. 4, point D'(0, 83.4, 9.5) was similarly obtained from an approximate curve formed by connecting point C (18.4, 74.5, 0) and points (13.9, 76.5, 2.5) (8.7, 79.2, 5) where the COP ratio is 92.5%, and a straight line that connects point C and point D' was defined as the straight line D'C.

The composition of each mixture was defined as WCF. A leak simulation was performed using NIST Standard Reference Database REFLEAK Version 4.0 under the conditions of Equipment, Storage, Shipping, Leak, and Recharge according to the ASHRAE Standard 34-2013. The most flammable fraction was defined as WCFF.

For the flammability, the burning velocity was measured according to the ANSI/ASHRAE Standard 34-2013. Both WCF and WCFF having a burning velocity of 10 cm/s or less were determined to be classified as "Class 2L (lower flammability)."

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

The results are shown in Tables 97 to 104.

TABLE 97

| Item | | | Comp. Ex. 6 | Comp. Ex. 13 | Comp. Ex. 19 | Comp. Ex. 24 | Comp. Ex. 29 | Comp. Ex. 34 |
|---|---|---|---|---|---|---|---|---|
| WCF | HFO-1132(E) | Mass % | 72.0 | 60.9 | 55.8 | 52.1 | 48.6 | 45.4 |
| | HFO-1123 | Mass % | 28.0 | 32.0 | 33.1 | 33.4 | 33.2 | 32.7 |
| | R1234yf | Mass % | 0.0 | 0.0 | 0.0 | 0 | 0 | 0 |
| | R32 | Mass % | 0.0 | 7.1 | 11.1 | 14.5 | 18.2 | 21.9 |
| Burning velocity (WCF) | | cm/s | 10 | 10 | 10 | 10 | 10 | 10 |

TABLE 98

| Item | | | Comp. Ex. 39 | Comp. Ex. 45 | Comp. Ex. 51 | Comp. Ex. 57 | Comp. Ex. 62 |
|---|---|---|---|---|---|---|---|
| WCF | HFO-1132(E) | Mass % | 41.8 | 40 | 35.7 | 32 | 30.4 |
| | HFO-1123 | Mass % | 31.5 | 30.7 | 23.6 | 23.9 | 21.8 |
| | R1234yf | Mass % | 0 | 0 | 0 | 0 | 0 |
| | R32 | Mass % | 26.7 | 29.3 | 36.7 | 44.1 | 47.8 |
| Burning velocity (WCF) | | cm/s | 10 | 10 | 10 | 10 | 10 |

TABLE 99

| Item | | | Comp. Ex. 7 | Comp. Ex. 14 | Comp. Ex. 20 | Comp. Ex. 25 | Comp. Ex. 30 | Comp. Ex. 35 |
|---|---|---|---|---|---|---|---|---|
| WCF | HFO-1132(E) | Mass % | 72.0 | 60.9 | 55.8 | 52.1 | 48.6 | 45.4 |
| | HFO-1123 | Mass % | 0.0 | 0.0 | 0.0 | 0 | 0 | 0 |
| | R1234yf | Mass % | 28.0 | 32.0 | 33.1 | 33.4 | 33.2 | 32.7 |
| | R32 | Mass % | 0.0 | 7.1 | 11.1 | 14.5 | 18.2 | 21.9 |
| Burning velocity (WCF) | | cm/s | 10 | 10 | 10 | 10 | 10 | 10 |

TABLE 100

|  | Item |  | Comp. Ex. 40 | Comp. Ex. 46 | Comp. Ex. 52 | Comp. Ex. 58 | Comp. Ex. 63 |
|---|---|---|---|---|---|---|---|
| WCF | HFO-1132(E) | Mass % | 41.8 | 40 | 35.7 | 32 | 30.4 |
|  | HFO-1123 | Mass % | 0 | 0 | 0 | 0 | 0 |
|  | R1234yf | Mass % | 31.5 | 30.7 | 23.6 | 23.9 | 21.8 |
|  | R32 | Mass % | 26.7 | 29.3 | 36.7 | 44.1 | 47.8 |
| Burning velocity (WCF) |  | cm/s | 10 | 10 | 10 | 10 | 10 |

TABLE 101

|  | Item |  | Comp. Ex. 8 | Comp. Ex. 15 | Comp. Ex. 21 | Comp. Ex. 26 | Comp. Ex. 31 | Comp. Ex. 36 |
|---|---|---|---|---|---|---|---|---|
| WCF | HFO-1132 (E) | Mass % | 47.1 | 40.5 | 37.0 | 34.3 | 32.0 | 30.3 |
|  | HFO-1123 | Mass % | 52.9 | 52.4 | 51.9 | 51.2 | 49.8 | 47.8 |
|  | R1234yf | Mass % | 0.0 | 0.0 | 0.0 | 0.0 | 0.0 | 0.0 |
|  | R32 | Mass % | 0.0 | 7.1 | 11.1 | 14.5 | 18.2 | 21.9 |
| Leak condition that results in WCFF |  |  | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side |
| WCFF | HFO-1132 (E) | Mass % | 72.0 | 62.4 | 56.2 | 50.6 | 45.1 | 40.0 |
|  | HFO-1123 | Mass % | 28.0 | 31.6 | 33.0 | 33.4 | 32.5 | 30.5 |
|  | R1234yf | Mass % | 0.0 | 0.0 | 0.0 | 20.4 | 0.0 | 0.0 |
|  | R32 | Mass % | 0.0 | 50.9 | 10.8 | 16.0 | 22.4 | 29.5 |
| Burning velocity (WCF) |  | cm/s | 8 or less | 8 or less | 8 or less | 8 or less | 8 or less | 8 or less |
| Burning velocity (WCFF) |  | cm/s | 10 | 10 | 10 | 10 | 10 | 10 |

TABLE 102

|  | Item |  | Comp. Ex. 41 | Comp. Ex. 47 | Comp. Ex. 53 | Comp. Ex. 59 | Comp. Ex. 64 |
|---|---|---|---|---|---|---|---|
| WCF | HFO-1132(E) | Mass % | 29.1 | 28.8 | 29.3 | 29.4 | 28.9 |
|  | HFO-1123 | Mass % | 44.2 | 41.9 | 34.0 | 26.5 | 23.3 |
|  | R1234yf | Mass % | 0.0 | 0.0 | 0.0 | 0.0 | 0.0 |
|  | R32 | Mass % | 26.7 | 29.3 | 36.7 | 44.1 | 47.8 |
| Leak condition that results in WCFF |  |  | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 90% release, gas phase side | Storage/Shipping −40° C., 86% release, gas phase side |
| WCFF | HFO-1132(E) | Mass % | 34.6 | 32.2 | 27.7 | 28.3 | 27.5 |
|  | HFO-1123 | Mass % | 26.5 | 23.9 | 17.5 | 18.2 | 16.7 |
|  | R1234yf | Mass % | 0.0 | 0.0 | 0.0 | 0.0 | 0.0 |
|  | R32 | Mass % | 38.9 | 43.9 | 54.8 | 53.5 | 55.8 |
| Burning velocity (WCF) |  | cm/s | 8 or less | 8 or less | 8.3 | 9.3 | 9.6 |
| Burning velocity (WCFF) |  | cm/s | 10 | 10 | 10 | 10 | 10 |

TABLE 103

|  | Item |  | Comp. Ex. 9 | Comp. Ex. 16 | Comp. Ex. 22 | Comp. Ex. 27 | Comp. Ex. 32 | Comp. Ex. 37 |
|---|---|---|---|---|---|---|---|---|
| WCF | HFO-1132(E) | Mass % | 61.7 | 47.0 | 41.0 | 36.5 | 32.5 | 28.8 |
|  | HFO-1123 | Mass % | 5.9 | 7.2 | 6.5 | 5.6 | 4.0 | 2.4 |
|  | R1234yf | Mass % | 32.4 | 38.7 | 41.4 | 43.4 | 45.3 | 46.9 |
|  | R32 | Mass % | 0.0 | 7.1 | 11.1 | 14.5 | 18.2 | 21.9 |
| Leak condition that results in WCFF |  |  | Storage/Shipping −40° | Storage/Shipping −40° | Storage/Shipping −40° | Storage/Shipping −40° | Storage/Shipping −40° | Storage/Shipping −40° |

TABLE 103-continued

| Item | | | Comp. Ex. 9 | Comp. Ex. 16 | Comp. Ex. 22 | Comp. Ex. 27 | Comp. Ex. 32 | Comp. Ex. 37 |
|---|---|---|---|---|---|---|---|---|
| | | | C., 0% release, gas phase side | C., 0% release, gas phase side | C., 0% release, gas phase side | C., 92% release, liquid phase side | C., 0% release, gas phase side | C., 0% release, gas phase side |
| WCFF | HFO-1132(E) | Mass % | 72.0 | 56.2 | 50.4 | 46.0 | 42.4 | 39.1 |
| | HFO-1123 | Mass % | 10.5 | 12.6 | 11.4 | 10.1 | 7.4 | 4.4 |
| | R1234yf | Mass % | 17.5 | 20.4 | 21.8 | 22.9 | 24.3 | 25.7 |
| | R32 | Mass % | 0.0 | 10.8 | 16.3 | 21.0 | 25.9 | 30.8 |
| Burning velocity (WCF) | | cm/s | 8 or less | 8 or less | 8 or less | 8 or less | 8 or less | 8 or less |
| Burning velocity (WCFF) | | cm/s | 10 | 10 | 10 | 10 | 10 | 10 |

TABLE 104

| Item | | | Comp. Ex. 42 | Comp. Ex. 48 | Comp. Ex. 54 | Comp. Ex. 60 | Comp. Ex. 65 |
|---|---|---|---|---|---|---|---|
| WCF | HFO-1132(E) | Mass % | 24.8 | 24.3 | 22.5 | 21.1 | 20.4 |
| | HFO-1123 | Mass % | 0.0 | 0.0 | 0.0 | 0.0 | 0.0 |
| | R1234yf | Mass % | 48.5 | 46.4 | 40.8 | 34.8 | 31.8 |
| | R32 | Mass % | 26.7 | 29.3 | 36.7 | 44.1 | 47.8 |
| Leak condition that results in WCFF | | | Storage/ Shipping −40° C., 0% release, gas phase side | Storage/ Shipping −40° C., 0% release, gas phase side | Storage/ Shipping −40° C., 0% release, gas phase side | Storage/ Shipping −40° C., 0% release, gas phase side | Storage/ Shipping −40° C., 0% release, gas phase side |
| WCFF | HFO-1132(E) | Mass % | 35.3 | 34.3 | 31.3 | 29.1 | 28.1 |
| | HFO-1123 | Mass % | 0.0 | 0.0 | 0.0 | 0.0 | 0.0 |
| | R1234yf | Mass % | 27.4 | 26.2 | 23.1 | 19.8 | 18.2 |
| | R32 | Mass % | 37.3 | 39.6 | 45.6 | 51.1 | 53.7 |
| Burning velocity (WCF) | | cm/s | 8 or less | 8 or less | 8 or less | 8 or less | 8 or less |
| Burning velocity (WCFF) | | cm/s | 10 | 10 | 10 | 10 | 10 |

The results in Tables 97 to 100 indicate that the refrigerant has a WCF lower flammability in the following cases:

When the mass % of HFO-1132(E), HFO-1123, R1234yf, and R32 based on their sum in the mixed refrigerant of HFO-1132(E), HFO-1123, R1234yf, and R32 is respectively represented by x, y, z, and a, coordinates (x,y,z) in a ternary composition diagram in which the sum of HFO-1132(E), HFO-1123, and R1234yf is (100-a) mass % and a straight line connecting a point (0.0, 100.0-a, 0.0) and a point (0.0, 0.0, 100.0-a) is the base, if $0 < a \leq 11.1$, coordinates (x,y,z) in the ternary composition diagram are on or below a straight line GI that connects point G ($0.026a^2 - 1.7478a + 72.0$, $-0.026a^2 + 0.7478a + 28.0$, 0.0) and point I ($0.026a^2 - 1.7478a + 72.0$, 0.0, $-0.026a^2 + 0.7478a + 28.0$);

if $11.1 < a \leq 18.2$, coordinates (x,y,z) in the ternary composition diagram are on or below a straight line GI that connects point G ($0.02a^2 - 1.6013a + 71.105$, $-0.02a^2 + 0.6013a + 28.895$, 0.0) and point I ($0.02a^2 - 1.6013a + 71.105$, 0.0, $-0.02a^2 + 0.6013a + 28.895$); if $18.2 < a \leq 26.7$, coordinates (x,y,z) in the ternary composition diagram are on or below a straight line GI that connects point G ($0.0135a^2 - 1.4068a + 69.727$, $-0.0135a^2 + 0.4068a + 30.273$, 0.0) and point I ($0.0135a^2 - 1.4068a + 69.727$, 0.0, $-0.0135a^2 + 0.4068a + 30.273$); if $26.7 < a \leq 36.7$, coordinates (x,y,z) in the ternary composition diagram are on or below a straight line GI that connects point G ($0.0111a^2 - 1.3152a + 68.986$, $-0.0111a^2 + 0.3152a + 31.014$, 0.0) and point I ($0.0111a^2 - 1.3152a + 68.986$, 0.0, $-0.0111a^2 + 0.3152a + 31.014$); and if $36.7 < a \leq 46.7$, coordinates (x,y,z) in the ternary composition diagram are on or below a straight line GI that connects point G ($0.0061a^2 - 0.9918a + 63.902$, $-0.0061a^2 - 0.0082a + 36.098$, 0.0) and point I ($0.0061a^2 - 0.9918a + 63.902$, 0.0, $-0.0061a^2 - 0.0082a + 36.098$).

Three points corresponding to point G (Table 105) and point I (Table 106) were individually obtained in each of the following five ranges by calculation, and their approximate expressions were obtained.

TABLE 105

| Item | $11.1 \geq R32 > 0$ | | | $18.2 \geq R32 \geq 11.1$ | | | $26.7 \geq R32 \geq 18.2$ | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 72.0 | 60.9 | 55.8 | 55.8 | 52.1 | 48.6 | 48.6 | 45.4 | 41.8 |
| HFO-1123 | 28.0 | 32.0 | 33.1 | 33.1 | 33.4 | 33.2 | 33.2 | 32.7 | 31.5 |
| R1234yf | 0 | 0 | 0 | 0 | 0 | 0 | 0 | 0 | 0 |
| R32 | | a | | | a | | | a | |
| HFO-1132(E) Approximate expression | $0.026a^2 - 1.7478a + 72.0$ | | | $0.02a^2 - 1.6013a + 71.105$ | | | $0.0135a^2 - 1.4068a + 69.727$ | | |

TABLE 105-continued

| | | | | | | |
|---|---|---|---|---|---|---|
| HFO-1123 Approximate expression | $-0.026a^2 + 0.7478a + 28.0$ | | $-0.02a^2 + 0.6013a + 28.895$ | | $-0.0135a^2 + 0.4068a + 30.273$ | |
| R1234yf Approximate expression | 0 | | 0 | | 0 | |

| Item | $36.7 \geq R32 \geq 26.7$ | | | $46.7 \geq R32 \geq 36.7$ | | |
|---|---|---|---|---|---|---|
| R32 | 26.7 | 29.3 | 36.7 | 36.7 | 44.1 | 47.8 |
| HFO-1132(E) | 41.8 | 40.0 | 35.7 | 35.7 | 32.0 | 30.4 |
| HFO-1123 | 31.5 | 30.7 | 27.6 | 27.6 | 23.9 | 21.8 |
| R1234yf | 0 | 0 | 0 | 0 | 0 | 0 |
| R32 | | a | | | a | |
| HFO-1132(E) Approximate expression | $0.0111a^2 - 1.3152a + 68.986$ | | | $0.0061a^2 - 0.9918a + 63.902$ | | |
| HFO-1123 Approximate expression | $-0.0111a^2 + 0.3152a + 31.014$ | | | $-0.0061a^2 - 0.0082a + 36.098$ | | |
| R1234yf Approximate expression | 0 | | | 0 | | |

TABLE 106

| Item | $11.1 \geq R32 > 0$ | | | $18.2 \geq R32 \geq 11.1$ | | | $26.7 \geq R32 \geq 18.2$ | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 72.0 | 60.9 | 55.8 | 55.8 | 52.1 | 48.6 | 48.6 | 45.4 | 41.8 |
| HFO-1123 | 0 | 0 | 0 | 0 | 0 | 0 | 0 | 0 | 0 |
| R1234yf | 28.0 | 32.0 | 33.1 | 33.1 | 33.4 | 33.2 | 33.2 | 32.7 | 31.5 |
| R32 | | a | | | a | | | a | |
| HFO-1132(E) Approximate expression | $0.026a^2 - 1.7478a + 72.0$ | | | $0.02a^2 - 1.6013a + 71.105$ | | | $0.0135a^2 - 1.4068a + 69.727$ | | |
| HFO-1123 Approximate expression | 0 | | | 0 | | | 0 | | |
| R1234yf Approximate expression | $-0.026a^2 + 0.7478a + 28.0$ | | | $-0.02a^2 + 0.6013a + 28.895$ | | | $-0.0135a^2 + 0.4068a + 30.273$ | | |

| Item | $36.7 \geq R32 \geq 26.7$ | | | $46.7 \geq R32 \geq 36.7$ | | |
|---|---|---|---|---|---|---|
| R32 | 26.7 | 29.3 | 36.7 | 36.7 | 44.1 | 47.8 |
| HFO-1132(E) | 41.8 | 40.0 | 35.7 | 35.7 | 32.0 | 30.4 |
| HFO-1123 | 0 | 0 | 0 | 0 | 0 | 0 |
| R1234yf | 31.5 | 30.7 | 23.6 | 23.6 | 23.5 | 21.8 |
| R32 | | x | | | x | |
| HFO-1132(E) Approximate expression | $0.0111a^2 - 1.3152a + 68.986$ | | | $0.0061a^2 - 0.9918a + 63.902$ | | |
| HFO-1123 Approximate expression | 0 | | | 0 | | |
| R1234yf Approximate expression | $-0.0111a^2 + 0.3152a + 31.014$ | | | $-0.0061a^2 - 0.0082a + 36.098$ | | |

The results in Tables 101 to 104 indicate that the refrigerant is determined to have a WCFF lower flammability, and the flammability classification according to the ASHRAE Standard is "2L (flammability)" in the following cases:

When the mass % of HFO-1132(E), HFO-1123, R1234yf, and R32 based on their sum in the mixed refrigerant of HFO-1132(E), HFO-1123, R1234yf, and R32 is respectively represented by x, y, z, and a, in a ternary composition diagram in which the sum of HFO-1132(E), HFO-1123, and R1234yf is (100−a) mass % and a straight line connecting a point (0.0, 100.0−a, 0.0) and a point (0.0, 0.0, 100.0−a) is the base, if 0<a≤11.1, coordinates (x,y,z) in the ternary composition diagram are on or below a straight line JK' that connects point J ($0.0049a^2 - 0.9645a + 47.1$, $-0.0049a^2 - 0.0355a + 52.9$, 0.0) and point K'($0.0514a^2 - 2.4353a + 61.7$, $-0.0323a^2 + 0.4122a + 5.9$, $-0.0191a^2 + 1.0231a + 32.4$); if 11.1<a≤18.2, coordinates are on a straight line JK' that connects point J ($0.0243a^2 - 1.4161a + 49.725$, $-0.0243a^2 + 0.4161a + 50.275$, 0.0) and point K'($0.0341a^2 - 2.1977a + 61.187$, $-0.0236a^2 + 0.34a + 5.636$, $-0.0105a^2 + 0.8577a + 33.177$); if 18.2<a≤26.7, coordinates are on or below a straight line JK' that connects point J ($0.0246a^2 - 1.4476a + 50.184$, $-0.0246a^2 + 0.4476a + 49.816$, 0.0) and point K' ($0.0196a^2 - 1.7863a + 58.515$, $-0.0079a^2 - 0.1136a + 8.702$, $-0.0117a^2 + 0.8999a + 32.783$); if 26.7<a≤36.7, coordinates are on or below a straight line JK' that connects point J ($0.0183a^2-1.1399a+46.493$, $-0.0183a^2+0.1399a+53.507$, 0.0) and point K' ($-0.0051a^2+0.0929a+25.95$, 0.0, $0.0051a^2-1.0929a+74.05$); and if $36.7<a\leq46.7$, coordinates are on or below a straight line JK' that connects point J ($-0.0134a^2+1.0956a+7.13$, $0.0134a^2-2.0956a+92.87$, 0.0) and point K'($-1.892a+29.443$, 0.0, $0.892a+70.557$).

Actual points having a WCFF lower flammability form a curved line that connects point J and point K' (on the straight line AB) in FIG. 3 and extends toward the HFO-1132(E) side. Accordingly, when coordinates are on or below the straight line JK', WCFF lower flammability is achieved.

Three points corresponding to point J (Table 107) and point K' (Table 108) were individually obtained in each of the following five ranges by calculation, and their approximate expressions were obtained.

TABLE 107

| Item | $11.1 \geq R32 > 0$ | | | $18.2 \geq R32 \geq 11.1$ | | | $26.7 \geq R32 \geq 18.2$ | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 47.1 | 40.5 | 37 | 37.0 | 34.3 | 32.0 | 32.0 | 30.3 | 29.1 |
| HFO-1123 | 52.9 | 52.4 | 51.9 | 51.9 | 51.2 | 49.8 | 49.8 | 47.8 | 44.2 |
| R1234yf | 0 | 0 | 0 | 0 | 0 | 0 | 0 | 0 | 0 |
| R32 | a | | | a | | | a | | |
| HFO-1132(E) Approximate expression | $0.0049a^2 - 0.9645a + 47.1$ | | | $0.0243a^2 - 1.4161a + 49.725$ | | | $0.0246a^2 - 1.4476a + 50.184$ | | |
| HFO-1123 Approximate expression | $-0.0049a^2 - 0.0355a + 52.9$ | | | $-0.0243a^2 + 0.4161a + 50.275$ | | | $-0.0246a^2 + 0.4476a + 49.816$ | | |
| R1234yf Approximate expression | 0 | | | 0 | | | 0 | | |

| Item | $36.7 \geq R32 \geq 26.7$ | | | $47.8 \geq R32 \geq 36.7$ | | |
|---|---|---|---|---|---|---|
| R32 | 26.7 | 29.3 | 36.7 | 36.7 | 44.1 | 47.8 |
| HFO-1132(E) | 29.1 | 28.8 | 29.3 | 29.3 | 29.4 | 28.9 |
| HFO-1123 | 44.2 | 41.9 | 34.0 | 34.0 | 26.5 | 23.3 |
| R1234yf | 0 | 0 | 0 | 0 | 0 | 0 |
| R32 | a | | | a | | |
| HFO-1132(E) Approximate expression | $0.0183a^2 - 1.1399a + 46.493$ | | | $-0.0134a^2 + 1.0956a + 7.13$ | | |
| HFO-1123 Approximate expression | $-0.0183a^2 + 0.1399a + 53.507$ | | | $0.0134a^2 - 2.0956a + 92.87$ | | |
| R1234yf Approximate expression | 0 | | | 0 | | |

TABLE 108

| Item | $11.1 \geq R32 > 0$ | | | $18.2 \geq R32 \geq 11.1$ | | | $26.7 \geq R32 \geq 18.2$ | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 61.7 | 47.0 | 41.0 | 41.0 | 36.5 | 32.5 | 32.5 | 28.8 | 24.8 |
| HFO-1123 | 5.9 | 7.2 | 6.5 | 6.5 | 5.6 | 4.0 | 4.0 | 2.4 | 0 |
| R1234yf | 32.4 | 38.7 | 41.4 | 41.4 | 43.4 | 45.3 | 45.3 | 46.9 | 48.5 |
| R32 | x | | | x | | | x | | |
| HFO-1132(E) Approximate expression | $0.0514a^2 - 2.4353a + 61.7$ | | | $0.0341a^2 - 2.1977a + 61.187$ | | | $0.0196a^2 - 1.7863a + 58.515$ | | |
| HFO-1123 Approximate expression | $-0.0323a^2 + 0.4122a + 5.9$ | | | $-0.0236a^2 + 0.34a + 5.636$ | | | $-0.0079a^2 - 0.1136a + 8.702$ | | |
| R1234yf Approximate expression | $-0.0191a^2 + 1.0231a + 32.4$ | | | $-0.0105a^2 + 0.8577a + 33.177$ | | | $-0.0117a^2 + 0.8999a + 32.783$ | | |

| Item | $36.7 \geq R32 \geq 26.7$ | $46.7 \geq R32 \geq 36.7$ |
|---|---|---|

TABLE 108-continued

| | | | | | | |
|---|---|---|---|---|---|---|
| R32 | 26.7 | 29.3 | 36.7 | 36.7 | 44.1 | 47.8 |
| HFO-1132(E) | 24.8 | 24.3 | 22.5 | 22.5 | 21.1 | 20.4 |
| HFO-1123 | 0 | 0 | 0 | 0 | 0 | 0 |
| R1234yf | 48.5 | 46.4 | 40.8 | 40.8 | 34.8 | 31.8 |
| R32 | x | | | | x | |
| HFO-1132(E) Approximate expression | $-0.0051a^2 + 0.0929a + 25.95$ | | | | $-1.892a + 29.443$ | |
| HFO-1123 Approximate expression | 0 | | | | 0 | |
| R1234yf Approximate expression | $0.0051a^2 - 1.0929a + 74.05$ | | | | $0.892a + 70.557$ | |

FIGS. 3 to 13 show compositions whose R32 content a (mass %) is 0 mass %, 7.1 mass %, 11.1 mass %, 14.5 mass %, 18.2 mass %, 21.9 mass %, 26.7 mass %, 29.3 mass %, 36.7 mass %, 44.1 mass %, and 47.8 mass %, respectively.

Points A, B, C, and D' were obtained in the following manner according to approximate calculation.

Point A is a point where the content of HFO-1123 is 0 mass %, and a refrigerating capacity ratio of 85% relative to that of R410A is achieved. Three points corresponding to point A were obtained in each of the following five ranges by calculation, and their approximate expressions were obtained (Table 109).

Three points corresponding to point B were obtained in each of the following five ranges by calculation, and their approximate expressions were obtained (Table 110).

TABLE 109

| Item | $11.1 \geq R32 > 0$ | | | $18.2 \geq R32 \geq 11.1$ | | | $26.7 \geq R32 \geq 18.2$ | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 68.6 | 55.3 | 48.4 | 48.4 | 42.8 | 37 | 37 | 31.5 | 24.8 |
| HFO-1123 | 0 | 0 | 0 | 0 | 0 | 0 | 0 | 0 | 0 |
| R1234yf | 31.4 | 37.6 | 40.5 | 40.5 | 42.7 | 44.8 | 44.8 | 46.6 | 48.5 |
| R32 | a | | | a | | | a | | |
| HFO-1132(E) Approximate expression | $0.0134a^2 - 1.9681a + 68.6$ | | | $0.0112a^2 - 1.9337a + 68.484$ | | | $0.0107a^2 - 1.9142a + 68.305$ | | |
| HFO-1123 Approximate expression | 0 | | | 0 | | | 0 | | |
| R1234yf Approximate expression | $-0.0134a^2 + 0.9681a + 31.4$ | | | $-0.0112a^2 + 0.9337a + 31.516$ | | | $-0.0107a^2 + 0.9142a + 31.695$ | | |

| Item | $36.7 \geq R32 \geq 26.7$ | | | $46.7 \geq R32 \geq 36.7$ | | |
|---|---|---|---|---|---|---|
| R32 | 26.7 | 29.3 | 36.7 | 36.7 | 44.1 | 47.8 |
| HFO-1132(E) | 24.8 | 21.3 | 12.1 | 12.1 | 3.8 | 0 |
| HFO-1123 | 0 | 0 | 0 | 0 | 0 | 0 |
| R1234yf | 48.5 | 49.4 | 51.2 | 51.2 | 52.1 | 52.2 |
| R32 | a | | | a | | |
| HFO-1132(E) Approximate expression | $0.0103a^2 - 1.9225a + 68.793$ | | | $0.0085a^2 - 1.8102a + 67.1$ | | |
| HFO-1123 Approximate expression | 0 | | | 0 | | |
| R1234yf Approximate expression | $-0.0103a^2 + 0.9225a + 31..207$ | | | $-0.0085a^2 + 0.8102a + 32.9$ | | |

Point B is a point where the content of HFO-1132(E) is 0 mass %, and a refrigerating capacity ratio of 85% relative to that of R410A is achieved.

TABLE 110

| Item | 11.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 0 | 0 | 0 | 0 | 0 | 0 | 0 | 0 | 0 |
| HFO-1123 | 58.7 | 47.8 | 42.3 | 42.3 | 37.8 | 33.1 | 33.1 | 28.5 | 22.9 |
| R1234yf | 41.3 | 45.1 | 46.6 | 46.6 | 47.7 | 48.7 | 48.7 | 49.6 | 50.4 |
| R32 | | a | | | a | | | a | |
| HFO-1132(E) Approximate expression | | 0 | | | 0 | | | 0 | |
| HFO-1123 Approximate expression | | $0.0144a^2 - 1.6377a + 58.7$ | | | $0.0075a^2 - 1.5156a + 58.199$ | | | $0.009a^2 - 1.6045a + 59.318$ | |
| R1234yf Approximate expression | | $-0.0144a^2 + 0.6377a + 41.3$ | | | $-0.0075a^2 + 0.5156a + 41.801$ | | | $-0.009a^2 + 0.6045a + 40.682$ | |

| Item | 36.7 ≥ R32 ≥ 26.7 | | | 46.7 ≥ R32 ≥ 36.7 | | |
|---|---|---|---|---|---|---|
| R32 | 26.7 | 29.3 | 36.7 | 36.7 | 44.1 | 47.8 |
| HFO-1132(E) | 0 | 0 | 0 | 0 | 0 | 0 |
| HFO-1123 | 22.9 | 19.9 | 11.7 | 11.8 | 3.9 | 0 |
| R1234yf | 50.4 | 50.8 | 51.6 | 51.5 | 52.0 | 52.2 |
| R32 | | a | | | a | |
| HFO-1132(E) Approximate expression | | 0 | | | 0 | |
| HFO-1123 Approximate expression | | $0.0046a^2 - 1.41a + 57.286$ | | | $0.0012a^2 - 1.1659a + 52.95$ | |
| R1234yf Approximate expression | | $-0.0046a^2 + 0.41a + 42.714$ | | | $-0.0012a^2 + 0.1659a + 47.05$ | |

Point D' is a point where the content of HFO-1132(E) is 0 mass %, and a COP ratio of 95.5% relative to that of R410A is achieved.

Three points corresponding to point D' were obtained in each of the following by calculation, and their approximate expressions were obtained (Table 111).

TABLE 111

| Item | 11.1 ≥ R32 > 0 | | |
|---|---|---|---|
| R32 | 0 | 7.1 | 11.1 |
| HFO-1132(E) | 0 | 0 | 0 |
| HFO-1123 | 75.4 | 83.4 | 88.9 |
| R1234yf | 24.6 | 9.5 | 0 |
| R32 | | a | |
| HFO-1132(E) Approximate expression | | 0 | |
| HFO-1123 Approximate expression | | $0.0224a^2 + 0.968a + 75.4$ | |
| R1234yf Approximate expression | | $-0.0224a^2 - 1.968a + 24.6$ | |

Point C is a point where the content of R1234yf is 0 mass %, and a COP ratio of 95.5% relative to that of R410A is achieved.

Three points corresponding to point C were obtained in each of the following by calculation, and their approximate expressions were obtained (Table 112).

TABLE 112

| Item | 11.1 ≥ R32 > 0 | | |
|---|---|---|---|
| R32 | 0 | 7.1 | 11.1 |
| HFO-1132(E) | 32.9 | 18.4 | 0 |
| HFO-1123 | 67.1 | 74.5 | 88.9 |
| R1234yf | 0 | 0 | 0 |
| R32 | | a | |
| HFO-1132(E) Approximate expression | | $-0.2304a^2 - 0.4062a + 32.9$ | |
| HFO-1123 Approximate expression | | $0.2304a^2 - 0.5938a + 67.1$ | |
| R1234yf Approximate expression | | 0 | |

(5-4) Refrigerant D

The refrigerant D according to the present disclosure is a mixed refrigerant comprising trans-1,2-difluoroethylene (HFO-1132(E)), difluoromethane (R32), and 2,3,3,3-tetrafluoro-1-propene (R1234yf).

The refrigerant D according to the present disclosure has various properties that are desirable as an R410A-alternative refrigerant; i.e., a refrigerating capacity equivalent to that of R410A, a sufficiently low GWP, and a lower flammability (Class 2L) according to the ASHRAE standard.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:
point I (72.0, 0.0, 28.0),
point J (48.5, 18.3, 33.2), point N (27.7, 18.2, 54.1), and
point E (58.3, 0.0, 41.7),
or on these line segments (excluding the points on the line segment EI);

the line segment IJ is represented by coordinates $(0.0236y^2-1.7616y+72.0, y, -0.0236y^2+0.7616y+28.0)$;

the line segment NE is represented by coordinates $(0.012y^2-1.9003y+58.3, y, -0.012y^2+0.9003y+41.7)$; and the line segments JN and E are straight lines. When the requirements above are satisfied, the refrigerant according to the present disclosure has a refrigerating capacity ratio of 80% or more relative to R410A, a GWP of 125 or less, and a WCF lower flammability.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments MM', M'N, NV, VG, and GM that connect the following points:
point M (52.6, 0.0, 47.4),
point M' (39.2, 5.0, 55.8),
point N (27.7, 18.2, 54.1),
point V (11.0, 18.1, 70.9), and
point G (39.6, 0.0, 60.4),
or on these line segments (excluding the points on the line segment GM);

the line segment MM' is represented by coordinates $(0.132y^2-3.34y+52.6, y, -0.132y^2+2.34y+47.4)$;

the line segment M'N is represented by coordinates $(0.0596y^2-2.2541y+48.98, y, -0.0596y^2+1.2541y+51.02)$;

the line segment VG is represented by coordinates $(0.0123y^2-1.8033y+39.6, y, -0.0123y^2+0.8033y+60.4)$; and the line segments NV and GM are straight lines. When the requirements above are satisfied, the refrigerant according to the present disclosure has a refrigerating capacity ratio of 70% or more relative to R410A, a GWP of 125 or less, and an ASHRAE lower flammability.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments ON, NU, and UO that connect the following 3 points:
point O (22.6, 36.8, 40.6),
point N (27.7, 18.2, 54.1), and
point U (3.9, 36.7, 59.4),
or on these line segments;

the line segment ON is represented by coordinates $(0.0072y^2-0.6701y+37.512, y, -0.0072y^2-0.3299y+62.488)$;

the line segment NU is represented by coordinates $(0.0083y^2-1.7403y+56.635, y, -0.0083y^2+0.7403y+43.365)$; and the line segment UO is a straight line. When the requirements above are satisfied, the refrigerant according to the present disclosure has a refrigerating capacity ratio of 80% or more relative to R410A, a GWP of 250 or less, and an ASHRAE lower flammability.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:
point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments;

the line segment QR is represented by coordinates $(0.0099y^2-1.975y+84.765, y, -0.0099y^2+0.975y+15.235)$;

the line segment RT is represented by coordinates $(0.0082y^2-1.8683y+83.126, y, -0.0082y^2+0.8683y+16.874)$;

the line segment LK is represented by coordinates $(0.0049y^2-0.8842y+61.488, y, -0.0049y^2-0.1158y+38.512)$;

the line segment KQ is represented by coordinates $(0.0095y^2-1.2222y+67.676, y, -0.0095y^2+0.2222y+32.324)$; and the line segment TL is a straight line. When the requirements above are satisfied, the refrigerant according to the present disclosure has a refrigerating capacity ratio of 92.5% or more relative to R410A, a GWP of 350 or less, and a WCF lower flammability.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments PS, ST, and TP that connect the following 3 points:
point P (20.5, 51.7, 27.8),
point S (21.9, 39.7, 38.4), and
point T (8.6, 51.6, 39.8),
or on these line segments;

the line segment PS is represented by coordinates $(0.0064y^2-0.7103y+40.1, y, -0.0064y^2-0.2897y+59.9)$;

the line segment ST is represented by coordinates $(0.0082y^2-1.8683y+83.126, y, -0.0082y^2+0.8683y+16.874)$; and the line segment TP is a straight line. When the requirements above are satisfied, the refrigerant according to the present disclosure has a refrigerating capacity ratio of 92.5% or more relative to R410A, a GWP of 350 or less, and an ASHRAE lower flammability.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments ac, cf, fd, and da that connect the following 4 points:
point a (71.1, 0.0, 28.9),
point c (36.5, 18.2, 45.3),
point f (47.6, 18.3, 34.1), and
point d (72.0, 0.0, 28.0),
or on these line segments;

the line segment ac is represented by coordinates $(0.0181y^2-2.2288y+71.096, y, -0.0181y^2+1.2288y+28.904)$;

the line segment fd is represented by coordinates $(0.02y^2-1.7y+72, y, -0.02y^2+0.7y+28)$; and the line segments cf and da are straight lines. When the requirements above are satisfied, the refrigerant according to the present disclosure has a refrigerating capacity ratio of 85% or more relative to R410A, a GWP of 125 or less, and a lower flammability (Class 2L) according to the ASHRAE standard.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments ab, be, ed, and da that connect the following 4 points:
point a (71.1, 0.0, 28.9),
point b (42.6, 14.5, 42.9),
point e (51.4, 14.6, 34.0), and
point d (72.0, 0.0, 28.0),
or on these line segments;

the line segment ab is represented by coordinates $(0.0181y^2-2.2288y+71.096, y, -0.0181y^2+1.2288y+28.904)$;

the line segment ed is represented by coordinates $(0.02y-1.7y+72, y, -0.02y^2+0.7y+28)$; and the line segments be and da are straight lines. When the requirements above are satisfied, the refrigerant according to the present disclosure has a refrigerating capacity ratio of 85% or more relative to R410A, a GWP of 100 or less, and a lower flammability (Class 2L) according to the ASHRAE standard.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments gi, ij, and jg that connect the following 3 points:
point g (77.5, 6.9, 15.6),
point i (55.1, 18.3, 26.6), and
point j (77.5, 18.4, 4.1),
or on these line segments;

the line segment gi is represented by coordinates $(0.02y^2-2.4583y+93.396, y, -0.02y^2+1.4583y+6.604)$; and the line segments ij and jg are straight lines. When the requirements above are satisfied, the refrigerant according to the present disclosure has a refrigerating capacity ratio of 95% or more relative to R410A and a GWP of 100 or less, undergoes fewer or no changes such as polymerization or decomposition, and also has excellent stability.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments gh, hk, and kg that connect the following 3 points:
point g (77.5, 6.9, 15.6),
point h (61.8, 14.6, 23.6), and
point k (77.5, 14.6, 7.9),
or on these line segments;

the line segment gh is represented by coordinates $(0.02y^2-2.4583y+93.396, y, -0.02y^2+1.4583y+6.604)$; and the line segments hk and kg are straight lines. When the requirements above are satisfied, the refrigerant according to the present disclosure has a refrigerating capacity ratio of 95% or more relative to R410A and a GWP of 100 or less, undergoes fewer or no changes such as polymerization or decomposition, and also has excellent stability.

The refrigerant D according to the present disclosure may further comprise other additional refrigerants in addition to HFO-1132(E), R32, and R1234yf, as long as the above properties and effects are not impaired. In this respect, the refrigerant according to the present disclosure preferably comprises HFO-1132(E), R32, and R1234yf in a total amount of 99.5 mass % or more, more preferably 99.75 mass % or more, and still more preferably 99.9 mass % or more based on the entire refrigerant.

Such additional refrigerants are not limited, and can be selected from a wide range of refrigerants. The mixed refrigerant may comprise a single additional refrigerant, or two or more additional refrigerants.

(Examples of Refrigerant D)

The present disclosure is described in more detail below with reference to Examples of refrigerant D. However, the refrigerant D is not limited to the Examples.

The composition of each mixed refrigerant of HFO-1132 (E), R32, and R1234yf was defined as WCF. A leak simulation was performed using the NIST Standard Reference Database REFLEAK Version 4.0 under the conditions of Equipment, Storage, Shipping, Leak, and Recharge according to the ASHRAE Standard 34-2013. The most flammable fraction was defined as WCFF.

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC. Tables 113 to 115 show the results.

TABLE 113

| Item | | Unit | Comparative Example 13 I | Example 11 | Example 12 J | Example 13 | Example 14 K | Example 15 | Example 16 L |
|---|---|---|---|---|---|---|---|---|---|
| WCF | HFO-1132(E) | Mass % | 72 | 57.2 | 48.5 | 41.2 | 35.6 | 32 | 28.9 |
| | R32 | Mass % | 0 | 10 | 18.3 | 27.6 | 36.8 | 44.2 | 51.7 |
| | R1234yf | Mass % | 28 | 32.8 | 33.2 | 31.2 | 27.6 | 23.8 | 19.4 |
| Burning Velocity (WCF) | | cm/s | 10 | 10 | 10 | 10 | 10 | 10 | 10 |

TABLE 114

| Item | | Unit | Comparative Example 14 M | Example 18 | Example 19 W | Example 20 | Example 21 N | Example 22 |
|---|---|---|---|---|---|---|---|---|
| WCF | HFO-1132(E) | Mass % | 52.6 | 39.2 | 32.4 | 29.3 | 27.7 | 24.6 |
| | R32 | Mass % | 0.0 | 5.0 | 10.0 | 14.5 | 18.2 | 27.6 |
| | R1234yf | Mass % | 47.4 | 55.8 | 57.6 | 56.2 | 54.1 | 47.8 |
| Leak condition that results in WCFF | | | Storage, Shipping, −40° C., 0% release, on the gas phase side | Storage, Shipping, −40° C., 0% release, on the gas phase side | Storage, Shipping, −40° C., 0% release, on the gas phase side | Storage, Shipping, −40° C., 0% release, on the gas phase side | Storage, Shipping, −40° C., 0% release, on the gas phase side | Storage, Shipping, −40° C., 0% release, on the gas phase side |
| WCF | HFO-1132(E) | Mass % | 72.0 | 57.8 | 48.7 | 43.6 | 40.6 | 34.9 |
| | R32 | Mass % | 0.0 | 9.5 | 17.9 | 24.2 | 28.7 | 38.1 |
| | R1234yf | Mass % | 28.0 | 32.7 | 33.4 | 32.2 | 30.7 | 27.0 |
| Burning Velocity (WCF) | | cm/s | 8 or less | 8 or less | 8 or less | 8 or less | 8 or less | 8 or less |
| Burning Velocity (WCFF) | | cm/s | 10 | 10 | 10 | 10 | 10 | 10 |

TABLE 115

| Item | | Unit | Example 23 O | Example 24 | Example 25 P |
|---|---|---|---|---|---|
| WCF | HFO-1132 (E) | Mass % | 22.6 | 21.2 | 20.5 |
| | HFO-1123 | Mass % | 36.8 | 44.2 | 51.7 |
| | R1234yf | Mass % | 40.6 | 34.6 | 27.8 |
| Leak condition that results in WCFF | | | Storage, Shipping, −40° C., 0% release, on the gas phase side | Storage, Shipping, −40° C., 0% release, on the gas phase side | Storage, Shipping, −40° C., 0% release, on the gas phase side |
| WCFF | HFO-1132 (E) | Mass % | 31.4 | 29.2 | 27.1 |
| | HFO-1123 | Mass % | 45.7 | 51.1 | 56.4 |
| | R1234yf | Mass % | 23.0 | 19.7 | 16.5 |
| Burning Velocity (WCF) | | cm/s | 8 or less | 8 or less | 8 or less |
| Burning Velocity (WCFF) | | cm/s | 10 | 10 | 10 |

The results indicate that under the condition that the mass % of TFO-1132(E), R32, and R1234yf based on their sum is respectively represented by x,y, and z, when coordinates (x,y,z) in the ternary composition diagram shown in FIG. 14 in which the sum of HFO-1132(E), R32, and R1234yf is 100 mass % are on the line segment that connects point I, point J, point K, and point L, or below these line segments, the refrigerant has a WCF lower flammability.

Figure 14:
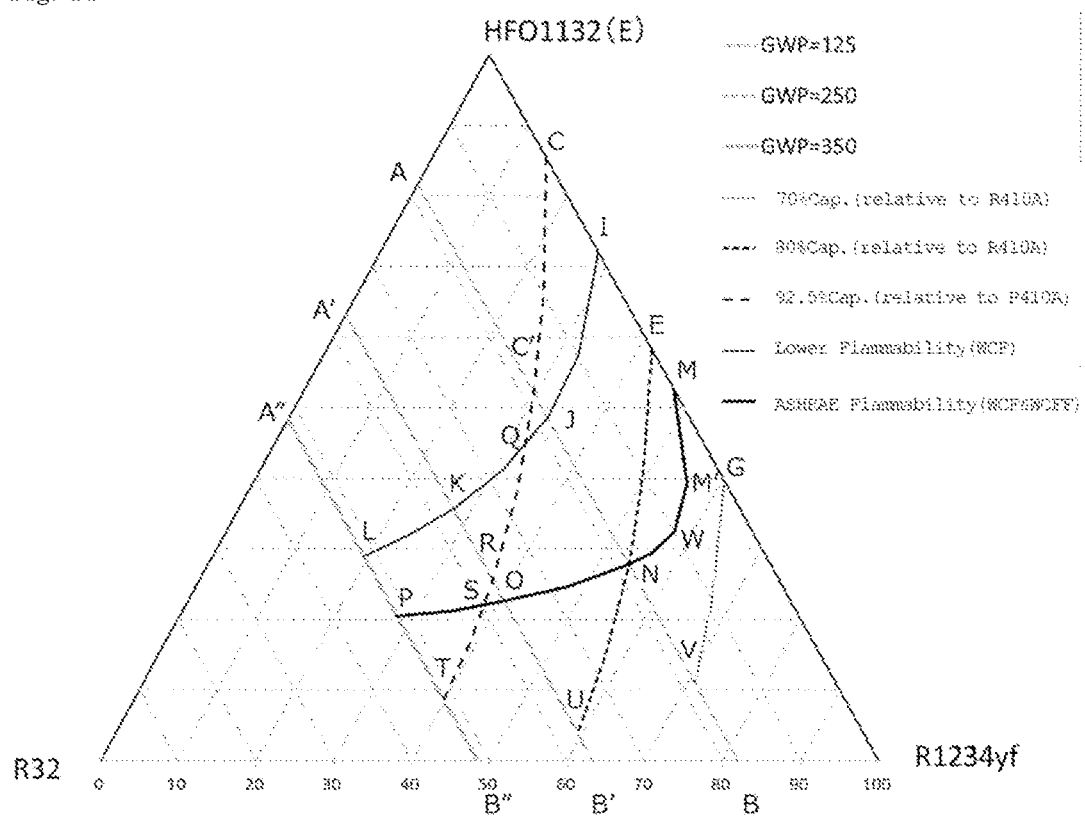
FIG. 14 is a view showing points A to C, E, G, and I to W; and line segments that connect points A to C, E, G, and I to W in a ternary composition diagram in which the sum of HFO-1132(E), R32, and R1234yf is 100 mass %.
Figure 15:
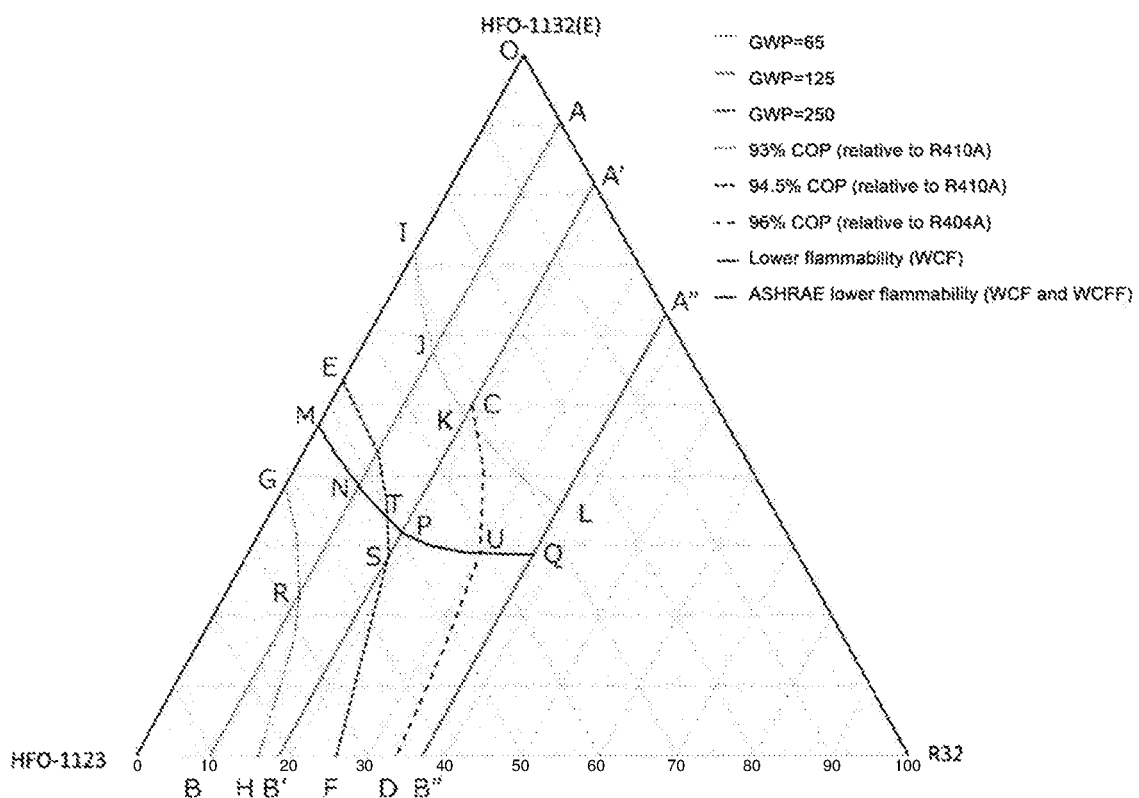
FIG. 15 is a view showing points A to U; and line segments that connect the points in a ternary composition diagram in which the sum of HFO-1132(E), HFO-1123, and R32 is 100 mass %.

The results also indicate that when coordinates (x,y,z) in the ternary composition diagram shown in FIG. 14 are on the line segments that connect point M, point M', point W, point J, point N, and point P, or below these line segments, the refrigerant has an ASHRAE lower flammability.

Mixed refrigerants were prepared by mixing HFO-1132 (E), R32, and R1234yf in amounts (mass %) shown in Tables 116 to 144 based on the sum of FO-1132(E), R32, and R1234yf. The coefficient of performance (COP) ratio and the refrigerating capacity ratio relative to R410 of the mixed refrigerants shown in Tables 116 to 144 were determined. The conditions for calculation were as described below.

Evaporating temperature: 5° C.
Condensation temperature: 45° C.
Degree of superheating: 5 K
Degree of subcooling: 5 K Compressor efficiency: 70%
Tables 116 to 144 show these values together with the GWP of each mixed refrigerant.

TABLE 116

| Item | Unit | Comparative Example 1 | Comparative Example 2 A | Comparative Example 3 B | Comparative Example 4 A' | Comparative Example 5 B' | Comparative Example 6 A" | Comparative Example 7 B" |
|---|---|---|---|---|---|---|---|---|
| HFO-1132(E) | Mass % | R410A | 81.6 | 0.0 | 63.1 | 0.0 | 48.2 | 0.0 |
| R32 | Mass % |  | 18.4 | 18.1 | 36.9 | 36.7 | 51.8 | 51.5 |
| R1234yf | Mass % |  | 0.0 | 81.9 | 0.0 | 63.3 | 0.0 | 48.5 |
| GWP | — | 2088 | 125 | 125 | 250 | 250 | 350 | 350 |
| COP Ratio | % (relative to R410A) | 100 | 98.7 | 103.6 | 98.7 | 102.3 | 99.2 | 102.2 |
| Refrigerating Capacity Ratio | % (relative to R410A) | 100 | 105.3 | 62.5 | 109.9 | 77.5 | 112.1 | 87.3 |

TABLE 117

| Item | Unit | Comparative Example 8 C | Comparative Example 9 | Comparative Example 10 C' | Example 1 | Example 2 R | Example 3 | Example 4 T |
|---|---|---|---|---|---|---|---|---|
| HFO-1132(E) | Mass % | 85.5 | 66.1 | 52.1 | 37.8 | 25.5 | 16.6 | 8.6 |
| R32 | Mass % | 0.0 | 10.0 | 18.2 | 27.6 | 36.8 | 44.2 | 51.6 |
| R1234yf | Mass % | 14.5 | 23.9 | 29.7 | 34.6 | 37.7 | 39.2 | 39.8 |
| GWP | — | 1 | 69 | 125 | 188 | 250 | 300 | 350 |
| COP Ratio | % (relative to R410A) | 99.8 | 99.3 | 99.3 | 99.6 | 100.2 | 100.8 | 101.4 |
| Refrigerating Capacity Ratio | % (relative to R410A) | 92.5 | 92.5 | 92.5 | 92.5 | 92.5 | 92.5 | 92.5 |

TABLE 118

| Item | Unit | Comparative Example 11 E | Example 5 | Example 6 N | Example 7 | Example 8 U | Comparative Example 12 G | Example 9 | Example 10 V |
|---|---|---|---|---|---|---|---|---|---|
| HFO-1132(E) | Mass % | 58.3 | 40.5 | 27.7 | 14.9 | 3.9 | 39.6 | 22.8 | 11.0 |
| R32 | Mass % | 0.0 | 10.0 | 18.2 | 27.6 | 36.7 | 0.0 | 10.0 | 18.1 |
| R1234yf | Mass % | 41.7 | 49.5 | 54.1 | 57.5 | 59.4 | 60.4 | 67.2 | 70.9 |
| GWP | — | 2 | 70 | 125 | 189 | 250 | 3 | 70 | 125 |
| COP Ratio | % (relative to R410A) | 100.3 | 100.3 | 100.7 | 101.2 | 101.9 | 101.4 | 101.8 | 102.3 |
| Refrigerating Capacity Ratio | % (relative to R410A) | 80.0 | 80.0 | 80.0 | 80.0 | 80.0 | 70.0 | 70.0 | 70.0 |

TABLE 119

| Item | Unit | Comparative Example 13 I | Example 11 | Example 12 J | Example 13 | Example 14 K | Example 15 | Example 16 L | Example 17 Q |
|---|---|---|---|---|---|---|---|---|---|
| HFO-1132(E) | Mass % | 72.0 | 57.2 | 48.5 | 41.2 | 35.6 | 32.0 | 28.9 | 44.6 |
| R32 | Mass % | 0.0 | 10.0 | 18.3 | 27.6 | 36.8 | 44.2 | 51.7 | 23.0 |
| R1234yf | Mass % | 28.0 | 32.8 | 33.2 | 31.2 | 27.6 | 23.8 | 19.4 | 32.4 |
| GWP | — | 2 | 69 | 125 | 188 | 250 | 300 | 350 | 157 |
| COP Ratio | % (relative to R410A) | 99.9 | 99.5 | 99.4 | 99.5 | 99.6 | 99.8 | 100.1 | 99.4 |
| Refrigerating Capacity Ratio | % (relative to R410A) | 86.6 | 88.4 | 90.9 | 94.2 | 97.7 | 100.5 | 103.3 | 92.5 |

TABLE 120

| Item | Unit | Comparative Example 14 M | Example 18 | Example 19 W | Example 20 | Example 21 N | Example 22 |
|---|---|---|---|---|---|---|---|
| HFO-1132(E) | Mass % | 52.6 | 39.2 | 32.4 | 29.3 | 27.7 | 24.5 |
| R32 | Mass % | 0.0 | 5.0 | 10.0 | 14.5 | 18.2 | 27.6 |
| R1234yf | Mass % | 47.4 | 55.8 | 57.6 | 56.2 | 54.1 | 47.9 |
| GWP | — | 2 | 36 | 70 | 100 | 125 | 188 |
| COP Ratio | % (relative to R410A) | 100.5 | 100.9 | 100.9 | 100.8 | 100.7 | 100.4 |
| Refrigerating Capacity Ratio | % (relative to R410A) | 77.1 | 74.8 | 75.6 | 77.8 | 80.0 | 85.5 |

TABLE 121

| Item | Unit | Example 23 O | Example 24 | Example 25 P | Example 26 S |
|---|---|---|---|---|---|
| HFO-1132(E) | Mass % | 22.6 | 21.2 | 20.5 | 21.9 |
| R32 | Mass % | 36.8 | 44.2 | 51.7 | 39.7 |
| R1234yf | Mass % | 40.6 | 34.6 | 27.8 | 38.4 |
| GWP | — | 250 | 300 | 350 | 270 |
| COP Ratio | % (relative to R410A) | 100.4 | 100.5 | 100.6 | 100.4 |
| Refrigerating Capacity Ratio | % (relative to R410A) | 91.0 | 95.0 | 99.1 | 92.5 |

TABLE 122

| Item | Unit | Comparative Example 15 | Comparative Example 16 | Comparative Example 17 | Comparative Example 18 | Example 27 | Example 28 | Comparative Example 19 | Comparative Example 20 |
|---|---|---|---|---|---|---|---|---|---|
| HFO-1132(E) | Mass % | 10.0 | 20.0 | 30.0 | 40.0 | 50.0 | 60.0 | 70.0 | 80.0 |
| R32 | Mass % | 5.0 | 5.0 | 5.0 | 5.0 | 5.0 | 5.0 | 5.0 | 5.0 |
| R1234yf | Mass % | 85.0 | 75.0 | 65.0 | 55.0 | 45.0 | 35.0 | 25.0 | 15.0 |
| GWP | — | 37 | 37 | 37 | 36 | 36 | 36 | 35 | 35 |
| COP Ratio | % (relative to R410A) | 103.4 | 102.6 | 101.6 | 100.8 | 100.2 | 99.8 | 99.6 | 99.4 |
| Refrigerating Capacity Ratio | % (relative to R410A) | 56.4 | 63.3 | 69.5 | 75.2 | 80.5 | 85.4 | 90.1 | 94.4 |

TABLE 123

| Item | Unit | Comparative Example 21 | Comparative Example 22 | Example 29 | Comparative Example 23 | Example 30 | Comparative Example 24 | Comparative Example 25 | Comparative Example 26 |
|---|---|---|---|---|---|---|---|---|---|
| HFO-1132(E) | Mass % | 10.0 | 20.0 | 30.0 | 40.0 | 50.0 | 60.0 | 70.0 | 80.0 |
| R32 | Mass % | 10.0 | 10.0 | 10.0 | 10.0 | 10.0 | 10.0 | 10.0 | 10.0 |
| R1234yf | Mass % | 80.0 | 70.0 | 60.0 | 50.0 | 40.0 | 30.0 | 20.0 | 10.0 |
| GWP | — | 71 | 71 | 70 | 70 | 70 | 69 | 69 | 69 |
| COP Ratio | % (relative to R410A) | 103.1 | 102.1 | 101.1 | 100.4 | 99.8 | 99.5 | 99.2 | 99.1 |
| Refrigerating Capacity Ratio | % (relative to R410A) | 61.8 | 68.3 | 74.3 | 79.7 | 84.9 | 89.7 | 94.2 | 98.4 |

TABLE 124

| Item | Unit | Comparative Example 27 | Example 31 | Comparative Example 28 | Example 32 | Example 33 | Comparative Example 29 | Comparative Example 30 | Comparative Example 31 |
|---|---|---|---|---|---|---|---|---|---|
| HFO-1132(E) | Mass % | 10.0 | 20.0 | 30.0 | 40.0 | 50.0 | 60.0 | 70.0 | 80.0 |
| R32 | Mass % | 15.0 | 15.0 | 15.0 | 15.0 | 15.0 | 15.0 | 15.0 | 15.0 |
| R1234yf | Mass % | 75.0 | 65.0 | 55.0 | 45.0 | 35.0 | 25.0 | 15.0 | 5.0 |
| GWP | — | 104 | 104 | 104 | 103 | 103 | 103 | 103 | 102 |
| COP Ratio | % (relative to R410A) | 102.7 | 101.6 | 100.7 | 100.0 | 99.5 | 99.2 | 99.0 | 98.9 |
| Refrigerating Capacity Ratio | % (relative to R410A) | 66.6 | 72.9 | 78.6 | 84.0 | 89.0 | 93.7 | 98.1 | 102.2 |

TABLE 125

| Item | Unit | Comparative Example 32 | Comparative Example 33 | Comparative Example 34 | Comparative Example 35 | Comparative Example 36 | Comparative Example 37 | Comparative Example 38 | Comparative Example 39 |
|---|---|---|---|---|---|---|---|---|---|
| HFO-1132(E) | Mass % | 10.0 | 20.0 | 30.0 | 40.0 | 50.0 | 60.0 | 70.0 | 10.0 |
| R32 | Mass % | 20.0 | 20.0 | 20.0 | 20.0 | 20.0 | 20.0 | 20.0 | 25.0 |
| R1234yf | Mass % | 70.0 | 60.0 | 50.0 | 40.0 | 30.0 | 20.0 | 10.0 | 65.0 |
| GWP | — | 138 | 138 | 137 | 137 | 137 | 136 | 136 | 171 |
| COP Ratio | % (relative to R410A) | 102.3 | 101.2 | 100.4 | 99.7 | 99.3 | 99.0 | 98.8 | 101.9 |
| Refrigerating Capacity Ratio | % (relative to R410A) | 71.0 | 77.1 | 82.7 | 88.0 | 92.9 | 97.5 | 101.7 | 75.0 |

TABLE 126

| Item | Unit | Example 34 | Comparative Example 40 | Comparative Example 41 | Comparative Example 42 | Comparative Example 43 | Comparative Example 44 | Comparative Example 45 | Example 35 |
|---|---|---|---|---|---|---|---|---|---|
| HFO-1132(E) | Mass % | 20.0 | 30.0 | 40.0 | 50.0 | 60.0 | 70.0 | 10.0 | 20.0 |
| R32 | Mass % | 25.0 | 25.0 | 25.0 | 25.0 | 25.0 | 25.0 | 30.0 | 30.0 |
| R1234yf | Mass % | 55.0 | 45.0 | 35.0 | 25.0 | 15.0 | 5.0 | 60.0 | 50.0 |
| GWP | — | 171 | 171 | 171 | 170 | 170 | 170 | 205 | 205 |
| COP Ratio | % (relative to R410A) | 100.9 | 100.1 | 99.6 | 99.2 | 98.9 | 98.7 | 101.6 | 100.7 |
| Refrigerating Capacity Ratio | % (relative to R410A) | 81.0 | 86.6 | 91.7 | 96.5 | 101.0 | 105.2 | 78.9 | 84.8 |

TABLE 127

| Item | Unit | Comparative Example 46 | Comparative Example 47 | Comparative Example 48 | Comparative Example 49 | Example 36 | Example 37 | Example 38 | Comparative Example 50 |
|---|---|---|---|---|---|---|---|---|---|
| HFO-1132(E) | Mass % | 30.0 | 40.0 | 50.0 | 60.0 | 10.0 | 20.0 | 30.0 | 40.0 |
| R32 | Mass % | 30.0 | 30.0 | 30.0 | 30.0 | 35.0 | 35.0 | 35.0 | 35.0 |
| R1234yf | Mass % | 40.0 | 30.0 | 20.0 | 10.0 | 55.0 | 45.0 | 35.0 | 25.0 |
| GWP | — | 204 | 204 | 204 | 204 | 239 | 238 | 238 | 238 |
| COP Ratio | % (relative to R410A) | 100.0 | 99.5 | 99.1 | 98.8 | 101.4 | 100.6 | 99.9 | 99.4 |
| Refrigerating Capacity Ratio | % (relative to R410A) | 90.2 | 95.3 | 100.0 | 104.4 | 82.5 | 88.3 | 93.7 | 98.6 |

TABLE 128

| Item | Unit | Comparative Example 51 | Comparative Example 52 | Comparative Example 53 | Comparative Example 54 | Example 39 | Comparative Example 55 | Comparative Example 56 | Comparative Example 57 |
|---|---|---|---|---|---|---|---|---|---|
| HFO-1132(E) | Mass % | 50.0 | 60.0 | 10.0 | 20.0 | 30.0 | 40.0 | 50.0 | 10.0 |
| R32 | Mass % | 35.0 | 35.0 | 40.0 | 40.0 | 40.0 | 40.0 | 40.0 | 45.0 |

TABLE 128-continued

| Item | Unit | Comparative Example 51 | Comparative Example 52 | Comparative Example 53 | Comparative Example 54 | Example 39 | Comparative Example 55 | Comparative Example 56 | Comparative Example 57 |
|---|---|---|---|---|---|---|---|---|---|
| R1234yf | Mass % | 15.0 | 5.0 | 50.0 | 40.0 | 30.0 | 20.0 | 10.0 | 45.0 |
| GWP | — | 237 | 237 | 272 | 272 | 272 | 271 | 271 | 306 |
| COP Ratio | % (relative to R410A) | 99.0 | 98.8 | 101.3 | 100.6 | 99.9 | 99.4 | 99.0 | 101.3 |
| Refrigerating Capacity Ratio | % (relative to R410A) | 103.2 | 107.5 | 86.0 | 91.7 | 96.9 | 101.8 | 106.3 | 89.3 |

TABLE 129

| Item | Unit | Example 40 | Example 41 | Comparative Example 58 | Comparative Example 59 | Comparative Example 60 | Example 42 | Comparative Example 61 | Comparative Example 62 |
|---|---|---|---|---|---|---|---|---|---|
| HFO-1132(E) | Mass % | 20.0 | 30.0 | 40.0 | 50.0 | 10.0 | 20.0 | 30.0 | 40.0 |
| R32 | Mass % | 45.0 | 45.0 | 45.0 | 45.0 | 50.0 | 50.0 | 50.0 | 50.0 |
| R1234yf | Mass % | 35.0 | 25.0 | 15.0 | 5.0 | 40.0 | 30.0 | 20.0 | 10.0 |
| GWP | — | 305 | 305 | 305 | 304 | 339 | 339 | 339 | 338 |
| COP Ratio | % (relative to R410A) | 100.6 | 100.0 | 99.5 | 99.1 | 101.3 | 100.6 | 100.0 | 99.5 |
| Refrigerating Capacity Ratio | % (relative to R410A) | 94.9 | 100.0 | 104.7 | 109.2 | 92.4 | 97.8 | 102.9 | 107.5 |

TABLE 130

| Item | Unit | Comparative Example 63 | Comparative Example 64 | Comparative Example 65 | Comparative Example 66 | Example 43 | Example 44 | Example 45 | Example 46 |
|---|---|---|---|---|---|---|---|---|---|
| HFO-1132(E) | Mass % | 10.0 | 20.0 | 30.0 | 40.0 | 56.0 | 59.0 | 62.0 | 65.0 |
| R32 | Mass % | 55.0 | 55.0 | 55.0 | 55.0 | 3.0 | 3.0 | 3.0 | 3.0 |
| R1234yf | Mass % | 35.0 | 25.0 | 15.0 | 5.0 | 41.0 | 38.0 | 35.0 | 32.0 |
| GWP | — | 373 | 372 | 372 | 372 | 22 | 22 | 22 | 22 |
| COP Ratio | % (relative to R410A) | 101.4 | 100.7 | 100.1 | 99.6 | 100.1 | 100.0 | 99.9 | 99.8 |
| Refrigerating Capacity Ratio | % (relative to R410A) | 95.3 | 100.6 | 105.6 | 110.2 | 81.7 | 83.2 | 84.6 | 86.0 |

TABLE 131

| Item | Unit | Example 47 | Example 48 | Example 49 | Example 50 | Example 51 | Example 52 | Example 53 | Example 54 |
|---|---|---|---|---|---|---|---|---|---|
| HFO-1132(E) | Mass % | 49.0 | 52.0 | 55.0 | 58.0 | 61.0 | 43.0 | 46.0 | 49.0 |
| R32 | Mass % | 6.0 | 6.0 | 6.0 | 6.0 | 6.0 | 9.0 | 9.0 | 9.0 |
| R1234yf | Mass % | 45.0 | 42.0 | 39.0 | 36.0 | 33.0 | 48.0 | 45.0 | 42.0 |
| GWP | — | 43 | 43 | 43 | 43 | 42 | 63 | 63 | 63 |
| COP Ratio | % (relative to R410A) | 100.2 | 100.0 | 99.9 | 99.8 | 99.7 | 100.3 | 100.1 | 99.9 |
| Refrigerating Capacity Ratio | % (relative to R410A) | 80.9 | 82.4 | 83.9 | 85.4 | 86.8 | 80.4 | 82.0 | 83.5 |

TABLE 132

| Item | Unit | Example 55 | Example 56 | Example 57 | Example 58 | Example 59 | Example 60 | Example 61 | Example 62 |
|---|---|---|---|---|---|---|---|---|---|
| HFO-1132(E) | Mass % | 52.0 | 55.0 | 58.0 | 38.0 | 41.0 | 44.0 | 47.0 | 50.0 |
| R32 | Mass % | 9.0 | 9.0 | 9.0 | 12.0 | 12.0 | 12.0 | 12.0 | 12.0 |
| R1234yf | Mass % | 39.0 | 36.0 | 33.0 | 50.0 | 47.0 | 44.0 | 41.0 | 38.0 |
| GWP | — | 63 | 63 | 63 | 83 | 83 | 83 | 83 | 83 |

TABLE 132-continued

| Item | Unit | Example 55 | Example 56 | Example 57 | Example 58 | Example 59 | Example 60 | Example 61 | Example 62 |
|---|---|---|---|---|---|---|---|---|---|
| COP Ratio | % (relative to R410A) | 99.8 | 99.7 | 99.6 | 100.3 | 100.1 | 100.0 | 99.8 | 99.7 |
| Refrigerating Capacity Ratio | % (relative to R410A) | 85.0 | 86.5 | 87.9 | 80.4 | 82.0 | 83.5 | 85.1 | 86.6 |

TABLE 133

| Item | Unit | Example 63 | Example 64 | Example 65 | Example 66 | Example 67 | Example 68 | Example 69 | Example 70 |
|---|---|---|---|---|---|---|---|---|---|
| HFO-1132(E) | Mass % | 53.0 | 33.0 | 36.0 | 39.0 | 42.0 | 45.0 | 48.0 | 51.0 |
| R32 | Mass % | 12.0 | 15.0 | 15.0 | 15.0 | 15.0 | 15.0 | 15.0 | 15.0 |
| R1234yf | Mass % | 35.0 | 52.0 | 49.0 | 46.0 | 43.0 | 40.0 | 37.0 | 34.0 |
| GWP | — | 83 | 104 | 104 | 103 | 103 | 103 | 103 | 103 |
| COP Ratio | % (relative to R410A) | 99.6 | 100.5 | 100.3 | 100.1 | 99.9 | 99.7 | 99.6 | 99.5 |
| Refrigerating Capacity Ratio | % (relative to R410A) | 88.0 | 80.3 | 81.9 | 83.5 | 85.0 | 86.5 | 88.0 | 89.5 |

TABLE 134

| Item | Unit | Example 71 | Example 72 | Example 73 | Example 74 | Example 75 | Example 76 | Example 77 | Example 78 |
|---|---|---|---|---|---|---|---|---|---|
| HFO-1132(E) | Mass % | 29.0 | 32.0 | 35.0 | 38.0 | 41.0 | 44.0 | 47.0 | 36.0 |
| R32 | Mass % | 18.0 | 18.0 | 18.0 | 18.0 | 18.0 | 18.0 | 18.0 | 3.0 |
| R1234yf | Mass % | 53.0 | 50.0 | 47.0 | 44.0 | 41.0 | 38.0 | 35.0 | 61.0 |
| GWP | — | 124 | 124 | 124 | 124 | 124 | 123 | 123 | 23 |
| COP Ratio | % (relative to R410A) | 100.6 | 100.3 | 100.1 | 99.9 | 99.8 | 99.6 | 99.5 | 101.3 |
| Refrigerating Capacity Ratio | % (relative to R410A) | 80.6 | 82.2 | 83.8 | 85.4 | 86.9 | 88.4 | 89.9 | 71.0 |

TABLE 135

| Item | Unit | Example 79 | Example 80 | Example 81 | Example 82 | Example 83 | Example 84 | Example 85 | Example 86 |
|---|---|---|---|---|---|---|---|---|---|
| HFO-1132(E) | Mass % | 39.0 | 42.0 | 30.0 | 33.0 | 36.0 | 26.0 | 29.0 | 32.0 |
| R32 | Mass % | 3.0 | 3.0 | 6.0 | 6.0 | 6.0 | 9.0 | 9.0 | 9.0 |
| R1234yf | Mass % | 58.0 | 55.0 | 64.0 | 61.0 | 58.0 | 65.0 | 62.0 | 59.0 |
| GWP | — | 23 | 23 | 43 | 43 | 43 | 64 | 64 | 63 |
| COP Ratio | % (relative to R410A) | 101.1 | 100.9 | 101.5 | 101.3 | 101.0 | 101.6 | 101.3 | 101.1 |
| Refrigerating Capacity Ratio | % (relative to R410A) | 72.7 | 74.4 | 70.5 | 72.2 | 73.9 | 71.0 | 72.8 | 74.5 |

TABLE 136

| Item | Unit | Example 87 | Example 88 | Example 89 | Example 90 | Example 91 | Example 92 | Example 93 | Example 94 |
|---|---|---|---|---|---|---|---|---|---|
| HFO-1132(E) | Mass % | 21.0 | 24.0 | 27.0 | 30.0 | 16.0 | 19.0 | 22.0 | 25.0 |
| R32 | Mass % | 12.0 | 12.0 | 12.0 | 12.0 | 15.0 | 15.0 | 15.0 | 15.0 |
| R1234yf | Mass % | 67.0 | 64.0 | 61.0 | 58.0 | 69.0 | 66.0 | 63.0 | 60.0 |
| GWP | — | 84 | 84 | 84 | 84 | 104 | 104 | 104 | 104 |
| COP Ratio | % (relative to R410A) | 101.8 | 101.5 | 101.2 | 101.0 | 102.1 | 101.8 | 101.4 | 101.2 |

TABLE 136-continued

| Item | Unit | Example 87 | Example 88 | Example 89 | Example 90 | Example 91 | Example 92 | Example 93 | Example 94 |
|---|---|---|---|---|---|---|---|---|---|
| Refrigerating Capacity Ratio | % (relative to R410A) | 70.8 | 72.6 | 74.3 | 76.0 | 70.4 | 72.3 | 74.0 | 75.8 |

TABLE 137

| Item | Unit | Example 95 | Example 96 | Example 97 | Example 98 | Example 99 | Example 100 | Example 101 | Example 102 |
|---|---|---|---|---|---|---|---|---|---|
| HFO-1132(E) | Mass % | 28.0 | 12.0 | 15.0 | 18.0 | 21.0 | 24.0 | 27.0 | 25.0 |
| R32 | Mass % | 15.0 | 18.0 | 18.0 | 18.0 | 18.0 | 18.0 | 18.0 | 21.0 |
| R1234yf | Mass % | 57.0 | 70.0 | 67.0 | 64.0 | 61.0 | 58.0 | 55.0 | 54.0 |
| GWP | — | 104 | 124 | 124 | 124 | 124 | 124 | 124 | 144 |
| COP Ratio | % (relative to R410A) | 100.9 | 102.2 | 101.9 | 101.6 | 101.3 | 101.0 | 100.7 | 100.7 |
| Refrigerating Capacity Ratio | % (relative to R410A) | 77.5 | 70.5 | 72.4 | 74.2 | 76.0 | 77.7 | 79.4 | 80.7 |

TABLE 138

| Item | Unit | Example 103 | Example 104 | Example 105 | Example 106 | Example 107 | Example 108 | Example 109 | Example 110 |
|---|---|---|---|---|---|---|---|---|---|
| HFO-1132(E) | Mass % | 21.0 | 24.0 | 17.0 | 20.0 | 23.0 | 13.0 | 16.0 | 19.0 |
| R32 | Mass % | 24.0 | 24.0 | 27.0 | 27.0 | 27.0 | 30.0 | 30.0 | 30.0 |
| R1234yf | Mass % | 55.0 | 52.0 | 56.0 | 53.0 | 50.0 | 57.0 | 54.0 | 51.0 |
| GWP | — | 164 | 164 | 185 | 185 | 184 | 205 | 205 | 205 |
| COP Ratio | % (relative to R410A) | 100.9 | 100.6 | 101.1 | 100.8 | 100.6 | 101.3 | 101.0 | 100.8 |
| Refrigerating Capacity Ratio | % (relative to R410A) | 80.8 | 82.5 | 80.8 | 82.5 | 84.2 | 80.7 | 82.5 | 84.2 |

TABLE 139

| Item | Unit | Example 111 | Example 112 | Example 113 | Example 114 | Example 115 | Example 116 | Example 117 | Example 118 |
|---|---|---|---|---|---|---|---|---|---|
| HFO-1132(E) | Mass % | 22.0 | 9.0 | 12.0 | 15.0 | 18.0 | 21.0 | 8.0 | 12.0 |
| R32 | Mass % | 30.0 | 33.0 | 33.0 | 33.0 | 33.0 | 33.0 | 36.0 | 36.0 |
| R1234yf | Mass % | 48.0 | 58.0 | 55.0 | 52.0 | 49.0 | 46.0 | 56.0 | 52.0 |
| GWP | — | 205 | 225 | 225 | 225 | 225 | 225 | 245 | 245 |
| COP Ratio | % (relative to R410A) | 100.5 | 101.6 | 101.3 | 101.0 | 100.8 | 100.5 | 101.6 | 101.2 |
| Refrigerating Capacity Ratio | % (relative to R410A) | 85.9 | 80.5 | 82.3 | 84.1 | 85.8 | 87.5 | 82.0 | 84.4 |

TABLE 140

| Item | Unit | Example 119 | Example 120 | Example 121 | Example 122 | Example 123 | Example 124 | Example 125 | Example 126 |
|---|---|---|---|---|---|---|---|---|---|
| HFO-1132(E) | Mass % | 15.0 | 18.0 | 21.0 | 42.0 | 39.0 | 34.0 | 37.0 | 30.0 |
| R32 | Mass % | 36.0 | 36.0 | 36.0 | 25.0 | 28.0 | 31.0 | 31.0 | 34.0 |
| R1234yf | Mass % | 49.0 | 46.0 | 43.0 | 33.0 | 33.0 | 35.0 | 32.0 | 36.0 |
| GWP | — | 245 | 245 | 245 | 170 | 191 | 211 | 211 | 231 |
| COP Ratio | % (relative to R410A) | 101.0 | 100.7 | 100.5 | 99.5 | 99.5 | 99.8 | 99.6 | 99.9 |
| Refrigerating Capacity Ratio | % (relative to R410A) | 86.2 | 87.9 | 89.6 | 92.7 | 93.4 | 93.0 | 94.5 | 93.0 |

TABLE 141

| Item | Unit | Example 127 | Example 128 | Example 129 | Example 130 | Example 131 | Example 132 | Example 133 | Example 134 |
|---|---|---|---|---|---|---|---|---|---|
| HFO-1132(E) | Mass % | 33.0 | 36.0 | 24.0 | 27.0 | 30.0 | 33.0 | 23.0 | 26.0 |
| R32 | Mass % | 34.0 | 34.0 | 37.0 | 37.0 | 37.0 | 37.0 | 40.0 | 40.0 |
| R1234yf | Mass % | 33.0 | 30.0 | 39.0 | 36.0 | 33.0 | 30.0 | 37.0 | 34.0 |
| GWP | — | 231 | 231 | 252 | 251 | 251 | 251 | 272 | 272 |
| COP Ratio | % (relative to R410A) | 99.8 | 99.6 | 100.3 | 100.1 | 99.9 | 99.8 | 100.4 | 100.2 |
| Refrigerating Capacity Ratio | % (relative to R410A) | 94.5 | 96.0 | 91.9 | 93.4 | 95.0 | 96.5 | 93.3 | 94.9 |

TABLE 142

| Item | Unit | Example 135 | Example 136 | Example 137 | Example 138 | Example 139 | Example 140 | Example 141 | Example 142 |
|---|---|---|---|---|---|---|---|---|---|
| HFO-1132(E) | Mass % | 29.0 | 32.0 | 19.0 | 22.0 | 25.0 | 28.0 | 31.0 | 18.0 |
| R32 | Mass % | 40.0 | 40.0 | 43.0 | 43.0 | 43.0 | 43.0 | 43.0 | 46.0 |
| R1234yf | Mass % | 31.0 | 28.0 | 38.0 | 35.0 | 32.0 | 29.0 | 26.0 | 36.0 |
| GWP | — | 272 | 271 | 292 | 292 | 292 | 292 | 292 | 312 |
| COP Ratio | % (relative to R410A) | 100.0 | 99.8 | 100.6 | 100.4 | 100.2 | 100.1 | 99.9 | 100.7 |
| Refrigerating Capacity Ratio | % (relative to R410A) | 96.4 | 97.9 | 93.1 | 94.7 | 96.2 | 97.8 | 99.3 | 94.4 |

TABLE 143

| Item | Unit | Example 143 | Example 144 | Example 145 | Example 146 | Example 147 | Example 148 | Example 149 | Example 150 |
|---|---|---|---|---|---|---|---|---|---|
| HFO-1132(E) | Mass % | 21.0 | 23.0 | 26.0 | 29.0 | 13.0 | 16.0 | 19.0 | 22.0 |
| R32 | Mass % | 46.0 | 46.0 | 46.0 | 46.0 | 49.0 | 49.0 | 49.0 | 49.0 |
| R1234yf | Mass % | 33.0 | 31.0 | 28.0 | 25.0 | 38.0 | 35.0 | 32.0 | 29.0 |
| GWP | — | 312 | 312 | 312 | 312 | 332 | 332 | 332 | 332 |
| COP Ratio | % (relative to R410A) | 100.5 | 100.4 | 100.2 | 100.0 | 101.1 | 100.9 | 100.7 | 100.5 |
| Refrigerating Capacity Ratio | % (relative to R410A) | 96.0 | 97.0 | 98.6 | 100.1 | 93.5 | 95.1 | 96.7 | 98.3 |

TABLE 144

| Item | Unit | Example 151 | Example 152 |
|---|---|---|---|
| HFO-1132(E) | Mass % | 25.0 | 28.0 |
| R32 | Mass % | 49.0 | 49.0 |
| R1234yf | Mass % | 26.0 | 23.0 |
| GWP | — | 332 | 332 |
| COP Ratio | % (relative to R410A) | 100.3 | 100.1 |
| Refrigerating Capacity Ratio | % (relative to R410A) | 99.8 | 101.3 |

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:
point I (72.0, 0.0, 28.0),
point J (48.5, 18.3, 33.2),
point N (27.7, 18.2, 54.1), and
point E (58.3, 0.0, 41.7),
or on these line segments (excluding the points on the line segment EI),
the line segment IJ is represented by coordinates $(0.0236y^2-1.7616y+72.0, y, -0.0236y^2+0.7616y+28.0)$,
the line segment NE is represented by coordinates $(0.012y^2-1.9003y+58.3, y, -0.012y^2+0.9003y+41.7)$, and
the line segments JN and EI are straight lines, the refrigerant D has a refrigerating capacity ratio of 80% or more relative to R410A, a GWP of 125 or less, and a WCF lower flammability.

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments MM', M'N, NV, VG, and GM that connect the following 5 points:
point M (52.6, 0.0, 47.4),
point M' (39.2, 5.0, 55.8),
point N (27.7, 18.2, 54.1),
point V (11.0, 18.1, 70.9), and
point G (39.6, 0.0, 60.4),
or on these line segments (excluding the points on the line segment GM),
the line segment MM' is represented by coordinates $(0.132y^2-3.34y+52.6, y, -0.132y^2+2.34y+47.4)$, the line segment M'N is represented by coordinates $(0.0596y^2-2.2541y+48.98, y, -0.0596y^2+1.2541y+51.02)$, the line segment VG is represented by coordinates $(0.0123y^2-1.8033y+39.6, y, -0.0123y^2+0.8033y+60.4)$, and the line segments NV and GM are straight lines, the refrigerant D according to the present disclosure has a refrigerating capacity ratio of 70% or more relative to R410A, a GWP of 125 or less, and an ASHRAE lower flammability.

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments ON, NU, and UO that connect the following 3 points:
point O (22.6, 36.8, 40.6),
point N (27.7, 18.2, 54.1), and
point U (3.9, 36.7, 59.4),
or on these line segments, the line segment ON is represented by coordinates $(0.0072y^2-0.6701y+37.512, y, -0.0072y^2-0.3299y+62.488)$, the line segment NU is represented by coordinates $(0.0083y^2-1.7403y+56.635, y, -0.0083y^2+0.7403y+43.365)$, and the line segment UO is a straight line, the refrigerant D according to the present disclosure has a refrigerating capacity ratio of 80% or more relative to R410A, a GWP of 250 or less, and an ASHRAE lower flammability.

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:
point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments, the line segment QR is represented by coordinates $(0.0099y^2-1.975y+84.765, y, -0.0099y^2+0.975y+15.235)$, the line segment RT is represented by coordinates $(0.0082y^2-1.8683y+83.126, y, -0.0082y^2+0.8683y+16.874)$, the line segment LK is represented by coordinates $(0.0049y^2-0.8842y+61.488, y, -0.0049y^2-0.1158y+38.512)$, the line segment KQ is represented by coordinates $(0.0095y^2-1.2222y+67.676, y, -0.0095y^2+0.2222y+32.324)$, and the line segment TL is a straight line, the refrigerant D according to the present disclosure has a refrigerating capacity ratio of 92.5% or more relative to R410A, a GWP of 350 or less, and a WCF lower flammability.

The results further indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments PS, ST, and TP that connect the following 3 points:
point P (20.5, 51.7, 27.8),
point S (21.9, 39.7, 38.4), and
point T (8.6, 51.6, 39.8),
or on these line segments, the line segment PS is represented by coordinates $(0.0064y^2-0.7103y+40.1, y, -0.0064y^2-0.2897y+59.9)$, the line segment ST is represented by coordinates $(0.0082y^2-1.8683y+83.126, y, -0.0082y^2+0.8683y+16.874)$, and the line segment TP is a straight line, the refrigerant D according to the present disclosure has a refrigerating capacity ratio of 92.5% or more relative to R410A, a GWP of 350 or less, and an ASHRAE lower flammability.

(5-5) Refrigerant E

The refrigerant E according to the present disclosure is a mixed refrigerant comprising trans-1,2-difluoroethylene (HFO-1132(E)), trifluoroethylene (HFO-1123), and difluoromethane (R32).

The refrigerant E according to the present disclosure has various properties that are desirable as an R410A-alternative refrigerant, i.e., a coefficient of performance equivalent to that of R410A and a sufficiently low GWP.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments IK, KB', B'H, HR, RG, and GI that connect the following 6 points:
point I (72.0, 28.0, 0.0),
point K (48.4, 33.2, 18.4),
point B' (0.0, 81.6, 18.4),
point H (0.0, 84.2, 15.8),
point R (23.1, 67.4, 9.5), and
point G (38.5, 61.5, 0.0),
or on these line segments (excluding the points on the line segments B'H and GI);

the line segment IK is represented by coordinates $(0.025z^2-1.7429z+72.00, -0.025z^2+0.7429z+28.0, z)$, the line segment HR is represented by coordinates $(-0.3123z^2+4.234z+11.06, 0.3123z^2-5.234z+88.94, z)$, the line segment RG is represented by coordinates $(-0.0491z^2-1.1544z+38.5, 0.0491z^2+0.1544z+61.5, z)$, and the line segments KB' and GI are straight lines. When the requirements above are satisfied, the refrigerant according to the present disclosure has WCF lower flammability, a COP ratio of 93% or more relative to that of R410A, and a GWP of 125 or less.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132 (E), HFO-1123, and R32 is 100 mass % are within the range of a figure surrounded by line segments J, JR, RG, and GI that connect the following 4 points:
point I (72.0, 28.0, 0.0),
point J (57.7, 32.8, 9.5),
point R (23.1, 67.4, 9.5), and
point G (38.5, 61.5, 0.0),
or on these line segments (excluding the points on the line segment GI);

the line segment IJ is represented by coordinates $(0.025z^2-1.7429z+72.0, -0.025z^2+0.7429z+28.0, z)$, the line segment RG is represented by coordinates $(-0.0491z^2-1.1544z+38.5, 0.0491z^2+0.1544z+61.5, z)$, and the line segments JR and GI are straight lines. When the requirements above are satisfied, the refrigerant according to the present disclosure has WCF lower flammability, a COP ratio of 93% or more relative to that of R410A, and a GWP of 125 or less.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132 (E), HFO-1123, and R32 is 100 mass % are within the range of a figure surrounded by line segments MP, PB', B'H, HR, RG, and GM that connect the following 6 points:
point M (47.1, 52.9, 0.0),
point P (31.8, 49.8, 18.4),
point B' (0.0, 81.6, 18.4),
point H (0.0, 84.2, 15.8),
point R (23.1, 67.4, 9.5), and
point G (38.5, 61.5, 0.0),
or on these line segments (excluding the points on the line segments B'H and GM);
the line segment MP is represented by coordinates $(0.0083z^2−0.984z+47.1, −0.0083z^2−0.016z+52.9, z)$,
the line segment HR is represented by coordinates $(−0.3123z^2+4.234z+11.06, 0.3123z^2−5.234z+88.94, z)$,
the line segment RG is represented by coordinates $(−0.0491z^2−1.1544z+38.5, 0.0491z^2+0.1544z+61.5, z)$, and
the line segments PB' and GM are straight lines. When the requirements above are satisfied, the refrigerant according to the present disclosure has ASHRAE lower flammability, a COP ratio of 93% or more relative to that of R410A, and a GWP of 125 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments MN, NR, RG, and GM that connect the following 4 points:
point M (47.1, 52.9, 0.0),
point N (38.5, 52.1, 9.5),
point R (23.1, 67.4, 9.5), and
point G (38.5, 61.5, 0.0),
or on these line segments (excluding the points on the line segment GM);
the line segment MN is represented by coordinates $(0.0083z^2−0.984z+47.1, −0.0083z^2−0.016z+52.9, z)$,
the line segment RG is represented by coordinates $(−0.0491z^2−1.1544z+38.5, 0.0491z^2+0.1544z+61.5, z)$,
the line segments NR and GM are straight lines. When the requirements above are satisfied, the refrigerant according to the present disclosure has ASHRAE lower flammability, a COP ratio of 93% or more relative to that of R410A, and a GWP of 65 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments PS, ST, and TP that connect the following 3 points:
point P (31.8, 49.8, 18.4),
point S (25.4, 56.2, 18.4), and
point T (34.8, 51.0, 14.2),
or on these line segments;
the line segment ST is represented by coordinates $(−0.0982z^2+0.9622z+40.931, 0.0982z^2−1.9622z+59.069, z)$,
the line segment TP is represented by coordinates $(0.0083z^2−0.984z+47.1, −0.0083z^2−0.016z+52.9, z)$, and
the line segment PS is a straight line. When the requirements above are satisfied, the refrigerant according to the present disclosure has ASHRAE lower flammability, a COP ratio of 94.5% or more relative to that of R410A, and a GWP of 125 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments QB", B"D, DU, and UQ that connect the following 4 points:
point Q (28.6, 34.4, 37.0),
point B" (0.0, 63.0, 37.0),
point D (0.0, 67.0, 33.0), and
point U (28.7, 41.2, 30.1),
or on these line segments (excluding the points on the line segment B"D);
the line segment DU is represented by coordinates $(−3.4962z^2+210.71z−3146.1, 3.4962z^2−211.71z+3246.1, z)$,
the line segment UQ is represented by coordinates $(0.0135z^2−0.9181z+44.133, −0.0135z^2−0.0819z+55.867, z)$, and
the line segments QB" and B"D are straight lines. When the requirements above are satisfied, the refrigerant according to the present disclosure has ASHRAE lower flammability, a COP ratio of 96% or more relative to that of R410A, and a GWP of 250 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments Oc', c'd', d'e', e'a', and a'O that connect the following 5 points:
point O (100.0, 0.0, 0.0),
point c'(56.7, 43.3, 0.0),
point d' (52.2, 38.3, 9.5),
point e' (41.8, 39.8, 18.4), and
point a' (81.6, 0.0, 18.4), or on the line segments c'd', d'e', and e'a' (excluding the points c' and a');
the line segment c'd' is represented by coordinates $(−0.0297z^2−0.1915z+56.7, 0.0297z^2+1.1915z+43.3, z)$,
the line segment d'e' is represented by coordinates $(−0.0535z^2+0.3229z+53.957, 0.0535z^2+0.6771z+46.043, z)$, and
the line segments Oc', e'a', and a'O are straight lines. When the requirements above are satisfied, the refrigerant according to the present disclosure has a COP ratio of 92.5% or more relative to that of R410A, and a GWP of 125 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments Oc, cd, de, ea', and a'O that connect the following 5 points:
point O (100.0, 0.0, 0.0),
point c (77.7, 22.3, 0.0),
point d (76.3, 14.2, 9.5),
point e (72.2, 9.4, 18.4), and
point a' (81.6, 0.0, 18.4),
or on the line segments cd, de, and ea' (excluding the points c and a');
the line segment cde is represented by coordinates $(-0.017z^2+0.0148z+77.684, 0.017z^2+0.9852z+22.316, z)$, and
the line segments Oc, ea', and a'O are straight lines. When the requirements above are satisfied, the refrigerant according to the present disclosure has a COP ratio of 95% or more relative to that of R410A, and a GWP of 125 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments Oc', c'd', d'a, and aO that connect the following 5 points:
point O (100.0, 0.0, 0.0),
point c'(56.7, 43.3, 0.0),
point d' (52.2, 38.3, 9.5), and
point a (90.5, 0.0, 9.5),
or on the line segments c'd' and d'a (excluding the points c' and a);
the line segment c'd' is represented by coordinates $(-0.0297z^2-0.1915z+56.7, 0.0297z^2+1.1915z+43.3, z)$, and
the line segments Oc', d'a, and aO are straight lines. When the requirements above are satisfied, the refrigerant according to the present disclosure has a COP ratio of 93.5% or more relative to that of R410A, and a GWP of 65 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments Oc, cd, da, and aO that connect the following 4 points:
point O (100.0, 0.0, 0.0),
point c (77.7, 22.3, 0.0),
point d (76.3, 14.2, 9.5), and
point a (90.5, 0.0, 9.5),
or on the line segments cd and da (excluding the points c and a);
the line segment cd is represented by coordinates $(-0.017z^2+0.0148z+77.684, 0.017z^2+0.9852z+22.316, z)$, and
the line segments Oc, da, and aO are straight lines. When the requirements above are satisfied, the refrigerant according to the present disclosure has a COP ratio of 95% or more relative to that of R410A, and a GWP of 65 or less.

The refrigerant E according to the present disclosure may further comprise other additional refrigerants in addition to HFO-1132(E), HFO-1123, and R32, as long as the above properties and effects are not impaired. In this respect, the refrigerant according to the present disclosure preferably comprises HFO-1132(E), HFO-1123, and R32 in a total amount of 99.5 mass % or more, more preferably 99.75 mass % or more, and even more preferably 99.9 mass % or more, based on the entire refrigerant.

Such additional refrigerants are not limited, and can be selected from a wide range of refrigerants. The mixed refrigerant may comprise a single additional refrigerant, or two or more additional refrigerants.

(Examples of Refrigerant E)

The present disclosure is described in more detail below with reference to Examples of refrigerant E. However, the refrigerant E is not limited to the Examples.

Mixed refrigerants were prepared by mixing HFO-1132 (E), HFO-1123, and R32 at mass % based on their sum shown in Tables 145 and 146.

The composition of each mixture was defined as WCF. A leak simulation was performed using National Institute of Science and Technology (NIST) Standard Reference Data Base Refleak Version 4.0 under the conditions for equipment, storage, shipping, leak, and recharge according to the ASHRAE Standard 34-2013. The most flammable fraction was defined as WCFF.

For each mixed refrigerant, the burning velocity was measured according to the ANSI/ASHRAE Standard 34-2013. When the burning velocities of the WCF composition and the WCFF composition are 10 cm/s or less, the flammability of such a refrigerant is classified as Class 2L (lower flammability) in the ASHRAE flammability classification.

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

Tables 145 and 146 show the results.

TABLE 145

| | Item | Unit | I | J | K | L |
|---|---|---|---|---|---|---|
| WCF | HFO-1132(E) | mass % | 72.0 | 57.7 | 48.4 | 35.5 |
| | HFO-1123 | mass % | 28.0 | 32.8 | 33.2 | 27.5 |
| | R32 | mass % | 0.0 | 9.5 | 18.4 | 37.0 |
| Burning velocity (WCF) | | cm/s | 10 | 10 | 10 | 10 |

TABLE 146

| Item | | Unit | M | N | T | P | U | Q |
|---|---|---|---|---|---|---|---|---|
| WCF | HFO-1132(E) | mass % | 47.1 | 38.5 | 34.8 | 31.8 | 28.7 | 28.6 |
| | HFO-1123 | mass % | 52.9 | 52.1 | 51.0 | 49.8 | 41.2 | 34.4 |
| | R32 | mass % | 0.0 | 9.5 | 14.2 | 18.4 | 30.1 | 37.0 |
| Leak condition that results in WCFF | | | Storage, Shipping, −40° C., 92%, release, on the liquid phase side | Storage, Shipping, −40° C., 92%, release, on the liquid phase side | Storage, Shipping, −40° C., 92%, release, on the liquid phase side | Storage, Shipping, −40° C., 92%, release, on the liquid phase side | Storage, Shipping, −40° C., 92%, release, on the liquid phase side | Storage, Shipping, −40° C., 92%, release, on the liquid phase side |
| WCFF | HFO-1132(E) | mass % | 72.0 | 58.9 | 51.5 | 44.6 | 31.4 | 27.1 |
| | HFO-1123 | mass % | 28.0 | 32.4 | 33.1 | 32.6 | 23.2 | 18.3 |
| | R32 | mass % | 0.0 | 8.7 | 15.4 | 22.8 | 45.4 | 54.6 |
| Burning velocity (WCF) | | cm/s | 8 or less | 8 or less | 8 or less | 8 or less | 8 or less | 8 or less |
| Burning velocity (WCFF) | | cm/s | 10 | 10 | 10 | 10 | 10 | 10 |

The results in Table 1 indicate that in a ternary composition diagram of a mixed refrigerant of HFO-1132(E), HFO-1123, and R32 in which their sum is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on or below line segments IK and KL that connect the following 3 points:
point I (72.0, 28.0, 0.0),
point K (48.4, 33.2, 18.4), and
point L (35.5, 27.5, 37.0);
the line segment IK is represented by coordinates $(0.025z^2-1.7429z+72.00, -0.025z^2+0.7429z+28.00, z)$, and
the line segment KL is represented by coordinates $(0.0098z^2-1.238z+67.852, -0.0098z^2+0.238z+32.148, z)$, it can be determined that the refrigerant has WCF lower flammability.

For the points on the line segment IK, an approximate curve $(x=0.025z^2-1.7429z+72.00)$ was obtained from three points, i.e., I (72.0, 28.0, 0.0), J (57.7, 32.8, 9.5), and K (48.4, 33.2, 18.4) by using the least-square method to determine coordinates $(x=0.025z^2-1.7429z+72.00, y=100-z-x=-0.00922z^2+0.2114z+32.443, z)$.

Likewise, for the points on the line segment KL, an approximate curve was determined from three points, i.e., K (48.4, 33.2, 18.4), Example 10 (41.1, 31.2, 27.7), and L (35.5, 27.5, 37.0) by using the least-square method to determine coordinates.

The results in Table 146 indicate that in a ternary composition diagram of a mixed refrigerant of HFO-1132(E), HFO-1123, and R32 in which their sum is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on or below line segments MP and PQ that connect the following 3 points:
point M (47.1, 52.9, 0.0),
point P (31.8, 49.8, 18.4), and
point Q (28.6, 34.4, 37.0),
it can be determined that the refrigerant has ASHRAE lower flammability.

In the above, the line segment MP is represented by coordinates $(0.0083z^2-0.984z+47.1, -0.0083z^2-0.016z+52.9, z)$, and the line segment PQ is represented by coordinates $(0.0135z^2-0.9181z+44.133, -0.0135z^2-0.0819z+55.867, z)$.

For the points on the line segment MP, an approximate curve was obtained from three points, i.e., points M, N, and P, by using the least-square method to determine coordinates. For the points on the line segment PQ, an approximate curve was obtained from three points, i.e., points P, U, and Q, by using the least-square method to determine coordinates.

The GWP of compositions each comprising a mixture of R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in Patent Literature 1). The refrigerating capacity of compositions each comprising R410A and a mixture of HFO-1132(E) and HFO-1123 was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

The COP ratio and the refrigerating capacity (which may be referred to as "cooling capacity" or "capacity") ratio relative to those of R410 of the mixed refrigerants were determined. The conditions for calculation were as described below.

Evaporating temperature: 5° C.

Condensation temperature: 45° C.

Degree of superheating: 5K

Degree of subcooling: 5K

Compressor efficiency: 70%

Tables 147 to 166 show these values together with the GWP of each mixed refrigerant.

TABLE 147

| Item | Unit | Comparative Example 1 | Comparative Example 2 A | Comparative Example 3 B | Comparative Example 4 A' | Comparative Example 5 B' | Comparative Example 6 A'' | Comparative Example 7 B'' |
|---|---|---|---|---|---|---|---|---|
| HFO-1132(E) | mass % | R410A | 90.5 | 0.0 | 81.6 | 0.0 | 63.0 | 0.0 |
| HFO-1123 | mass % | | 0.0 | 90.5 | 0.0 | 81.6 | 0.0 | 63.0 |
| R32 | mass % | | 9.5 | 9.5 | 18.4 | 18.4 | 37.0 | 37.0 |

TABLE 147-continued

| Item | Unit | Comparative Example 1 | Comparative Example 2 A | Comparative Example 3 B | Comparative Example 4 A' | Comparative Example 5 B' | Comparative Example 6 A" | Comparative Example 7 B" |
|---|---|---|---|---|---|---|---|---|
| GWP | — | 2088 | 65 | 65 | 125 | 125 | 250 | 250 |
| COP ratio | % (relative to R410A) | 100 | 99.1 | 92.0 | 98.7 | 93.4 | 98.7 | 96.1 |
| Refrigerating capacity ratio | % (relative to R410A) | 100 | 102.2 | 111.6 | 105.3 | 113.7 | 110.0 | 115.4 |

TABLE 148

| Item | Unit | Comparative Example 8 O | Comparative Example 9 C | Comparative Example 10 | Example 1 U | Example 2 | Comparative Example 11 D |
|---|---|---|---|---|---|---|---|
| HFO-1132(E) | mass % | 100.0 | 50.0 | 41.1 | 28.7 | 15.2 | 0.0 |
| HFO-1123 | mass % | 0.0 | 31.6 | 34.6 | 41.2 | 52.7 | 67.0 |
| R32 | mass % | 0.0 | 18.4 | 24.3 | 30.1 | 32.1 | 33.0 |
| GWP | — | 1 | 125 | 165 | 204 | 217 | 228 |
| COP ratio | % (relative to R410A) | 99.7 | 96.0 | 96.0 | 96.0 | 96.0 | 96.0 |
| Refrigerating capacity ratio | % (relative to R410A) | 98.3 | 109.9 | 111.7 | 113.5 | 114.8 | 115.4 |

TABLE 149

| Item | Unit | Comparative Example 12 E | Comparative Example 13 | Example 3 T | Example 4 S | Comparative Example 14 F |
|---|---|---|---|---|---|---|
| HFO-1132(E) | mass % | 53.4 | 43.4 | 34.8 | 25.4 | 0.0 |
| HFO-1123 | mass % | 46.6 | 47.1 | 51.0 | 56.2 | 74.1 |
| R32 | mass % | 0.0 | 9.5 | 14.2 | 18.4 | 25.9 |
| GWP | — | 1 | 65 | 97 | 125 | 176 |
| COP ratio | % (relative to R410A) | 94.5 | 94.5 | 94.5 | 94.5 | 94.5 |
| Refrigerating capacity ratio | % (relative to R410A) | 105.6 | 109.2 | 110.8 | 112.3 | 114.8 |

TABLE 150

| Item | Unit | Comparative Example 15 G | Example 5 | Example 6 R | Example 7 | Comparative Example 16 H |
|---|---|---|---|---|---|---|
| HFO-1132(E) | mass % | 38.5 | 31.5 | 23.1 | 16.9 | 0.0 |
| HFO-1123 | mass % | 61.5 | 63.5 | 67.4 | 71.1 | 84.2 |
| R32 | mass % | 0.0 | 5.0 | 9.5 | 12.0 | 15.8 |
| GWP | — | 1 | 35 | 65 | 82 | 107 |
| COP ratio | % (relative to R410A) | 93.0 | 93.0 | 93.0 | 93.0 | 93.0 |
| Refrigerating capacity ratio | % (relative to R410A) | 107.0 | 109.1 | 110.9 | 111.9 | 113.2 |

TABLE 151

| Item | Unit | Comparative Example 17 I | Example 8 J | Example 9 K | Comparative Example 18 | Comparative Example 19 L |
|---|---|---|---|---|---|---|
| HFO-1132(E) | mass % | 72.0 | 57.7 | 48.4 | 41.1 | 35.5 |
| HFO-1123 | mass % | 28.0 | 32.8 | 33.2 | 31.2 | 27.5 |
| R32 | mass % | 0.0 | 9.5 | 18.4 | 27.7 | 37.0 |
| GWP | — | 1 | 65 | 125 | 188 | 250 |
| COP ratio | % (relative to R410A) | 96.6 | 95.8 | 95.9 | 96.4 | 97.1 |
| Refrigerating capacity ratio | % (relative to R410A) | 103.1 | 107.4 | 110.1 | 112.1 | 113.2 |

TABLE 152

| Item | Unit | Comparative Example 20 M | Example 10 N | Example 11 P | Example 12 Q |
|---|---|---|---|---|---|
| HFO-1132(E) | mass % | 47.1 | 38.5 | 31.8 | 28.6 |
| HFO-1123 | mass % | 52.9 | 52.1 | 49.8 | 34.4 |
| R32 | mass % | 0.0 | 9.5 | 18.4 | 37.0 |
| GWP | — | 1 | 65 | 125 | 250 |
| COP ratio | % (relative to R410A) | 93.9 | 94.1 | 94.7 | 96.9 |
| Refrigerating capacity ratio | % (relative to R410A) | 106.2 | 109.7 | 112.0 | 114.1 |

TABLE 153

| Item | Unit | Comparative Example 22 | Comparative Example 23 | Comparative Example 24 | Example 14 | Example 15 | Example 16 | Comparative Example 25 | Comparative Example 26 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 85.0 | 75.0 | 65.0 | 55.0 | 45.0 | 35.0 | 25.0 | 15.0 |
| R32 | mass % | 5.0 | 5.0 | 5.0 | 5.0 | 5.0 | 5.0 | 5.0 | 5.0 |
| GWP | — | 35 | 35 | 35 | 35 | 35 | 35 | 35 | 35 |
| COP ratio | % (relative to R410A) | 91.7 | 92.2 | 92.9 | 93.7 | 94.6 | 95.6 | 96.7 | 97.7 |
| Refrigerating capacity ratio | % (relative to R410A) | 110.1 | 109.8 | 109.2 | 108.4 | 107.4 | 106.1 | 104.7 | 103.1 |

TABLE 154

| Item | Unit | Comparative Example 27 | Comparative Example 28 | Comparative Example 29 | Example 17 | Example 18 | Example 19 | Comparative Example 30 | Comparative Example 31 |
|---|---|---|---|---|---|---|---|---|---|
| HFO-1132(E) | mass % | 90.0 | 10.0 | 20.0 | 30.0 | 40.0 | 50.0 | 60.0 | 70.0 |
| HFO-1123 | mass % | 5.0 | 80.0 | 70.0 | 60.0 | 50.0 | 40.0 | 30.0 | 20.0 |
| R32 | mass % | 5.0 | 10.0 | 10.0 | 10.0 | 10.0 | 10.0 | 10.0 | 10.0 |
| GWP | — | 35 | 68 | 68 | 68 | 68 | 68 | 68 | 68 |
| COP ratio | % (relative to R410A) | 98.8 | 92.4 | 92.9 | 93.5 | 94.3 | 95.1 | 96.1 | 97.0 |
| Refrigerating capacity ratio | % (relative to R410A) | 101.4 | 111.7 | 111.3 | 110.6 | 109.6 | 108.5 | 107.2 | 105.7 |

TABLE 155

| Item | Unit | Comparative Example 32 | Example 20 | Example 21 | Example 22 | Example 23 | Example 24 | Comparative Example 33 | Comparative Example 34 |
|---|---|---|---|---|---|---|---|---|---|
| HFO-1132(E) | mass % | 80.0 | 10.0 | 20.0 | 30.0 | 40.0 | 50.0 | 60.0 | 70.0 |
| HFO-1123 | mass % | 10.0 | 75.0 | 65.0 | 55.0 | 45.0 | 35.0 | 25.0 | 15.0 |
| R32 | mass % | 10.0 | 15.0 | 15.0 | 15.0 | 15.0 | 15.0 | 15.0 | 15.0 |
| GWP | — | 68 | 102 | 102 | 102 | 102 | 102 | 102 | 102 |
| COP ratio | % (relative to R410A) | 98.0 | 93.1 | 93.6 | 94.2 | 94.9 | 95.6 | 96.5 | 97.4 |
| Refrigerating capacity ratio | % (relative to R410A) | 104.1 | 112.9 | 112.4 | 111.6 | 110.6 | 109.4 | 108.1 | 106.6 |

TABLE 156

| Item | Unit | Comparative Example 35 | Comparative Example 36 | Comparative Example 37 | Comparative Example 38 | Comparative Example 39 | Comparative Example 40 | Comparative Example 41 | Comparative Example 42 |
|---|---|---|---|---|---|---|---|---|---|
| HFO-1132(E) | mass % | 80.0 | 10.0 | 20.0 | 30.0 | 40.0 | 50.0 | 60.0 | 70.0 |
| HFO-1123 | mass % | 5.0 | 70.0 | 60.0 | 50.0 | 40.0 | 30.0 | 20.0 | 10.0 |
| R32 | mass % | 15.0 | 20.0 | 20.0 | 20.0 | 20.0 | 20.0 | 20.0 | 20.0 |
| GWP | — | 102 | 136 | 136 | 136 | 136 | 136 | 136 | 136 |
| COP ratio | % (relative to R410A) | 98.3 | 93.9 | 94.3 | 94.8 | 95.4 | 96.2 | 97.0 | 97.8 |
| Refrigerating capacity ratio | % (relative to R410A) | 105.0 | 113.8 | 113.2 | 112.4 | 111.4 | 110.2 | 108.8 | 107.3 |

TABLE 157

| Item | Unit | Comparative Example 43 | Comparative Example 44 | Comparative Example 45 | Comparative Example 46 | Comparative Example 47 | Comparative Example 48 | Comparative Example 49 | Comparative Example 50 |
|---|---|---|---|---|---|---|---|---|---|
| HFO-1132(E) | mass % | 10.0 | 20.0 | 30.0 | 40.0 | 50.0 | 60.0 | 70.0 | 10.0 |
| HFO-1123 | mass % | 65.0 | 55.0 | 45.0 | 35.0 | 25.0 | 15.0 | 5.0 | 60.0 |
| R32 | mass % | 25.0 | 25.0 | 25.0 | 25.0 | 25.0 | 25.0 | 25.0 | 30.0 |
| GWP | — | 170 | 170 | 170 | 170 | 170 | 170 | 170 | 203 |
| COP ratio | % (relative to R410A) | 94.6 | 94.9 | 95.4 | 96.0 | 96.7 | 97.4 | 98.2 | 95.3 |
| Refrigerating capacity ratio | % (relative to R410A) | 114.4 | 113.8 | 113.0 | 111.9 | 110.7 | 109.4 | 107.9 | 114.8 |

TABLE 158

| Item | Unit | Comparative Example 51 | Comparative Example 52 | Comparative Example 53 | Comparative Example 54 | Comparative Example 55 | Example 25 | Example 26 | Comparative Example 56 |
|---|---|---|---|---|---|---|---|---|---|
| HFO-1132(E) | mass % | 20.0 | 30.0 | 40.0 | 50.0 | 60.0 | 10.0 | 20.0 | 30.0 |
| HFO-1123 | mass % | 50.0 | 40.0 | 30.0 | 20.0 | 10.0 | 55.0 | 45.0 | 35.0 |
| R32 | mass % | 30.0 | 30.0 | 30.0 | 30.0 | 30.0 | 35.0 | 35.0 | 35.0 |
| GWP | — | 203 | 203 | 203 | 203 | 203 | 237 | 237 | 237 |
| COP ratio | % (relative to R410A) | 95.6 | 96.0 | 96.6 | 97.2 | 97.9 | 96.0 | 96.3 | 96.6 |
| Refrigerating capacity ratio | % (relative to R410A) | 114.2 | 113.4 | 112.4 | 111.2 | 109.8 | 115.1 | 114.5 | 113.6 |

TABLE 159

| Item | Unit | Comparative Example 57 | Comparative Example 58 | Comparative Example 59 | Comparative Example 60 | Comparative Example 61 | Comparative Example 62 | Comparative Example 63 | Comparative Example 64 |
|---|---|---|---|---|---|---|---|---|---|
| HFO-1132(E) | mass % | 40.0 | 50.0 | 60.0 | 10.0 | 20.0 | 30.0 | 40.0 | 50.0 |
| HFO-1123 | mass % | 25.0 | 15.0 | 5.0 | 50.0 | 40.0 | 30.0 | 20.0 | 10.0 |

TABLE 159-continued

| Item | Unit | Comparative Example 57 | Comparative Example 58 | Comparative Example 59 | Comparative Example 60 | Comparative Example 61 | Comparative Example 62 | Comparative Example 63 | Comparative Example 64 |
|---|---|---|---|---|---|---|---|---|---|
| R32 | mass % | 35.0 | 35.0 | 35.0 | 40.0 | 40.0 | 40.0 | 40.0 | 40.0 |
| GWP | — | 237 | 237 | 237 | 271 | 271 | 271 | 271 | 271 |
| COP ratio | % (relative to R410A) | 97.1 | 97.7 | 98.3 | 96.6 | 96.9 | 97.2 | 97.7 | 98.2 |
| Refrigerating capacity ratio | % (relative to R410A) | 112.6 | 111.5 | 110.2 | 115.1 | 114.6 | 113.8 | 112.8 | 111.7 |

TABLE 160

| Item | Unit | Example 27 | Example 28 | Example 29 | Example 30 | Example 31 | Example 32 | Example 33 | Example 34 |
|---|---|---|---|---|---|---|---|---|---|
| HFO-1132(E) | mass % | 38.0 | 40.0 | 42.0 | 44.0 | 35.0 | 37.0 | 39.0 | 41.0 |
| HFO-1123 | mass % | 60.0 | 58.0 | 56.0 | 54.0 | 61.0 | 59.0 | 57.0 | 55.0 |
| R32 | mass % | 2.0 | 2.0 | 2.0 | 2.0 | 4.0 | 4.0 | 4.0 | 4.0 |
| GWP | — | 14 | 14 | 14 | 14 | 28 | 28 | 28 | 28 |
| COP ratio | % (relative to R410A) | 93.2 | 93.4 | 93.6 | 93.7 | 93.2 | 93.3 | 93.5 | 93.7 |
| Refrigerating capacity ratio | % (relative to R410A) | 107.7 | 107.5 | 107.3 | 107.2 | 108.6 | 108.4 | 108.2 | 108.0 |

TABLE 161

| Item | Unit | Example 35 | Example 36 | Example 37 | Example 38 | Example 39 | Example 40 | Example 41 | Example 42 |
|---|---|---|---|---|---|---|---|---|---|
| HFO-1132(E) | mass % | 43.0 | 31.0 | 33.0 | 35.0 | 37.0 | 39.0 | 41.0 | 27.0 |
| HFO-1123 | mass % | 53.0 | 63.0 | 61.0 | 59.0 | 57.0 | 55.0 | 53.0 | 65.0 |
| R32 | mass % | 4.0 | 6.0 | 6.0 | 6.0 | 6.0 | 6.0 | 6.0 | 8.0 |
| GWP | — | 28 | 41 | 41 | 41 | 41 | 41 | 41 | 55 |
| COP ratio | % (relative to R410A) | 93.9 | 93.1 | 93.2 | 93.4 | 93.6 | 93.7 | 93.9 | 93.0 |
| Refrigerating capacity ratio | % (relative to R410A) | 107.8 | 109.5 | 109.3 | 109.1 | 109.0 | 108.8 | 108.6 | 110.3 |

TABLE 162

| Item | Unit | Example 43 | Example 44 | Example 45 | Example 46 | Example 47 | Example 48 | Example 49 | Example 50 |
|---|---|---|---|---|---|---|---|---|---|
| HFO-1132(E) | mass % | 29.0 | 31.0 | 33.0 | 35.0 | 37.0 | 39.0 | 32.0 | 32.0 |
| HFO-1123 | mass % | 63.0 | 61.0 | 59.0 | 57.0 | 55.0 | 53.0 | 51.0 | 50.0 |
| R32 | mass % | 8.0 | 8.0 | 8.0 | 8.0 | 8.0 | 8.0 | 17.0 | 18.0 |
| GWP | — | 55 | 55 | 55 | 55 | 55 | 55 | 116 | 122 |
| COP ratio | % (relative to R410A) | 93.2 | 93.3 | 93.5 | 93.6 | 93.8 | 94.0 | 94.5 | 94.7 |
| Refrigerating capacity ratio | % (relative to R410A) | 110.1 | 110.0 | 109.8 | 109.6 | 109.5 | 109.3 | 111.8 | 111.9 |

TABLE 163

| Item | Unit | Example 51 | Example 52 | Example 53 | Example 54 | Example 55 | Example 56 | Example 57 | Example 58 |
|---|---|---|---|---|---|---|---|---|---|
| HFO-1132(E) | mass % | 30.0 | 27.0 | 21.0 | 23.0 | 25.0 | 27.0 | 11.0 | 13.0 |
| HFO-1123 | mass % | 52.0 | 42.0 | 46.0 | 44.0 | 42.0 | 40.0 | 54.0 | 52.0 |
| R32 | mass % | 18.0 | 31.0 | 33.0 | 33.0 | 33.0 | 33.0 | 35.0 | 35.0 |
| GWP | — | 122 | 210 | 223 | 223 | 223 | 223 | 237 | 237 |

TABLE 163-continued

| Item | Unit | Example 51 | Example 52 | Example 53 | Example 54 | Example 55 | Example 56 | Example 57 | Example 58 |
|---|---|---|---|---|---|---|---|---|---|
| COP ratio | % (relative to R410A) | 94.5 | 96.0 | 96.0 | 96.1 | 96.2 | 96.3 | 96.0 | 96.0 |
| Refrigerating capacity ratio | % (relative to R410A) | 112.1 | 113.7 | 114.3 | 114.2 | 114.0 | 113.8 | 115.0 | 114.9 |

TABLE 164

| Item | Unit | Example 59 | Example 60 | Example 61 | Example 62 | Example 63 | Example 64 | Example 65 | Example 66 |
|---|---|---|---|---|---|---|---|---|---|
| HFO-1132(E) | mass % | 15.0 | 17.0 | 19.0 | 21.0 | 23.0 | 25.0 | 27.0 | 11.0 |
| HFO-1123 | mass % | 50.0 | 48.0 | 46.0 | 44.0 | 42.0 | 40.0 | 38.0 | 52.0 |
| R32 | mass % | 35.0 | 35.0 | 35.0 | 35.0 | 35.0 | 35.0 | 35.0 | 37.0 |
| GWP | — | 237 | 237 | 237 | 237 | 237 | 237 | 237 | 250 |
| COP ratio | % (relative to R410A) | 96.1 | 96.2 | 96.2 | 96.3 | 96.4 | 96.4 | 96.5 | 96.2 |
| Refrigerating capacity ratio | % (relative to R410A) | 114.8 | 114.7 | 114.5 | 114.4 | 114.2 | 114.1 | 113.9 | 115.1 |

TABLE 165

| Item | Unit | Example 67 | Example 68 | Example 69 | Example 70 | Example 71 | Example 72 | Example 73 | Example 74 |
|---|---|---|---|---|---|---|---|---|---|
| HFO-1132(E) | mass % | 13.0 | 15.0 | 17.0 | 15.0 | 17.0 | 19.0 | 21.0 | 23.0 |
| HFO-1123 | mass % | 50.0 | 48.0 | 46.0 | 50.0 | 48.0 | 46.0 | 44.0 | 42.0 |
| R32 | mass % | 37.0 | 37.0 | 37.0 | 0.0 | 0.0 | 0.0 | 0.0 | 0.0 |
| GWP | — | 250 | 250 | 250 | 237 | 237 | 237 | 237 | 237 |
| COP ratio | % (relative to R410A) | 96.3 | 96.4 | 96.4 | 96.1 | 96.2 | 96.2 | 96.3 | 96.4 |
| Refrigerating capacity ratio | % (relative to R410A) | 115.0 | 114.9 | 114.7 | 114.8 | 114.7 | 114.5 | 114.4 | 114.2 |

TABLE 166

| Item | Unit | Example 75 | Example 76 | Example 77 | Example 78 | Example 79 | Example 80 | Example 81 | Example 82 |
|---|---|---|---|---|---|---|---|---|---|
| HFO-1132(E) | mass % | 25.0 | 27.0 | 11.0 | 19.0 | 21.0 | 23.0 | 25.0 | 27.0 |
| HFO-1123 | mass % | 40.0 | 38.0 | 52.0 | 44.0 | 42.0 | 40.0 | 38.0 | 36.0 |
| R32 | mass % | 0.0 | 0.0 | 0.0 | 37.0 | 37.0 | 37.0 | 37.0 | 37.0 |
| GWP | — | 237 | 237 | 250 | 250 | 250 | 250 | 250 | 250 |
| COP ratio | % (relative to R410A) | 96.4 | 96.5 | 96.2 | 96.5 | 96.5 | 96.6 | 96.7 | 96.8 |
| Refrigerating capacity ratio | % (relative to R410A) | 114.1 | 113.9 | 115.1 | 114.6 | 114.5 | 114.3 | 114.1 | 114.0 |

The above results indicate that under the condition that the mass % of HFO-1132(E), HFO-1123, and R32 based on their sum is respectively represented by x, y, and z, when coordinates (x,y,z) in a ternary composition diagram in which the sum of HFO-1132(E), HFO-1123, and R32 is 100 mass %, a line segment connecting a point (0.0, 100.0, 0.0) and a point (0.0, 0.0, 100.0) is the base, and the point (0.0, 100.0, 0.0) is on the left side are within the range of a figure surrounded by line segments that connect the following 4 points:
point O (100.0, 0.0, 0.0),
point A" (63.0, 0.0, 37.0),
point B" (0.0, 63.0, 37.0), and
point (0.0, 100.0, 0.0),
or on these line segments,
the refrigerant has a GWP of 250 or less.

The results also indicate that when coordinates (x,y,z) are within the range of a figure surrounded by line segments that connect the following 4 points:
point O (100.0, 0.0, 0.0),
point A' (81.6, 0.0, 18.4),
point B' (0.0, 81.6, 18.4), and
point (0.0, 100.0, 0.0),
or on these line segments,
the refrigerant has a GWP of 125 or less.

The results also indicate that when coordinates (x,y,z) are within the range of a figure surrounded by line segments that connect the following 4 points:
point O (100.0, 0.0, 0.0),
point A (90.5, 0.0, 9.5), point B (0.0, 90.5, 9.5), and
point (0.0, 100.0, 0.0),
or on these line segments,
the refrigerant has a GWP of 65 or less.

The results also indicate that when coordinates (x,y,z) are on the left side of line segments that connect the following 3 points:
point C (50.0, 31.6, 18.4),
point U (28.7, 41.2, 30.1), and
point D (52.2, 38.3, 9.5),
or on these line segments,
the refrigerant has a COP ratio of 96% or more relative to that of R410A.

In the above, the line segment CU is represented by coordinates $(-0.0538z^2+0.7888z+53.701, 0.0538z^2-1.7888z+46.299, z)$, and the line segment UD is represented by coordinates $(-3.4962z^2+210.71z-3146.1, 3.4962z^2-211.71z+3246.1, z)$.

The points on the line segment CU are determined from three points, i.e., point C, Comparative Example 10, and point U, by using the least-square method.

The points on the line segment UD are determined from three points, i.e., point U, Example 2, and point D, by using the least-square method.

The results also indicate that when coordinates (x,y,z) are on the left side of line segments that connect the following 3 points:
point E (55.2, 44.8, 0.0),
point T (34.8, 51.0, 14.2), and
point F (0.0, 76.7, 23.3),
or on these line segments,
the refrigerant has a COP ratio of 94.5% or more relative to that of R410A.

In the above, the line segment ET is represented by coordinates $(-0.0547z^2\ 0.5327z+53.4, 0.0547z^2-0.4673z+46.6, z)$, and the line segment TF is represented by coordinates $(-0.0982z^2+0.9622z+40.931, 0.0982z^2-1.9622z+59.069, z)$.

The points on the line segment ET are determined from three points, i.e., point E, Example 2, and point T, by using the least-square method.

The points on the line segment TF are determined from three points, i.e., points T, S, and F, by using the least-square method.

The results also indicate that when coordinates (x,y,z) are on the left side of line segments that connect the following 3 points:
point G (0.0, 76.7, 23.3),
point R (21.0, 69.5, 9.5), and
point H (0.0, 85.9, 14.1),
or on these line segments,
the refrigerant has a COP ratio of 93% or more relative to that of R410A.

In the above, the line segment GR is represented by coordinates $(-0.0491z^2-1.1544z+38.5, 0.0491z^2+0.1544z+61.5, z)$, and the line segment RH is represented by coordinates $(-0.3123z^2+4.234z+11.06, 0.3123z^2-5.234z+88.94, z)$.

The points on the line segment GR are determined from three points, i.e., point G, Example 5, and point R, by using the least-square method.

The points on the line segment RH are determined from three points, i.e., point R, Example 7, and point H, by using the least-square method.

In contrast, as shown in, for example, Comparative Examples 8, 9, 13, 15, 17, and 18, when R32 is not contained, the concentrations of HFO-1132(E) and HFO-1123, which have a double bond, become relatively high; this undesirably leads to deterioration, such as decomposition, or polymerization in the refrigerant compound. The embodiments of the present disclosure are described above; however, it is understood that various modifications of modes and details are applicable without departing from the purport or scope of the present disclosure recited in the claims.

(6) First Embodiment

Figure 16:
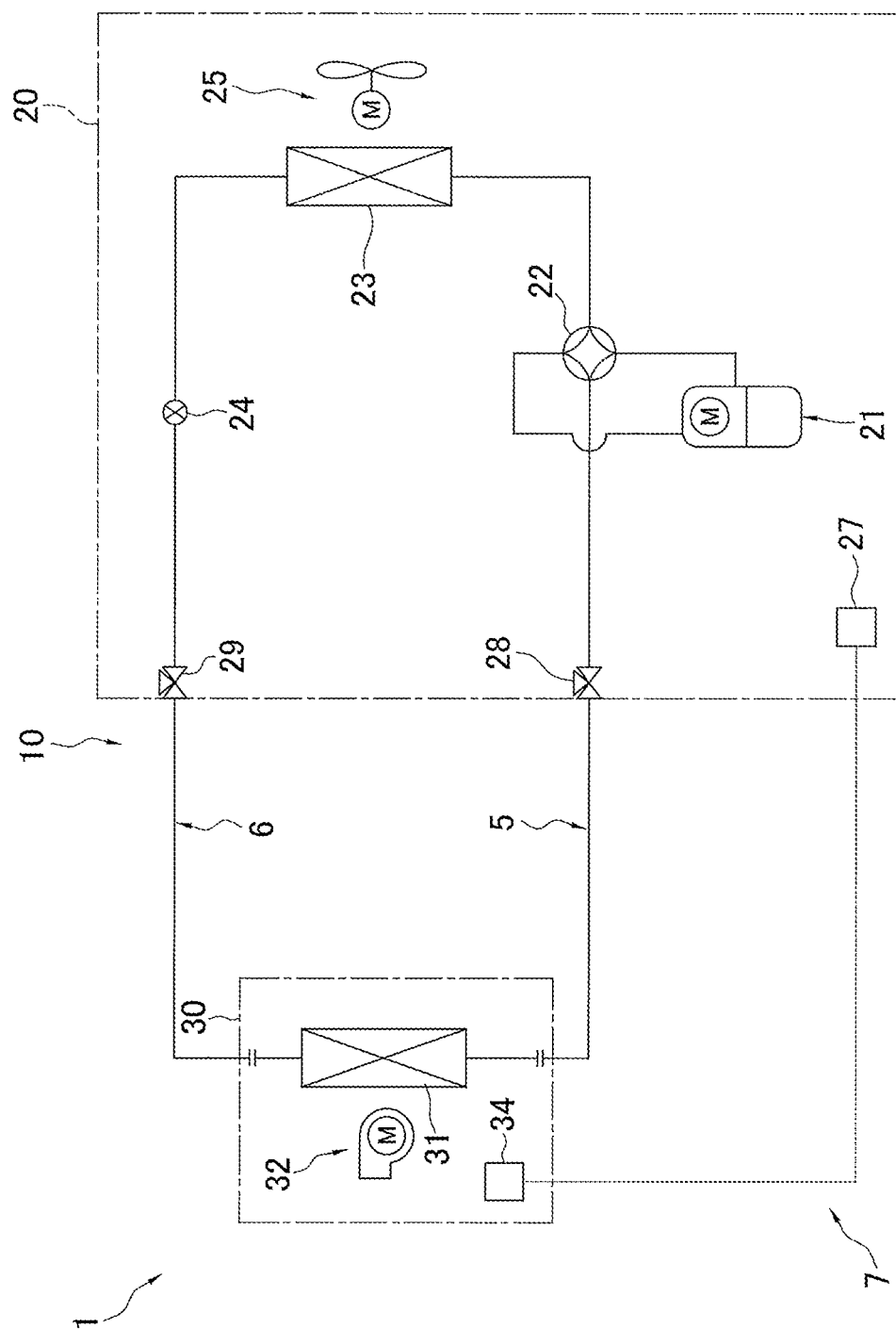
FIG. 16 is a schematic configuration diagram of a refrigerant circuit according to a first embodiment.
Figure 17:
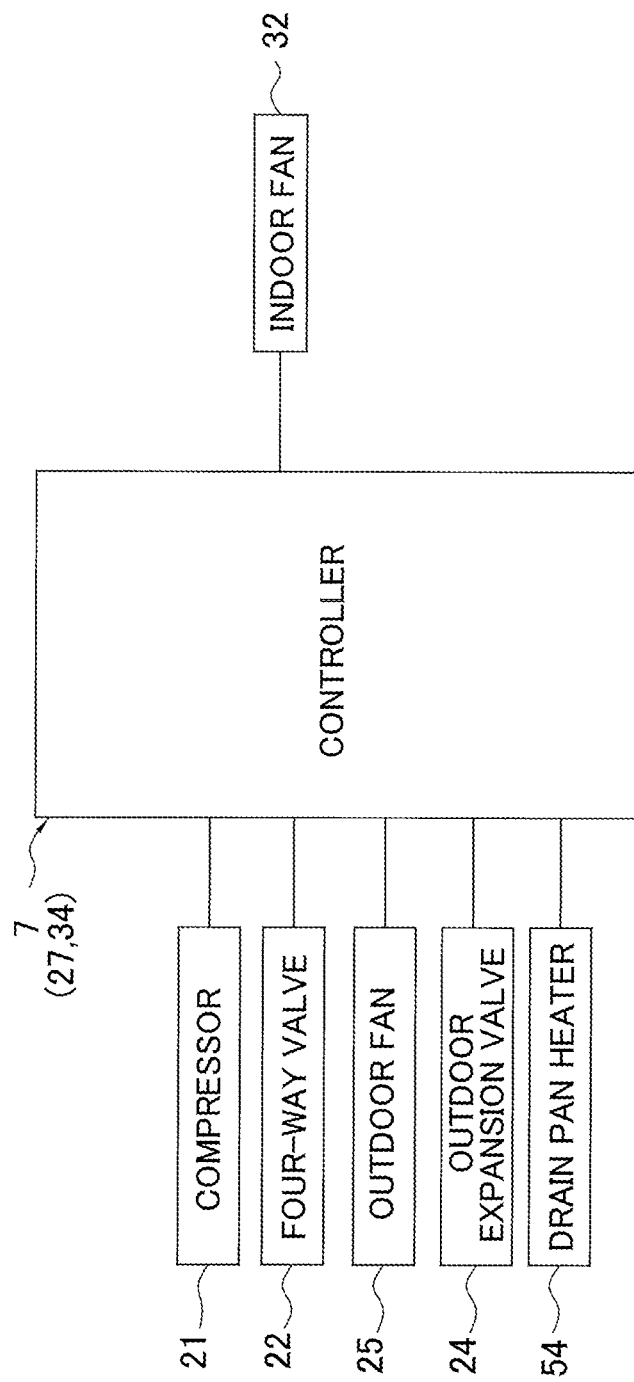
FIG. 17 is a schematic control block configuration diagram of a refrigeration cycle apparatus according to the first embodiment.

Hereinafter, an air conditioner 1 that serves as a refrigeration cycle apparatus according to a first embodiment will be described with reference to FIG. 16 that is the schematic configuration diagram of a refrigerant circuit and FIG. 17 that is a schematic control block configuration diagram.

The air conditioner 1 is an apparatus that air-conditions a space to be air-conditioned by performing a vapor compression refrigeration cycle.

The air conditioner 1 mainly includes an outdoor unit 20, an indoor unit 30, a liquid-side connection pipe 6 and a gas-side connection pipe 5 connecting the outdoor unit 20 and the indoor unit 30, a remote control unit (not shown) serving as an input device and an output device, and a controller 7 that controls the operation of the air conditioner 1.

In the air conditioner 1, the refrigeration cycle in which refrigerant sealed in a refrigerant circuit 10 is compressed, cooled or condensed, decompressed, heated or evaporated, and then compressed again is performed. In the present embodiment, the refrigerant circuit 10 is filled with refrigerant for performing a vapor compression refrigeration cycle. The refrigerant is a refrigerant mixture containing 1,2-difluoroethylene and may use any one of the above-described refrigerants A to E. The refrigerant circuit 10 is filled with refrigerating machine oil together with the refrigerant. A rated cooling capacity of the air conditioner 1 including only the single indoor unit 30 is not limited and may be, for example, higher than or equal to 2.0 kW and lower than or equal to 17.0 kW, and, specifically, in the air conditioner 1 of the present embodiment with a size such that no refrigerant container is provided, the rated cooling capacity is preferably higher than or equal to 2.0 kW and lower than or equal to 6.0 kW.

(6-1) Outdoor Unit 20

The outdoor unit 20 has a structure in which a fan chamber and a machine chamber are formed (so-called, trunk structure) when the internal space of the casing 50 having substantially a rectangular parallelepiped shape into right and left spaces by a partition plate (not shown) extending vertically.

The outdoor unit 20 is connected to the indoor unit 30 via the liquid-side connection pipe 6 and the gas-side connection pipe 5, and makes up part of the refrigerant circuit 10. The outdoor unit 20 mainly includes a compressor 21, a four-way valve 22, an outdoor heat exchanger 23, an outdoor expansion valve 24, an outdoor fan 25, a liquid-side stop valve 29, and a gas-side stop valve 28.

The compressor 21 is a device that compresses low-pressure refrigerant into high pressure in the refrigeration cycle. Here, the compressor 21 is a hermetically sealed compressor in which a positive-displacement, such as a rotary type and a scroll type, compression element (not shown) is driven for rotation by a compressor motor. The compressor motor is used to change the displacement. The operation frequency of the compressor motor is controllable with an inverter. The compressor 21 is provided with an attached accumulator (not shown) at its suction side. The outdoor unit 20 of the present embodiment does not have a refrigerant container larger than the attached accumulator (a low-pressure receiver disposed at the suction side of the compressor 21, a high-pressure receiver disposed at a liquid side of the outdoor heat exchanger 23, or the like). The four-way valve 22 is able to switch between a cooling operation connection state and a heating operation connection state by switching the status of connection. In the cooling operation connection state, a discharge side of the compressor 21 and the outdoor heat exchanger 23 are connected, and the suction side of the compressor 21 and the gas-side stop valve 28 are connected. In the heating operation connection state, the discharge side of the compressor 21 and the gas-side stop valve 28 are connected, and the suction side of the compressor 21 and the outdoor heat exchanger 23 are connected.

The outdoor heat exchanger 23 is a heat exchanger that functions as a condenser for high-pressure refrigerant in the refrigeration cycle during cooling operation and that functions as an evaporator for low-pressure refrigerant in the refrigeration cycle during heating operation. In the present embodiment in which no refrigerant container (a low-pressure receiver, a high-pressure receiver, or the like, except an accumulator attached to the compressor) is provided in the refrigerant circuit 10, the internal volume (the volume of fluid that can be filled inside) of the outdoor heat exchanger 23 is preferably greater than or equal to 0.4 L and less than or equal to 2.5 L.

The outdoor fan 25 takes outdoor air into the outdoor unit 20, causes the air to exchange heat with refrigerant in the outdoor heat exchanger 23, and then generates air flow for emitting the air to the outside. The outdoor fan 25 is driven for rotation by an outdoor fan motor. In the present embodiment, only one outdoor fan 25 is provided.

The outdoor expansion valve 24 is able to control the valve opening degree, and is provided between a liquid-side end portion of the outdoor heat exchanger 23 and the liquid-side stop valve 29.

The liquid-side stop valve 29 is a manual valve disposed at a connection point at which the outdoor unit 20 is connected to the liquid-side connection pipe 6.

The gas-side stop valve 28 is a manual valve disposed at a connection point at which the outdoor unit 20 is connected to the gas-side connection pipe 5.

The outdoor unit 20 includes an outdoor unit control unit 27 that controls the operations of parts that makeup the outdoor unit 20. The outdoor unit control unit 27 includes a microcomputer including a CPU, a memory, and the like. The outdoor unit control unit 27 is connected to an indoor unit control unit 34 of indoor unit 30 via a communication line, and sends or receives control signals, or the like, to or from the indoor unit control unit 34. The outdoor unit control unit 27 is electrically connected to various sensors (not shown), and receives signals from the sensors.

Figure 18:
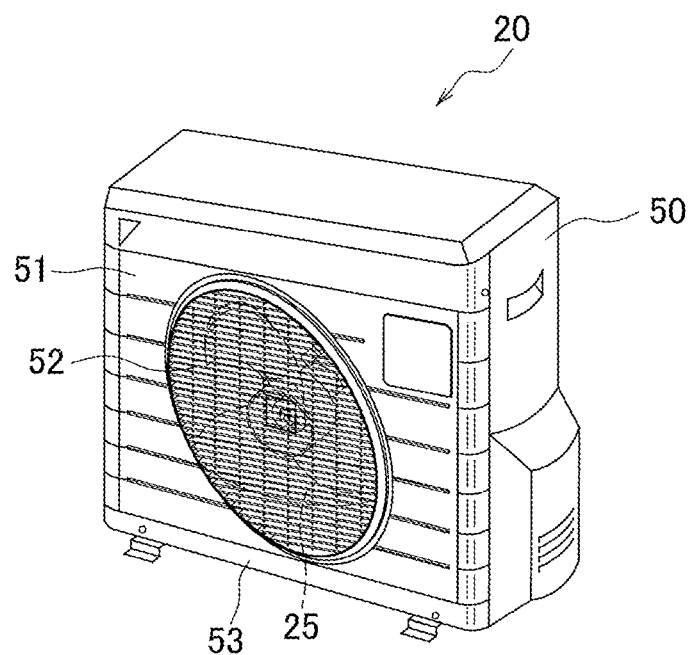
FIG. 18 is a schematic appearance perspective view of an outdoor unit according to the first embodiment.
Figure 19:
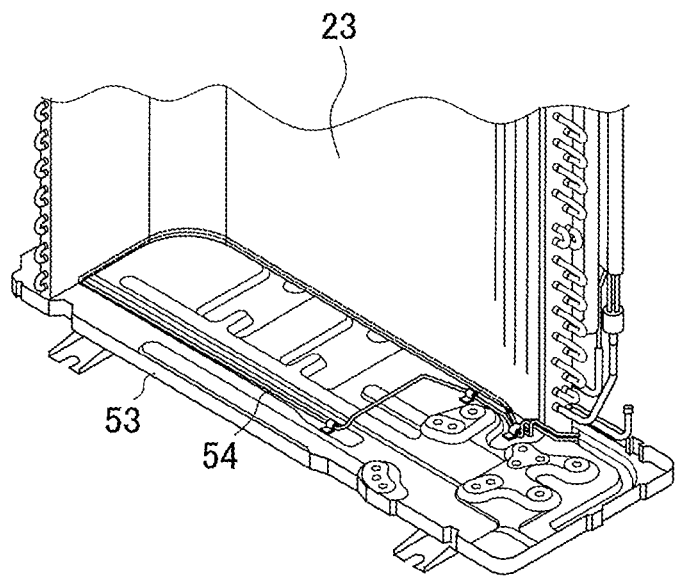
FIG. 19 is a schematic perspective view of a drain pan heater provided on a bottom plate.

As shown in FIG. 18, the outdoor unit 20 includes the casing 50 having an air outlet 52. The casing 50 has a substantially rectangular parallelepiped shape. The casing 50 is able to take in outdoor air from a rear side and one side (the left side in FIG. 18) and is able to discharge air having passed through the outdoor heat exchanger 23 forward via the air outlet 52 formed in a front 51. A lower end portion of the casing 50 is covered with a bottom plate 53. As shown in FIG. 19, the outdoor heat exchanger 23 is provided upright on the bottom plate 53 along the rear side and the one side. A top face of the bottom plate 53 can function as a drain pan. A drain pan heater 54 that is a sheathed heater made up of heating wires is provided along a top surface of the bottom plate 53. The drain pan heater 54 has a portion running along a vertically lower part of the outdoor heat exchanger 23 and a portion running along a side closer to the front than the outdoor heat exchanger 23 on the bottom plate 53. The drain pan heater 54 is connected to the outdoor unit control unit 27 that also serves as a power supply unit and receives electric power supply. The drain pan heater 54 preferably has a rated electric power consumption of lower than or equal to 300 W and, in the present embodiment, higher than or equal to 75 W and lower than or equal to 100 W.

(6-2) Indoor Unit 30

The indoor unit 30 is placed on a wall surface, a ceiling, or the like, in a room that is a space to be air-conditioned. The indoor unit 30 is connected to the outdoor unit 20 via the liquid-side connection pipe 6 and the gas-side connection pipe 5, and makes up part of the refrigerant circuit 10.

The indoor unit 30 includes the indoor heat exchanger 31 and the indoor fan 32.

The liquid side of the indoor heat exchanger 31 is connected to the liquid-side connection pipe 6, and the gas side of the indoor heat exchanger 31 is connected to the gas-side connection pipe 5. The indoor heat exchanger 31 is a heat exchanger that functions as an evaporator for low-pressure refrigerant in the refrigeration cycle during cooling operation and that functions as a condenser for high-pressure refrigerant in the refrigeration cycle during heating operation.

The indoor fan 32 takes indoor air into the indoor unit 30, causes the air to exchange heat with refrigerant in the indoor heat exchanger 31, and then generates air flow for emitting the air to the outside. The indoor fan 32 is driven for rotation by an indoor fan motor.

The indoor unit 30 includes an indoor unit control unit 34 that controls the operations of the parts that make up the indoor unit 30. The indoor unit control unit 34 includes a microcomputer including a CPU, a memory, and the like. The indoor unit control unit 34 is connected to the outdoor unit control unit 27 via a communication line, and sends or receives control signals, or the like, to or from the outdoor unit control unit 27.

The indoor unit control unit 34 is electrically connected to various sensors (not shown) provided inside the indoor unit 30, and receives signals from the sensors.

(6-3) Details of Controller 7

In the air conditioner 1, the outdoor unit control unit 27 and the indoor unit control unit 34 are connected via the communication line to make up the controller 7 that controls the operation of the air conditioner 1.

The controller 7 mainly includes a CPU (central processing unit) and a memory such as a ROM and a RAM. Various processes and controls made by the controller 7 are implemented by various parts included in the outdoor unit control unit 27 and/or the indoor unit control unit 34 functioning together.

(6-4) Operation Mode

Hereinafter, operation modes will be described.

The operation modes include a cooling operation mode and a heating operation mode.

The controller 7 determines whether the operation mode is the cooling operation mode or the heating operation mode and performs the selected operation mode based on an instruction received from the remote control unit, or the like.

(6-4-1) Cooling Operation Mode

In the air conditioner 1, in the cooling operation mode, the status of connection of the four-way valve 22 is set to the cooling operation connection state where the discharge side of the compressor 21 and the outdoor heat exchanger 23 are connected and the suction side of the compressor 21 and the gas-side stop valve 28 are connected, and refrigerant filled in the refrigerant circuit 10 is mainly circulated in order of the compressor 21, the outdoor heat exchanger 23, the outdoor expansion valve 24, and the indoor heat exchanger 31.

More specifically, when the cooling operation mode is started, refrigerant is taken into the compressor 21, compressed, and then discharged in the refrigerant circuit 10.

In the compressor 21, displacement control commensurate with a cooling load that is required from the indoor unit 30 is performed. The displacement control is not limited. For example, a target value of suction pressure may be set according to a cooling load that is required of the indoor unit 30, and the operating frequency of the compressor 21 may be controlled such that the suction pressure becomes the target value.

Gas refrigerant discharged from the compressor 21 passes through the four-way valve 22 and flows into the gas-side end of the outdoor heat exchanger 23.

Gas refrigerant having flowed into the gas-side end of the outdoor heat exchanger 23 exchanges heat in the outdoor heat exchanger 23 with outdoor-side air that is supplied by the outdoor fan 25 to condense into liquid refrigerant and flows out from the liquid-side end of the outdoor heat exchanger 23.

Refrigerant having flowed out from the liquid-side end of the outdoor heat exchanger 23 is decompressed when passing through the outdoor expansion valve 24. The outdoor expansion valve 24 is controlled such that the degree of subcooling of refrigerant that passes through a liquid-side outlet of the outdoor heat exchanger 23 satisfies a predetermined condition. A method of controlling the valve opening degree of the outdoor expansion valve 24 is not limited. For example, the valve opening degree of the outdoor expansion valve 24 may be controlled such that a discharge temperature of refrigerant that is discharged from the compressor 21 becomes a predetermined temperature or may be controlled such that the degree of superheating of refrigerant that is discharged from the compressor 21 satisfies a predetermined condition.

Refrigerant decompressed in the outdoor expansion valve 24 passes through the liquid-side stop valve 29 and the liquid-side connection pipe 6 and flows into the indoor unit 30.

Refrigerant having flowed into the indoor unit 30 flows into the indoor heat exchanger 31, exchanges heat in the indoor heat exchanger 31 with indoor air that is supplied by the indoor fan 32 to evaporate into gas refrigerant, and flows out from the gas-side end of the indoor heat exchanger 31. Gas refrigerant having flowed out from the gas-side end of the indoor heat exchanger 31 flows to the gas-side connection pipe 5.

Refrigerant having flowed through the gas-side connection pipe 5 passes through the gas-side stop valve 28 and the four-way valve 22, and is taken into the compressor 21 again.

(6-4-2) Heating Operation Mode

In the air conditioner 1, in the heating operation mode, the status of connection of the four-way valve 22 is set to the heating operation connection state where the discharge side of the compressor 21 and the gas-side stop valve 28 are connected and the suction side of the compressor 21 and the outdoor heat exchanger 23 are connected, and refrigerant filled in the refrigerant circuit 10 is mainly circulated in order of the compressor 21, the indoor heat exchanger 31, the outdoor expansion valve 24, and the outdoor heat exchanger 23.

More specifically, when the heating operation mode is started, refrigerant is taken into the compressor 21, compressed, and then discharged in the refrigerant circuit 10.

In the compressor 21, displacement control commensurate with a heating load that is required from the indoor unit 30 is performed. The displacement control is not limited. For example, a target value of discharge pressure may be set according to a heating load that is required of the indoor unit 30, and the operating frequency of the compressor 21 may be controlled such that the discharge pressure becomes the target value.

Gas refrigerant discharged from the compressor 21 flows through the four-way valve 22 and the gas-side connection pipe 5 and then flows into the indoor unit 30.

Refrigerant having flowed into the indoor unit 30 flows into the gas-side end of the indoor heat exchanger 31, exchanges heat in the indoor heat exchanger 31 with indoor air that is supplied by the indoor fan 32 to condense into refrigerant in a gas-liquid two-phase state or liquid refrigerant, and flows out from the liquid-side end of the indoor heat exchanger 31. Refrigerant having flowed out from the liquid-side end of the indoor heat exchanger 31 flows into the liquid-side connection pipe 6.

Refrigerant having flowed through the liquid-side connection pipe 6 is decompressed to a low pressure in the refrigeration cycle in the liquid-side stop valve 29 and the outdoor expansion valve 24. The outdoor expansion valve 24 is controlled such that the degree of subcooling of refrigerant that passes through a liquid-side outlet of the indoor heat exchanger 31 satisfies a predetermined condition. A method of controlling the valve opening degree of the outdoor expansion valve 24 is not limited. For example, the valve opening degree of the outdoor expansion valve 24 may be controlled such that a discharge temperature of refrigerant that is discharged from the compressor 21 becomes a predetermined temperature or may be controlled such that the degree of superheating of refrigerant that is discharged from the compressor 21 satisfies a predetermined condition.

Refrigerant decompressed in the outdoor expansion valve 24 flows into the liquid-side end of the outdoor heat exchanger 23.

Refrigerant having flowed in from the liquid-side end of the outdoor heat exchanger 23 exchanges heat in the outdoor heat exchanger 23 with outdoor air that is supplied by the outdoor fan 25 to evaporate into gas refrigerant, and flows out from the gas-side end of the outdoor heat exchanger 23.

Refrigerant having flowed out from the gas-side end of the outdoor heat exchanger 23 passes through the four-way valve 22 and is taken into the compressor 21 again.

(6-4-3) Defrost Operation Mode

A defrost operation mode is an operation when a predetermined defrost condition, that is, for example, the duration of an operation in a state where an outdoor air temperature is lower than or equal to a predetermined temperature is longer than or equal to a predetermined time in the heating operation mode, is satisfied. In the defrost operation mode, a refrigeration cycle similar to that of the cooling operation mode is performed except that the operation of the indoor fan 32 is stopped and the status of connection of the four-way valve 22 is switched as in the case during the cooling operation mode. Thus, frost stuck to the outdoor heat exchanger 23 can be partially melted down onto the bottom plate 53 of the casing 50. At this time, the bottom plate 53 is warmed through control for energizing the drain pan heater 54, so frost fallen onto the bottom plate 53 can be melted into a liquid state to facilitate drainage.

(6-5) Characteristics of First Embodiment

In the above-described air conditioner 1, since refrigerant containing 1,2-difluoroethylene is used, a GWP can be sufficiently reduced.

Since the outdoor unit 20 of the air conditioner 1 includes the drain pan heater 54 on the bottom plate 53 of the casing 50, even when frost accumulates on the bottom plate 53, drainability can be improved by melting the frost.

By using the drain pan heater 54 of which the rated electric power consumption is higher than or equal to 75 W, the outdoor unit 20 having a capacity to such a degree that only the single outdoor fan 25 is provided is able to sufficiently exercise the function of the drain pan heater 54 appropriately for the capacity.

In addition, by using the drain pan heater 54 of which the rated electric power consumption is lower than or equal to 100 W, even when refrigerant containing 1,2-difluoroethylene leaks in the outdoor unit 20, a situation in which the drain pan heater 54 becomes an ignition source can be suppressed.

(6-6) Modification A of First Embodiment

In the above-described first embodiment, an air conditioner in which no refrigerant container other than an accumulator attached to the compressor 21 is provided at the suction side of the compressor 21 is described as an example. For an air conditioner, a refrigerant container (which is a low-pressure receiver, a high-pressure receiver, or the like, except an accumulator attached to the compressor) may be provided in a refrigerant circuit.

In this case, an internal volume (the volume of fluid that can be filled inside) of the outdoor heat exchanger 23 is preferably greater than or equal to 1.4 L and less than 3.5 L.

(6-7) Modification B of First Embodiment

In the above-described first embodiment, the air conditioner including only one indoor unit is described as an example, however, the air conditioner may include a plurality of indoor units (with no indoor expansion valve) connected in parallel with each other.

In this case, an internal volume (the volume of fluid that can be filled inside) of the outdoor heat exchanger 23 is preferably greater than or equal to 0.4 L and less than 3.5 L.

(7) Second Embodiment

Figure 20:
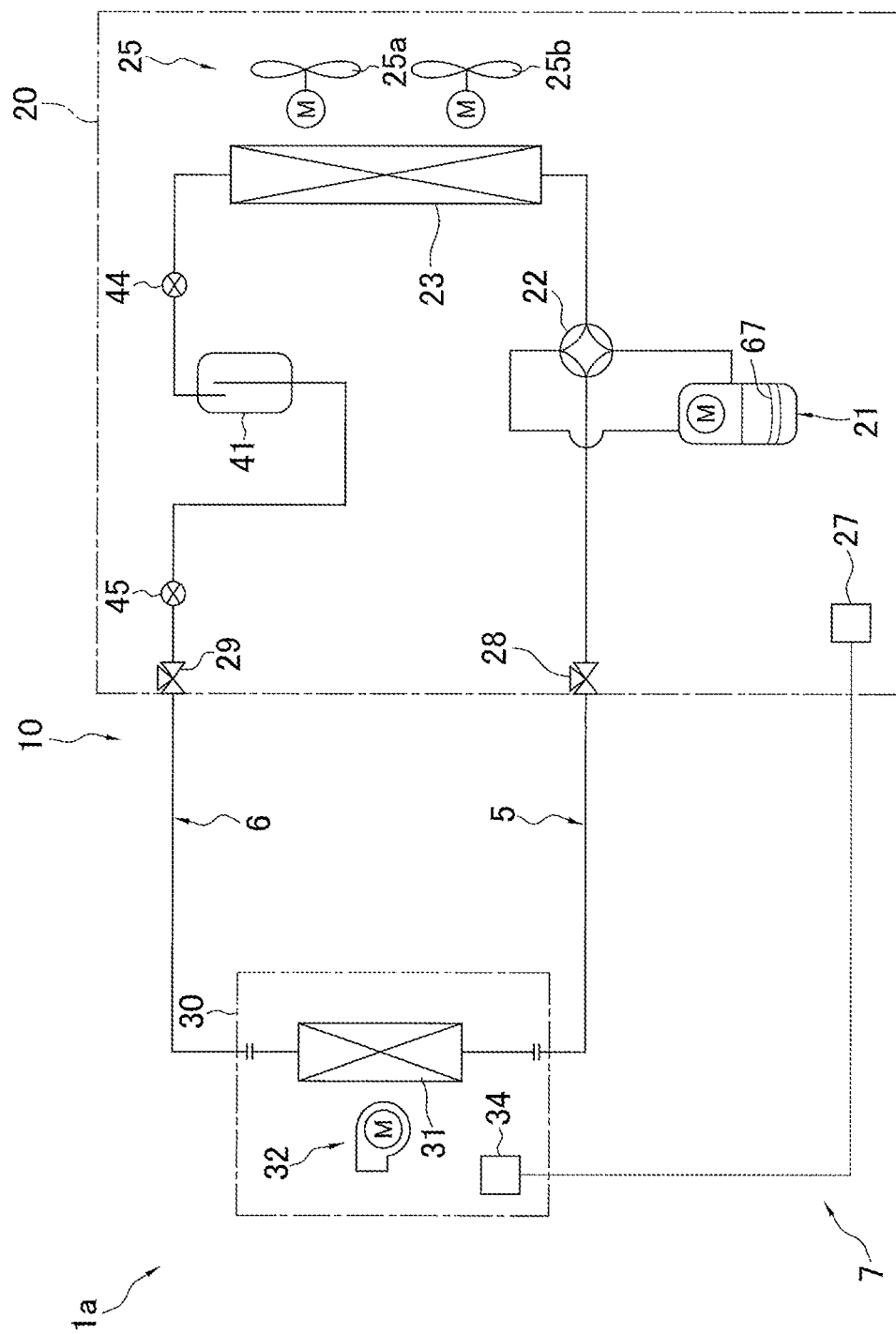
FIG. 20 is a schematic configuration diagram of a refrigerant circuit according to a second embodiment.
Figure 21:
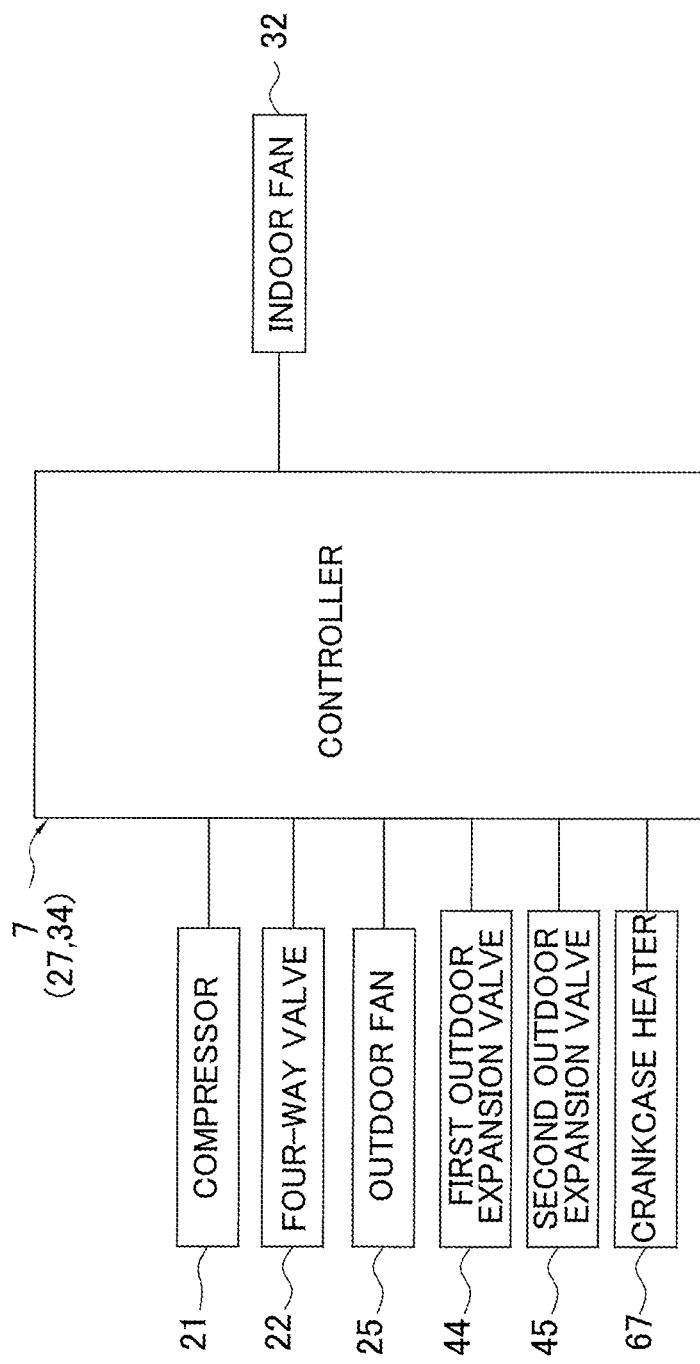
FIG. 21 is a schematic control block configuration diagram of a refrigeration cycle apparatus according to the second embodiment.

Hereinafter, an air conditioner 1a that serves as a refrigeration cycle apparatus according to a second embodiment will be described with reference to FIG. 20 that is the schematic configuration diagram of a refrigerant circuit and FIG. 21 that is a schematic control block configuration diagram.

Hereinafter, mainly, the air conditioner 1a of the second embodiment will be described with a focus on a portion different from the air conditioner 1 of the first embodiment.

In the air conditioner 1a as well, the refrigerant circuit 10 is filled with a refrigerant mixture that contains 1,2-difluoroethylene and that is any one of the above-described refrigerants A to E as a refrigerant for performing a vapor compression refrigeration cycle. The refrigerant circuit 10 is filled with refrigerating machine oil together with the refrigerant. A rated cooling capacity of the air conditioner 1a including only the single indoor unit 30 is not limited and may be, for example, higher than or equal to 2.0 kW and lower than or equal to 17.0 kW, and, in the air conditioner 1a of the present embodiment in which an intermediate pressure receiver 41 that is a refrigerant container is provided as will be described later, the rated cooling capacity is preferably higher than or equal to 10.0 kW and lower than or equal to 17.0 kW.

In the outdoor unit 20 of the air conditioner 1a of the second embodiment, a first outdoor fan 25a and a second outdoor fan 25b are provided as the outdoor fans 25. The outdoor heat exchanger 23 of the outdoor unit 20 of the air conditioner 1a has a wide heat exchange area so as to adapt to air flow coming from the first outdoor fan 25a and the second outdoor fan 25b. The internal volume (the volume of fluid that can be filled inside) of the outdoor heat exchanger 23 of the outdoor unit 20 of the air conditioner 1a is preferably greater than or equal to 3.5 L and less than or equal to 7.0 L, and, in the air conditioner 1a of the present embodiment, including the indoor unit 30 in which no indoor expansion valve is provided, the internal volume of the outdoor heat exchanger 23 is preferably greater than or equal to 3.5 L and less than 5.0 L.

In the outdoor unit 20 of the air conditioner 1a, instead of the outdoor expansion valve 24 of the outdoor unit 20 in the above-described first embodiment, a first outdoor expansion valve 44, an intermediate pressure receiver 41, and a second outdoor expansion valve 45 are sequentially provided between the liquid side of the outdoor heat exchanger 23 and the liquid-side stop valve 29.

The first outdoor expansion valve 44 and the second outdoor expansion valve 45 each are able to control the valve opening degree.

The intermediate pressure receiver 41 is a container that is able to store refrigerant. Both an end portion of a pipe extending from the first outdoor expansion valve 44 side and an end portion of a pipe extending from the second outdoor expansion valve 45 side are located in the internal space of the intermediate pressure receiver 41.

The outdoor unit 20 of the air conditioner 1a includes a crankcase heater 67 for the compressor 21. The crankcase heater 67 is an electric heater attached to an oil reservoir where refrigerating machine oil is stored at a lower side in the compressor 21. When the compressor 21 has been stopped for a long time as well, the oil reservoir is heated by energizing the crankcase heater 67 before startup of the compressor 21. Thus, refrigerant mixed in refrigerating machine oil stored in the oil reservoir is evaporated to be reduced, with the result that generation of bubbles of refrigerating machine oil at the startup of the compressor 21 can be reduced. The crankcase heater 67 preferably has a rated electric power consumption of lower than or equal to 300 W and higher than or equal to 100 W.

Figure 22:
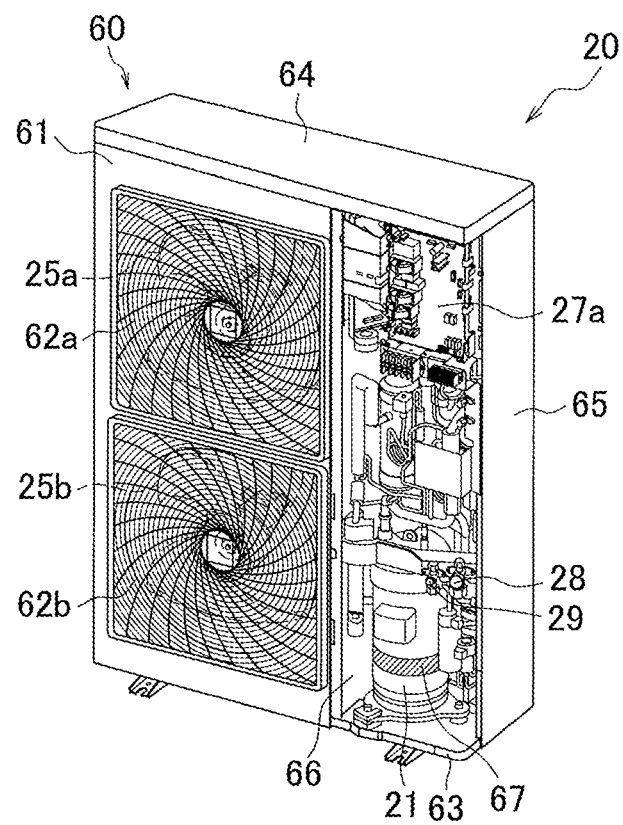
FIG. 22 is a schematic appearance perspective view of an outdoor unit according to the second embodiment (in a state where a front panel of a machine chamber is removed).

The outdoor unit 20 of the second embodiment has a structure in which a fan chamber and a machine chamber are formed (so-called trunk structure) when the internal space of a casing 60 having a substantially rectangular parallelepiped shape is divided into right and left spaces by a partition plate 66 extending vertically, as shown in FIG. 22.

The outdoor heat exchanger 23, the outdoor fans 25 (a first outdoor fan 25a and a second outdoor fan 25b), and the like, are disposed in the fan chamber inside the casing 60. The compressor 21, the four-way valve 22, the first outdoor expansion valve 44, the second outdoor expansion valve 45, the intermediate pressure receiver 41, the gas-side stop valve 28, the liquid-side stop valve 29, and an electric component unit 27a that makes up the outdoor unit control unit 27, and the like, are disposed in the machine chamber inside the casing 60.

The casing 60 mainly includes a bottom plate 63, a top panel 64, a left front panel 61, a left-side panel (not shown), a right front panel (not shown), a right-side panel 65, the partition plate 66, and the like. The bottom plate 63 makes up a bottom part of the casing 60. The top panel 64 makes up a top part of the outdoor unit 20. The left front panel 61 mainly makes up a left front part of the casing 60, and has a first air outlet 62a and a second air outlet 62b that are open in a front-rear direction and arranged one above the other. Air taken in from the rear side and left side of the casing 60 by the first outdoor fan 25a and having passed through an upper part of the outdoor heat exchanger 23 passes through the first air outlet 62a. Air taken in from the rear side and left side of the casing 60 by the second outdoor fan 25b and having passed through a lower part of the outdoor heat exchanger 23 passes through the second air outlet 62b. A fan grille is provided at each of the first air outlet 62a and the second air outlet 62b. The left-side panel mainly makes up a left side part of the casing 60 and is also able to function as an inlet for air that is taken into the casing 60. The right front panel mainly makes up a right front part and a front-side part of the right side of the casing 60. The right-side panel 65 mainly makes up a rear-side part of the right side and right-side part of the rear of the casing 60. The partition plate 66 is a plate-shaped member extending vertically and disposed on the bottom plate 63, and divides the internal space of the casing 60 into the fan chamber and the machine chamber.

The outdoor heat exchanger 23 is, for example, a cross-fin type fin-and-tube heat exchanger made up of heat transfer tubes and a large number of fins, and is disposed in the fan chamber in an L-shape in plan view along the left side and rear of the casing 60.

The compressor 21 is mounted on the bottom plate 63 and fixed by bolts in the machine chamber of the casing 60.

The gas-side stop valve 28 and the liquid-side stop valve 29 are disposed near the right front corner at the level near the upper end of the compressor 21 in the machine chamber of the casing 60.

The electric component unit 27a is disposed in a space above both of the gas-side stop valve 28 and the liquid-side stop valve 29 in the machine chamber of the casing 60.

In the above air conditioner 1a, in the cooling operation mode, the first outdoor expansion valve 44 is controlled such that the degree of subcooling of refrigerant that passes through the liquid-side outlet of the outdoor heat exchanger 23 satisfies a predetermined condition. In the cooling operation mode, the second outdoor expansion valve 45 is controlled such that the degree of superheating of refrigerant that the compressor 21 takes in satisfies a predetermined condition. In the cooling operation mode, the second outdoor expansion valve 45 may be controlled such that the temperature of refrigerant that the compressor 21 discharges becomes a predetermined temperature or may be controlled such that the degree of superheating of refrigerant that the compressor 21 discharges satisfies a predetermined condition.

In the heating operation mode, the second outdoor expansion valve 45 is controlled such that the degree of subcooling of refrigerant that passes through the liquid-side outlet of the indoor heat exchanger 31 satisfies a predetermined condition. In the heating operation mode, the first outdoor expansion valve 44 is controlled such that the degree of superheating of refrigerant that the compressor 21 takes in satisfies a predetermined condition. In the heating operation mode, the first outdoor expansion valve 44 may be controlled such that the temperature of refrigerant that the compressor 21 discharges becomes a predetermined temperature or may be controlled such that the degree of superheating of refrigerant that the compressor 21 discharges satisfies a predetermined condition. Here, in the heating operation mode of the air conditioner 1a, at the time of causing the compressor 21 to start up, it is determined whether a predetermined condition, for example, the duration of a drive stopped state of the compressor 21 is longer than or equal to a predetermined time, satisfies a predetermined condition, and, when the predetermined condition is satisfied, the process of energizing the crankcase heater 67 for a predetermined time or until the temperature of the oil reservoir reaches a predetermined temperature before the compressor 21 is started up.

In the above-described air conditioner 1a according to the second embodiment as well, as well as the air conditioner 1 according to the first embodiment, since refrigerant containing 1,2-difluoroethylene is used, a GWP can be sufficiently reduced.

Since the outdoor unit 20 of the air conditioner 1a includes the crankcase heater 67, oil foaming at the startup of the compressor 21 can be suppressed.

By using the crankcase heater 67 of which the rated electric power consumption is higher than or equal to 100 W, even in the outdoor unit 20 having a capacity to such a degree that two outdoor fans 25 (the first outdoor fan 25a and the second outdoor fan 25b) are provided, the function of the crankcase heater 67 can be sufficiently exercised appropriately for the capacity.

In addition, by using the crankcase heater 67 of which the rated electric power consumption is lower than or equal to 300 W, even when refrigerant containing 1,2-difluoroethylene leaks in the outdoor unit 20, a situation in which the crankcase heater 67 becomes an ignition source can be suppressed.

(7-1) Modification A of Second Embodiment

In the above-described second embodiment, the air conditioner including only one indoor unit is described as an example; however, the air conditioner may include a plurality of indoor units (with no indoor expansion valve) connected in parallel with each other.

In this case, an internal volume (the volume of fluid that can be filled inside) of the outdoor heat exchanger 23 is preferably greater than or equal to 3.5 L and less than 5.0 L.

(7-2) Modification B of Second Embodiment

In the above-described second embodiment, the air conditioner including only one indoor unit is described as an example; however, the air conditioner may include a plurality of indoor units (with no indoor expansion valve) connected in parallel with each other.

In this case, an internal volume (the volume of fluid that can be filled inside) of the outdoor heat exchanger 23 is preferably greater than or equal to 5.0 L and less than or equal to 7.0 L.

(8) Third Embodiment

Figure 23:
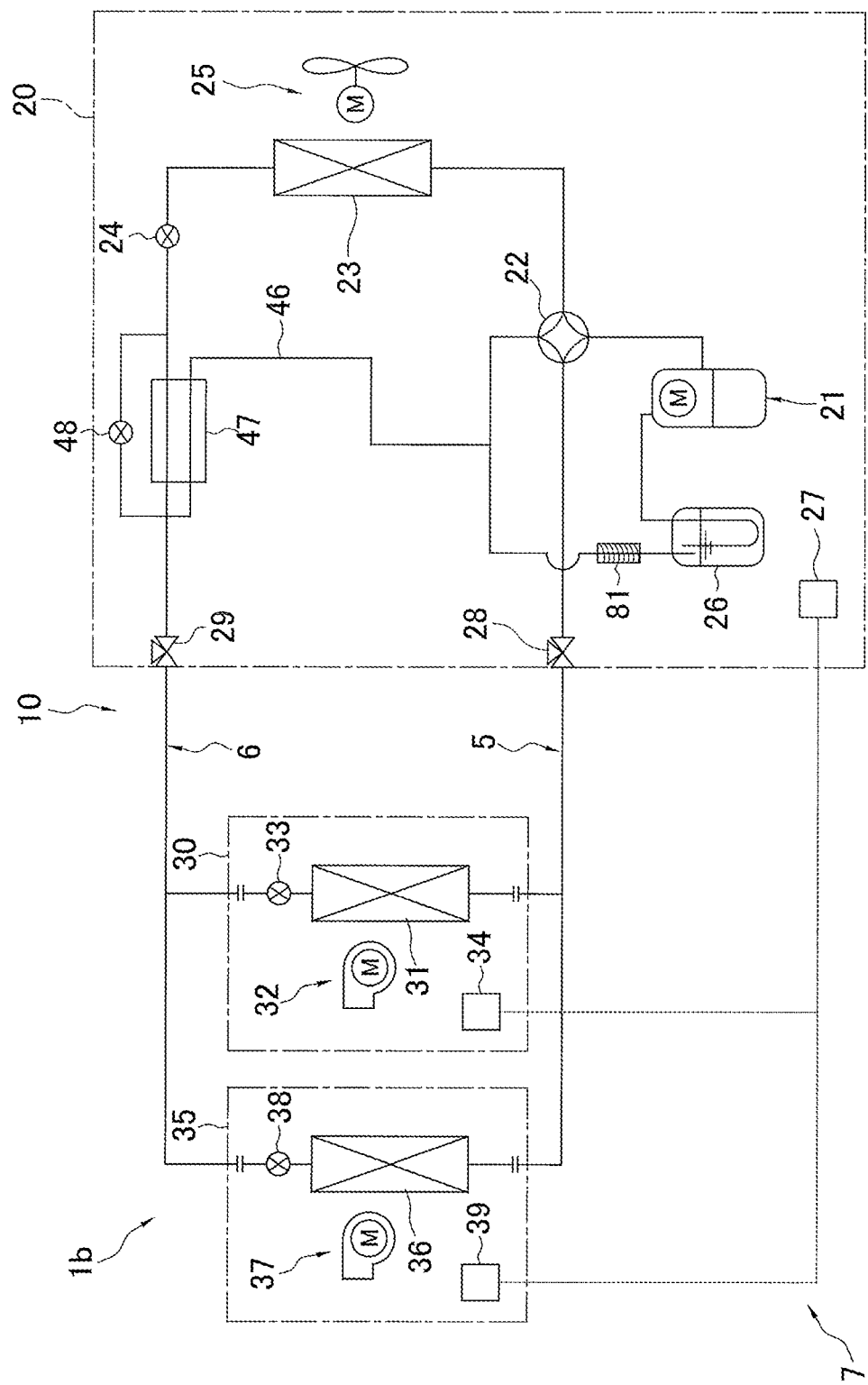
FIG. 23 is a schematic configuration diagram of a refrigerant circuit according to a third embodiment.
Figure 24:
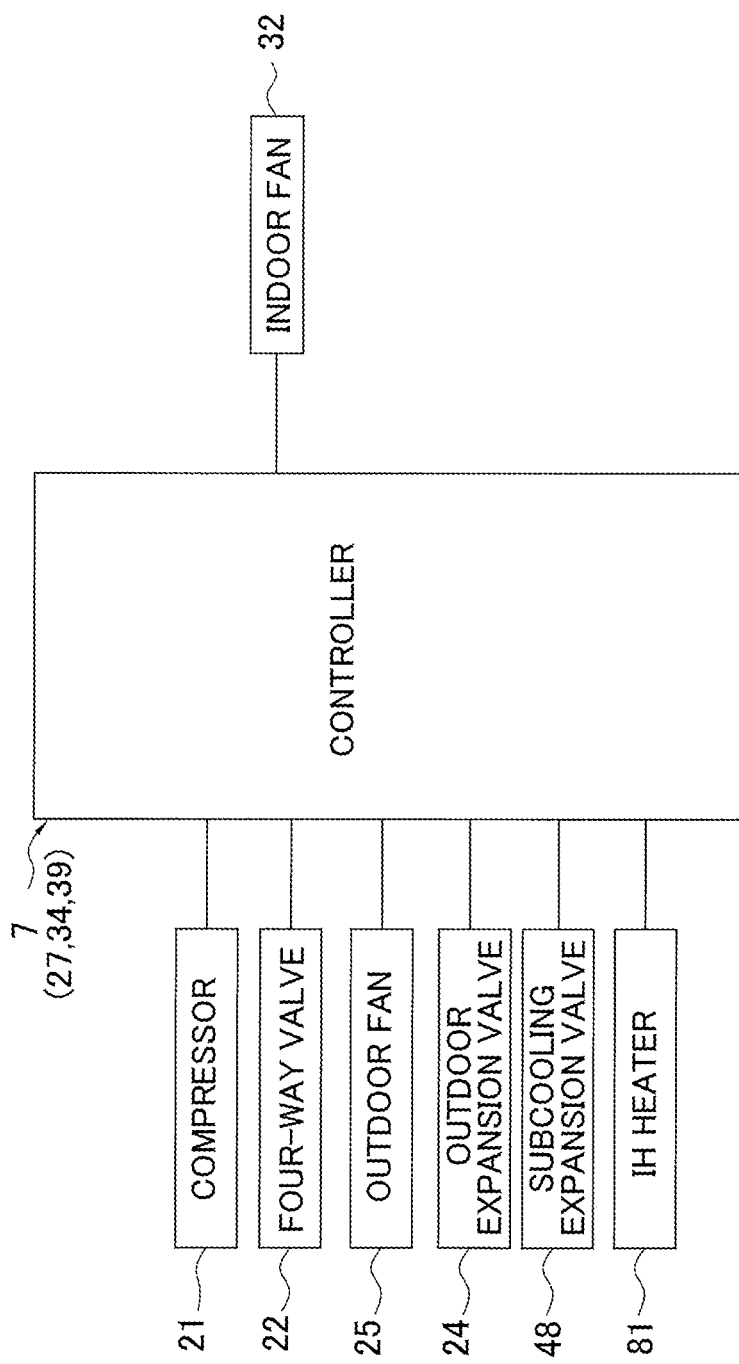
FIG. 24 is a schematic control block configuration diagram of a refrigeration cycle apparatus according to the third embodiment.

Hereinafter, an air conditioner 1b that serves as a refrigeration cycle apparatus according to a third embodiment will be described with reference to FIG. 23 that is the schematic configuration diagram of a refrigerant circuit and FIG. 24 that is a schematic control block configuration diagram.

Hereinafter, mainly, the air conditioner 1b of the third embodiment will be described with a focus on a portion different from the air conditioner 1 of the first embodiment.

In the air conditioner 1b as well, the refrigerant circuit 10 is filled with a refrigerant mixture that contains 1,2-difluoroethylene and that is any one of the above-described refrigerants A to E as a refrigerant for performing a vapor compression refrigeration cycle. The refrigerant circuit 10 is filled with refrigerating machine oil together with the refrigerant. A rated cooling capacity of the air conditioner 1b including the multiple indoor units 30 is not limited and may be, for example, higher than or equal to 18.0 kW and lower than or equal to 160.0 kW.

In the outdoor unit 20 of the air conditioner 1b of the third embodiment, a low-pressure receiver 26, an IH heater 81, a subcooling heat exchanger 47, and a subcooling circuit 46 are provided in the outdoor unit 20 of the above-described first embodiment.

The low-pressure receiver 26 is a container that is provided between one of connection ports of the four-way valve 22 and the suction side of the compressor 21 and that is able to store refrigerant. In the present embodiment, the low-pressure receiver 26 is provided separately from the attached accumulator of the compressor 21.

The IH heater 81 is an electric heater that is able to heat refrigerant flowing through the refrigerant pipes. The electric heater is not limited and is preferably the one that heats refrigerant with an electromagnetic induction heating system that is an electrical system rather than a system using fire, such as a burner. With the electromagnetic induction heating system, for example, in a state where a raw material containing a magnetic material is provided at a portion that directly or indirectly contacts with refrigerant and an electromagnetic induction coil is wound around the raw material containing the magnetic material, the raw material containing the magnetic material is caused to generate heat by generating magnetic flux as a result of passing current through the electromagnetic induction coil, with the result that refrigerant can be heated.

The subcooling heat exchanger 47 is provided between the outdoor expansion valve 24 and the liquid-side stop valve 29.

The subcooling circuit 46 is a circuit that branches off from a main circuit between the outdoor expansion valve 24 and the subcooling heat exchanger 47 and that merges with a portion halfway from one of the connection ports of the four-way valve 22 to the low-pressure receiver 26. A subcooling expansion valve 48 that decompresses refrigerant passing therethrough is provided halfway in the subcooling circuit 46. Refrigerant flowing through the subcooling circuit 46 and decompressed by the subcooling expansion valve 48 exchanges heat with refrigerant flowing through the main circuit side in the subcooling heat exchanger 47. Thus, refrigerant flowing through the main circuit side is further cooled, and refrigerant flowing through the subcooling circuit 46 evaporates.

Figure 25:
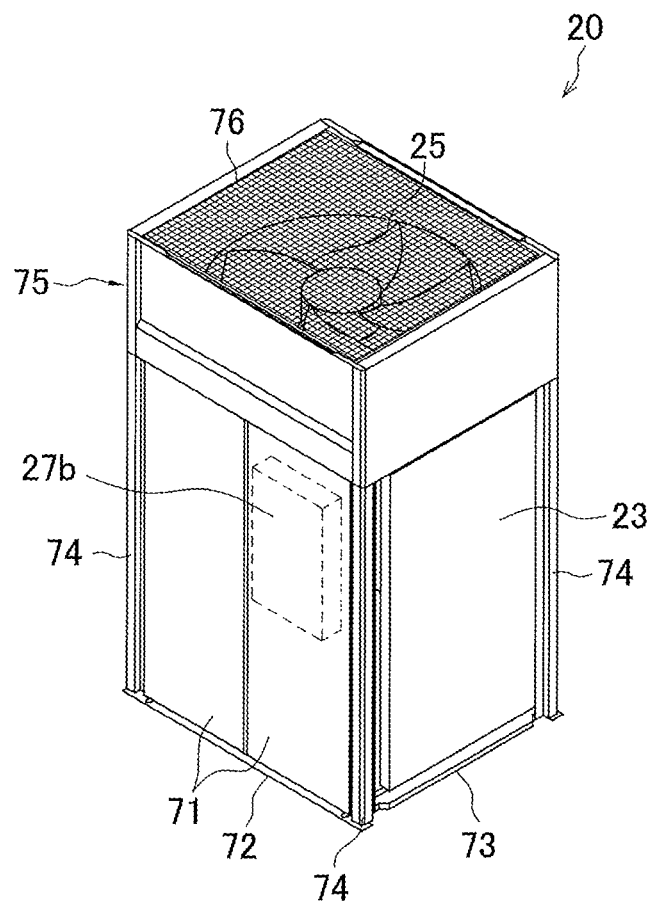
FIG. 25 is a schematic appearance perspective view of an outdoor unit according to the third embodiment.
Figure 26:
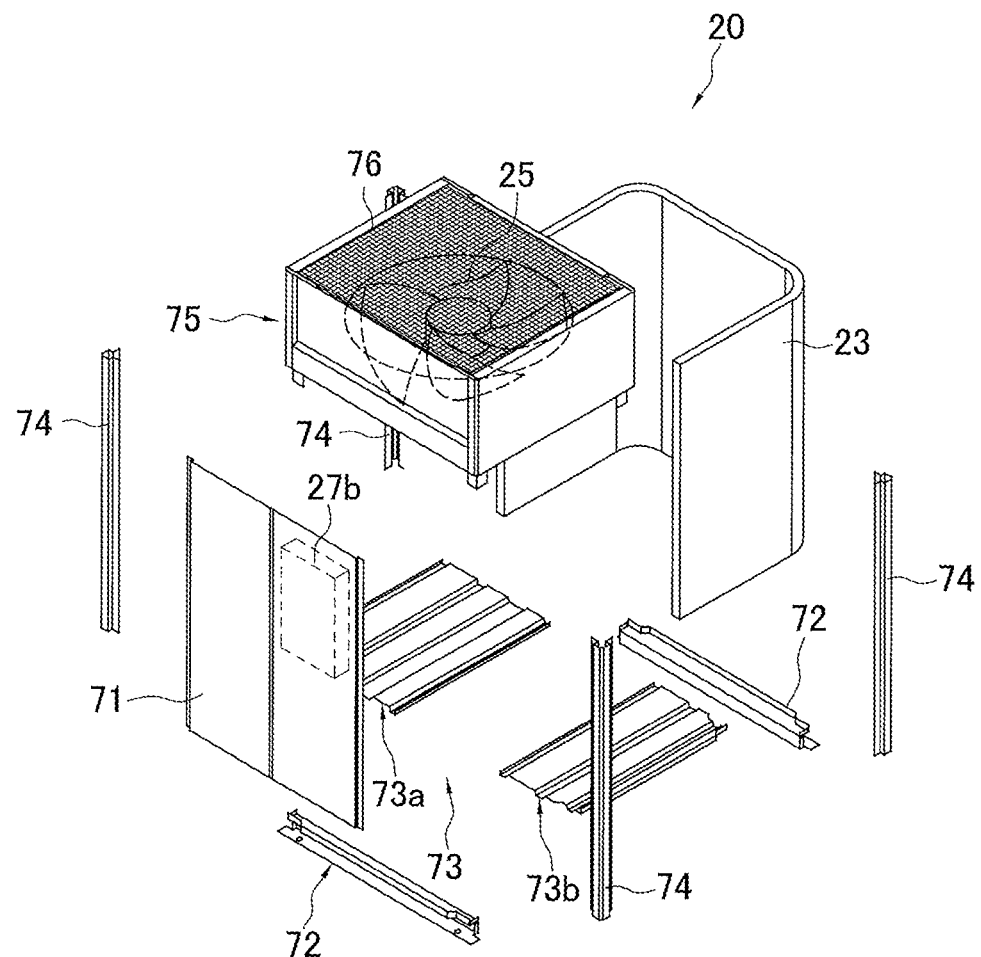
FIG. 26 is a schematic exploded perspective view of the outdoor unit according to the third embodiment.

The detailed structure of the outdoor unit 20 of the air conditioner 1b according to the third embodiment will be described below with reference to the appearance perspective view of FIG. 25 and the exploded perspective view of FIG. 26.

The outdoor unit 20 of the air conditioner 1b may have an up-blow structure that takes in air from the lower side into a casing 70 and discharges air outward of the casing 70 from the upper side.

The casing 70 mainly includes a bottom plate 73 bridged on a pair of installation legs 72 extending in a right-left direction, supports 74 extending in a vertical direction from corners of the bottom plate 73, a front panel 71, and a fan module 75. The bottom plate 73 forms the bottom of the casing 70 and is separated into a left-side first bottom plate 73a and a right-side second bottom plate 73b. The front panel 71 is bridged between the front-side supports 74 below the fan module 75 and makes up the front of the casing 70. Inside the casing 70, the compressor 21, the outdoor heat exchanger 23, the low-pressure receiver 26, the four-way valve 22, the IH heater 81, the outdoor expansion valve 24, the subcooling heat exchanger 47, the subcooling expansion valve 48, the subcooling circuit 46, the gas-side stop valve 28, the liquid-side stop valve 29, an electric component unit 27b that makes up the outdoor unit control unit 27, and the like, are disposed in the space below the fan module 75 and above the bottom plate 73. The outdoor heat exchanger 23 has a substantially U-shape in plan view facing the rear and both right and left sides within a part of the casing 70 below the fan module 75 and substantially forms the rear and both right and left sides of the casing 70. The outdoor heat exchanger 23 is disposed on the bottom plate 73 along the left-side edge portion, rear-side edge portion and right-side edge portion of the bottom plate 73. The electric component unit 27b is provided so as to be fixed to the rear side of the right-side part in the front panel 71.

The fan module 75 is provided above the outdoor heat exchanger 23, and includes the outdoor fan 25, a bell mouth (not shown), and the like. The outdoor fan 25 is disposed in such an orientation that the rotation axis coincides with the vertical direction.

With the above structure, air flow formed by the outdoor fan 25 passes from around the outdoor heat exchanger 23 through the outdoor heat exchanger 23 and flows into the casing 70, and is discharged upward via an air outlet 76 provided so as to extend through in an up-down direction at the upper end surface of the casing 70.

Figure 27:
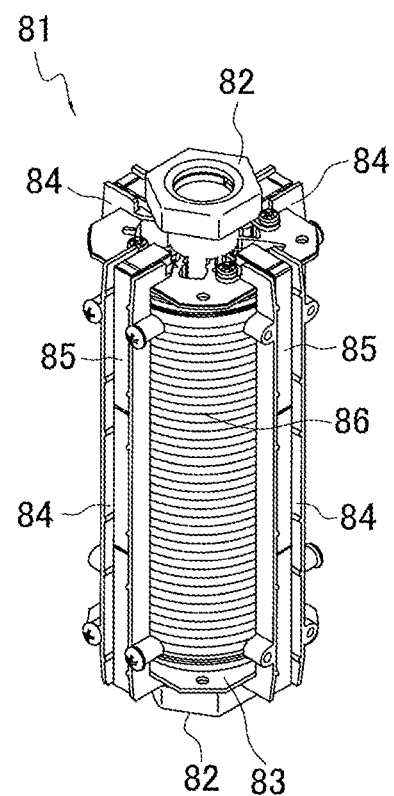
FIG. 27 is a schematic appearance perspective view of an IH heater.
Figure 28:
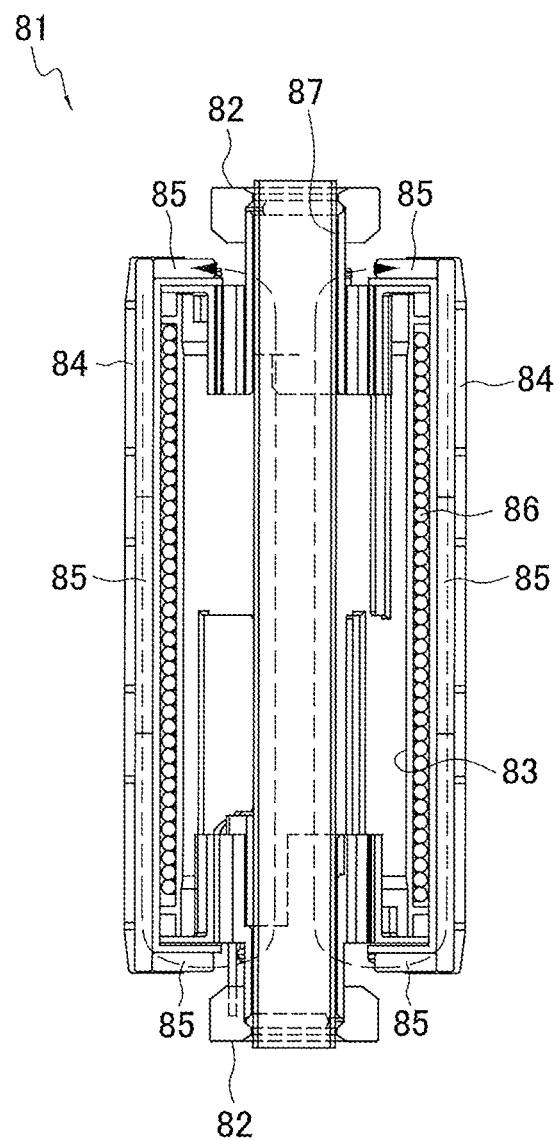
FIG. 28 is a schematic cross-sectional view of the IH heater.

Hereinafter, the detailed structure of the IH heater 81 will be described below with reference to the appearance perspective view of FIG. 27 and the cross-sectional view of FIG. 28.

The IH heater 81 includes a pipe portion 87, fixing members 82, a cylindrical member 83, ferrite cases 84, ferrite members 85, a coil 86, and the like. The pipe portion 87 is made of a metal, and both ends are fixedly coupled to the refrigerant pipes that make up the refrigerant circuit 10 by welding, or the like. Although not limited, the pipe portion 87 may be made such that an inner part is made of a copper alloy and an outer part is made of iron. A portion that heats refrigerant with the IH heater 81 in the refrigerant circuit 10 is not limited, and, in the present embodiment, the IH heater 81 is provided so as to be able to heat a portion from one of connection ports of the four-way valve 22 to the low-pressure receiver 26. The cylindrical member 83 is a resin member. The pipe portion 87 is located inside the cylindrical member 83. The coil 86 is wound around the outer periphery of the cylindrical member 83. Both ends of the coil 86 are connected to an electric power supply unit (not shown), and the output is controlled by the outdoor unit control unit 27. The cylindrical member 83 around which the coil 86 is wound is fixed to the pipe portion 87 via the resin fixing members 82 provided at one end and the other end of the pipe portion 87. Thus, the pipe portion 87 is located inside the coil 86 wound around the cylindrical member 83. The plurality of resin ferrite cases 84 extending along the longitudinal direction of the pipe portion 87 are attached to the outer side of the cylindrical member 83. Each ferrite case 84 accommodates the plurality of ferrite members 85 arranged in a direction along the longitudinal direction of the pipe portion 87. Of the plurality of ferrite members 85, the ferrite members 85 disposed at both end portions in the longitudinal direction of the pipe portion 87 are provided so as to approach the pipe portion 87 side.

In the above configuration, when high-frequency current is supplied to the coil 86 of the IH heater 81, magnetic flux can be generated around the coil 86. When the magnetic flux penetrates through the pipe portion 87, eddy current is induced in the pipe portion 87, and the pipe portion 87 generates heat by its own electric resistance. Thus, refrigerant passing inside the pipe portion 87 can be heated. Magnetic flux generated outside the coil 86 can be mainly caused to pass through the ferrite members 85 (see the dashed-line arrows).

The above IH heater 81 has a rated electric power consumption of lower than or equal to 300 W and preferably higher than or equal to 200 W.

In the air conditioner 1b according to the third embodiment, instead of the indoor unit 30 in the above-described first embodiment, a first indoor unit 30 and a second indoor unit 35 are provided in parallel with each other.

The first indoor unit 30, as well as the indoor unit 30 in the above-described first embodiment, includes a first indoor heat exchanger 31, a first indoor fan 32, and a first indoor unit control unit 34, and further includes a first indoor expansion valve 33 at the liquid side of the first indoor heat exchanger 31. The first indoor expansion valve 33 is able to control the valve opening degree.

The second indoor unit 35, as well as the first indoor unit 30, includes a second indoor heat exchanger 36, a second indoor fan 37, a second indoor unit control unit 39, and a second indoor expansion valve 38 provided at the liquid side of the second indoor heat exchanger 36. The second indoor expansion valve 38 is able to control the valve opening degree.

In this way, in the air conditioner 1b according to the third embodiment in which the plurality of indoor units each including the indoor expansion valve and the up-blow type outdoor unit is provided, the internal volume (the volume of fluid that can be filled inside) of the outdoor heat exchanger 23 of the outdoor unit 20 is preferably greater than or equal to 5.5 L and less than or equal to 38 L.

The controller 7 of the third embodiment is made up of the outdoor unit control unit 27, the first indoor unit control unit 34, and the second indoor unit control unit 39 communicably connected to one another.

In the above air conditioner 1b, in the cooling operation mode, the outdoor expansion valve 24 is controlled such that the degree of subcooling of refrigerant that passes through the liquid-side outlet of the outdoor heat exchanger 23 satisfies a predetermined condition. In the cooling operation mode, the subcooling expansion valve 48 is controlled such that the degree of superheating of refrigerant that the compressor 21 takes in satisfies a predetermined condition. In the cooling operation mode, the first indoor expansion valve 33 and the second indoor expansion valve 38 are controlled to a fully open state.

In the heating operation mode, the first indoor expansion valve 33 is controlled such that the degree of subcooling of refrigerant that passes through the liquid-side outlet of the first indoor heat exchanger 31 satisfies a predetermined condition. Similarly, the second indoor expansion valve 38 is also controlled such that the degree of subcooling of refrigerant that passes through the liquid-side outlet of the second indoor heat exchanger 36 satisfies a predetermined condition. In the heating operation mode, the outdoor expansion valve 45 is controlled such that the degree of superheating of refrigerant that the compressor 21 takes in satisfies a predetermined condition. In the heating operation mode, the subcooling expansion valve 48 is controlled such that the degree of superheating of refrigerant that the compressor 21 takes in satisfies a predetermined condition.

In the above-described air conditioner 1b according to the third embodiment as well, as well as the air conditioner 1 according to the first embodiment, since refrigerant containing 1,2-difluoroethylene is used, a GWP can be sufficiently reduced.

Since the outdoor unit 20 of the air conditioner 1b includes the IH heater 81, refrigerant flowing through the portion where the IH heater 81 is provided in the refrigerant circuit 10 can be heated. By heating refrigerant flowing at the suction side of the compressor 21, refrigerant that is taken into the compressor 21 can be more reliably changed into a gas state, so liquid compression in the compressor 21 can be reduced.

By using the IH heater 81 of which the rated electric power consumption is higher than or equal to 200 W, for the outdoor unit 20 having a capacity to such a degree like the up-blow type as well, the function of the IH heater 81 can be sufficiently exercised appropriately for the capacity.

In addition, by using the IH heater 81 of which the rated electric power consumption is lower than or equal to 300 W, even when refrigerant containing 1,2-difluoroethylene leaks in the outdoor unit 20, a situation in which the IH heater 81 becomes an ignition source can be suppressed.

(9) Fourth Embodiment

An air conditioner or an outdoor unit may be made up of a combination of the above-described first embodiment to third embodiment and modifications as needed. For example, the outdoor unit of the second embodiment may further include a drain pan heater and an IH heater. In this case, it is allowable that the rated electric power consumption of each electric heater does not exceed a predetermined value. Alternatively, the total of the rated electric power consumptions of the electric heater may be configured to be lower than or equal to 300 W.

The embodiments of the present disclosure are described above; however, it is understood that various modifications of modes and details are applicable without departing from the purport or scope of the present disclosure recited in the claims.

REFERENCE SIGNS LIST 20 outdoor unit (air-conditioning unit)
21 compressor (device)
23 outdoor heat exchanger (heat exchanger, device)
25 outdoor fan (fan)
25a first outdoor fan (fan)
25b second outdoor fan (fan)
50 casing
52 air outlet
54 drain pan heater (electric heater)
60 casing
62a first air outlet (air outlet)
62b second air outlet (air outlet)
67 crankcase heater (electric heater)
70 casing
76 air outlet
81 IH heater (refrigerant heater, electric heater)

CITATION LIST

Patent Literature

PTL 1 International Publication No. 2015/141678

The invention claimed is:
1. An air-conditioning unit comprising:
a casing;

a device provided inside the casing; and
an electric heater provided inside the casing, wherein
the device is a compressor configured to compress a refrigerant and/or a heat exchanger configured to exchange heat between air and the refrigerant, and
an electric power consumption of the electric heater is lower than or equal to 300 W, and
wherein
the refrigerant comprises trans-1,2-difluoroethylene (HFO-1132(E)), difluoromethane (R32), and 2,3,3,3-tetrafluoro-1-propene (R1234yf),
wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:
point I (72.0, 0.0, 28.0),
point J (48.5, 18.3, 33.2),
point N (27.7, 18.2, 54.1), and
point E (58.3, 0.0, 41.7),
or on these line segments (excluding the points on the line segment EI;
the line segment IJ is represented by coordinates $(0.0236y^2-1.7616y+72.0, y, -0.0236y^2+0.7616y+28.0)$;
the line segment NE is represented by coordinates $(0.012y^2-1.9003y+58.3, y, -0.012y^2+0.9003y+41.7)$; and
the line segments JN and EI are straight lines.

2. The air-conditioning unit according to claim 1, wherein
the casing has an air outlet for discharging air having passed through the heat exchanger at a side in an installation state, and
the electric power consumption of the electric heater is higher than or equal to 75 W.

3. The air-conditioning unit according to claim 2, further comprising:
a single fan configured to form air flow passing through the heat exchanger, wherein
the electric power consumption of the electric heater is higher than or equal to 75 W and lower than or equal to 100 W.

4. The air-conditioning unit according to claim 2, further comprising:
two fans configured to form air flow passing through the heat exchanger, wherein
the electric power consumption of the electric heater is higher than or equal to 100 W.

5. The air-conditioning unit according to claim 1, wherein
the casing has an air outlet for upwardly discharging air having passed through the heat exchanger, and
the electric power consumption of the electric heater is higher than or equal to 200 W.

6. The air-conditioning unit according to claim 1, wherein
the electric heater is at least any one of a drain pan heater, a crankcase heater, and a refrigerant heater.

7. An air-conditioning unit comprising:
a casing;
a device provided inside the casing; and
an electric heater provided inside the casing, wherein
the device is a compressor configured to compress a refrigerant and/or a heat exchanger configured to exchange heat between air and the refrigerant, and
an electric power consumption of the electric heater is lower than or equal to 300 W, and
wherein
the refrigerant comprises trans-1,2-difluoroethylene (HFO-1132(E)), difluoromethane (R32), and 2,3,3,3-tetrafluoro-1-propene (R1234yf),
wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments MM', M'N, NV, VG, and GM that connect the following 5 points:
point M (52.6, 0.0, 47.4),
point M' (39.2, 5.0, 55.8),
point N (27.7, 18.2, 54.1),
point V (11.0, 18.1, 70.9), and
point G (39.6, 0.0, 60.4),
or on these line segments (excluding the points on the line segment GM);
the line segment MM' is represented by coordinates $(0.132y^2-3.34y+52.6, y, -0.132y^2+2.34y+47.4)$;
the line segment M'N is represented by coordinates $(0.0596y^2-2.2541y+48.98, y, -0.0596y^2+1.2541y+51.02)$;
the line segment VG is represented by coordinates $(0.0123y^2-1.8033y+39.6, y, -0.0123y^2+0.8033y+60.4)$; and
the line segments NV and GM are straight lines.

8. An air-conditioning unit comprising:
a casing;
a device provided inside the casing; and
an electric heater provided inside the casing, wherein
the device is a compressor configured to compress a refrigerant and/or a heat exchanger configured to exchange heat between air and the refrigerant, and
an electric power consumption of the electric heater is lower than or equal to 300 W, and
wherein
the refrigerant comprises trans-1,2-difluoroethylene (HFO-1132(E)), difluoromethane (R32), and 2,3,3,3-tetrafluoro-1-propene (R1234yf),
wherein
when the mass % of HFO-1132(E), R32, and R1234yf based on their sum in the refrigerant is respectively represented by x, y and z, coordinates (x,y,z) in a ternary composition diagram in which the sum of HFO-1132(E), R32, and R1234yf is 100 mass % are within the range of a figure surrounded by line segments ON, NU, and UO that connect the following 3 points:
point O (22.6, 36.8, 40.6),
point N (27.7, 18.2, 54.1), and
point U (3.9, 36.7, 59.4),
or on these line segments;
the line segment ON is represented by coordinates $(0.0072y^2-0.6701y+37.512, y, -0.0072y^2-0.3299y+62.488)$;
the line segment NU is represented by coordinates $(0.0083y^2-1.7403y+56.635, y, -0.0083y^2+0.7403y+43.365)$; and
the line segment UO is a straight line.

9. An air-conditioning unit comprising:
a casing;
a device provided inside the casing; and an electric heater provided inside the casing, wherein the device is a compressor configured to compress a refrigerant and/or a heat exchanger configured to exchange heat between air and the refrigerant, and an electric power consumption of the electric heater is lower than or equal to 300 W, and wherein the refrigerant comprises trans-1,2-difluoroethylene (HFO-1132(E)), difluoromethane (R32), and 2,3,3,3-tetrafluoro-1-propene (R1234yf), wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:

point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments;

the line segment QR is represented by coordinates $(0.0099y^2-1.975y+84.765, y, -0.0099y^2+0.975y+15.235)$;

the line segment RT is represented by coordinates $(0.0082y^2-1.8683y+83.126, y, -0.0082y^2+0.8683y+16.874)$;

the line segment LK is represented by coordinates $(0.0049y^2-0.8842y+61.488, y, -0.0049y^2-0.1158y+38.512)$;

the line segment KQ is represented by coordinates $(0.0095y^2-1.2222y+67.676, y, -0.0095y^2+0.2222y+32.324)$; and the line segment TL is a straight line.

10. An air-conditioning unit comprising:

a casing;

a device provided inside the casing; and an electric heater provided inside the casing, wherein the device is a compressor configured to compress a refrigerant and/or a heat exchanger configured to exchange heat between air and the refrigerant, and an electric power consumption of the electric heater is lower than or equal to 300 W, and wherein the refrigerant comprises trans-1,2-difluoroethylene (HFO-1132(E)), difluoromethane (R32), and 2,3,3,3-tetrafluoro-1-propene (R1234yf), wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments PS, ST, and TP that connect the following 3 points:

point P (20.5, 51.7, 27.8),
point S (21.9, 39.7, 38.4), and
point T (8.6, 51.6, 39.8),
or on these line segments;

the line segment PS is represented by coordinates $(0.0064y^2-0.7103y+40.1, y, -0.0064y^2-0.2897y+59.9)$;

the line segment ST is represented by coordinates $(0.0082y^2-1.8683y+83.126, y, -0.0082y^2+0.8683y+16.874)$; and the line segment TP is a straight line.

* * * * *